United States Patent
Moussette et al.

(10) Patent No.: US 12,190,714 B2
(45) Date of Patent: *Jan. 7, 2025

(54) DEVICES, METHODS, AND GRAPHICAL USER INTERFACES FOR PROVIDING HAPTIC FEEDBACK

(71) Applicant: Apple Inc., Cupertino, CA (US)

(72) Inventors: Camille Moussette, San Francisco, CA (US); Duncan R. Kerr, San Francisco, CA (US); Joshua B. Kopin, Oakland, CA (US); Jules K. Fennis, Seattle, WA (US); Miao He, Shanghai (CN)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/216,546

(22) Filed: Jun. 29, 2023

(65) Prior Publication Data
US 2023/0343189 A1 Oct. 26, 2023

Related U.S. Application Data

(63) Continuation of application No. 17/947,023, filed on Sep. 16, 2022, now Pat. No. 11,735,014, which is a
(Continued)

(51) Int. Cl.
*G08B 21/12* (2006.01)
*G06F 3/01* (2006.01)
(Continued)

(52) U.S. Cl.
CPC ............... *G08B 3/10* (2013.01); *G06F 3/016* (2013.01); *G06F 3/04847* (2013.01);
(Continued)

(58) Field of Classification Search
USPC ...... 340/540, 426.2, 426.21, 426.22, 539.32, 340/566, 683, 825.49, 7.6, 7.58, 7.59
See application file for complete search history.

(56) References Cited

U.S. PATENT DOCUMENTS

| 5,959,624 A | 9/1999 | Johnston, Jr. et al. |
| 5,990,869 A | 11/1999 | Kubica et al. |
| (Continued) | | |

FOREIGN PATENT DOCUMENTS

| AU | 2016100246 A | 4/2016 |
| AU | 2016100653 A4 | 6/2016 |
| (Continued) | | |

OTHER PUBLICATIONS

US 9,110,555 B2, 08/2015, Fino (withdrawn)
(Continued)

*Primary Examiner* — Daniel Previl
(74) *Attorney, Agent, or Firm* — Morgan, Lewis & Bockius LLP

(57) ABSTRACT

An electronic device displays a user interface that includes a first adjustable control and a second adjustable control and detects movement of a first contact across a touch-sensitive surface in a drag gesture. In accordance with a determination that the drag gesture is performed while a focus selector is at a location that corresponds to the first adjustable control: the device outputs a first plurality of tactile outputs that has a first distribution of tactile outputs. In accordance with a determination that the drag gesture is performed while the focus selector is at a location that corresponds to the second adjustable control, the device outputs a second plurality of tactile outputs. The second plurality of tactile outputs has a second distribution of tactile outputs that is different from the first distribution of tactile outputs.

36 Claims, 79 Drawing Sheets

Related U.S. Application Data continuation of application No. 17/318,995, filed on May 12, 2021, now Pat. No. 11,468,749, which is a continuation of application No. 16/885,166, filed on May 27, 2020, now Pat. No. 11,037,413, which is a continuation of application No. 16/355,621, filed on Mar. 15, 2019, now Pat. No. 10,692,333, which is a continuation of application No. 15/905,671, filed on Feb. 26, 2018, now Pat. No. 10,276,000, which is a continuation of application No. 15/619,359, filed on Jun. 9, 2017, now Pat. No. 9,984,539.

(60) Provisional application No. 62/507,039, filed on May 16, 2017, provisional application No. 62/349,115, filed on Jun. 12, 2016.

(51) Int. Cl.
*G06F 3/04847* (2022.01)
*G06F 3/0486* (2013.01)
*G06F 3/04883* (2022.01)
*G06F 3/16* (2006.01)
*G08B 3/10* (2006.01)
*G08B 6/00* (2006.01)
*H04M 1/724* (2021.01)
*H04M 1/72454* (2021.01)
*H04M 19/04* (2006.01)
*G06F 3/041* (2006.01)

(52) U.S. Cl.
CPC ........ *G06F 3/0486* (2013.01); *G06F 3/04883* (2013.01); *G06F 3/16* (2013.01); *G06F 3/167* (2013.01); *G08B 6/00* (2013.01); *H04M 1/724* (2021.01); *H04M 1/72454* (2021.01); *H04M 19/047* (2013.01); *G06F 3/041* (2013.01); *G06F 2203/014* (2013.01)

(56) References Cited

U.S. PATENT DOCUMENTS

| | | |
|---|---|---|
| 6,211,861 B1 | 4/2001 | Rosenberg et al. |
| 6,424,251 B1 | 7/2002 | Byre |
| 6,433,771 B1 | 8/2002 | Yocum et al. |
| 6,560,165 B1 | 5/2003 | Barker |
| 7,130,664 B1 | 10/2006 | Williams |
| 7,305,257 B2 | 12/2007 | Ladouceur et al. |
| 7,308,253 B2 | 12/2007 | Moody et al. |
| 7,469,381 B2 | 12/2008 | Ording |
| 7,479,949 B2 | 1/2009 | Jobs et al. |
| 7,720,213 B2 | 5/2010 | Desai et al. |
| 7,809,406 B2 | 10/2010 | Weinans |
| 7,958,456 B2 | 6/2011 | Ording et al. |
| 7,978,183 B2 | 7/2011 | Rosenberg et al. |
| 8,026,814 B1 | 9/2011 | Heinze et al. |
| 8,131,848 B1 | 3/2012 | Denise |
| 8,144,125 B2 | 3/2012 | Peng et al. |
| 8,165,640 B2 | 4/2012 | Mullen |
| 8,204,548 B1 | 6/2012 | Blinn et al. |
| 8,207,832 B2 | 6/2012 | Yun et al. |
| 8,209,606 B2 | 6/2012 | Ording |
| 8,258,986 B2 | 9/2012 | Makovetskyy |
| 8,266,550 B1 | 9/2012 | Cleron et al. |
| 8,279,194 B2 | 10/2012 | Kent et al. |
| 8,331,268 B2 | 12/2012 | Hicks, III |
| 8,477,106 B2 | 7/2013 | Salaverry et al. |
| 8,509,856 B1 | 8/2013 | Blinn et al. |
| 8,548,418 B1 | 10/2013 | Jintaseranee et al. |
| 8,619,051 B2 | 12/2013 | Lacroix et al. |
| 8,624,864 B2 | 1/2014 | Birnbaum et al. |
| 8,659,571 B2 | 2/2014 | Birnbaum et al. |
| 8,661,363 B2 | 2/2014 | Platzer et al. |
| 8,676,274 B2 | 3/2014 | Li |
| 8,698,766 B2 | 4/2014 | Ali et al. |
| 8,712,383 B1 | 4/2014 | Hayes et al. |
| 8,717,151 B2 | 5/2014 | Forutanpour et al. |
| 8,750,296 B2 | 6/2014 | Bosschaert et al. |
| 8,754,757 B1 | 6/2014 | Ullrich et al. |
| 8,768,838 B1 | 7/2014 | Hoffman |
| 8,773,356 B2 | 7/2014 | Martin et al. |
| 8,886,252 B2 | 11/2014 | Luke et al. |
| 8,886,576 B1 | 11/2014 | Sanketi et al. |
| 8,914,743 B2 | 12/2014 | Nakajima et al. |
| 8,976,124 B1 | 3/2015 | Wright |
| 9,088,668 B1 | 7/2015 | Salvador |
| 9,092,953 B1 | 7/2015 | Mortimer et al. |
| 9,100,805 B2 | 8/2015 | Oshita |
| 9,110,529 B2 | 8/2015 | Kido |
| 9,110,562 B1 | 8/2015 | Eldawy |
| 9,166,823 B2 | 10/2015 | Karmarkar |
| 9,189,932 B2 | 11/2015 | Kerdemelidis |
| 9,244,562 B1 | 1/2016 | Rosenberg et al. |
| 9,247,525 B2 | 1/2016 | Jacobs et al. |
| 9,304,675 B2 | 4/2016 | Lemay et al. |
| 9,335,924 B2 | 5/2016 | Jobs et al. |
| 9,357,052 B2 | 5/2016 | Ullrich |
| 9,411,422 B1 | 8/2016 | McClendon et al. |
| 9,417,740 B2 | 8/2016 | Rauhala et al. |
| 9,430,796 B1 | 8/2016 | So |
| 9,509,829 B2 | 11/2016 | Culbert et al. |
| 9,542,820 B2 | 1/2017 | Moussette et al. |
| 9,548,050 B2 | 1/2017 | Gruber et al. |
| 9,588,586 B2 | 3/2017 | Rihn |
| 9,600,175 B2 | 3/2017 | Araki |
| 9,652,140 B2 | 5/2017 | Song et al. |
| 9,658,760 B2 | 5/2017 | Tee et al. |
| 9,665,960 B1 | 5/2017 | Masters et al. |
| 9,690,382 B2 | 6/2017 | Moussette et al. |
| 9,830,784 B2 | 11/2017 | Moussette et al. |
| 9,852,590 B2 | 12/2017 | Bhatia |
| 9,864,432 B1 | 1/2018 | Moussette et al. |
| 9,928,699 B2 | 3/2018 | Moussette et al. |
| 9,954,996 B2 | 4/2018 | Christie et al. |
| 9,984,539 B2 * | 5/2018 | Moussette ........... G06F 3/04883 |
| 10,013,162 B2 | 7/2018 | Fleizach et al. |
| 10,034,129 B1 | 7/2018 | Ellis et al. |
| 10,276,000 B2 * | 4/2019 | Moussette ............ G06F 3/013 |
| 10,338,772 B2 | 7/2019 | Anzures et al. |
| 10,692,333 B2 * | 6/2020 | Moussette ........... H04M 19/047 |
| 10,791,273 B1 | 9/2020 | Manzari et al. |
| 11,037,413 B2 * | 6/2021 | Moussette ............... G06F 3/16 |
| 11,099,650 B1 | 8/2021 | Haynold |
| 11,468,749 B2 * | 10/2022 | Moussette ............ G06F 3/0486 |
| 11,735,014 B2 * | 8/2023 | Moussette ............... G06F 3/013 |
| | | 340/540 |
| 2001/0002126 A1 | 5/2001 | Rosenberg et al. |
| 2001/0016518 A1 | 8/2001 | Nishiumi et al. |
| 2002/0057263 A1 | 5/2002 | Keely et al. |
| 2002/0080112 A1 | 6/2002 | Braun et al. |
| 2002/0115478 A1 | 8/2002 | Fujisawa et al. |
| 2003/0058265 A1 | 3/2003 | Robinson et al. |
| 2004/0088353 A1 | 5/2004 | Mendelsohn et al. |
| 2004/0095311 A1 | 5/2004 | Tarlton et al. |
| 2004/0213401 A1 | 10/2004 | Aupperle et al. |
| 2004/0233161 A1 | 11/2004 | Shahoian et al. |
| 2005/0231489 A1 | 10/2005 | Ladouceur et al. |
| 2005/0275638 A1 | 12/2005 | Kolmykov-Zotov et al. |
| 2005/0285846 A1 | 12/2005 | Funaki |
| 2006/0026521 A1 | 2/2006 | Hotelling et al. |
| 2006/0026535 A1 | 2/2006 | Hotelling et al. |
| 2006/0045252 A1 | 3/2006 | Gorti et al. |
| 2006/0248183 A1 | 11/2006 | Barton |
| 2007/0025335 A1 | 2/2007 | Patel et al. |
| 2007/0046627 A1 | 3/2007 | Soh et al. |
| 2007/0055770 A1 | 3/2007 | Karmakar et al. |
| 2007/0088560 A1 | 4/2007 | Mock et al. |
| 2007/0106457 A1 | 5/2007 | Rosenberg |
| 2007/0132789 A1 | 6/2007 | Ording et al. |
| 2007/0146316 A1 | 6/2007 | Poupyrev et al. |
| 2007/0193436 A1 | 8/2007 | Chu |
| 2007/0224980 A1 | 9/2007 | Wakefield |
| 2007/0226646 A1 | 9/2007 | Nagiyama et al. |
| 2007/0274503 A1 | 11/2007 | Klemm et al. |

(56) References Cited

U.S. PATENT DOCUMENTS

| | | |
|---|---|---|
| 2007/0283239 A1 | 12/2007 | Morris |
| 2008/0024459 A1 | 1/2008 | Poupyrev et al. |
| 2008/0122796 A1 | 5/2008 | Jobs et al. |
| 2008/0161062 A1 | 7/2008 | Harris et al. |
| 2008/0174570 A1 | 7/2008 | Jobs et al. |
| 2008/0270931 A1 | 10/2008 | Bamford |
| 2009/0075694 A1 | 3/2009 | Kim et al. |
| 2009/0085878 A1 | 4/2009 | Heubel et al. |
| 2009/0128581 A1 | 5/2009 | Brid et al. |
| 2009/0135142 A1 | 5/2009 | Fu et al. |
| 2009/0167508 A1 | 7/2009 | Fadell et al. |
| 2009/0167509 A1 | 7/2009 | Fadell et al. |
| 2009/0167704 A1 | 7/2009 | Terlizzi et al. |
| 2009/0178008 A1 | 7/2009 | Herz et al. |
| 2009/0215432 A1 | 8/2009 | Matsuoka |
| 2009/0215479 A1 | 8/2009 | Karmarkar |
| 2009/0219252 A1 | 9/2009 | Jarventie et al. |
| 2009/0222902 A1 | 9/2009 | Bender et al. |
| 2009/0228825 A1 | 9/2009 | Van O's et al. |
| 2009/0231271 A1 | 9/2009 | Heubel et al. |
| 2009/0231276 A1 | 9/2009 | Ullrich et al. |
| 2009/0284463 A1 | 11/2009 | Morimoto et al. |
| 2009/0292990 A1 | 11/2009 | Park et al. |
| 2009/0303031 A1 | 12/2009 | Strohallen et al. |
| 2009/0322497 A1 | 12/2009 | Ku et al. |
| 2009/0325645 A1 | 12/2009 | Bang et al. |
| 2009/0325647 A1 | 12/2009 | Cho et al. |
| 2010/0017489 A1 | 1/2010 | Birnbaum et al. |
| 2010/0017759 A1 | 1/2010 | Birnbaum et al. |
| 2010/0077328 A1 | 3/2010 | Berg et al. |
| 2010/0085317 A1 | 4/2010 | Park et al. |
| 2010/0099445 A1 | 4/2010 | Song et al. |
| 2010/0114974 A1 | 5/2010 | Jung et al. |
| 2010/0141411 A1 | 6/2010 | Ahn et al. |
| 2010/0144395 A1 | 6/2010 | Komiya |
| 2010/0156818 A1 | 6/2010 | Burrough et al. |
| 2010/0188327 A1 | 7/2010 | Frid et al. |
| 2010/0231367 A1 | 9/2010 | Cruz-Hernandez et al. |
| 2010/0231534 A1 | 9/2010 | Chaudhri et al. |
| 2010/0231537 A1 | 9/2010 | Pisula et al. |
| 2010/0267424 A1 | 10/2010 | Kim et al. |
| 2010/0278512 A1 | 11/2010 | Ryu et al. |
| 2010/0298034 A1 | 11/2010 | Shin et al. |
| 2010/0299638 A1 | 11/2010 | Choi |
| 2010/0302003 A1 | 12/2010 | Zellner |
| 2010/0302042 A1 | 12/2010 | Barnett et al. |
| 2010/0321411 A1 | 12/2010 | Paek et al. |
| 2011/0001707 A1 | 1/2011 | Faubert et al. |
| 2011/0017828 A1 | 1/2011 | Pine |
| 2011/0018695 A1 | 1/2011 | Bells et al. |
| 2011/0027381 A1 | 2/2011 | Gradl et al. |
| 2011/0053577 A1 | 3/2011 | Lee et al. |
| 2011/0055753 A1 | 3/2011 | Horodezky et al. |
| 2011/0061028 A1 | 3/2011 | Bachman et al. |
| 2011/0074695 A1 | 3/2011 | Rapp et al. |
| 2011/0081889 A1 | 4/2011 | Gao et al. |
| 2011/0102349 A1 | 5/2011 | Harris |
| 2011/0119610 A1 | 5/2011 | Hackborn et al. |
| 2011/0126148 A1 | 5/2011 | Krishnaraj et al. |
| 2011/0141142 A1 | 6/2011 | Leffert et al. |
| 2011/0148608 A1 | 6/2011 | Grant et al. |
| 2011/0179388 A1 | 7/2011 | Fleizach et al. |
| 2011/0190595 A1 | 8/2011 | Bennett et al. |
| 2011/0202843 A1 | 8/2011 | Morris |
| 2011/0210926 A1 | 9/2011 | Pasquero et al. |
| 2011/0216209 A1 | 9/2011 | Fredlund et al. |
| 2011/0252346 A1 | 10/2011 | Chaudhri et al. |
| 2011/0264491 A1 | 10/2011 | Birnbaum et al. |
| 2011/0266375 A1 | 11/2011 | Ono et al. |
| 2011/0267181 A1 | 11/2011 | Kildal |
| 2011/0267294 A1 | 11/2011 | Kildal |
| 2011/0270358 A1 | 11/2011 | Davis et al. |
| 2011/0271181 A1 | 11/2011 | Tsai et al. |
| 2011/0279380 A1 | 11/2011 | Weber et al. |
| 2011/0279381 A1 | 11/2011 | Tong et al. |
| 2011/0316698 A1 | 12/2011 | Palin et al. |
| 2012/0016879 A1 | 1/2012 | Groux et al. |
| 2012/0019365 A1 | 1/2012 | Tuikka et al. |
| 2012/0026110 A1 | 2/2012 | Yamano |
| 2012/0027216 A1 | 2/2012 | Tirry et al. |
| 2012/0028577 A1 | 2/2012 | Rodriguez et al. |
| 2012/0044251 A1 | 2/2012 | Mark et al. |
| 2012/0050324 A1 | 3/2012 | Jeong et al. |
| 2012/0056806 A1 | 3/2012 | Rosenberg et al. |
| 2012/0062491 A1 | 3/2012 | Coni et al. |
| 2012/0105367 A1 | 5/2012 | Son et al. |
| 2012/0173770 A1 | 7/2012 | Walker et al. |
| 2012/0174033 A1 | 7/2012 | Joo |
| 2012/0191704 A1 | 7/2012 | Jones |
| 2012/0216139 A1 | 8/2012 | Ording et al. |
| 2012/0229276 A1 | 9/2012 | Ronkainen |
| 2012/0229401 A1 | 9/2012 | Birnbaum et al. |
| 2012/0249461 A1 | 10/2012 | Flanagan et al. |
| 2012/0268412 A1 | 10/2012 | Cruz-Hernandez et al. |
| 2012/0286943 A1 | 11/2012 | Rothkopf et al. |
| 2012/0286944 A1 | 11/2012 | Forutanpour et al. |
| 2012/0299857 A1 | 11/2012 | Grant et al. |
| 2012/0299859 A1 | 11/2012 | Kinoshita |
| 2012/0306631 A1 | 12/2012 | Hughes |
| 2012/0306632 A1 | 12/2012 | Fleizach et al. |
| 2012/0306790 A1 | 12/2012 | Kyung et al. |
| 2012/0311477 A1 | 12/2012 | Mattos et al. |
| 2012/0327006 A1 | 12/2012 | Israr et al. |
| 2013/0031507 A1 | 1/2013 | George |
| 2013/0091462 A1 | 4/2013 | Gray et al. |
| 2013/0165226 A1 | 6/2013 | Thorner |
| 2013/0167058 A1 | 6/2013 | Levee et al. |
| 2013/0174100 A1 | 7/2013 | Seymour et al. |
| 2013/0174137 A1 | 7/2013 | Kim |
| 2013/0201115 A1 | 8/2013 | Heubel |
| 2013/0222224 A1 | 8/2013 | Eriksson et al. |
| 2013/0225300 A1 | 8/2013 | Brinlee |
| 2013/0234929 A1 | 9/2013 | Libin |
| 2013/0244633 A1 | 9/2013 | Jacobs et al. |
| 2013/0262298 A1 | 10/2013 | Morley |
| 2013/0265268 A1 | 10/2013 | Okumura et al. |
| 2013/0282325 A1 | 10/2013 | Takahashi et al. |
| 2013/0290442 A1 | 10/2013 | Dgani |
| 2013/0300684 A1 | 11/2013 | Kim et al. |
| 2013/0307786 A1 | 11/2013 | Heubel |
| 2013/0316744 A1 | 11/2013 | Newham et al. |
| 2013/0318437 A1 | 11/2013 | Jung et al. |
| 2013/0321317 A1 | 12/2013 | Hirukawa |
| 2013/0321337 A1 | 12/2013 | Graham et al. |
| 2013/0326367 A1 | 12/2013 | Nakamura et al. |
| 2013/0332721 A1 | 12/2013 | Chaudhri et al. |
| 2014/0002386 A1 | 1/2014 | Rosenberg et al. |
| 2014/0007005 A1 | 1/2014 | Libin et al. |
| 2014/0024414 A1 | 1/2014 | Fuji |
| 2014/0039900 A1 | 2/2014 | Heubel et al. |
| 2014/0059427 A1 | 2/2014 | Dombrowski et al. |
| 2014/0074716 A1 | 3/2014 | Ni |
| 2014/0075375 A1 | 3/2014 | Hwang et al. |
| 2014/0082501 A1 | 3/2014 | Bae et al. |
| 2014/0091857 A1 | 4/2014 | Bernstein |
| 2014/0092037 A1 | 4/2014 | Kim |
| 2014/0132568 A1 | 5/2014 | Hirose et al. |
| 2014/0139328 A1 | 5/2014 | Zellers et al. |
| 2014/0168105 A1 | 6/2014 | Zhou |
| 2014/0168110 A1 | 6/2014 | Araki et al. |
| 2014/0168124 A1 | 6/2014 | Park et al. |
| 2014/0176415 A1 | 6/2014 | Buuck et al. |
| 2014/0176452 A1 | 6/2014 | Aleksov et al. |
| 2014/0176455 A1 | 6/2014 | Araki et al. |
| 2014/0181222 A1 | 6/2014 | Geris et al. |
| 2014/0181756 A1 | 6/2014 | Kuo |
| 2014/0192037 A1 | 7/2014 | Chung |
| 2014/0197946 A1 | 7/2014 | Park et al. |
| 2014/0207880 A1 | 7/2014 | Malkin et al. |
| 2014/0210740 A1* | 7/2014 | Lee ................. G06F 1/1618 345/173 |
| 2014/0215494 A1 | 7/2014 | Kim |
| 2014/0218317 A1 | 8/2014 | Aberg et al. |
| 2014/0232657 A1 | 8/2014 | Aviles et al. |

(56) References Cited

U.S. PATENT DOCUMENTS

| | | |
|---|---|---|
| 2014/0232679 A1 | 8/2014 | Whitman et al. |
| 2014/0253319 A1 | 9/2014 | Chang |
| 2014/0258857 A1 | 9/2014 | Dykstra-Erickson et al. |
| 2014/0266607 A1 | 9/2014 | Olodort |
| 2014/0267065 A1 | 9/2014 | Levesque et al. |
| 2014/0267069 A1 | 9/2014 | Dionne et al. |
| 2014/0267076 A1 | 9/2014 | Birnbaum et al. |
| 2014/0273858 A1 | 9/2014 | Panther et al. |
| 2014/0281924 A1 | 9/2014 | Chipman et al. |
| 2014/0282011 A1 | 9/2014 | Dellinger et al. |
| 2014/0292501 A1 | 10/2014 | Lim et al. |
| 2014/0292668 A1 | 10/2014 | Fricklas et al. |
| 2014/0292706 A1 | 10/2014 | Hunt et al. |
| 2014/0298172 A1 | 10/2014 | Choi |
| 2014/0300454 A1 | 10/2014 | Lacroix et al. |
| 2014/0304651 A1 | 10/2014 | Johansson et al. |
| 2014/0320402 A1 | 10/2014 | Stahlberg |
| 2014/0320431 A1 | 10/2014 | Cruz-Hernandez et al. |
| 2014/0320435 A1 | 10/2014 | Modarres et al. |
| 2014/0325440 A1 | 10/2014 | Kondo |
| 2014/0329567 A1 | 11/2014 | Chan et al. |
| 2014/0333564 A1 | 11/2014 | Hong et al. |
| 2014/0340316 A1 | 11/2014 | Gu et al. |
| 2014/0351698 A1 | 11/2014 | Nakagawa |
| 2014/0358709 A1 | 12/2014 | Wu |
| 2014/0363113 A1 | 12/2014 | McGavran et al. |
| 2014/0368440 A1 | 12/2014 | Polyakov et al. |
| 2015/0002477 A1 | 1/2015 | Cheatham, III et al. |
| 2015/0020015 A1 | 1/2015 | Zhou |
| 2015/0050966 A1 | 2/2015 | West |
| 2015/0054727 A1 | 2/2015 | Saboune et al. |
| 2015/0055171 A1 | 2/2015 | Joo et al. |
| 2015/0062052 A1 | 3/2015 | Bernstein et al. |
| 2015/0067495 A1 | 3/2015 | Bernstein et al. |
| 2015/0067496 A1 | 3/2015 | Missig et al. |
| 2015/0067497 A1 | 3/2015 | Cieplinski et al. |
| 2015/0067563 A1 | 3/2015 | Bernstein et al. |
| 2015/0067596 A1 | 3/2015 | Brown et al. |
| 2015/0070150 A1 | 3/2015 | Levesque et al. |
| 2015/0070153 A1 | 3/2015 | Bhatia |
| 2015/0070260 A1 | 3/2015 | Saboune et al. |
| 2015/0077335 A1 | 3/2015 | Taguchi et al. |
| 2015/0078586 A1 | 3/2015 | Ang et al. |
| 2015/0082183 A1 | 3/2015 | Hale et al. |
| 2015/0089613 A1 | 3/2015 | Tippett et al. |
| 2015/0097657 A1 | 4/2015 | Gandhi et al. |
| 2015/0103015 A1 | 4/2015 | Berglund et al. |
| 2015/0103028 A1 | 4/2015 | Ruemelin et al. |
| 2015/0116205 A1 | 4/2015 | Westerman et al. |
| 2015/0116239 A1 | 4/2015 | Kaplan et al. |
| 2015/0123775 A1 | 5/2015 | Kerdemelidis |
| 2015/0134531 A1 | 5/2015 | Xia |
| 2015/0135109 A1 | 5/2015 | Zambetti et al. |
| 2015/0138046 A1 | 5/2015 | Moon |
| 2015/0145656 A1 | 5/2015 | Levesque et al. |
| 2015/0145657 A1 | 5/2015 | Levesque et al. |
| 2015/0149899 A1 | 5/2015 | Bernstein et al. |
| 2015/0149964 A1 | 5/2015 | Bernstein et al. |
| 2015/0153828 A1 | 6/2015 | Monkhouse et al. |
| 2015/0153830 A1 | 6/2015 | Hirose et al. |
| 2015/0156196 A1 | 6/2015 | Kim et al. |
| 2015/0169059 A1 | 6/2015 | Behles et al. |
| 2015/0199172 A1 | 7/2015 | Ringuette et al. |
| 2015/0201065 A1 | 7/2015 | Shim et al. |
| 2015/0227173 A1 | 8/2015 | Hwang |
| 2015/0227204 A1 | 8/2015 | Gipson et al. |
| 2015/0227280 A1 | 8/2015 | Westerman et al. |
| 2015/0227589 A1 | 8/2015 | Chakrabarti et al. |
| 2015/0234464 A1 | 8/2015 | Yliaho |
| 2015/0244848 A1 | 8/2015 | Park et al. |
| 2015/0248161 A1 | 9/2015 | Komori et al. |
| 2015/0253835 A1 | 9/2015 | Yu |
| 2015/0254570 A1 | 9/2015 | Florence et al. |
| 2015/0254947 A1 | 9/2015 | Komori et al. |
| 2015/0261296 A1 | 9/2015 | Yoshikawa |
| 2015/0261387 A1 | 9/2015 | Petersen et al. |
| 2015/0268725 A1 | 9/2015 | Levesque et al. |
| 2015/0273322 A1 | 10/2015 | Nakagawa et al. |
| 2015/0286288 A1 | 10/2015 | Lee et al. |
| 2015/0293592 A1* | 10/2015 | Cheong .................. G06F 1/163 |
| | | 345/173 |
| 2015/0301697 A1 | 10/2015 | Petrell et al. |
| 2015/0301838 A1 | 10/2015 | Steeves |
| 2015/0323996 A1 | 11/2015 | Obana et al. |
| 2015/0332226 A1 | 11/2015 | Wu et al. |
| 2015/0332565 A1 | 11/2015 | Cho et al. |
| 2015/0334292 A1 | 11/2015 | Tartz et al. |
| 2015/0346916 A1 | 12/2015 | Jisrawi et al. |
| 2015/0347010 A1 | 12/2015 | Yang et al. |
| 2015/0348512 A1 | 12/2015 | Sabatelli |
| 2015/0350146 A1 | 12/2015 | Cary et al. |
| 2015/0365306 A1 | 12/2015 | Chaudhri et al. |
| 2016/0007290 A1 | 1/2016 | Lindemann et al. |
| 2016/0034152 A1 | 2/2016 | Wilson et al. |
| 2016/0034253 A1 | 2/2016 | Bang et al. |
| 2016/0036996 A1 | 2/2016 | Midholt et al. |
| 2016/0041750 A1 | 2/2016 | Cieplinski et al. |
| 2016/0062464 A1 | 3/2016 | Moussette et al. |
| 2016/0062465 A1 | 3/2016 | Moussette et al. |
| 2016/0062466 A1 | 3/2016 | Moussette et al. |
| 2016/0062467 A1 | 3/2016 | Buxton et al. |
| 2016/0062590 A1 | 3/2016 | Karunamuni et al. |
| 2016/0063496 A1 | 3/2016 | Royyuru et al. |
| 2016/0063748 A1 | 3/2016 | Kim et al. |
| 2016/0063825 A1 | 3/2016 | Moussette et al. |
| 2016/0063826 A1 | 3/2016 | Morrell et al. |
| 2016/0063827 A1 | 3/2016 | Moussette et al. |
| 2016/0063828 A1 | 3/2016 | Moussette et al. |
| 2016/0063850 A1 | 3/2016 | Yang et al. |
| 2016/0065525 A1 | 3/2016 | Dye et al. |
| 2016/0103830 A1 | 4/2016 | Cheong et al. |
| 2016/0123745 A1 | 5/2016 | Cotier et al. |
| 2016/0161922 A1 | 6/2016 | Shin |
| 2016/0165038 A1 | 6/2016 | Lim et al. |
| 2016/0179203 A1 | 6/2016 | Modarres et al. |
| 2016/0187988 A1 | 6/2016 | Levesque et al. |
| 2016/0189492 A1 | 6/2016 | Hamam et al. |
| 2016/0205244 A1 | 7/2016 | Dvortsov et al. |
| 2016/0246376 A1 | 8/2016 | Birnbaum et al. |
| 2016/0259435 A1 | 9/2016 | Qian et al. |
| 2016/0259499 A1 | 9/2016 | Kocienda et al. |
| 2016/0259519 A1 | 9/2016 | Foss et al. |
| 2016/0259528 A1* | 9/2016 | Foss .................. G06T 13/80 |
| 2016/0259542 A1 | 9/2016 | Chaudhri et al. |
| 2016/0295010 A1 | 10/2016 | Miller |
| 2016/0313875 A1 | 10/2016 | Williams et al. |
| 2016/0339750 A1 | 11/2016 | Elnajjar |
| 2016/0342973 A1 | 11/2016 | Jueng et al. |
| 2016/0349936 A1 | 12/2016 | Cho et al. |
| 2016/0357354 A1 | 12/2016 | Chen et al. |
| 2016/0357362 A1 | 12/2016 | Gauci et al. |
| 2016/0357363 A1 | 12/2016 | Decker et al. |
| 2016/0364026 A1 | 12/2016 | Bernstein et al. |
| 2017/0011210 A1* | 1/2017 | Cheong .................. A61B 5/681 |
| 2017/0031495 A1 | 2/2017 | Smith |
| 2017/0046024 A1 | 2/2017 | Dascola et al. |
| 2017/0046025 A1* | 2/2017 | Dascola .................. G06F 3/016 |
| 2017/0068511 A1 | 3/2017 | Brown et al. |
| 2017/0075520 A1 | 3/2017 | Bauer et al. |
| 2017/0075534 A1 | 3/2017 | Leschenko |
| 2017/0075563 A1 | 3/2017 | Bauer et al. |
| 2017/0083096 A1 | 3/2017 | Rihn et al. |
| 2017/0102916 A1 | 4/2017 | Noble et al. |
| 2017/0185729 A1 | 6/2017 | Boray et al. |
| 2017/0201786 A1 | 7/2017 | Pyhalammi et al. |
| 2017/0357317 A1 | 12/2017 | Chaudhri et al. |
| 2017/0357318 A1 | 12/2017 | Chaudhri et al. |
| 2017/0357319 A1 | 12/2017 | Chaudhri et al. |
| 2017/0357320 A1* | 12/2017 | Chaudhri .............. G06F 3/0488 |
| 2017/0358181 A1 | 12/2017 | Moussette et al. |
| 2018/0067557 A1 | 3/2018 | Robert et al. |
| 2018/0082552 A1 | 3/2018 | Moussette et al. |
| 2018/0129292 A1 | 5/2018 | Moussette et al. |
| 2018/0204425 A1 | 7/2018 | Moussette et al. |

(56) References Cited

U.S. PATENT DOCUMENTS

| | | | |
|---|---|---|---|
| 2018/0335848 A1 | 11/2018 | Moussette et al. |
| 2018/0335939 A1 | 11/2018 | Karunamuni et al. |
| 2018/0367489 A1 | 12/2018 | Dye et al. |
| 2019/0026017 A1 | 1/2019 | Lee et al. |
| 2019/0033970 A1 | 1/2019 | Mellor et al. |
| 2019/0050055 A1 | 2/2019 | Chaudhri et al. |
| 2019/0138103 A1 | 5/2019 | Robert et al. |
| 2019/0213846 A1 | 7/2019 | Moussette et al. |
| 2019/0332179 A1 | 10/2019 | Robert et al. |
| 2020/0110466 A1 | 4/2020 | Moussette et al. |
| 2020/0111334 A1 | 4/2020 | Moussette et al. |
| 2020/0286343 A1 | 9/2020 | Moussette et al. |
| 2021/0117005 A1 | 4/2021 | Robert et al. |
| 2021/0192904 A1 | 6/2021 | Moussette et al. |
| 2021/0264748 A1 | 8/2021 | Moussette et al. |
| 2022/0091678 A1 | 3/2022 | Moussette et al. |
| 2022/0244782 A1 | 8/2022 | Robert et al. |
| 2022/0283643 A1 | 9/2022 | Chaudhri et al. |
| 2023/0019336 A1 | 1/2023 | Moussette et al. |
| 2023/0324996 A1 | 10/2023 | Moussette et al. |
| 2023/0351869 A1 | 11/2023 | Moussette et al. |

FOREIGN PATENT DOCUMENTS

| | | |
|---|---|---|
| CN | 101232665 A | 7/2008 |
| CN | 101375582 A | 2/2009 |
| CN | 101631162 A | 1/2010 |
| CN | 101901048 A | 12/2010 |
| CN | 102330123 A | 2/2012 |
| CN | 102420906 A | 4/2012 |
| CN | 102484664 A | 5/2012 |
| CN | 102609078 A | 7/2012 |
| CN | 102651920 A | 8/2012 |
| CN | 103503428 A | 1/2014 |
| CN | 103649885 A | 3/2014 |
| CN | 103793051 A | 5/2014 |
| CN | 103809884 A | 5/2014 |
| CN | 103838424 A | 6/2014 |
| CN | 104049743 A | 9/2014 |
| CN | 104049746 A | 9/2014 |
| CN | 104123035 A | 10/2014 |
| CN | 104142781 A | 11/2014 |
| CN | 104321723 A | 1/2015 |
| CN | 104375633 A | 2/2015 |
| CN | 104412201 A | 3/2015 |
| CN | 104423595 A | 3/2015 |
| CN | 104471521 A | 3/2015 |
| CN | 104487929 A | 4/2015 |
| CN | 104508618 A | 4/2015 |
| CN | 104536643 A | 4/2015 |
| CN | 104598149 A | 5/2015 |
| CN | 104685444 A | 6/2015 |
| CN | 104685447 A | 6/2015 |
| CN | 104903835 A | 9/2015 |
| CN | 104932681 A | 9/2015 |
| CN | 105027034 A | 11/2015 |
| CN | 105144057 A | 12/2015 |
| CN | 105260049 A | 1/2016 |
| CN | 105278746 A | 1/2016 |
| CN | 105759957 A | 7/2016 |
| DE | 102010048745 A1 | 4/2012 |
| EP | 1 406 150 | 4/2004 |
| EP | 2 141 569 A2 | 1/2010 |
| EP | 2 194 697 A1 | 6/2010 |
| EP | 2 328 063 A1 | 1/2011 |
| EP | 2 378 406 A2 | 10/2011 |
| EP | 2 386 935 A1 | 11/2011 |
| EP | 2 434 387 A2 | 3/2012 |
| EP | 2 728 445 A2 | 5/2014 |
| EP | 2 733 575 A1 | 5/2014 |
| EP | 2 821 912 A1 | 1/2015 |
| EP | 2 827 225 A2 | 1/2015 |
| EP | 2 846 226 A2 | 3/2015 |
| EP | 2 846 549 A1 | 3/2015 |
| EP | 2 847 658 A1 | 3/2015 |
| EP | 2 857 933 A1 | 4/2015 |
| EP | 2 950 182 A1 | 12/2015 |
| EP | 2 955 608 A1 | 12/2015 |
| EP | 2 977 859 A1 | 1/2016 |
| GB | 2532766 A | 6/2016 |
| GB | 2533572 A | 6/2016 |
| JP | 1999068888 A | 3/1999 |
| JP | 2000209311 A | 7/2000 |
| JP | 2002252676 A | 9/2002 |
| JP | 2004064117 A | 2/2004 |
| JP | 2004064730 A | 2/2004 |
| JP | 2004363999 A | 12/2004 |
| JP | 2005276089 A | 10/2005 |
| JP | 2006285471 A | 10/2006 |
| JP | 2008181365 A | 8/2008 |
| JP | 2008282125 A | 11/2008 |
| JP | 2009265818 A | 11/2009 |
| JP | 2010114702 A | 5/2010 |
| JP | 2010136151 A | 6/2010 |
| JP | 2010152716 A | 7/2010 |
| JP | 2010268086 A | 11/2010 |
| JP | 2011004397 A | 1/2011 |
| JP | 2011129019 A | 6/2011 |
| JP | 2011159110 A | 8/2011 |
| JP | 2012038289 A | 2/2012 |
| JP | 2013503578 A | 1/2013 |
| JP | 2013030050 | 2/2013 |
| JP | 2013507059 A | 2/2013 |
| JP | 2013103430 A | 5/2013 |
| JP | 2013-526099 A | 6/2013 |
| JP | 2013528855 A | 7/2013 |
| JP | 2013162167 A | 8/2013 |
| JP | 201300879 A | 10/2013 |
| JP | 2014-179855 A | 9/2014 |
| JP | 2014164754 A | 9/2014 |
| JP | 2014215639 A | 11/2014 |
| JP | 2014229150 A | 12/2014 |
| JP | 2014532217 A | 12/2014 |
| JP | 2015007836 A | 1/2015 |
| JP | 2015015600 A | 1/2015 |
| JP | 2015519655 A | 7/2015 |
| JP | 2016-178647 A | 10/2016 |
| JP | 2017-118554 A | 6/2017 |
| KR | 20060006843 A | 1/2006 |
| KR | 20090113186 A | 10/2009 |
| KR | 20100056396 A | 5/2010 |
| KR | 20110136220 A | 12/2011 |
| KR | 20120081493 A | 7/2012 |
| KR | 20130075412 A | 7/2013 |
| KR | 101305735 B1 | 9/2013 |
| KR | 20140002563 A | 1/2014 |
| KR | 1375613 B | 3/2014 |
| KR | 20140025552 A | 3/2014 |
| KR | 20140094489 A | 7/2014 |
| KR | 20140104913 A | 8/2014 |
| KR | 20150013264 A | 2/2015 |
| KR | 20150046105 A | 4/2015 |
| KR | 20150061599 A | 6/2015 |
| KR | 20150093840 A | 8/2015 |
| KR | 20150104023 A | 9/2015 |
| KR | 20140090318 A | 7/2017 |
| KR | 20210031752 A | 3/2021 |
| TW | I388995 B | 3/2013 |
| WO | WO 01/24158 A1 | 4/2001 |
| WO | WO 2004/053830 A1 | 6/2004 |
| WO | WO 2008/075082 A1 | 6/2008 |
| WO | WO 2012/081182 A1 | 6/2012 |
| WO | WO 2012/176441 A1 | 12/2012 |
| WO | WO 2013/089294 A1 | 6/2013 |
| WO | WO 2013/156815 A1 | 10/2013 |
| WO | WO 2013/169300 A1 | 11/2013 |
| WO | WO 2013/169842 A2 | 11/2013 |
| WO | WO 2013/169853 A1 | 11/2013 |
| WO | WO 2013/169854 A2 | 11/2013 |
| WO | WO 2013/169865 A2 | 11/2013 |
| WO | WO 2013/169875 A2 | 11/2013 |
| WO | WO 2013/173838 A2 | 11/2013 |
| WO | WO 2014/028443 A1 | 2/2014 |
| WO | WO 2014/095756 A1 | 6/2014 |

(56) References Cited

FOREIGN PATENT DOCUMENTS

| | | |
|---|---|---|
| WO | WO 2014/105275 A1 | 7/2014 |
| WO | WO 2015/092379 A1 | 6/2015 |
| WO | WO 2015/116056 A1 | 8/2015 |
| WO | WO 2015/187274 | 12/2015 |
| WO | WO 2016/036447 | 3/2016 |
| WO | WO 2016/036509 A1 | 3/2016 |
| WO | WO 2016/038677 A1 | 3/2016 |
| WO | WO 2016/171848 A1 | 10/2016 |
| WO | WO 2017/027526 A1 | 2/2017 |
| WO | WO 2017/065365 A1 | 4/2017 |

OTHER PUBLICATIONS

Patent, dated Apr. 11, 2023, received in Korean Patent Application No. 20237004128, which corresponds with U.S. Appl. No. 14/869,835, 4 pages.
Final Office Action, dated Jun. 19, 2023, received in Japanese Patent Application No. 2021-174795, with U.S. Appl. No. 16/157,891, 2 pages.
Office Action, dated May 12, 2023, received in Australian Patent Application No. 2022205027, which corresponds with U.S. Appl. No. 17/138,664, 3 pages.
Notice of Allowance, dated May 10, 2023, received in U.S. Appl. No. 17/192,076, 6 pages.
Office Action, dated May 30, 2023, received in Korean Patent Application No. 2022-7018094, which corresponds with U.S. Appl. No. 17/541,169, 4 pages.
Office Action, dated Jul. 20, 2023, received in Korean Patent Application No. 2023-7022877, which corresponds with U.S. Appl. No. 16/355,621, 3 pages.
Dosher et al., "Human Interaction with Small Haptic Effects", University of Washington, Seattle, WA, Jun. 2005, 16 pages.
Immersion, "The Value of Haptics", San Jose, California, 2010, 12 pages.
Sulaiman et al., "User Haptic Experience and the Design of Drawing Interfaces", *Interacting with Computers*, http://doi.org/10.1016/j.intcom.2009.11.009, Dec. 5, 2009, 20 pages.
VladMaxSoft, "Make Your iPhone Ring Louder When Inside a Pocket or Bag with Ringing Pocket Tweak", https://www.reddit.com/r/jailbreak/comments/1zj6zx/release_make_your_iphone_ring_louder_when_inside/, Mar. 4, 2014, 8 pages.
Notice of Allowance, dated Jan. 31, 2018, received in U.S. Appl. No. 15/619,359, 8 pages.
Notice of Allowance, dated Oct. 2, 2017, received in U.S. Appl. No. 15/619,359, 9 pages.
Certificate of Grant, dated May 18, 2017, received in Australian Patent Application No. 2017100482, which corresponds with U.S. Appl. No. 15/619,359, 1 page.
Office Action, dated Jun. 27, 2017, received in Australian Patent Application No. 2017100482, which corresponds with U.S. Appl. No. 15/619,359, 7 pages.
Certificate of Examination, dated Oct. 27, 2017, received in Australian Patent Application No. 2017100482, which corresponds with U.S. Appl. No. 15/619,359, 1 page.
Office Action, dated May 23, 2019, received in Australian Patent Application No. 2017286532, which corresponds with U.S. Appl. No. 15/619,359, 3 pages.
Office Action, dated Nov. 18, 2019, received in Australian Patent Application No. 2017286532, which corresponds with U.S. Appl. No. 15/619,359, 2 pages.
Notice of Acceptance, dated Apr. 2, 2020, received in Australian Patent Application No. 2017286532, which corresponds with U.S. Appl. No. 15/619,359, 3 pages.
Certificate of Grant, dated Aug. 13, 2020, received in Australian Patent Application No. 2017286532, which corresponds with U.S. Appl. No. 15/619,359, 4 pages.
Office Action, dated Oct. 15, 2016, received in Chinese Patent Application No. 201780030418.9, which corresponds with U.S. Appl. No. 15/619,359, 3 pages.
Office Action, dated Mar. 10, 2020, received in Chinese Patent Application No. 201780030418.9, which corresponds with U.S. Appl. No. 15/619,359, 3 pages.
Office Action, dated Jun. 3, 2020, received in Chinese Patent Application No. 201780030418.9, which corresponds with U.S. Appl. No. 15/619,359, 3 pages.
Office Action, dated Jan. 11, 2021, received in Chinese Patent Application No. 201780030418.9, which corresponds with U.S. Appl. No. 15/619,359, 6 pages.
Office Action, dated Jan. 24, 2018, received in Danish Patent Application No. 201770369, which corresponds with U.S. Appl. No. 15/619,359, 6 pages.
Office Action, dated Aug. 6, 2018, received in Danish Patent Application No. 201770369, which corresponds with U.S. Appl. No. 15/619,359, 5 pages.
Intention to Grant, dated Jul. 4, 2019, received in Danish Patent Application No. 201770369, which corresponds with U.S. Appl. No. 15/619,359, 2 pages.
Grant, dated Jul. 8, 2019, received in Danish Patent Application No. 201770369, which corresponds with U.S. Appl. No. 15/619,359, 2 pages.
Patent, dated Jul. 12, 2019, received in Danish Patent Application No. 2017 70369, which corresponds with U.S. Appl. No. 15/619,359, 4 pages.
Office Action, dated May 10, 2019, received in European Patent Application No. 17733235.0, which corresponds with U.S. Appl. No. 15/619,359, 9 pages.
Office Action, dated Oct. 4, 2019, received in European Patent Application No. 17733235.0, which corresponds with U.S. Appl. No. 15/619,359, 4 pages.
Decision to Refuse, dated Feb. 15, 2021, received in European Patent Application No. 17733235.0, which corresponds with U.S. Appl. No. 15/619,359, 14 pages.
Notice of Allowance, dated Feb. 3, 2020, received in Japanese Patent Application No. 2018-558694, which corresponds with U.S. Appl. No. 15/619,359, 5 pages.
Patent, dated Mar. 4, 2020, received in Japanese Patent Application No. 2018-558694, which corresponds with U.S. Appl. No. 15/619,359, 6 pages.
Office Action, dated Mar. 31, 2020, received in Korean Patent Application No. 2018-7032284, which corresponds with U.S. Appl. No. 15/619,359, 2 pages.
Notice of Allowance, dated Oct. 30, 2020, received in Korean Patent Application No. 2018-7032284, which corresponds with U.S. Appl. No. 15/619,359, 5 pages.
Patent, dated Jan. 27, 2021, received in Korean Patent Application No. 2018-7032284, which corresponds with U.S. Appl. No. 15/619,359, 3 pages.
Notice of Allowance, dated Dec. 14, 2016, received in U.S. Appl. No. 15/270,885, 13 pages.
Notice of Allowance, dated Apr. 10, 2017, received in U.S. Appl. No. 15/270,885, 5 pages.
Notice of Allowance, dated Jul. 21, 2017, received in U.S. Appl. No. 15/270,885, 10 pages.
Notice of Allowance, dated Nov. 22, 2017, received in U.S. Appl. No. 15/270,885, 5 pages.
Notice of Acceptance, dated Aug. 18, 2017, received in Australian Patent Application No. 2017216447, which corresponds with U.S. Appl. No. 15/270,885, 3 pages.
Grant, dated Dec. 21, 2017, received in Australian Application No. 2017216447, which corresponds with U.S. Appl. No. 15/270,885, 1 page.
Notice of Acceptance, dated Aug. 21, 2017, received in Australian Patent Application No. 2017216475, which corresponds with U.S. Appl. No. 15/270,885, 3 pages.
Grant, dated Dec. 21, 2017, received in Australian Application No. 2017216475, which corresponds with U.S. Appl. No. 15/270,885, 1 page.
Office Action, dated Mar. 22, 2019, received in Australian Patent Application No. 2017251751, which corresponds with U.S. Appl. No. 15/270,885, 3 pages.

(56) References Cited

OTHER PUBLICATIONS

Office Action, dated Aug. 9, 2019, received in Australian Patent Application No. 2017251751, which corresponds with U.S. Appl. No. 15/270,885, 5 pages.
Office Action, dated Nov. 14, 2019, received in Australian Patent Application No. 2017251751, which corresponds with U.S. Appl. No. 15/270,885, 3 pages.
Notice of Acceptance, dated Dec. 19, 2019, received in Australian Patent Application No. 2017251751, which corresponds with U.S. Appl. No. 15/270,885, 3 pages.
Certificate of Grant, dated Apr. 30, 2020, received in Australian Patent Application No. 2017251751, which corresponds with U.S. Appl. No. 15/270,885, 1 page.
Office Action, dated Feb. 2, 2019, received in Chinese Patent Application No. 2017107348777, which corresponds with U.S. Appl. No. 15/270,885, 10 pages.
Notice of Allowance, dated Aug. 14, 2019, received in Chinese Patent Application No. 201710734877.7, which corresponds with U.S. Appl. No. 15/270,885, 5 pages.
Patent, dated Oct. 25, 2019, received in Chinese Patent Application No. 201710734877.7, which corresponds with U.S. Appl. No. 15/270,885, 6 pages.
Office Action, dated Jan. 5, 2017, received in Danish Patent Application No. 201670721, which corresponds with U.S. Appl. No. 15/270,885, 7 pages.
Office Action, dated Jul. 20, 2017, received in Danish Patent Application No. 201670721, which corresponds with U.S. Appl. No. 15/270,885, 2 pages.
Decision to Grant, dated Oct. 25, 2017, received in Danish Patent Application No. 201670721, which corresponds with U.S. Appl. No. 15/270,885, 2 pages.
Office action, dated Jan. 18, 2017, received in Danish Patent Application No. 201670726, which corresponds with U.S. Appl. No. 15/270,885, 7 pages.
Office Action, dated Apr. 5, 2017, received in Danish Patent Application No. 201670726, which corresponds with U.S. Appl. No. 15/270,885, 2 pages.
Notice of Allowance, dated Jul. 18, 2017, received in Danish Patent Application No. 201670726, which corresponds with U.S. Appl. No. 15/270,885, 2 pages.
Patent, dated Oct. 16, 2017, received in Danish Patent Application No. 201670726, which corresponds with U.S. Appl. No. 15/270,885, 2 pages.
Office Action, dated Aug. 25, 2017, received in European patent Application No. 17177160.3, which corresponds with U.S. Appl. No. 15/270,885, 3 pages.
Office Action, dated Jan. 24, 2018, received in European Patent Application No. 17177160.3, which corresponds with U.S. Appl. No. 15/270,885, 4 pages.
Intention to Grant, dated Dec. 7, 2018, received in European Patent Application No. 17177160.3, which corresponds with U.S. Appl. No. 15/270,885, 7 pages.
Decision to Grant, dated May 16, 2019, received in European Patent Application No. 17177160.3, which corresponds with U.S. Appl. No. 15/270,885, 1 page.
Patent, dated Jun. 12, 2019, received in European Patent Application No. 17177160.3, which corresponds with U.S. Appl. No. 15/270,885, 3 page.
Intention to Grant, dated Feb. 1, 2019, received in European Patent Application No. 17177493.8, which corresponds with U.S. Appl. No. 15/270,885, 4 pages.
Decision to Grant, dated Apr. 18, 2019, received in European Patent Application No. 17177493.8, which corresponds with U.S. Appl. No. 15/270,885, 4 pages.
Patent, dated May 27, 2019, received in European Patent Application No. 17177493.8, which corresponds with U.S. Appl. No. 15/270,885, 2 pages.
Office Action, dated Aug. 1, 2019, received in European Patent Application No. 19168886.0, which corresponds with U.S. Appl. No. 15/270,885, 5 pages.
Intention to Grant, dated Sep. 11, 2020, received in European Patent Application No. 19168886.0, which corresponds with U.S. Appl. No. 15/270,885, 11 pages.
Decision to Grant, dated Jan. 28, 2021, received in European Patent Application No. 19168886.0, which corresponds with U.S. Appl. No. 15/270,885,4 pages.
Patent, dated Feb. 24, 2021, received in European Patent Application No. 19168886.0, which corresponds with U.S. Appl. No. 15/270,885, 4 pages.
Office Action, dated Jan. 17, 2017, received in U.S. Appl. No. 15/271,073, 8 pages.
Notice of Allowance, dated May 2, 2017, received in U.S. Appl. No. 15/271,073, 5 pages.
Notice of Allowance, dated Aug. 21, 2017, received in Australian Application No. 2017213578, which corresponds with U.S. Appl. No. 15/271,073, 3 pages.
Grant, dated Dec. 21, 2017, received in Australian Application No. 2017213578, which corresponds with U.S. Appl. No. 15/271,073, 1 page.
Notice of Allowance, dated Sep. 7, 2017, received in Australian Application No. 2017216471, which corresponds with U.S. Appl. No. 15/271,073, 3 pages.
Grant, dated Dec. 21, 2017, received in Australian Application No. 2017216471, which corresponds with U.S. Appl. No. 15/271,073, 1 page.
Notice of Allowance, dated Aug. 24, 2017, received in Australian Application No. 2017216453, which corresponds with U.S. Appl. No. 15/271,073, 3 pages.
Grant, dated Dec. 21, 2017, received in Australian Application No. 2017216453, which corresponds with U.S. Appl. No. 15/271,073, 1 page.
Office Action, dated Oct. 5, 2018, received in Australian Patent Application No. 201761484, which corresponds with U.S. Appl. No. 15/271,073, 2 pages.
Notice of Acceptance, dated Apr. 26, 2019, received in Australian Patent Application No. 201761484, which corresponds with U.S. Appl. No. 15/271,073, 3 pages.
Certificate of Grant, dated Aug. 28, 2019, received in Australian Patent Application No. 201761484, which corresponds with U.S. Appl. No. 15/271,073, 4 pages.
Office Action, dated Sep. 8, 2017, received in Chinese Application No. 201710735308.4, which corresponds with U.S. Appl. No. 15/271,073, 4 pages.
Office Action, dated Jan. 3, 2019, received in Chinese Application No. 201710735308.4, which corresponds with U.S. Appl. No. 15/271,073, 6 pages.
Notice of Allowance, dated Jul. 1, 2019, received in Chinese Application No. 201710735308.4, which corresponds with U.S. Appl. No. 15/271,073, 5 pages.
Patent, dated Aug. 27, 2019, received in Chinese Application No. 201710735308.4, which corresponds with U.S. Appl. No. 15/271,073, 6 pages.
Office Action, dated Jan. 20, 2017, received in Danish Patent Application No. 201670720, which corresponds with U.S. Appl. No. 15/271,073, 9 pages.
Office Action, dated Sep. 4, 2017, received in Danish Patent Application No. 201670720, which corresponds with U.S. Appl. No. 15/271,073, 4 pages.
Office Action, dated Aug. 14, 2018, received in Danish Patent Application No. 201670720, which corresponds with U.S. Appl. No. 15/271,073, 2 pages.
Office Action, dated Sep. 27, 2019, received in Danish Patent Application No. 201670720, which corresponds with U.S. Appl. No. 15/271,073, 2 pages.
Office Action, dated Apr. 5, 2017, received in Danish Patent Application No. 2016-70724, which corresponds with U.S. Appl. No. 15/271,073, 5 pages.
Office Action, dated Aug. 1, 2017, received in Danish Patent Application No. 2016-70724, which corresponds with U.S. Appl. No. 15/271,073, 5 pages.
Office Action, dated Feb. 14, 2018, received in Danish Patent Application No. 2016-70724, which corresponds with U.S. Appl. No. 15/271,073, 2 pages.

(56) References Cited

OTHER PUBLICATIONS

Notice of Allowance, dated Feb. 13, 2019, received in Danish Patent Application No. 2016-70724, which corresponds with U.S. Appl. No. 15/271,073, 2 pages.
Patent, dated Jun. 26, 2019, received in Danish Patent Application No. 2016-70724, which corresponds with U.S. Appl. No. 15/271,073, 4 pages.
Office Action, dated Jan. 25, 2017, received in Danish Patent Application No. 201670725, which corresponds with U.S. Appl. No. 15/271,073, 6 pages.
Office Action, dated Apr. 5, 2017, received in Danish Patent Application No. 201670725, which corresponds with U.S. Appl. No. 15/271,073, 3 pages.
Office Action, dated Oct. 12, 2017, received in Danish Patent Application No. 201670725, which corresponds with U.S. Appl. No. 15/271,073, 3 pages.
Office Action, dated Jan. 14, 2019, received in Danish Patent Application No. 201670725, which corresponds with U.S. Appl. No. 15/271,073, 3 pages.
Office Action, dated May 16, 2018, received in Danish Patent Application No. 201670725, which corresponds with U.S. Appl. No. 15/271,073, 2 pages.
Intention to Grant, dated Sep. 5, 2019, received in Danish Patent Applicatin No. 201670725, which corresponds with U.S. Appl. No. 15/271,073, 2 pages.
Decision to Grant, dated Dec. 19, 2019, received in Danish Patent Application No. 201670725, which corresponds with U.S. Appl. No. 15/271,073, 2 pages.
Patent, dated Feb. 4, 2020, received in Danish Patent Application No. 201670725, which corresponds with U.S. Appl. No. 15/271,073, 4 pages.
Decision to Grant, dated Apr. 9, 2020, received in European Patent Application No. 17186196.6, which corresponds with U.S. Appl. No. 15/271,073, 2 pages.
Patent, dated May 6, 2020, received in European Patent Application No. 17186196.6, which corresponds with U.S. Appl. No. 15/271,073, 2 pages.
Intention to Grant, dated Feb. 28, 2020, received in European Patent Application No. 17186312.9, which corresponds with U.S. Appl. No. 15/271,073, 5 pages.
Decision to Grant, dated Apr. 9, 2020, received in European Patent Application No. 17186312.9, which corresponds with U.S. Appl. No. 15/271,073, 2 pages.
Patent, dated May 6, 2020, received in European Patent Application No. 17186312.9, which corresponds with U.S. Appl. No. 15/271,073, 2 pages.
Office Action, dated Sep. 30, 2020, received in European Patent Application No. 17186313.7, which corresponds with U.S. Appl. No. 15/271,073, 5 pages.
Intention to Grant, dated Dec. 23, 2021, received in European Patent Application No. 17186313.7, which corresponds with U.S. Appl. No. 15/271,073, 7 pages.
Decision to Grant, dated Mar. 31, 2022, received in European Patent Application No. 17186313.7, which corresponds with U.S. Appl. No. 15/271,073, 3 pages.
Office Action, dated Feb. 10, 2017, received in U.S. Appl. No. 15/272,380, 18 pages.
Notice of Allowance, dated Dec. 6, 2017, received in U.S. Appl. No. 15/272,380, 11 pages.
Notice of Allowance, dated Mar. 8, 2018, received in U.S. Appl. No. 15/272,380, 11 pages.
Certificate of Grant, dated Aug. 23, 2017, received in Australian Patent Application No. 2017101092, which corresponds with U.S. Appl. No. 15/272,380, 1 page.
Office Action, dated Oct. 4, 2017, received in Australian Patent Application No. 2017101092, which correspond with U.S. Appl. No. 15/272,380, 8 pages.
Certificate of Grant, dated Apr. 26, 2018, received in Australian Patent Application No. 2018100429, which corresponds with U.S. Appl. No. 15/272,380, 1 page.
Office Action, dated May 31, 2018, received in Australian Patent Application No. 2018100429, which corresponds with U.S. Appl. No. 15/272,380, 5 pages.
Certificate of Examination, dated Aug. 7, 2018, received in Australian Patent Application No. 2018100429, which corresponds with U.S. Appl. No. 15/272,380, 1 page.
Office Action, dated Apr. 2, 2019, received in Chinese Patent Application No. 2017800042913, which corresponds with U.S. Appl. No. 15/272,380, 5 pages.
Office Action, dated Jul. 16, 2019, received in Chinese Patent Application No. 2017800042913, which corresponds with U.S. Appl. No. 15/272,380, 6 pages.
Notification to Grant, dated Jan. 16, 2020, received in Chinese Patent Application No. 2017800042913, which corresponds with U.S. Appl. No. 15/272,380, 6 pages.
Office Action, dated Jun. 5, 2019, received in Chinese Patent Application No. 2018108328493, which corresponds with U.S. Appl. No. 15/272,380, 4 pages.
Office Action, dated Apr. 3, 2020, received in Chinese Patent Application No. 2018108328493, which corresponds with U.S. Appl. No. 15/272,380, 8 pages.
Office Action, dated Feb. 4, 2021, received in Chinese Patent Application No. 2018108328493, which corresponds with U.S. Appl. No. 15/272,380, 1 page.
Office Action, dated Jan. 15, 2021, received in Chinese Patent Application No. 202010082072.0, which corresponds with U.S. Appl. No. 15/272,380, 2 pages.
Office Action, dated Jun. 16, 2021, received in Chinese Patent Application No. 202010082072.0, which corresponds with U.S. Appl. No. 15/272,380, 2 pages.
Notice of Allowance, dated Feb. 9, 2022, received in Chinese Patent Application No. 202010082072.0, which corresponds with U.S. Appl. No. 15/272,380, 1 page.
Patent, dated Mar. 8, 2022, received in Chinese Patent Application No. 202010082072.0, which corresponds with U.S. Appl. No. 15/272,380, 7 pages.
Office Action, dated Feb. 23, 2017, received in Danish Patent Application No. 201670729, which corresponds with U.S. Appl. No. 15/272,380, 9 pages.
Office Action, dated Aug. 28, 2017, received in Danish Patent Application No. 201670729, which corresponds with U.S. Appl. No. 15/272,380, 3 pages.
Office Action, dated Mar. 9, 2018, received in Danish Patent Application No. 201670729, which corresponds with U.S. Appl. No. 15/272,380, 2 pages.
Office Action, dated May 17, 2018, received in Danish Patent Application No. 201670729, which corresponds with U.S. Appl. No. 15/272,380, 2 pages.
Notice of Allowance, dated Oct. 2, 2018, received in Danish Patent Application No. 201670729, which corresponds with U.S. Appl. No. 15/272,380, 2 pages.
Patent, dated Jan. 4, 2019, received in Danish Patent Application No. 201670729, which corresponds with U.S. Appl. No. 15/272,380, 7 pages.
Office Action, dated Jan. 24, 2017, received in Danish Patent Application No. 201670735, which corresponds with U.S. Appl. No. 15/272,380, 8 pages.
Office Action, dated Jul. 27, 2017, received in Danish Patent Application No. 201670735, which corresponds with U.S. Appl. No. 15/272,380, 3 pages.
Office Action, dated Dec. 7, 2017, received in Danish Patent Application No. 201670735, which corresponds with U.S. Appl. No. 15/272,380, 3 pages.
Office Action, dated Jun. 15, 2018, received in Danish Patent Application No. 201670735, which corresponds with U.S. Appl. No. 15/272,380, 2 pages.
Intention to Grant, dated Nov. 21, 2018, received in Danish Patent Application No. 201670735, which corresponds with U.S. Appl. No. 15/272,380, 2 pages.
Patent, dated Mar. 13, 2019, received in Danish Patent Application No. 201670735, which corresponds with U.S. Appl. No. 15/272,380, 3 pages.

(56) References Cited

OTHER PUBLICATIONS

Office Action, dated Jan. 11, 2017, received in Danish Patent Application No. 201670736, which corresponds with U.S. Appl. No. 15/272,380, 11 pages.
Office Action, dated Aug. 30, 2017, received in Danish Patent Application No. 201670736, which corresponds with U.S. Appl. No. 15/272,380, 4 pages.
Office Action, dated Mar. 16, 2018, received in Danish Patent Application No. 201670736, which corresponds with U.S. Appl. No. 15/272,380, 4 pages.
Office Action, dated May 14, 2019, received in Danish Patent Application No. 201670736, which corresponds with U.S. Appl. No. 15/272,380, 3 pages.
Intention to Grant, dated Dec. 18, 2019, received in Danish Patent Application No. 201670736, which corresponds with U.S. Appl. No. 15/272,380, 2 pages.
Decision to Grant, dated Feb. 17, 2020, received in Danish Patent Application No. 201670736, which corresponds with U.S. Appl. No. 15/272,380, 2 pages.
Patent, dated May 19, 2020, received in Danish Patent Application No. 201670736, which corresponds with U.S. Appl. No. 15/272,380, 4 pages.
Office Action, dated Jan. 30, 2017, received in Danish Patent Application No. 201670737, which corresponds with U.S. Appl. No. 15/272,380, 9 pages.
Office Action, dated Aug. 31, 2017, received in Danish Patent Application No. 201670737, which corresponds with U.S. Appl. No. 15/272,380, 4 pages.
Office Action, dated Jul. 25, 2018, received in Danish Patent Application No. 201670737, which corresponds with U.S. Appl. No. 15/272,380, 5 pages.
Office Action, dated May 3, 2021, received in European Patent Application No. 17751545.9, which corresponds with U.S. Appl. No. 15/272,380, 6 pages.
Office Action, dated Oct. 26, 2018, received in European Patent Application No. 18183341.9, which corresponds with U.S. Appl. No. 15/272,380, 7 pages.
Office Action, dated Apr. 26, 2021, received in European Patent Application No. 18183341.9, which corresponds with U.S. Appl. No. 15/272,380, 6 pages.
Office Action, dated Jun. 15, 2020, received in European Patent Application No. 20155940.8, which corresponds with U.S. Appl. No. 15/272,380, 8 pages.
Office Action, dated Nov. 30, 2021, received in European Patent Application No. 20155940.8, which corresponds with U.S. Appl. No. 15/272,380, 7 pages.
Office Action, dated Aug. 5, 2019, received in Japanese Patent Application No. 2019-090875, which corresponds with U.S. Appl. No. 15/272,380, 7 pages.
Office Action, dated Apr. 17, 2020, received in Japanese Patent Application No. 2019-090875, which corresponds with U.S. Appl. No. 15/272,380, 2 pages.
Notice of Allowance, dated Sep. 11, 2020, received in Japanese Patent Application No. 2019-090875, which corresponds with U.S. Appl. No. 15/272,380, 5 pages.
Notice of Allowance, dated Aug. 27, 2018, received in U.S. Appl. No. 15/273,688, 27 pages.
Office Action, dated Sep. 28, 2021, received in Chinese Patent Application No. 202010238671.7, which corresponds with U.S. Appl. No. 15/273,688, 1 page.
Notice of Allowance, dated Oct. 8, 2021, received in Japanese Patent Application No. 2020-172113, which corresponds with U.S. Appl. No. 15/273,688, 2 pages.
Patent, dated Oct. 28, 2021, received in Japanese Patent Application No. 2020-172113, which corresponds with U.S. Appl. No. 15/273,688, 3 pages.
Notice of Allowance, dated Jul. 12, 2018, received in U.S. Appl. No. 15/275,083, 22 pages.

Office Action, dated Jul. 23, 2109, received in Chinese Patent Application No. 2018110167326.2, which corresponds with U.S. Appl. No. 15/275,083, 6 pages.
Office Action, dated May 27, 2020, received in Chinese Patent Application No. 2018110167326.2, which corresponds with U.S. Appl. No. 15/275,083, 4 pages.
Office Action, dated Feb. 2, 2021, received in Chinese Patent Application No. 2018110167326.2, which corresponds with U.S. Appl. No. 15/275,083, 2 pages.
Office Action, dated Jan. 14, 2019, received in European Patent Application No. 18191063.9, which corresponds with U.S. Appl. No. 15/275,083, 9 pages.
Office Action, dated Apr. 29, 2021, received in European Patent Application No. 18191063.9, which corresponds with U.S. Appl. No. 15/275,083,3 pages.
Notice of Allowance, dated Apr. 23, 2019, received in Japanese Patent Application No. 2018550359, which corresponds with U.S. Appl. No. 15/275,083, 4 pages.
Patent, dated May 17, 2019, received in Japanese Patent Application No. 2018550359, which corresponds with U.S. Appl. No. 15/275,083, 4 pages.
Notice of Allowance, dated Feb. 22, 2017, received in U.S. Appl. No. 15/271,534, 13 pages.
Office Action, dated Nov. 23, 2018, received in Chinese Patent Application No. 201710736303.3, which corresponds with U.S. Appl. No. 15/271,534, 7 pages.
Notification to Grant, dated Apr. 10, 2019, received in Chinese Patent Application No. 201710736303.3, which corresponds with U.S. Appl. No. 15/271,534, 6 pages.
Patent, dated Jun. 7, 2019, received in Chinese Patent Application No. 201710736303.3, which corresponds with U.S. Appl. No. 15/271,534, 6 pages.
Office Action, dated Jan. 10, 2017, received in U.S. Appl. No. 15/271,653, 9 pages.
Office Action, dated Sep. 13, 2017, received in Chinese Patent Application No. 201710728497.2, which corresponds with U.S. Appl. No. 15/271,653, 3 pages.
Office Action, dated Dec. 29, 2018, received in Chinese Patent Application No. 201710728497.2, which corresponds with U.S. Appl. No. 15/271,653, 6 pages.
Notice of Allowance, dated Sep. 4, 2019, received in Chinese Patent Application No. 201710728497.2, which corresponds with U.S. Appl. No. 15/271,653, 5 pages.
Patent, dated Nov. 1, 2019, received in Chinese Patent Application No. 201710728497.2, which corresponds with U.S. Appl. No. 15/271,653, 6 pages.
Office Action, dated Jan. 27, 2017, received in U.S. Appl. No. 15/271,708, 8 pages.
Notice of Allowance, dated Apr. 5, 2017, received in U.S. Appl. No. 15/271,708, 5 pages.
Office Action, dated Nov. 22, 2017, received in Chinese Patent Application No. 201710736331.5, which corresponds with U.S. Appl. No. 15/271,108, 3 pages.
Office Action, dated Mar. 5, 2019, received in Chinese Patent Application No. 201710736331.5, which corresponds with U.S. Appl. No. 15/271,108, 6 pages.
Notice of Allowance, dated Jul. 31, 2019, received in Chinese Patent Application No. 201710736331.5, which corresponds with U.S. Appl. No. 15/271,108, 3 pages.
Patent, dated Sep. 3, 2019, received in Chinese Patent Application No. 201710736331.5, which corresponds with U.S. Appl. No. 15/271,108, 6 pages.
Office Action, dated Nov. 30, 2015, received in U.S. Appl. No. 14/835,708, 28 pages.
Final Office Action, dated May 20, 2016, received in U.S. Appl. No. 14/835,708, 7 pages.
Notice of Allowance, dated Aug. 29, 2016, received in U.S. Appl. No. 14/835,708, 9 pages.
Office Action, dated Oct. 30, 2017, received in Australian Patent Application No. 2015312344, which corresponds with U.S. Appl. No. 14/835,708, 2 pages.

(56) References Cited

OTHER PUBLICATIONS

Notice of Acceptance, dated Apr. 5, 2018, received in Australian Patent Application No. 2015312344, which corresponds with U.S. Appl. No. 14/835,708, 5 pages.
Certificate of Grant, dated Aug. 2, 2018, received in Australian Patent Application No. 2015312344, which corresponds with U.S. Appl. No. 14/835,708, 1 page.
Office Action, dated Apr. 18, 2019, received in Chinese Patent Application No. 201580044092.6, which corresponds with U.S. Appl. No. 14/835,708, 5 pages.
Office Action, dated Dec. 11, 2019, received in Chinese Patent Application No. 201580044092.6, which corresponds with U.S. Appl. No. 14/835,708, 5 pages.
Office Action, dated Aug. 28, 2020, received in Chinese Patent Application No. 201580044092.6, which corresponds with U.S. Appl. No. 14/835,708, 10 pages.
Office Action, dated Dec. 1, 2020, received in Chinese Patent Application No. 201580044092.6, which corresponds with U.S. Appl. No. 14/835,708, 8 pages.
Office Action, dated Apr. 18, 2019, received in European Patent Application No. 15748122.7, which corresponds with U.S. Appl. No. 14/835,708, 5 pages.
Office Action, dated May 11, 2018, received in Japanese Patent Application No. 2017509011, which corresponds with U.S. Appl. No. 14/835,708, 8 pages.
Office Action, dated Dec. 14, 2018, received in Japanese Patent Application No. 2017509011, which corresponds with U.S. Appl. No. 14/835,708, 8 pages.
Notice of Allowance, dated May 24, 2019, received in Japanese Patent Application No. 2017509011, which corresponds with U.S. Appl. No. 14/835,708, 5 pages.
Patent, dated Jun. 14, 2019, received in Japanese Patent Application No. 2017509011, which corresponds with U.S. Appl. No. 14/835,708, 3 pages.
Office Action, dated Dec. 26, 2017, received in Korean Patent Application No. 2017-7005874, which corresponds with U.S. Appl. No. 14/835,708, 11 pages.
Final Office Action, dated Jul. 17, 2018, received in Korean Patent Application No. 2017-7005874, which corresponds with U.S. Appl. No. 14/835,708, 3 pages.
Final Office Action, dated Nov. 8, 2018, received in Korean Patent Application No. 2017-7005874, which corresponds with U.S. Appl. No. 14/835,708, 3 pages.
Oral Summons, dated Jan. 2, 2020, received in Korean Patent Application No. 2017-7005874, which corresponds with U.S. Appl. No. 14/835,708, 5 pages.
Notice of Allowance, dated Feb. 24, 2020, received in Korean Patent Application No. 2017-7005874, which corresponds with U.S. Appl. No. 14/835,708, 5 pages.
Patent, dated Mar. 26, 2020, received in Korean Patent Application No. 2017-7005874, which corresponds with U.S. Appl. No. 14/835,708, 4 pages.
Office Action, dated Aug. 1, 2016, received in Taiwanese Patent Application No. 104126890, which corresponds with U.S. Appl. No. 14/835,708, 17 pages.
Office Action, dated Dec. 20, 2016, received in Taiwanese Patent Application No. 104126890, which corresponds with U.S. Appl. No. 14/835,708, 5 pages.
Office Action, dated Dec. 28, 2016, received in Taiwanese Patent Application No. 104126890, which corresponds with U.S. Appl. No. 14/835,708, 3 pages.
Patent, dated Apr. 11, 2018, received in Taiwanese Patent Application No. 104126890, which corresponds with U.S. Appl. No. 14/835,708, 5 pages.
Office action, dated Apr. 5, 2017, received in Taiwanese Patent Application No. 105139726, which corresponds with U.S. Appl. No. 14/835,708, 2 pages.
Notice of Allowance, dated Jul. 21, 2017, received in Taiwanese Patent Application No. 105139726, which corresponds with U.S. Appl. No. 14/835,708, 6 pages.
Patent, dated Nov. 1, 2017, received in Taiwanese Patent Application No. 105139726, which corresponds with U.S. Appl. No. 14/835,708, 5 pages.
Office Action, dated Feb. 12, 2016, received in U.S. Appl. No. 14/869,825, 15 pages.
Final Office Action, dated Jul. 8, 2016, received in U.S. Appl. No. 14/869,825, 20 pages.
Office Action, dated Dec. 27, 2016, received in U.S. Appl. No. 14/869,825, 27 pages.
Office Action, dated Feb. 12, 2016, received in U.S. Appl. No. 14/869,829, 20 pages.
Final Office Action, dated Aug. 8, 2016, received in U.S. Appl. No. 14/869,829, 28 pages.
Office Action, dated Mar. 7, 2017, received in U.S. Appl. No. 14/869,829, 24 pages.
Final Office Action, dated Jul. 24, 2017, received in U.S. Appl. No. 14/869,829, 30 pages.
Examiner's Answer, dated Mar. 21, 2018, received in U.S. Appl. No. 14/869,829, 8 pages.
Notice of Allowance, dated May 9, 2019, received in U.S. Appl. No. 14/869,829, 8 pages.
Notice of Allowance, dated Jun. 26, 2019, received in U.S. Appl. No. 14/869,829, 8 pages.
Office Action, dated Mar. 22, 2021, received in Australian Patent Application No. 2020202916, which corresponds with U.S. Appl. No. 14/869,829, 3 pages.
Notice of Allowance, dated Jun. 3, 2021, received in Australian Patent Application No. 2020202916, which corresponds with U.S. Appl. No. 14/869,829, 3 pages.
Certificate of Grant, dated Oct. 22, 2021, received in Australian Patent Application No. 2020202916, which corresponds with U.S. Appl. No. 14/869,829, 3 pages.
Office Action, dated Jun. 22, 2020, received in Japanese Patent Application No. 2019-046172, which corresponds with U.S. Appl. No. 14/869,829, 7 pages.
Notice of Allowance, dated Feb. 22, 2021, received in Japanese Patent Application No. 2019-046172, which corresponds with U.S. Appl. No. 14/869,829, 2 pages.
Patent, dated Mar. 8, 2021, received in Japanese Patent Application No. 2019-046172, which corresponds with U.S. Appl. No. 14/869,829, 3 pages.
Office Action, dated Feb. 11, 2020, received in Korean Patent Application No. 2019-7036500, which corresponds with U.S. Appl. No. 14/869,829, 2 pages.
Office Action, dated Sep. 3, 2020, received in Korean Patent Application No. 2019-7036500, which corresponds with U.S. Appl. No. 14/869,829, 5 pages.
Patent, dated Oct. 29, 2020, received in Korean Patent Application No. 2019-7036500, which corresponds with U.S. Appl. No. 14/869,829, 4 pages.
Office Action, dated Feb. 18, 2016, received in U.S. Appl. No. 14/869,834, 17 pages.
Final Office Action, dated Aug. 8, 2016, received in U.S. Appl. No. 14/869,834, 22 pages.
Office Action, dated Mar. 7, 2017, received in U.S. Appl. No. 14/869,834, 20 pages.
Final Office Action, dated Jul. 25, 2017, received in U.S. Appl. No. 14/869,834, 18 pages.
Notice of Allowance, dated Nov. 7, 2017, received in U.S. Appl. No. 14/869,834 , 9 pages.
Office Action, dated May 3, 2019, received in Australian Patent Application No. 2018202796, which corresponds with U.S. Appl. No. 14/869,834, 2 pages.
Notice of Acceptance, dated Feb. 17, 2020, received in Australian Patent Application No. 2018202796, which corresponds with U.S. Appl. No. 14/869,834, 3 pages.
Patent, dated Jun. 18, 2020, received in Australian Patent Application No. 2018202796, which corresponds with U.S. Appl. No. 14/869,834, 3 pages.
Office Action, dated Mar. 21, 2019, received in Korean Patent Application No. 2019-7000444, which corresponds with U.S. Appl. No. 14/869,870, 3 pages.

(56) References Cited

OTHER PUBLICATIONS

Notice of Allowance, dated Sep. 10, 2019, received in Korean Patent Application No. 2019-7000444, which corresponds with U.S. Appl. No. 14/869,870, 4 pages.
Patent, dated Dec. 10, 2019, received in Korean Patent Application No. 2019-7000444, which corresponds with U.S. Appl. No. 14/869,870, 4 pages.
Office Action, dated Feb. 17, 2016, received in U.S. Appl. No. 14/869,835, 15 pages.
Final Office Action, dated Aug. 4, 2016, received in U.S. Appl. No. 14/869,835, 21 pages.
Office Action, dated Jan. 6, 2017, received in U.S. Appl. No. 14/869,835, 17 pages.
Final Office Action, dated Jun. 28, 2017, received in U.S. Appl. No. 14/869,835, 24 pages.
Office Action, dated Nov. 30, 2017, received in U.S. Appl. No. 14/869,835, 8 pages.
Notice of Allowance, dated May 29, 2018, received in U.S. Appl. No. 14/869,835, 12 pages.
Notice of Allowance, dated Feb. 23, 2023, received in Korean Patent Application No. 2023704128, which corresponds with U.S. Appl. No. 14/869,835, 2 pages.
Office Action, dated Dec. 30, 2015, received in U.S. Appl. No. 14/869,837, 35 pages.
Final Office Action, dated Jun. 30, 2016, received in U.S. Appl. No. 14/869,837, 37 pages.
Office Action, dated Jan. 17, 2017, received in U.S. Appl. No. 14/869,837, 27 pages.
Notice of Allowance, dated Jul. 31, 2017, received in U.S. Appl. No. 14/869,837, 27 pages.
Office Action, dated Apr. 14, 2022, received in Korean Patent Application No. 2022-7007635, which corresponds with U.S. Appl. No. 14/869,837, 2 pages.
Notice of Allowance, dated Sep. 5, 2022, received in Korean Patent Application No. 2022-7007635, which corresponds with U.S. Appl. No. 14/869,837, 2 pages.
Patent, dated Dec. 2, 2022, received in Korean Patent Application No. 2022-7007635, which corresponds with U.S. Appl. No. 14/869,837, 5 pages.
Office Action, dated Nov. 27, 2019, received in U.S. Appl. No. 15/972,040, 17 pages.
Final Office Action, dated Apr. 23, 2020, received in U.S. Appl. No. 15/972,040, 18 pages.
Office Action, dated Jul. 24, 2020, received in U.S. Appl. No. 15/972,040, 18 pages.
Final Office Action, dated Feb. 8, 2021, received in U.S. Appl. No. 15/972,040, 17 pages.
Office Action, dated Jun. 4, 2021, received in U.S. Appl. No. 15/972,040, 18 pages.
Notice of Allowance, dated Oct. 22, 2021, received in U.S. Appl. No. 15/972,040, 13 pages.
Office Action, dated Jun. 1, 2020, received in Australian Patent Application No. 2018271107, which corresponds with U.S. Appl. No. 15/972,040, 4 pages.
Notice of Allowance, dated Nov. 26, 2020, received in Australian Patent Application No. 2018271107, which corresponds with U.S. Appl. No. 15/972,040, 2 pages.
Certificate of Grant, dated Mar. 18, 2021, received in Australian Patent Application No. 201827107, which corresponds with U.S. Appl. No. 15/972,040, 3 pages.
Office Action, dated Jul. 29, 2021, received in Australian Patent Application No. 2020289876, which corresponds with U.S. Appl. No. 15/972,040, 4 pages.
Notice of Allowance, dated Dec. 13, 2021, received in Australian Patent Application No. 2020289876, which corresponds with U.S. Appl. No. 15/972,040, 3 pages.
Certificate of Grant, dated Apr. 21, 2022, received in Australian Patent Application No. 2020289876, which corresponds with U.S. Appl. No. 15/972,040, 3 pages.
Office Action, dated Aug. 12, 2022, received in Chinese Patent Application No. 201880032323.5, which corresponds with U.S. Appl. No. 15/972,040, 6 pages.
Office Action, dated Aug. 31, 2017, received in Danish Patent Application No. 201770372, 10 pages.
Office Action, dated Apr. 17, 2018, received in Danish Patent Application No. 201770372, 5 pages.
Office Action, dated May 10, 2019, received in Danish Patent Application No. 201770372, 5 pages.
Office Action, dated Sep. 30, 2021, received in European Patent Application No. 18730541.2, which corresponds with U.S. Appl. No. 15/972,040, 8 pages.
Office Action, dated Oct. 30, 2020, received in Japanese Patent Application No. 2019-562305, which corresponds with U.S. Appl. No. 15/972,040, 9 pages.
Office Action, dated Mar. 8, 2021, received in Japanese Patent Application No. 2019-562305, which corresponds with U.S. Appl. No. 15/972,040, 2 pages.
Notice of Allowance, dated Feb. 25, 2022, received in Japanese Patent Application No. 2019-562305, which corresponds with U.S. Appl. No. 15/972,040, 2 pages.
Patent, dated Mar. 29, 2022, received in Japanese Patent Application No. 2019-562305, which corresponds with U.S. Appl. No. 15/972,040, 3 pages.
Office Action, dated Apr. 26, 2022, received in Korean Patent Application No. 2019-7032571, which corresponds with U.S. Appl. No. 15/972,040, 2 pages.
Patent, dated May 27, 2022, received in Korean Patent Application No. 2019-7032571, which corresponds with U.S. Appl. No. 15/972,040, 5 pages.
Office Action, dated Mar. 7, 2018, received in U.S. Appl. No. 15/688,754, 9 pages.
Notice of Allowance, dated Aug. 27, 2018, received in U.S. Appl. No. 15/688,754, 5 pages.
Office Action, dated Sep. 18, 2021, received in Chinese Patent Application No. 201911032592.4, which corresponds with U.S. Appl. No. 15/688,754, 7 pages.
Notice of Allowance, dated Jan. 6, 2022, received in Chinese Patent Application No. 201911032592.4, which corresponds with U.S. Appl. No. 15/688,754, 1 page.
Patent, dated Mar. 11, 2022, received in Chinese Patent Application No. 201911032592.4, which corresponds with U.S. Appl. No. 15/688,754, 6 pages.
Office Action, dated Feb. 12, 2019, received in U.S. Appl. No. 15/823,436, 7 pages.
Notice of Allowance, dated Jul. 24, 2019, received in U.S. Appl. No. 15/823,436, 5 pages.
Office Action, dated May 12, 2022, received in Australian Patent Application No. 2021203205, which corresponds with U.S. Appl. No. 15/823,436, 3 pages.
Notice of Allowance, dated Mar. 28, 2023, received in Australian Patent Application No. 2021203205, which corresponds with U.S. Appl. No. 15/823,436, 3 pages.
Office Action, dated Feb. 25, 2022, received in Japanese Patent Application No. 2021-034605, which corresponds with U.S. Appl. No. 15/823,436, 2 pages.
Notice of Allowance, dated Dec. 5, 2022, received in Japanese Patent Application No. 2021-034605, which corresponds with U.S. Appl. No. 15/823,436, 2 pages.
Patent, dated Dec. 28, 2022, received in Japanese Patent Application No. 2021-034605, which corresponds with U.S. Appl. No. 15/823,436, 3 pages.
Office Action, dated Nov. 19, 2020, received in Korean Patent Application No. 2020-7030968, which corresponds with U.S. Appl. No. 15/823,436, 8 pages.
Notice of Allowance, dated Apr. 5, 2021, received in Korean Patent Application No. 2020-7030968, which corresponds with U.S. Appl. No. 15/823,436, 3 pages.
Patent, dated Jul. 5, 2021, received in Korean Patent Application No. 2020-7030968, which corresponds with U.S. Appl. No. 15/823,436, 4 pages.
Notice of Allowance, dated Apr. 11, 2019, received in U.S. Appl. No. 15/863,765, 10 pages.

(56) References Cited

OTHER PUBLICATIONS

Notice of Allowance, dated Sep. 18, 2019, received in U.S. Appl. No. 15/863,765, 8 pages.
Notice of Allowance, dated Sep. 24, 2021, received in Chinese Patent Application No. 201910901923.7, which corresponds with U.S. Appl. No. 15/863,765, 6 pages.
Patent, dated Dec. 14, 2021, received in Chinese Patent Application No. 201910901923.7, which corresponds with U.S. Appl. No. 15/863,765, 6 pages.
Office Action, dated Jul. 20, 2018, received in U.S. Appl. No. 15/905,671, 7 pages.
Notice of Allowance, dated Dec. 20, 2018, received in U.S. Appl. No. 15/905,671, 9 pages.
Office Action, dated Mar. 24, 2020, received in U.S. Appl. No. 16/157,891, 16 pages.
Final Office Action, dated Sep. 23, 2020, received in U.S. Appl. No. 16/157,891, 16 pages.
Office Action, dated Feb. 5, 2021, received in U.S. Appl. No. 16/157,891, 18 pages.
Final Office Action, dated Jul. 6, 2020, received in U.S. Appl. No. 16/157,891, 21 pages.
Notice of Allowance, dated Dec. 17, 2021, received in U.S. Appl. No. 16/157,891, 14 pages.
Notice of Allowance, dated Feb. 23, 2022, received in U.S. Appl. No. 16/157,891, 14 pages.
Office Action, dated Sep. 14, 2021, received in Chinese Patent Application No. 202010238633.1, which corresponds with U.S. Appl. No. 16/157,891, 2 pages.
Notice of Allowance, dated Feb. 21, 2022, received in Chinese Patent Application No. 202010238633.1, which corresponds with U.S. Appl. No. 16/157,891, 4 pages.
Patent, dated Mar. 22, 2022, received in Chinese Patent Application No. 202010238633.1, which corresponds with U.S. Appl. No. 16/157,891, 7 pages.
Office Action, dated Nov. 21, 2022, received in Japanese Patent Application No. 2021-174795, with U.S. Appl. No. 16/157,891, 4 pages.
Office Action, dated Feb. 13, 2019, received in U.S. Appl. No. 16/240,684, 9 pages.
Notice of Allowance, dated Mar. 19, 2019, received in U.S. Appl. No. 16/240,684, 5 pages.
Office Action, dated Nov. 26, 2019, received in Australian Patent Application No. 2019202429, which corresponds with U.S. Appl. No. 16/240,684, 2 pages.
Notice of Acceptance, dated Sep. 30, 2020, received in Australian Patent Application No. 2019202429, which corresponds with U.S. Appl. No. 16/240,684, 3 pages.
Certificate of Grant, dated Jan. 28, 2021, received in Australian Patent Application No. 2019202429, which corresponds with U.S. Appl. No. 16/240,684, 3 pages.
Notice of Allowance, dated Sep. 23, 2021, received in Chinese Patent Application No. 201911023034.1, which corresponds with U.S. Appl. No. 16/240,684, 2 pages.
Patent, dated Nov. 2, 2021, received in Chinese Patent Application No. 201911023034.1, which corresponds with U.S. Appl. No. 16/240,684, 6 pages.
Office Action, dated Jul. 17, 2019, received in U.S. Appl. No. 16/355,621, 7 pages.
Final Office Action, dated Dec. 12, 2019, received in U.S. Appl. No. 16/355,621, 8 pages.
Notice of Allowance, dated Feb. 14, 2020, received in U.S. Appl. No. 16/355,621, 9 pages.
Office Action, dated Mar. 8, 2021, received in Japanese Patent Application No. 2020-035108, which corresponds with U.S. Appl. No. 16/355,621, 2 pages.
Office Action, dated Jan. 17, 2022, received in Japanese Patent Application No. 2020-035108, which corresponds with U.S. Appl. No. 16/355,621, 2 pages.
Final Office Action, dated May 16, 2022, received in Japanese Patent Application No. 2020-035108, which corresponds with U.S. Appl. No. 16/355,621, 2 pages.
Patent, dated Mar. 7, 2023, received in Japanese Patent Application No. 2020-035108, which corresponds with U.S. Appl. No. 16/355,621, 3 pages.
Office Action, dated Apr. 28, 2022, received in Korean Patent Application No. 2022-7003347, which corresponds with U.S. Appl. No. 16/355,621, 3 pages.
Notice of Allowance, dated Dec. 27, 2022, received in Korean Patent Application No. 2022-7003347, which corresponds with U.S. Appl. No. 16/355,621, 9 pages.
Notice of Allowance, dated Apr. 5, 2023, received in Korean Patent Application No. 2022-7003347, which corresponds with U.S. Appl. No. 16/355,621, 2 pages.
Office Action, dated Aug. 21, 2019, received in U.S. Appl. No. 16/508,218, 8 pages.
Notice of Allowance, dated Dec. 4, 2019, received in U.S. Appl. No. 16/508,218, 5 pages.
Intent to Grant, dated Oct. 9, 2021, received in Australian Patent Application No. 2020294270, which corresponds with U.S. Appl. No. 16/508,218, 2 pages.
Notice of Allowance, dated Jun. 30, 2022, received in Australian Patent Application No. 2020294270, which corresponds with U.S. Appl. No. 16/508,218, 3 pages.
Patent, dated Nov. 3, 2022, received in Australian Patent Application No. 2020294270, which corresponds with U.S. Appl. No. 16/508,218, 3 pages.
Office Action, dated Feb. 10, 2020, received in U.S. Appl. No. 16/705,673, 6 pages.
Final Office Action, dated May 18, 2020, received in U.S. Appl. No. 16/705,673, 7 pages.
Office Action, dated Sep. 8, 2020, received in U.S. Appl. No. 16/705,673, 6 pages.
Notice of Allowance, dated Dec. 9, 2020, received in U.S. Appl. No. 16/705,673, 6 pages.
Notice of Allowance, dated Dec. 7, 2021, received in Korean Patent Application No. 2021-7021011, which corresponds with U.S. Appl. No. 16/705,673, 5 pages.
Patent, dated Mar. 7, 2022, received in Korean Patent Application No. 2021-7021011, which corresponds with U.S. Appl. No. 16/705,673, 5 pages.
Office Action, dated Jun. 24, 2020, received in U.S. Appl. No. 16/553,064, 21 pages.
Notice of Allowance, dated Sep. 17, 2020, received in U.S. Appl. No. 16/553,064, 3 pages.
Office Action, dated Sep. 1, 2020, received in U.S. Appl. No. 16/846,124, 8 pages.
Notice of Allowance, dated Sep. 22, 2020, received in U.S. Appl. No. 16/846,124, 5 pages.
Office Action, dated Oct. 9, 2020, received in U.S. Appl. No. 16/885,166, 9 pages.
Notice of Allowance, dated Feb. 25, 2021, received in U.S. Appl. No. 16/885,166, 9 pages.
Office Action, dated May 6, 2021, received in Australian Patent Application No. 2020203587, which corresponds with U.S. Appl. No. 16/885,166, 3 pages.
Notice of Allowance, dated Oct. 28, 2021, received in Australian Patent Application No. 2020203587, which corresponds with U.S. Appl. No. 16/885,166, 3 pages.
Patent, dated Feb. 24, 2022, received in Australian Patent Application No. 2020203587, which corresponds with U.S. Appl. No. 16/885,166, 3 pages.
Office Action, dated Feb. 26, 2021, received in Korean Patent Application No. 2021-7002786, which corresponds with U.S. Appl. No. 16/885,166, 4 pages.
Final Office Action, dated Aug. 30, 2021, received in Korean Patent Application No. 2021-7002786, which corresponds with U.S. Appl. No. 16/885,166, 3 pages.
Notice of Allowance, dated Nov. 25, 2021, received in Korean Patent Application No. 2021-7002786, which corresponds with U.S. Appl. No. 16/885,166, 2 pages.

(56) References Cited

OTHER PUBLICATIONS

Patent, dated Jan. 27, 2022, received in Korean Patent Application No. 2021-7002786, which corresponds with U.S. Appl. No. 16/885,166, 6 pages.
Office Action, dated Jun. 9, 2021, received in U.S. Appl. No. 17/138,664, 10 pages.
Notice of Allowance, dated Aug. 27, 2021, received in U.S. Appl. No. 17/138,664, 5 pages.
Office Action, dated Dec. 2, 2022, received in U.S. Appl. No. 17/192,076, 6 pages.
Office Action, dated Dec. 19, 2022, received in Korean Patent Application No. 2022-7042472, which corresponds with U.S. Appl. No. 17/192,076, 2 pages.
Patent, dated Feb. 3, 2023, received in Korean Patent Application No. 2022-7042472, which corresponds with U.S. Appl. No. 17/192,076, 5 pages.
Office Action, dated Mar. 15, 2022, received in U.S. Appl. No. 17/318,995, 8 pages.
Notice of Allowance, dated May 23, 2022, received in U.S. Appl. No. 17/318,995, 8 pages.
Office Action, dated Sep. 29, 2022, received in U.S. Appl. No. 17/541,169, 12 pages.
Final Office Action, dated Jan. 19, 2023, received in U.S. Appl. No. 17/541,169, 12 pages.
Office Action, dated Mar. 24, 2023, received in Japanese Patent Application No. 2022-050345, 6 pages.
Office Action, dated Aug. 31, 2022, received in Korean Patent Application No. 2022-7018094, which corresponds with U.S. Appl. No. 17/541,169, 8 pages.
Office Action, dated Sep. 22, 2022, received in U.S. Appl. No. 17/572,535, 7 pages.
Notice of Allowance, dated Dec. 21, 2022, received in U.S. Appl. No. 17/572,535, 5 pages.
Office Action, dated Jan. 30, 2023, received in U.S. Appl. No. 17/947,023, 8 pages.
Notice of Allowance, dated Mar. 16, 2023, , received in U.S. Appl. No. 17/947,023, 8 pages.
International Search Report and Written Opinion, dated Nov. 29, 2017, received in International Patent Application No. PCT/US2017/037004, which corresponds with U.S. Appl. No. 15/619,359, 21 pages.
International Preliminary Report on Patentability, dated Dec. 18, 2018, received in International Patent Application No. PCT/US2017/037004, which corresponds with U.S. Appl. No. 15/619,359, 12 pages.
Extended European Search Report, dated Oct. 20, 2017, received in European Patent Application No. 17177493.8, which corresponds with U.S. Appl. No. 15/270,885, 6 pages.
European Search Report, dated Jul. 16, 2019, received in European Patent Application No. 19168886.0, which corresponds with U.S. Appl. No. 15/270,885, 6 pages.
Invitation to Pay Additional Fees, dated Nov. 8, 2017, received in International Patent Application No. PCT/US2017/045152, which corresponds with U.S. Appl. No. 15/270,885, 17 pages.
International Search Report and Written Opinion, dated Jan. 18, 2018, received in International Patent Application No. PCT/US2017/045152, which corresponds with U.S. Appl. No. 15/270,885, 20 pages.
Extended European Search Report, dated Jan. 10, 2018, received in European Patent Applicaton No. 17186196.6, which corresponds with U.S. Appl. No. 15/271,073, 8 pages.
Extended European Search Report, dated Jan. 9, 2018, received in European Patent Application No. 17186312.9, which corresponds with U.S. Appl. No. 15/271,073, 6 pages.
Extended European Search Report, dated Jan. 5, 2018, received in European Patent Application No. 17186313.7, which corresponds with U.S. Appl. No. 15/271,073, 9 pages.
International Search Report and Written Opinion, dated Jan. 16, 2018, received in International Patent Application No. PCT/US2017/045740, which corresponds with U.S. Appl. No. 15/271,073, 19 pages.
European Search Report, dated Sep. 27, 2018, received in European Patent Application No. 18183341.9, which corresponds with U.S. Appl. No. 15/271,073, 4 pages.
European Search Report, dated Jun. 2, 2020, received in European Patent Application No. 20155940.8, which corresponds with U.S. Appl. No. 15/271,073, 4 pages.
International Search Report and Written Opinion, dated Jan. 18, 2018, received in International Patent Application No. PCT/US2017/044851, which corresponds with U.S. Appl. No. 15/272,380, 17 pages.
European Search Report, dated Dec. 3, 2018, received in European Patent Application No. 18191063.9, which corresponds with U.S. Appl. No. 15/275,083, 4 pages.
International Search Report and Written Opinion, dated Mar. 15, 2016, received in International Patent Application No. PCT/US2015/041858, which corresponds with U.S. Appl. No. 14/835,708, 31 pages.
International Search Report and Written Opinion, dated Aug. 22, 2018, received in International Patent Application No. PCT/US2018032936, which corresponds with U.S. Appl. No. 15/972,040, 14 pages.
Extended European Search Report, dated Jul. 25, 2022, received in European Patent Application No. 22167427.8, which corresponds with U.S. Appl. No. 15/688,754, 9 pages.
Apple, "iPhone User Guide for iOs 8.4 Software", Jun. 30, 2015, 196 pages.
Kraft, "Haptic Compass", https://hackaday.com/2009/02/05/haptic-compass, Feb. 5, 2009, 1 page.
Office Action, dated Mar. 13, 2024, received in European Patent Application No. 17751545.9, which corresponds with U.S. Appl. No. 15/272,380, 8 pages.
Intent to Grant, dated Jan. 8, 2024, received in European Patent Application No. 15748122.7, which corresponds with U.S. Appl. No. 14/835,708, 8 pages.
Intent to Grant, dated Oct. 10, 2023, received in European Patent Application No. 18730541.2, which corresponds with U.S. Appl. No. 15/972,040, 10 pages.
Decision to Grant, dated Feb. 22, 2024, received in European Patent Application No. 18730541.2, which corresponds with U.S. Appl. No. 15/972,040, 3 pages.
Patent, dated Mar. 20, 2024, received in European Patent Application No. 18730541.2, which corresponds with U.S. Appl. No. 15/972,040, 2 pages.
Intent to Grant, dated Nov. 17, 2023, received in European Patent Application No. 22167427.8, which corresponds with U.S. Appl. No. 15/688,754, 8 pages.
Decision to Grant, dated Feb. 15, 2024, received in European Patent Application No. 22167427.8, which corresponds with U.S. Appl. No. 15/688,754, 2 pages.
Patent, dated Mar. 26, 2024, received in European Patent Application No. 22167427.8, which corresponds with U.S. Appl. No. 15/688,754, 5 pages.
Notice of Allowance, dated Jan. 2, 2024, received in Australian Patent Application No. 2022205027, which corresponds with U.S. Appl. No. 17/138,664, 3 pages.
Office Action, dated Oct. 12, 2023, received in U.S. Appl. No. 17/751,519, 11 pages.
Final Office Action, dated Jan. 30, 2024, received in U.S. Appl. No. 17/751,519, 12 pages.
Office Action, dated Apr. 5, 2024, received in U.S. Appl. No. 18/210,606, 12 pages.
Extended European Search Report, dated Dec. 6, 2023, received in European Patent Application No. 23192586.8, which corresponds with U.S. Appl. No. 16/355,621, 10 Pages.
Decision to Grant, dated May 16, 2024, received in European U.S. Appl. No. 14/835,708, which corresponds with U.S. Appl. No. 14/835,708, 4 pages.

(56) References Cited

OTHER PUBLICATIONS

Patent, dated Apr. 9, 2024, received in Korean Patent Application No. 2023-7022877, which corresponds with U.S. Appl. No. 16/355,621, 4 pages.

Office Action, dated Apr. 16, 2024, received in Japanese Patent Application No. 2023-033002, which corresponds with U.S.Appl. No. 16/885,166, 6 pages.

Office Action, dated May 1, 2024, received in Australian Patent Application No. 2023204608, which corresponds with U.S. Appl. No. 17/192,076, 3 pages.

Notice of Allowance, dated Apr. 26, 2024, received in Korean Patent Application No. 2023-7022883, which corresponds with U.S. Appl. No. 17/318,995, 3 pages.

Notice of Allowance, dated May 30, 2024, received in Korean Patent Application No. 2023-7029546, which corresponds with U.S. Appl. No. 18/210,606, 3 pages.

Office Action, dated May 20, 2024, received in U.S. Appl. No. 18/219,625, 19 pages.

Grant Certificate, dated Jun. 12, 2024, received in European Patent Application No. 15748122.7, which corresponds with U.S. Appl. No. 14/835,708, 4 pages.

Notice of Allowance, dated Jul. 1, 2024, received in Japanese Patent Application No. 2021-174795, with U.S. Appl. No. 16/157,891, 2 pages.

Notice of Allowance, dated Jun. 22, 2024, received in Australia Patent Application No. 2023204608, which corresponds with U.S. Appl. No. 17/192,076, 3 pages.

Final Office Action, dated Sep. 16, 2024, received in U.S. Appl. No. 18/210,606, 9 pages.

Patent, dated Aug. 5, 2024, received in Korean Patent Application No. 2023-7029546, which corresponds with U.S. Appl. No. 18/210,606, 4 pages.

Final Office Action, dated Aug. 15, 2024, received in U.S. Appl. No. 18/219,625, 24 pages.

Patent, dated Jul. 26, 2024, received in Korean Patent Application No. 2023-7022883, which corresponds with U.S. Appl. No. 17/318,995, 4 pages.

* cited by examiner

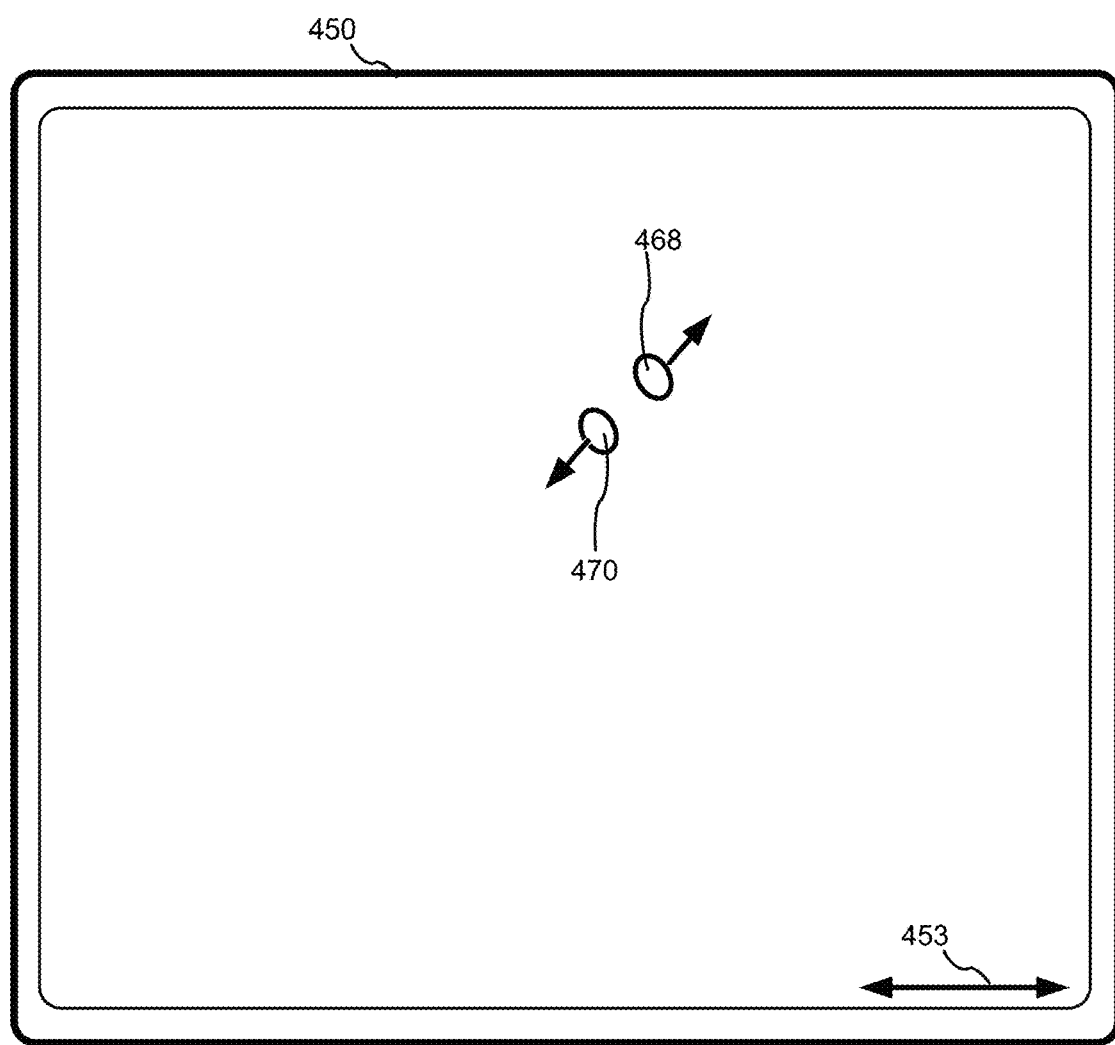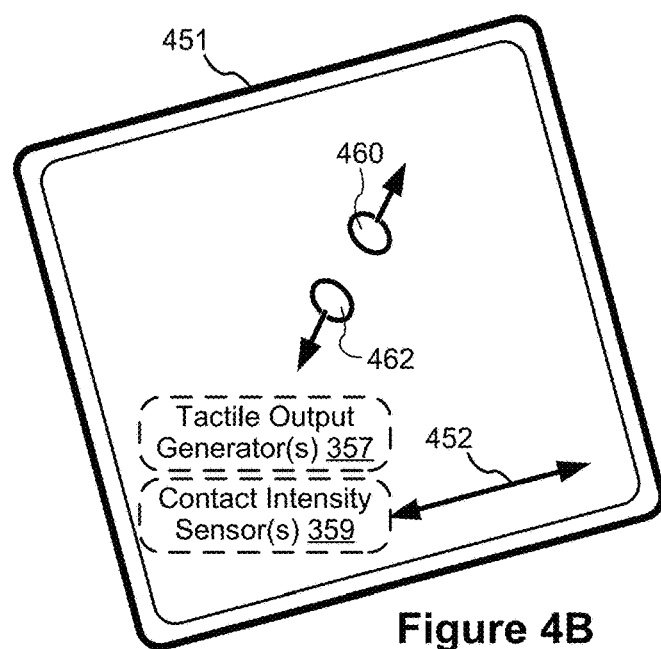
Figure 4B

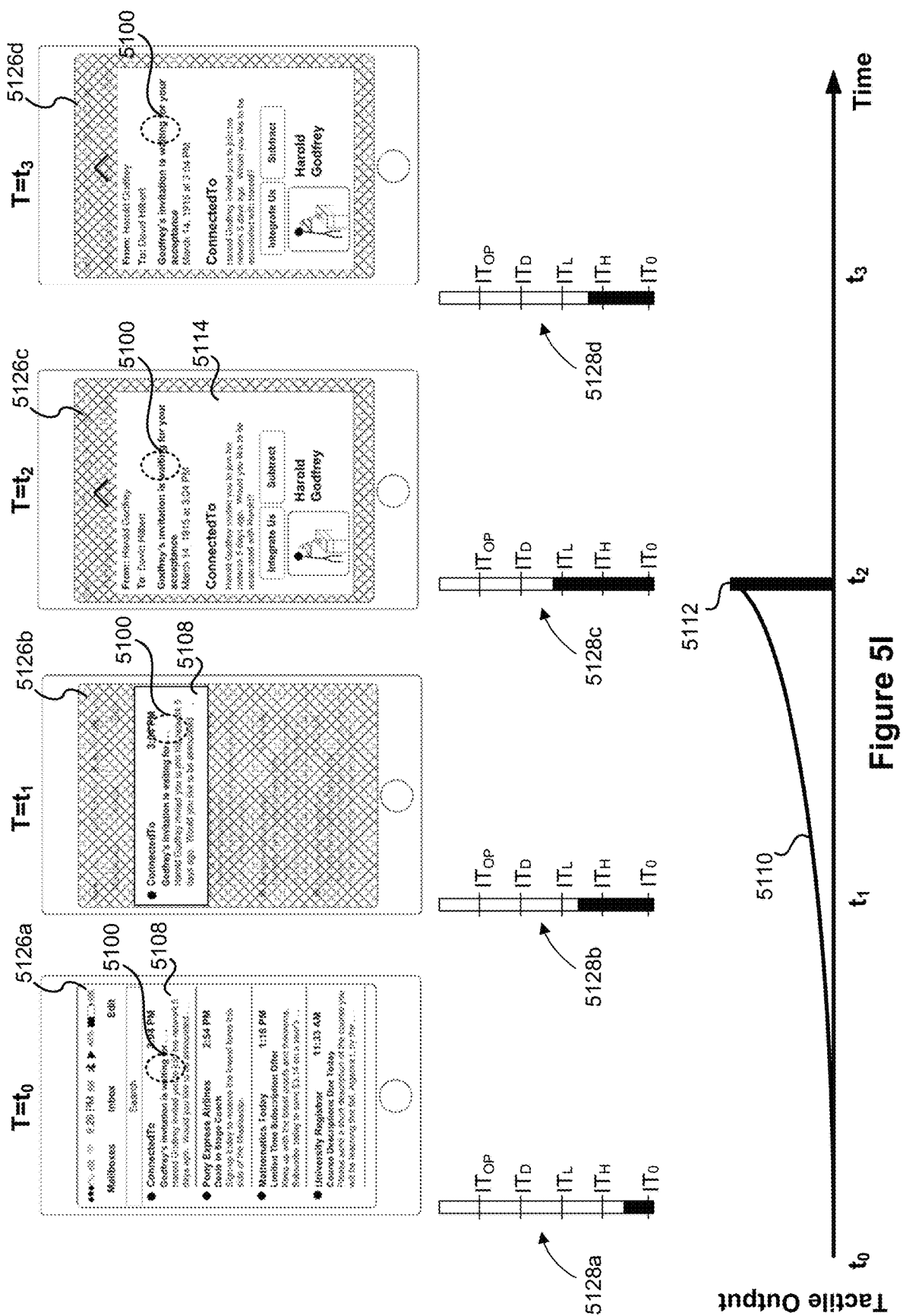

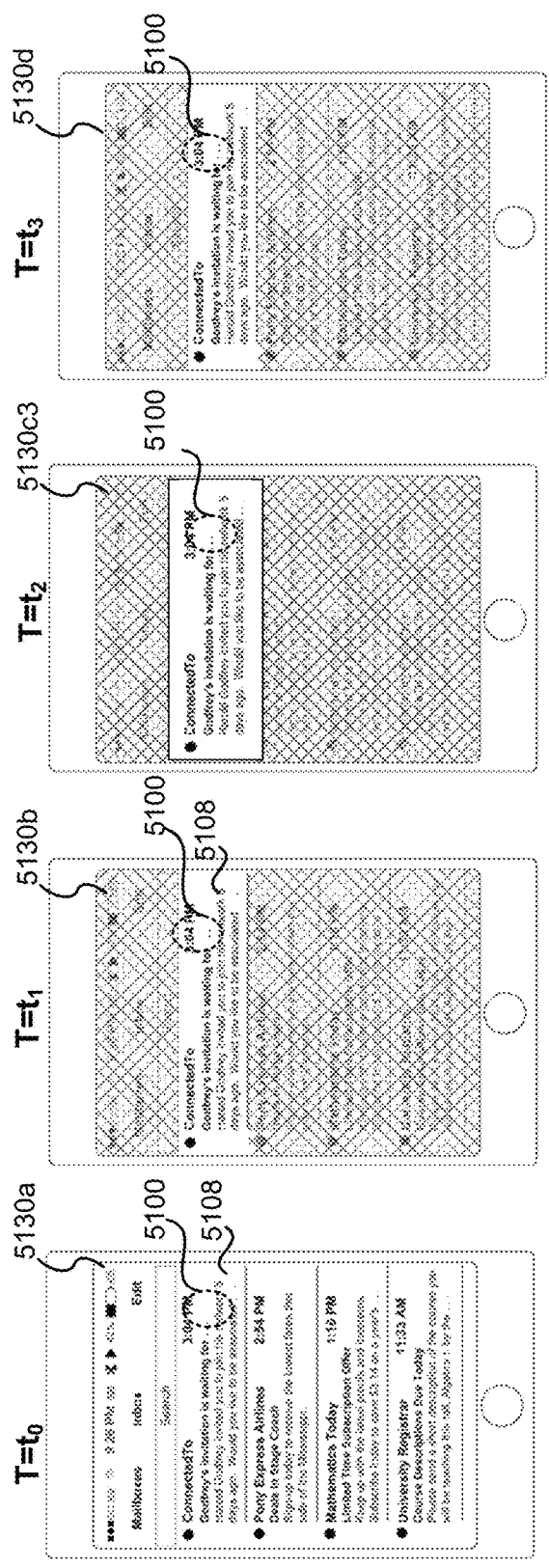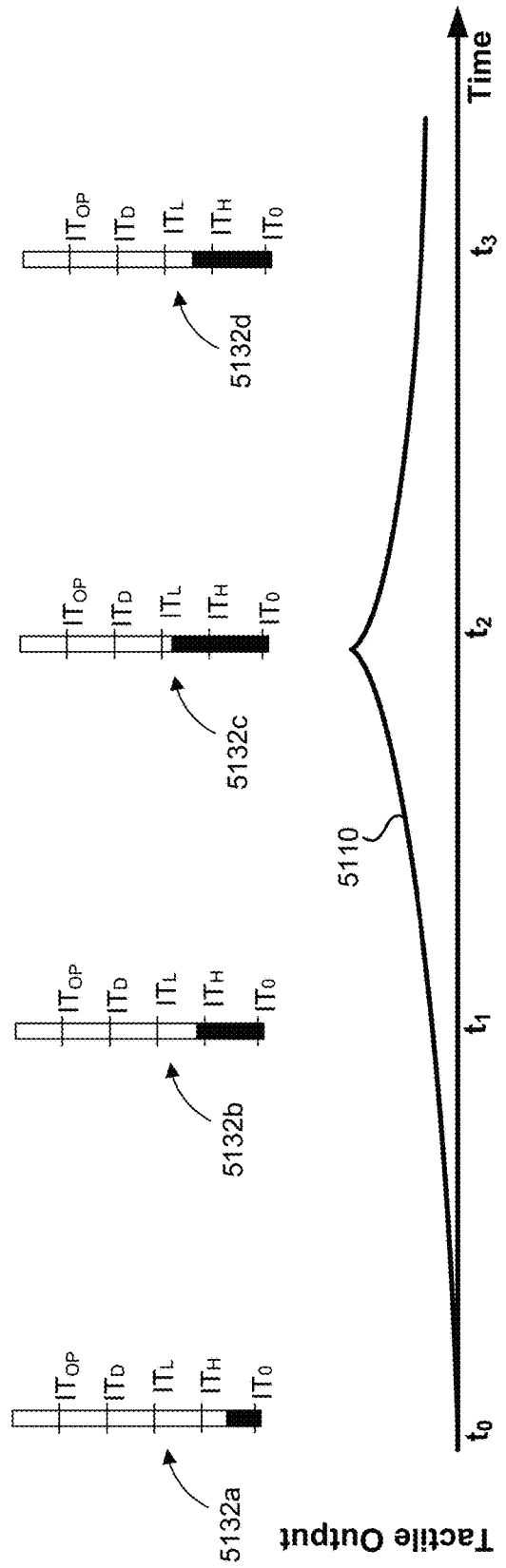
Figure 5J

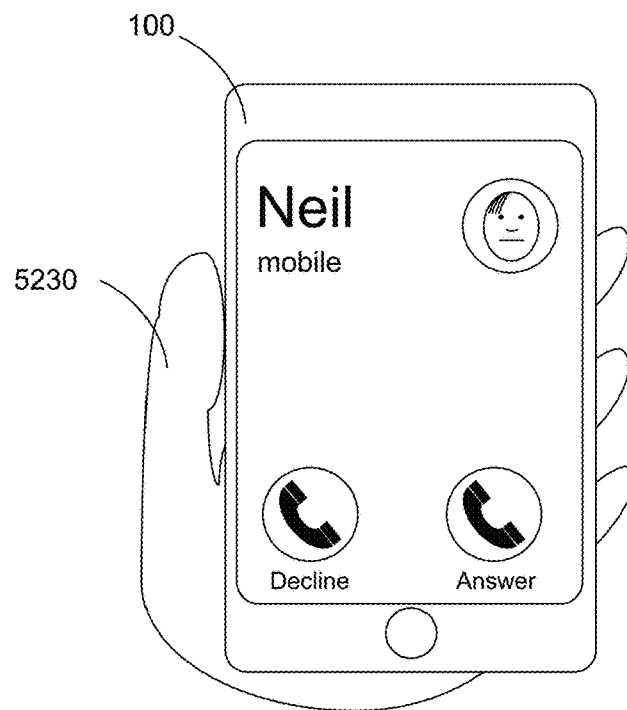
Tap-based Tactile Output
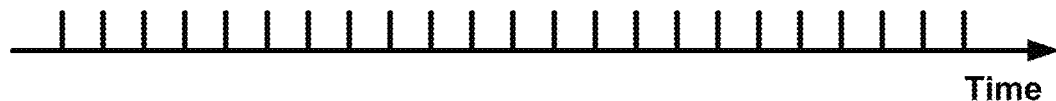
Time
Vibration Output
Time
Audio Output
Time
Figure 5Z

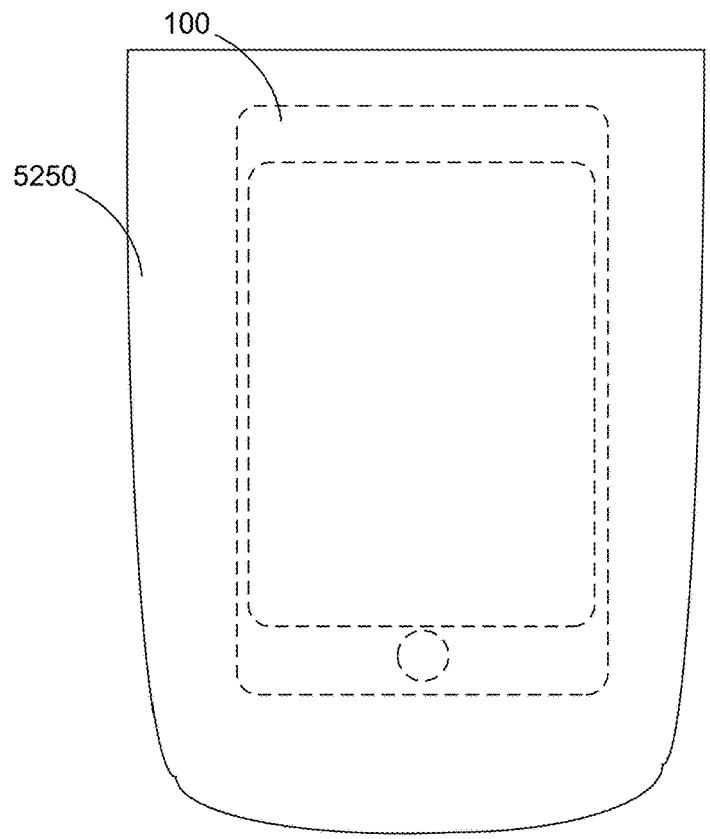
Tap-based Tactile Output
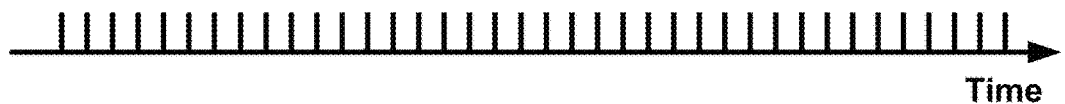
Time
Vibration Output
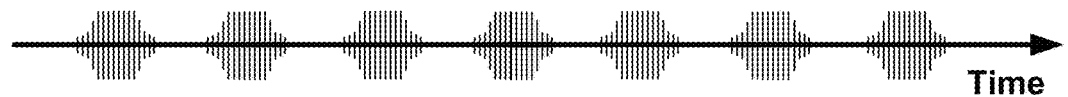
Time
Audio Output
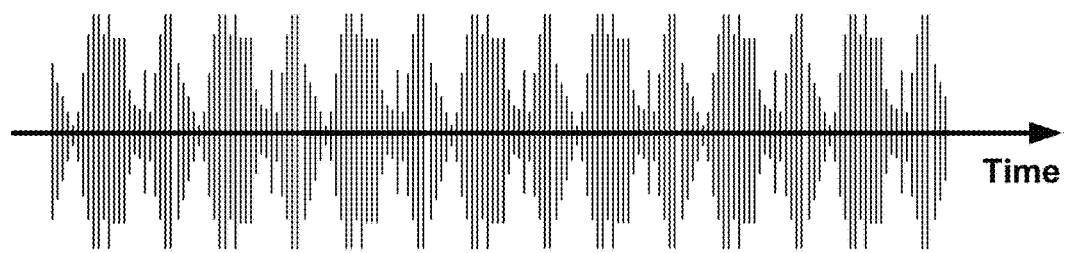
Time
Figure 5AA

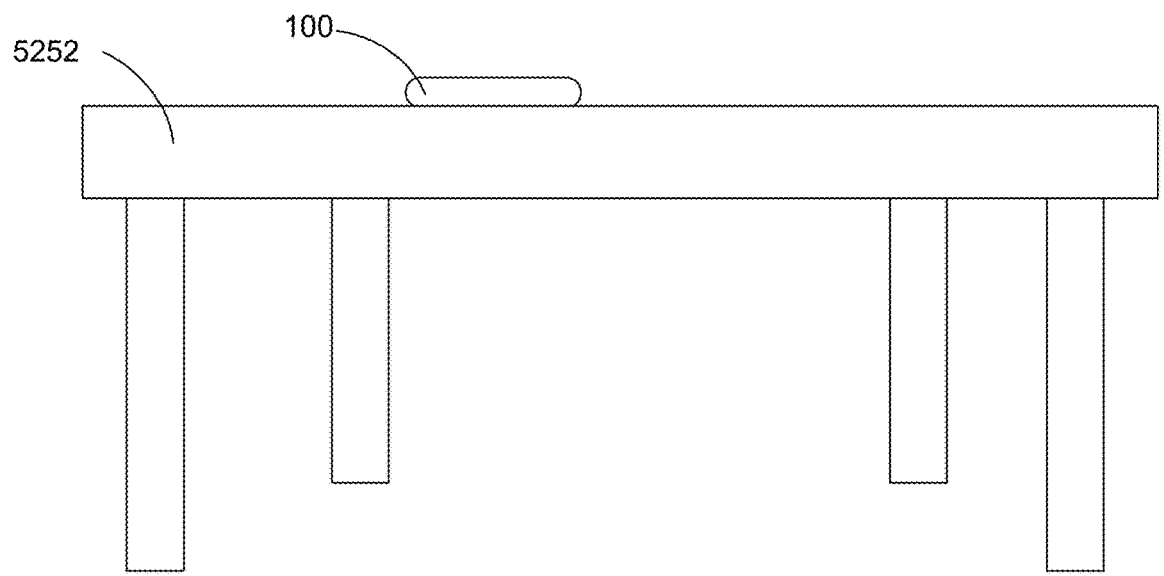
Tap-based Tactile Output
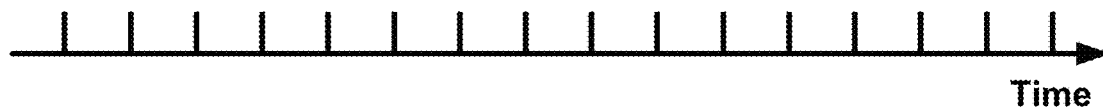
Vibration Output
Audio Output
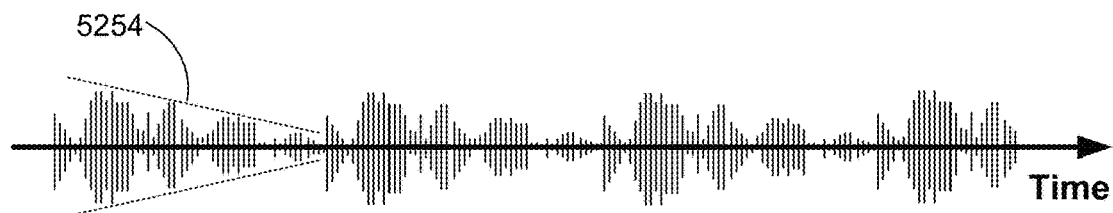
Figure 5BB

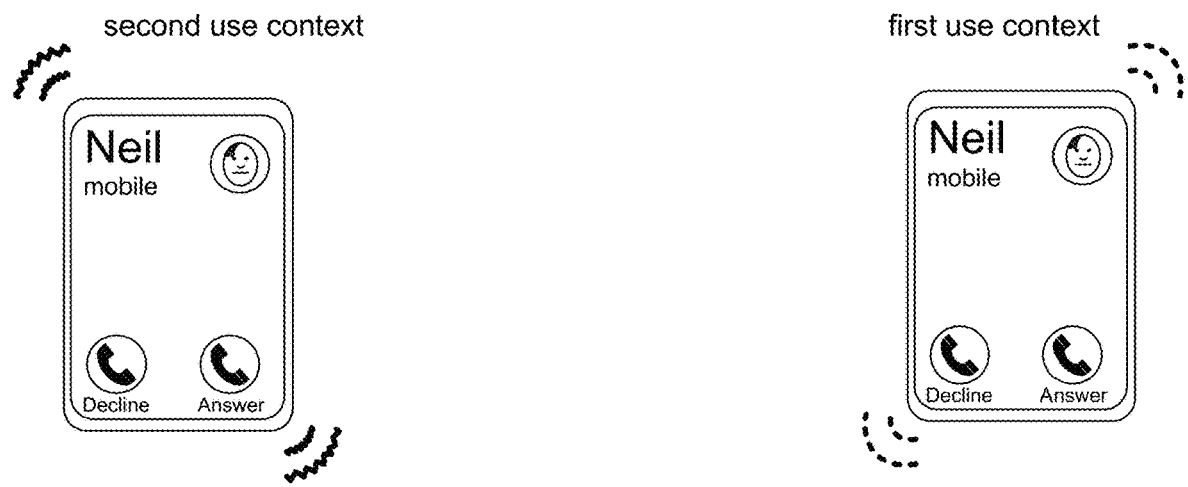
Tap-based Tactile Output
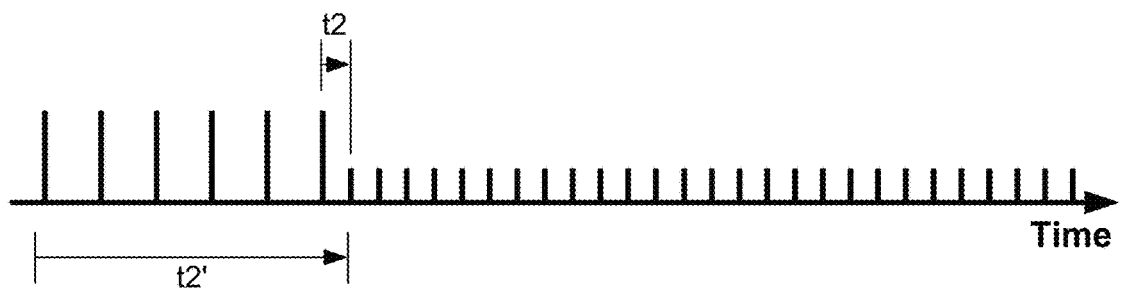
Vibration Output
Audio Output
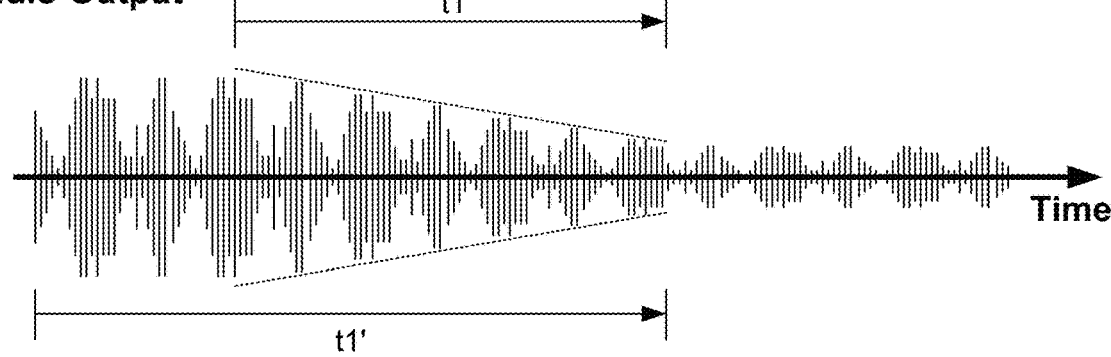
Figure 5GG

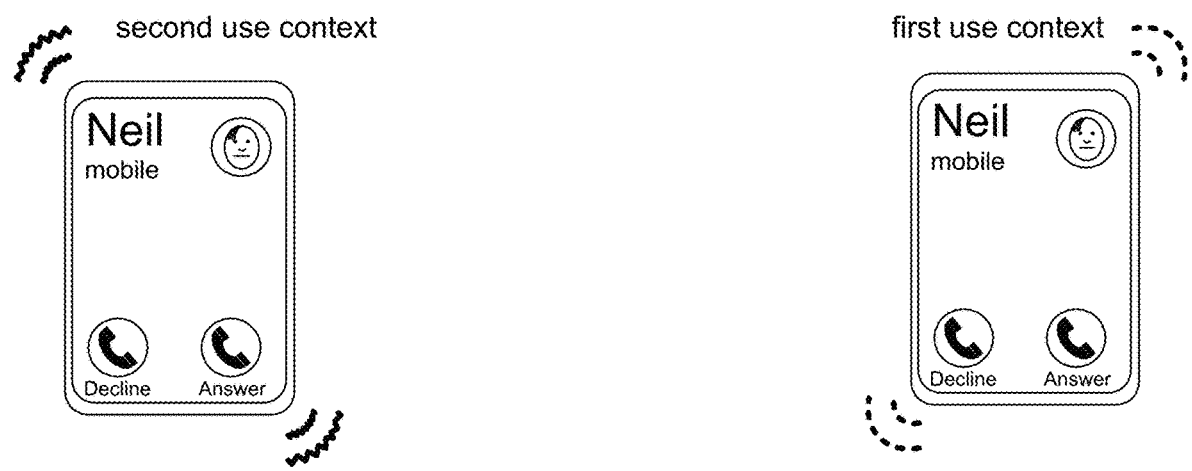
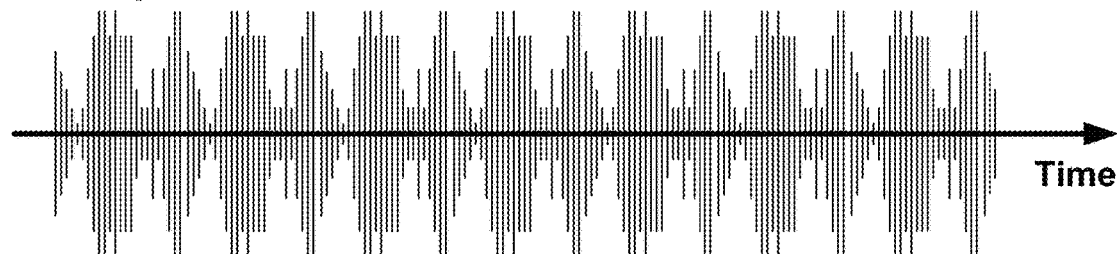
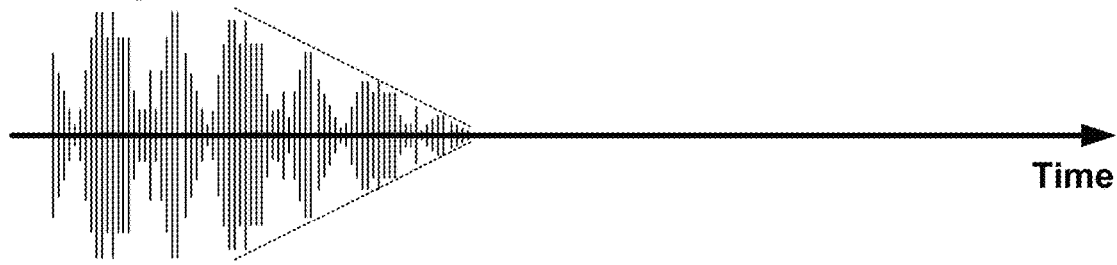
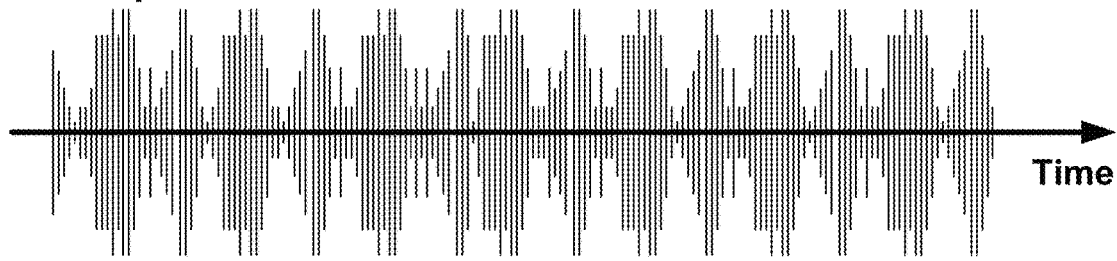
Figure 5MM

600

602
Display a user interface that includes a first adjustable control and a second adjustable control

604
Detect movement of a first contact across a touch-sensitive surface in a drag gesture

606
In accordance with a determination that the drag gesture is performed while a focus selector is at a location that corresponds to the first adjustable control: adjust the first adjustable control in accordance with the movement of the first contact in the drag gesture; and output, with the one or more tactile output generators, a first plurality of tactile outputs, wherein: a respective tactile output, in the first plurality of tactile outputs, is triggered based on progress adjusting the first adjustable control; and the first plurality of tactile outputs have a first distribution of tactile outputs as the first adjustable control is adjusted

608
In accordance with a determination that the drag gesture is performed while the focus selector is at a location that corresponds to the second adjustable control: adjust the second adjustable control in accordance with the movement of the first contact in the drag gesture; and output, with one or more tactile output generators, a second plurality of tactile outputs, wherein: a respective tactile output, in the second plurality of tactile outputs, is triggered based on progress adjusting the second adjustable control; and the second plurality of tactile outputs has a second distribution of tactile outputs that is different from the first distribution of tactile outputs as the second adjustable control is adjusted.

610
The first adjustable control is a progress control for selecting a position within content and the second control is a volume control for controlling volume of the content while it is playing

612
The first plurality of tactile outputs includes an endpoint tactile output that is provided in accordance with a determination that the first adjustable control has reached an endpoint.

614
For a respective tactile output in the first plurality of tactile outputs, the respective tactile output is triggered when the focus selector is at a corresponding predefined location on the display

616
The first adjustable control is a progress control, and at least some of the predefined locations on the display correspond to chapter markers for media content whose playback is being adjusted with the progress control

618
Each tactile output, in the first plurality of tactile outputs and in the second plurality of tactile outputs, has a corresponding tactile output profile

620
A respective tactile output, in the first plurality of tactile outputs, has a first respective tactile output profile; and a respective tactile output, in the second plurality of tactile outputs, has a second respective tactile output profile that is different from the first respective tactile output profile.

622
Amplitudes of tactile outputs in the first plurality of tactile outputs are constant and amplitudes of tactile outputs in the second plurality of tactile outputs are variable

624
Amplitudes of tactile outputs in the first plurality of tactile outputs vary in a first manner and amplitudes of tactile outputs in the second plurality of tactile outputs vary in a second manner that is different from the first manner

626
Tactile outputs in the first plurality of tactile outputs are accompanied by corresponding audio outputs

628
The audio outputs have an audio parameter that is variable

630
Detect an input by a second contact on the touch-sensitive surface while a focus selector is at a location that corresponds to the play/pause toggle control

---

632
In response to detecting the input by the second contact: in accordance with a determination that the input corresponds to a request to play media content: playing the media content; displaying the play/pause toggle control in a play state; and outputting, with the one or more tactile output generators, at least one tactile output that has a first tactile output profile; and, in accordance with a determination that the input corresponds to a request to pause the media content: pausing the media content; displaying the play/pause toggle control in a pause state; and outputting, with the one or more tactile output generators, at least one tactile output that has a second tactile output profile that is different from the first tactile output profile.

702
While displaying a first user interface, detect a contact on a touch-sensitive surface

704
Detect a first increase in a characteristic intensity of the contact on a touch-sensitive surface

706
In response to detecting the first increase in the characteristic intensity of the contact on the touch-sensitive surface, produce a first tactile output, with one or more tactile output generators, that has a first tactile output profile, wherein the first tactile output profile includes an output parameter that varies in accordance with a proximity of the characteristic intensity of the contact to meeting a first intensity criteria

708
While producing the tactile output that has the first tactile output profile, detect a second increase in the characteristic intensity of the contact on the touch-sensitive surface

710
In response to detecting the second increase in the characteristic intensity of the contact on the touch-sensitive surface: in accordance with a determination that the characteristic intensity of the contact on the touch-sensitive surface meets the first intensity criteria, produce a second tactile output that has a second tactile output profile that is different from the first tactile output profile; and, in accordance with a determination that the characteristic intensity of the contact on the touch-sensitive surface does not meet the first intensity criteria, continue to produce the first tactile output that has the first tactile output profile and vary the output parameter in accordance with the second increase in the characteristic intensity of the contact based on the proximity of the characteristic intensity of the contact to meeting the first intensity criteria

712
Determine whether the characteristic intensity of the contact on the touch-sensitive surface meets the first intensity criteria in response to detecting the second increase in the characteristic intensity of the contact on the touch-sensitive surface

---

714
While detecting the second increase in the characteristic intensity of the contact, the first tactile output continues at least until the first intensity criteria are satisfied

---

716
The second tactile output is a discrete tactile output

---

718
In accordance with a determination that the characteristic intensity of the contact on the touch-sensitive surface meets the first intensity criteria, cease to output the first tactile output

---

720
After detecting the second increase in the characteristic intensity of the contact, detect a decrease in the characteristic intensity of the contact, and, in accordance with a determination that the decrease in the characteristic intensity of the contact is detected after the characteristic intensity of the contact on the touch-sensitive surface meets the first intensity criteria, forgoing producing the first tactile output; and in accordance with a determination that the decrease in the characteristic intensity of the contact is detected before the characteristic intensity of the contact on the touch-sensitive surface meets the first intensity criteria, continue to produce the first tactile output that has the first tactile output profile and continue to vary the output parameter in accordance with the proximity of the characteristic intensity of the contact to meeting the first intensity criteria.

---

722
While the first tactile output is produced, display an animation that varies in accordance with the proximity of the characteristic intensity of the contact to meeting the first intensity criteria

724
The output parameter of the first tactile output varies nonlinearly in accordance with the proximity of the characteristic intensity of the contact to meeting the first intensity criteria.

726
After producing the first tactile output, detect a third increase in a characteristic intensity of the contact on the touch-sensitive surface to an intensity that is greater than a threshold intensity that is included in the first intensity criteria; and, in response to detecting the third increase in the characteristic intensity of the contact on the touch-sensitive surface, produce a third tactile output, with the one or more tactile output generators, that has a third tactile output profile that varies in accordance with a proximity of the characteristic intensity of the contact to meeting a second intensity criteria.

728
As the third tactile output is produced, display an animation that varies in accordance with the proximity of the characteristic intensity of the contact to meeting the second intensity criteria

730
In accordance with a determination that the characteristic intensity of the contact on the touch-sensitive surface meets the second intensity criteria, produce a fourth tactile output that has a fourth tactile output profile

732
The third tactile output profile is different from the first tactile output profile

726
After producing the first tactile output, detect a third increase in a characteristic intensity of the contact on the touch-sensitive surface to an intensity that is greater than a threshold intensity that is included in the first intensity criteria; and, in response to detecting the third increase in the characteristic intensity of the contact on the touch-sensitive surface, produce a third tactile output, with the one or more tactile output generators, that has a third tactile output profile that varies in accordance with a proximity of the characteristic intensity of the contact to meeting a second intensity criteria.

734
In accordance with a determination that the characteristic intensity of the contact on the touch-sensitive surface meets a third intensity criteria, produce a fifth tactile output that has a fifth tactile output profile, wherein the duration of the fifth tactile output is shorter than the duration of the first tactile output.

736
The first intensity criteria includes a criterion that is met when the characteristic intensity of the contact exceeds a first intensity threshold; the second intensity criteria includes a criterion that is met when the characteristic intensity of the contact exceeds a second intensity threshold, greater than the first intensity threshold; the third intensity criteria includes a criterion that is met when the characteristic intensity of the contact exceeds a third intensity threshold, greater than the second intensity threshold; and the device foregoes producing a continuous tactile output while the characteristic intensity of the contact is between the second intensity threshold and the third intensity threshold

738
While displaying an animation that varies in accordance with the proximity of the characteristic intensity of the contact to meeting the second intensity criteria, detect a fourth increase in a characteristic intensity of the contact on the touch-sensitive surface; and in response to detecting the fourth increase in the characteristic intensity of the contact: in accordance with a determination that the characteristic intensity of the contact on the touch-sensitive surface meets the second intensity criteria, displaying a second user interface that is distinct from the first user interface; and, in accordance with a determination that the characteristic intensity of the contact on the touch-sensitive surface meets the third intensity criteria, redisplaying the first user interface

802
Display a user interface that includes a plurality of user interface objects

804
Detect, on a touch-sensitive surface, a touch input by a contact that moves a focus selector from a first user interface object of the plurality of user interface objects in a first direction on the display

806
In response to detecting the touch input: in accordance with a determination that the first user interface object is selected when the focus selector moves in the first direction, generate a sequence of tactile outputs that correspond to the movement of the focus selector in the first direction; and in accordance with a determination that the first user interface object is not selected when the focus selector moves in the first direction, forgo generation of the sequence of tactile outputs that correspond to the movement of the focus selector in the first direction

808
In response to detecting the touch input, move the first user interface object in accordance with the movement of the focus selector without regard to whether or not the first user interface object is selected

810
In response to detecting the touch input, in accordance with a determination that the first user interface object is selected, move the first user interface object relative to at least one other user interface object in the plurality of user interface objects

812
In response to detecting the touch input, in accordance with a determination that the first user interface object is selected, display a preview of another object that corresponds to the first user interface object.

814
As the first user interface object is moved, generate discrete tactile outputs that correspond to movement of the first object relative to the at least one other user interface object in the plurality of user interface objects.

816
As the first user interface object is moved, generate discrete tactile outputs that correspond to movement of other user interface objects in response to the movement of the first user interface object

---

818
In response to selecting the first user interface object, generate a tactile output that corresponds to the selection of the first user interface object that is different from the sequence of tactile outputs that correspond to movement of the first user interface object

820
In response to detecting the touch input, in accordance with a determination that the first user interface object is not selected, move a second user interface object in the plurality of user interface objects along with the first user interface object

822
In response to detecting a first portion of the touch input: select the first user interface object, and, generate an ongoing tactile output that indicates that the user interface is in a first state in which the first user interface object is selected

824
In response to detecting a first portion of the touch input: select the first user interface object, and, generate an ongoing tactile output that indicates that the user interface is in a first state in which the first user interface object is selected

826
While the touch input is being detected and while the first user interface object is selected, detecting a change in a state of the user interface from the first state to a second state, and, in response to detecting the change in the state of the user interface from the first state to the second state, change from an ongoing first-state tactile output to one or more second-state tactile outputs, different from the ongoing first-state tactile output, to indicate that the change in the state of the user interface from the first state to the second state has occurred

828
Outputting the one or more second-state tactile outputs includes outputting an ongoing sequence of tactile outputs while the second state is the active state of the first user interface

830
Changing a state of the user interface from the first state to the second state includes displaying a second user interface overlaid on a first user interface

832
Changing a state of the user interface from the first state to the second state includes replacing display of a first user interface with a second user interface

902
Display, on a display, a first user interface that includes: a plurality of icons of a first type, and at least one icon of a second type, different from the first type

904
While a focus selector is on a first icon of the first type, detect movement of a contact across a touch-sensitive surface in a drag gesture

906
In response to detecting movement of the contact across the touch-sensitive surface in the drag gesture while the focus selector is on the first icon:

908
Move the first icon across the display in accordance with the movement of the first contact in the drag gesture

910
In accordance with a determination that the first icon moves over one or more other icons of the first type during the drag gesture, output, with one or more tactile output generators, one or more tactile outputs of a first type, wherein a respective tactile output of the first type has a first tactile output profile

912
In accordance with a determination that the drag gesture moves the first icon over an icon of the second type at the end of the drag gesture: display a second user interface that corresponds to the icon of the second type; and output, with the one or more tactile output generators, a tactile output of a second type, wherein the tactile output of the second type has a second tactile output profile that is different from the first tactile output profile

1002
Display, on a display, a first user interface that includes a plurality of icons

↓

1004
Detect a first input by a contact on a touch sensitive surface while a focus selector is on a first icon in the plurality of icons, the first icon having a first size

↓

1006
In response to detecting the first input by the contact on the touch sensitive surface:

1008
In accordance with a determination that the first input satisfies preview display criteria: display a preview of an object that corresponds to the first icon, the preview having a second size that is greater than the first size; and output, with one or more tactile output generators, a tactile output of a first type, wherein a tactile output of the first type has a first tactile output profile

1010
In accordance with a determination that the first input satisfies scrolling criteria, which are different from the preview display criteria: forgo displaying the preview of the object that corresponds to the first icon; forgo outputting, with the one or more tactile output generators, the tactile output of the first type; and, scroll the plurality of icons

1102
Receive a number of communications

1104
After the number of communications is received: detect, using one or more device orientation sensors, a change in a position and/or orientation of the electronic device; and in response to detecting the change in the position and/or orientation of the device, produce, with the one or more tactile output generators, tactile output that has a tactile output profile that includes an output parameter that increases as the number of received communications increases

1106
The communications are received while the device is in a locked state

1108
The tactile output is produced while the device is in a locked state

1110
The tactile output is produced while the display is in a non-displaying state

1112
The output parameter is an amplitude of the tactile output

1114
The output parameter is a number of simulated objects that are simulated by the tactile output

1116
The tactile output includes simulated impact events by the simulated objects and the number of simulated impact events increases as the number of communications received increases

1118
The tactile output profile includes tactile outputs to simulate movements of the simulated objects wherein movement parameters of the simulated movements of the simulated objects are dependent on the detected change in the position and/or orientation of the device

1120
Detect a user input; and in response to detecting the user input, modify the tactile output profile to simulate movement of the simulated objects across a surface that has a surface texture

1122
A respective simulated object has a simulated quality that depends on at least one property of a corresponding notification

1124
The at least one property of the corresponding notification includes a type of a communication

1126
The tactile output profile for a particular received communication is user configurable

1128
The tactile output is generated immediately in response to the detected change in the position and/or orientation of the electronic device

1130
The change in the position and/or orientation of the electronic device is detected at a first time and the tactile output is generated at a second time when the orientation of the device meets tilt criteria

1212
The second ongoing tactile output for the incoming communication is distinct from the first ongoing tactile output for the incoming communication

1214
Providing the second feedback indicative of the incoming communication includes providing, with the audio system, a second ongoing audio output for the incoming communication, wherein the second ongoing audio output corresponds to the second use context

1216
The second ongoing audio output for the incoming communication is distinct from the first ongoing audio output for the incoming communication

1218
At least one audio characteristic is shared between the first ongoing audio output and the second ongoing audio output

1220
At least one audio parameter changes during a transition from the first ongoing audio output to the second ongoing audio output as at least one tactile parameter changes during a transition from the first ongoing tactile output to the second ongoing tactile output

1222
The first use context is in a partially enclosed space and the first ongoing audio output has a first amplitude; and the second use context is in a space that is less enclosed than the partially enclosed space and the second ongoing audio output has a second amplitude that is smaller than the first amplitude

1224
The first use context has a first background noise level and the first ongoing audio output has a first amplitude; and the second use context has a second background noise level that is louder than the first background noise level and the second ongoing audio output has a second amplitude that is greater than the first amplitude

1214
Providing the second feedback indicative of the incoming communication includes providing, with the audio system, a second ongoing audio output for the incoming communication, wherein the second ongoing audio output corresponds to the second use context

1226
The first use context has a first noise frequency distribution and the first ongoing audio output has a first audio frequency distribution; and the second use context has a second noise frequency distribution that is different from the first noise frequency distribution and the second ongoing audio output has a greater amplitude than the first ongoing audio output in at least one frequency range

1228
The first use context is on a stationary surface and the first ongoing audio output has a first amplitude; and the second use context is in hand and the second ongoing audio output has a second amplitude that is smaller than the first amplitude

1230
The first ongoing audio output, the first ongoing tactile output, the second ongoing audio output, and the second ongoing tactile output are feedback indicative of the same incoming communication

1232
While providing the second ongoing tactile output for the incoming communication, detecting, using one or more of the sensors, that the electronic device is in a third use context, different from the first use context and different from the second use context; and, in response to detecting that the electronic device is in the third use context, providing third feedback indicative of the incoming communication that is different from the first feedback and different from the second feedback, wherein providing the third feedback indicative of the incoming communication includes providing, with the one or more tactile output generators, a third ongoing tactile output for the incoming communication, wherein the third ongoing tactile output has a third tactile output profile that corresponds to the third use context

1234
Wherein providing the third feedback indicative of the incoming communication includes providing, with the audio system, a third ongoing audio output for the incoming communication, wherein the third ongoing audio output corresponds to the third use context

1236
The first use context is one of in a pocket, on a stationary surface, or in a hand and the second use context is another one of in a pocket, on a stationary surface, or in a hand

---

1238
When the device is determined to be in a context that indicates the device is in a user's pocket, the ongoing audio output corresponding to the incoming communication is undamped and the ongoing tactile output corresponding to the incoming communication includes high-salience tactile components and low-salience tactile components;

when the device is determined to be in a context that indicates the device is in a user's hand, the ongoing audio output corresponding to the incoming communication is undamped and the ongoing tactile output corresponding to the incoming communication includes the low-salience tactile components but includes a reduced number of the low-salience and high-salience tactile components relative to the ongoing tactile output corresponding to the incoming communication when the device is determined to be in a context that indicates the device is in a user's hand; and, when the device is determined to be in a context that indicates the device is in display-side down on a surface, the ongoing audio output corresponding to the incoming communication is damped and the ongoing tactile output corresponding to the incoming communication includes a reduced number of the low-salience and high-salience tactile components relative to the ongoing tactile output corresponding to the incoming communication when the device is determined to be in a context that indicates the device is in a user's hand

Figure 12D

In response to determining whether the electronic device is in the first use context or the second use context:

1312 In accordance with a determination that the electronic device is in the first use context, providing first feedback indicative of the alert event. The first feedback includes a first audio output and/or a first tactile output.

1314 Forgo monitoring whether the electronic device has transitioned from the first use context to the second use context; and/or forgo transitioning from providing the first feedback to providing the second feedback 1316 In accordance with a determination that the electronic device is in the second use context that is distinct from the first use context, provide second feedback indicative of the alert event. The second feedback includes a second audio output that is distinct from the first audio output and/or a second tactile output that is distinct from the first tactile output.

1318 While providing the second feedback indicative of the alert event, monitor whether the electronic device has transitioned from the second use context to the first use context. In response to determining that the electronic device has transitioned from the second use context to the first use context, transition from providing the second feedback to providing the first feedback.

1320 Transitioning from providing the second feedback to providing the first feedback includes: transitioning from providing the second audio output to providing the first audio output over a first period of time; and transitioning from providing the second tactile output to providing the first tactile output over a second period of time that is less than the first period of time.

Figure 13B

1322 The first audio output has a first volume and the second audio output has a second volume that is greater than the first volume 1324 The first volume corresponds to a reduction of the second volume by a reduction factor; and the reduction factor is selected based on a volume property of the electronic device 1326 The first audio output corresponds to an output obtained by applying a low pass filter to the second audio output 1328 The second audio output includes two or more audio tracks; and the first audio output includes a subset, less than all, of the two or more audio tracks 1330 The second audio output includes a first audio track at a third volume and a second audio track at a fourth volume; and the first audio output includes the first audio tracking at the third volume and the second audio track at a fifth volume that is less than the fourth volume.

1332 The first audio output corresponds to an output of applying a respective audio filter to the second audio output; and the respective audio filter is selected based on a type of audio content of the second audio output.

1334 Providing the second feedback indicative of the alert event includes generating the second audio output by outputting an audio alert without applying a first filter or a second filter to the audio alert; and providing the first feedback indicative of the alert event includes: in accordance with a determination that an audio alert designated for the alert event is a first type of audio alert, generating the first audio output by applying the first filter to the audio alert of the first type; and in accordance with a determination that the audio alert designated for the alert event is a second type of audio alert, generating the first audio output by applying the second filter to the audio alert of the second type

Figure 13C

1336 The first tactile output has a first amplitude and the second tactile output has a second amplitude that is greater than the first amplitude 1338 The first tactile output includes a first number of tactile events; the second tactile output includes a second number of tactile events; and the second number is less than the first number 1340 The second tactile output includes a plurality of tactile output components; and the first tactile output includes a subset, less than all, of the plurality of tactile output components 1342 The second feedback includes a first vibration output that is generated by repeated oscillations of a tactile output generator at a respective frequency; and the first feedback includes a sequence of tactile output components in place of the first vibration output. The tactile output components in the sequence of tactile output components correspond to separate activations of a tactile output generator instead of repeated oscillations of a tactile output generator at the respective frequency.

1344 Providing the first feedback indicative of the alert event includes transitioning from providing the second feedback to providing third feedback that includes a third audio output and/or a third tactile output, followed by a transition to providing the first feedback. A volume of the third audio output is less than a volume of the second audio output and greater than a volume of the first audio output, and/or an amplitude of the third tactile output is less than an amplitude of the second tactile output and greater than an amplitude of the first tactile output.

Figure 13D

DEVICES, METHODS, AND GRAPHICAL USER INTERFACES FOR PROVIDING HAPTIC FEEDBACK

RELATED APPLICATIONS

This application is a continuation of U.S. application Ser. No. 17/947,023, filed Sep. 16, 2022, which is a continuation of U.S. application Ser. No. 17/318,995, filed May 12, 2021, now U.S. Pat. No. 11,468,749, which is a continuation of U.S. application Ser. No. 16/885,166, filed May 27, 2020, now U.S. Pat. No. 11,037,413, which is a continuation of U.S. application Ser. No. 16/355,621, filed Mar. 15, 2019, now U.S. Pat. No. 10,692,333, which is a continuation of U.S. patent application Ser. No. 15/905,671, filed Feb. 26, 2018, now U.S. Pat. No. 10,276,000, which is a continuation of U.S. patent application Ser. No. 15/619,359, filed Jun. 9, 2017, now U.S. Pat. No. 9,984,539, which claims the benefit of, and priority to, U.S. Provisional Patent Application Ser. No. 62/507,039, filed May 16, 2017, and U.S. Provisional Patent Application Ser. No. 62/349,115, filed Jun. 12, 2016; all of the aforementioned applications are incorporated by reference herein in their entireties.

TECHNICAL FIELD

This relates generally to electronic devices with touch-sensitive surfaces, including but not limited to electronic devices with touch-sensitive surfaces that generate tactile outputs to provide haptic feedback to a user.

BACKGROUND

The use of touch-sensitive surfaces as input devices for computers and other electronic computing devices has increased significantly in recent years. Example touch-sensitive surfaces include touchpads and touch-screen displays. Such surfaces are widely used to manipulate user interface objects on a display.

Example manipulations include adjusting the position and/or size of one or more user interface objects or activating buttons or opening files/applications represented by user interface objects, as well as associating metadata with one or more user interface objects or otherwise manipulating user interfaces. Example user interface objects include digital images, video, text, icons, control elements such as buttons and other graphics. A user will, in some circumstances, need to perform such manipulations on user interface objects in a file management program (e.g., Finder from Apple Inc. of Cupertino, California), an image management application (e.g., Photos from Apple Inc. of Cupertino, California), a digital content (e.g., videos and music) management application (e.g., iTunes from Apple Inc. of Cupertino, California), a drawing application, a presentation application (e.g., Keynote from Apple Inc. of Cupertino, California), a word processing application (e.g., Pages from Apple Inc. of Cupertino, California), or a spreadsheet application (e.g., Numbers from Apple Inc. of Cupertino, California).

Haptic feedback, typically in combination with visual feedback, is often used in an attempt to make manipulation of user interface objects more efficient and intuitive for a user. But conventional methods of providing haptic feedback are not as helpful as they could be.

SUMMARY

Accordingly, there is a need for electronic devices with improved methods and interfaces for providing visual and/or haptic feedback that make manipulation of user interface objects more efficient and intuitive for a user. Such methods and interfaces optionally complement or replace conventional methods for providing visual and/or haptic feedback. Such methods and interfaces reduce the number, extent, and/or nature of the inputs from a user by helping the user to understand the connection between provided input and device responses to input, thereby creating a more efficient human-machine interface.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with a display, a touch-sensitive surface, and one or more tactile output generators. The method includes: displaying, on the display, a user interface that includes a first adjustable control and a second adjustable control and detecting movement of a first contact across the touch-sensitive surface in a drag gesture. The method further includes, in accordance with a determination that the drag gesture is performed while a focus selector is at a location that corresponds to the first adjustable control: adjusting the first adjustable control in accordance with the movement of the first contact in the drag gesture; and outputting, with the one or more tactile output generators, a first plurality of tactile outputs. A respective tactile output, in the first plurality of tactile outputs, is triggered based on progress adjusting the first adjustable control; and the first plurality of tactile outputs have a first distribution of tactile outputs as the first adjustable control is adjusted. The method further includes, in accordance with a determination that the drag gesture is performed while the focus selector is at a location that corresponds to the second adjustable control: adjusting the second adjustable control in accordance with the movement of the first contact in the drag gesture; and outputting, with the one or more tactile output generators, a second plurality of tactile outputs. A respective tactile output, in the second plurality of tactile outputs, is triggered based on progress adjusting the second adjustable control; and the second plurality of tactile outputs has a second distribution of tactile outputs that is different from the first distribution of tactile outputs as the second adjustable control is adjusted.

In accordance with some embodiments, a method is performed at an electronic device with a display, a touch-sensitive surface, one or more sensors configured to detect intensities of contacts with the touch-sensitive surface, and one or more tactile output generators. The method includes: while displaying a first user interface on the display, detecting a contact on the touch-sensitive surface; detecting a first increase in a characteristic intensity of the contact on the touch-sensitive surface; in response to detecting the first increase in the characteristic intensity of the contact on the touch-sensitive surface, producing a first tactile output, with the one or more tactile output generators, that has a first tactile output profile, wherein the first tactile output profile includes an output parameter that varies in accordance with a proximity of the characteristic intensity of the contact to meeting a first intensity criteria; and, while producing the tactile output that has the first tactile output profile, detecting a second increase in the characteristic intensity of the contact on the touch-sensitive surface. The method further includes, in response to detecting the second increase in the characteristic intensity of the contact on the touch-sensitive surface: in accordance with a determination that the characteristic intensity of the contact on the touch-sensitive surface meets the first intensity criteria, producing a second tactile output that has a second tactile output profile that is different from the first tactile output profile; and, in accordance with a determination that the characteristic intensity of the contact on the touch-sensitive surface does not meet the first intensity criteria, continuing to produce the first tactile output that has the first tactile output profile and varying the output parameter in accordance with the second increase in the characteristic intensity of the contact based on the proximity of the characteristic intensity of the contact to meeting the first intensity criteria.

In accordance with some embodiments, a method is performed at an electronic device with a display, a touch-sensitive surface, and one or more tactile output generators. The method includes: displaying, on the display, a user interface that includes a plurality of user interface objects; and detecting, on the touch-sensitive surface, a touch input by a contact that moves a focus selector from a first user interface object of the plurality of user interface objects in a first direction on the display. The method further includes, in response to detecting the touch input: in accordance with a determination that the first user interface object is selected when the focus selector moves in the first direction, generating, by the one or more tactile output generators, a sequence of tactile outputs that correspond to the movement of the focus selector in the first direction; and in accordance with a determination that the first user interface object is not selected when the focus selector moves in the first direction, forgoing generation of the sequence of tactile outputs that correspond to the movement of the focus selector in the first direction.

In accordance with some embodiments, a method is performed at an electronic device with a display, a touch-sensitive surface, and one or more tactile output generators. The method includes: displaying, on the display, a first user interface that includes a plurality of icons of a first type and at least one icon of a second type, different from the first type; and, while a focus selector is on a first icon of the first type, detecting movement of a contact across the touch-sensitive surface in a drag gesture. The method further includes, in response to detecting movement of the contact across the touch-sensitive surface in the drag gesture while the focus selector is on the first icon: moving the first icon across the display in accordance with the movement of the first contact in the drag gesture; and, in accordance with a determination that the first icon moves over one or more other icons of the first type during the drag gesture, outputting, with the one or more tactile output generators, one or more tactile outputs of a first type, wherein a respective tactile output of the first type has a first tactile output profile. The method further includes, in response to detecting movement of the contact across the touch-sensitive surface in the drag gesture while the focus selector is on the first icon, in accordance with a determination that the drag gesture moves the first icon over an icon of the second type at the end of the drag gesture: displaying a second user interface that corresponds to the icon of the second type; and outputting, with the one or more tactile output generators, a tactile output of a second type, wherein the tactile output of the second type has a second tactile output profile that is different from the first tactile output profile.

In accordance with some embodiments, a method is performed at an electronic device with a display, a touch-sensitive surface, and one or more tactile output generators. The method includes: displaying, on the display, a first user interface that includes a plurality of icons; and detecting a first input by a contact on the touch sensitive surface while a focus selector is on a first icon in the plurality of icons, the first icon having a first size. The method further includes, in response to detecting the first input by the contact on the touch sensitive surface, in accordance with a determination that the first input satisfies preview display criteria: displaying a preview of an object that corresponds to the first icon, the preview having a second size that is greater than the first size; and outputting, with the one or more tactile output generators, a tactile output of a first type, wherein a tactile output of the first type has a first tactile output profile. The method further includes, in response to detecting the first input by the contact on the touch sensitive surface, in accordance with a determination that the first input satisfies scrolling criteria, which are different from the preview display criteria: foregoing displaying the preview of the object that corresponds to the first icon; forgoing outputting, with the one or more tactile output generators, the tactile output of the first type; and, scrolling the plurality of icons.

In accordance with some embodiments, a method is performed at an electronic device with a display, a touch sensitive surface, one or more device orientation sensors, and one or more tactile output generators. The method includes receiving a number of communications; and, after the number of communications is received: detecting, using one or more of the device orientation sensors, a change in a position and/or orientation of the electronic device; and in response to detecting the change in the position and/or orientation of the device, producing, with the one or more tactile output generators, tactile output that has a tactile output profile that includes an output parameter that increases as the number of received communications increases.

In accordance with some embodiments, a method is performed at an electronic device with a display, a touch sensitive surface, one or more sensors, an audio system, and one or more tactile output generators. The method includes receiving an incoming communication; determining, using one or more of the sensors, that the electronic device is in a first use context; and, in response to receiving the incoming communication, providing first feedback indicative of the incoming communication, wherein providing the first feedback indicative of the incoming communication includes: providing, with the audio system, a first ongoing audio output for the incoming communication, wherein the first ongoing audio output corresponds to the first use context; and providing, with the one or more tactile output generators, a first ongoing tactile output for the incoming communication, wherein the first ongoing tactile output has a first tactile output profile that corresponds to the first use context. The method further includes, while providing the first ongoing audio output and the first ongoing tactile output for the incoming communication, detecting, using one or more of the sensors, that the electronic device is in a second use context, different from the first use context; and, in response to detecting that the electronic device is in the second use context, providing second feedback indicative of the incoming communication that is different from the first feedback, wherein providing the second feedback indicative of the incoming communication includes: providing, with the one or more tactile output generators, a second ongoing tactile output for the incoming communication, wherein the second ongoing tactile output has a second tactile output profile that corresponds to the second use context.

In accordance with some embodiments, a method is performed at an electronic device with a display, a touch sensitive surface, one or more sensors, and an audio system and/or one or more tactile output generators. The method includes detecting an alert event. The method also includes, in response to receiving the alert event, delaying provision of feedback indicative of the alert event until determining whether the electronic device is in a first use context or in a second use context that is distinct from the first use context; and in response to determining whether the electronic device is in the first use context or the second use context, in accordance with a determination that the electronic device is in the first use context, providing first feedback indicative of the alert event, wherein the first feedback includes a first audio output and/or a first tactile output; and, in accordance with a determination that the electronic device is in the second use context that is distinct from the first use context, providing second feedback indicative of the alert event, wherein the second feedback includes a second audio output that is distinct from the first audio output and/or a second tactile output that is distinct from the first tactile output.

In accordance with some embodiments, an electronic device includes a display, a touch-sensitive surface, optionally one or more sensors to detect intensities of contacts with the touch-sensitive surface, one or more tactile output generators, optionally one or more device orientation sensors, optionally an audio system, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions which when executed by an electronic device with a display, a touch-sensitive surface, optionally one or more sensors to detect intensities of contacts with the touch-sensitive surface, one or more tactile output generators, optionally one or more device orientation sensors, and optionally an audio system, cause the device to perform or cause performance of the operations of any of the methods described herein. In accordance with some embodiments, a graphical user interface on an electronic device with a display, a touch-sensitive surface, optionally one or more sensors to detect intensities of contacts with the touch-sensitive surface, one or more tactile output generators, optionally one or more device orientation sensors, optionally an audio system, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, optionally one or more sensors to detect intensities of contacts with the touch-sensitive surface, one or more tactile output generators, optionally one or more device orientation sensors, and optionally an audio system, and means for performing or causing performance of the operations of any of the methods described herein. In accordance with some embodiments, an information processing apparatus, for use in an electronic device with a display and a touch-sensitive surface, optionally one or more sensors to detect intensities of contacts with the touch-sensitive surface, one or more tactile output generators, optionally one or more device orientation sensors, and optionally an audio system, includes means for performing or causing performance of the operations of any of the methods described herein.

Thus, electronic devices with displays, touch-sensitive surfaces, optionally one or more sensors to detect intensities of contacts with the touch-sensitive surface, one or more tactile output generators, optionally one or more device orientation sensors, and optionally an audio system, are provided with improved methods and interfaces for providing haptic feedback to a user, thereby increasing the effectiveness, efficiency, and user satisfaction with such devices. Such methods and interfaces may complement or replace conventional methods for providing haptic feedback to a user.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6C are flow diagrams illustrating a method of outputting tactile outputs based on progress adjusting adjustable controls in accordance with some embodiments.

FIGS. 7A-7D are flow diagrams illustrating a method of providing tactile outputs in response to detected increases in the characteristic intensity of a contact in accordance with some embodiments.

FIGS. 8A-8C are flow diagrams illustrating a method of generating a sequence of tactile outputs that correspond to movement of a focus selector, in accordance with some embodiments.

FIG. 9 is a flow diagram illustrating a method of outputting tactile outputs in response to detecting movement of a contact, in accordance with some embodiments.

FIG. 10 is a flow diagram illustrating a method of providing output in accordance with detected input by a contact at a user interface that includes a plurality of icons, in accordance with some embodiments.

FIGS. 11A-11B are flow diagrams illustrating a method of a flow diagram of a method of producing tactile output that includes an output parameter that increases as a number of received communications increases, in accordance with some embodiments.

FIGS. 12A-12D are flow diagrams illustrating a method of providing different feedback indicative of an incoming communication depending on a device context, in accordance with some embodiments.

FIGS. 13A-13D are flow diagrams illustrating a method of providing different feedback indicative of an alert event depending on a device context, in accordance with some embodiments.

DESCRIPTION OF EMBODIMENTS

Figure 1A:
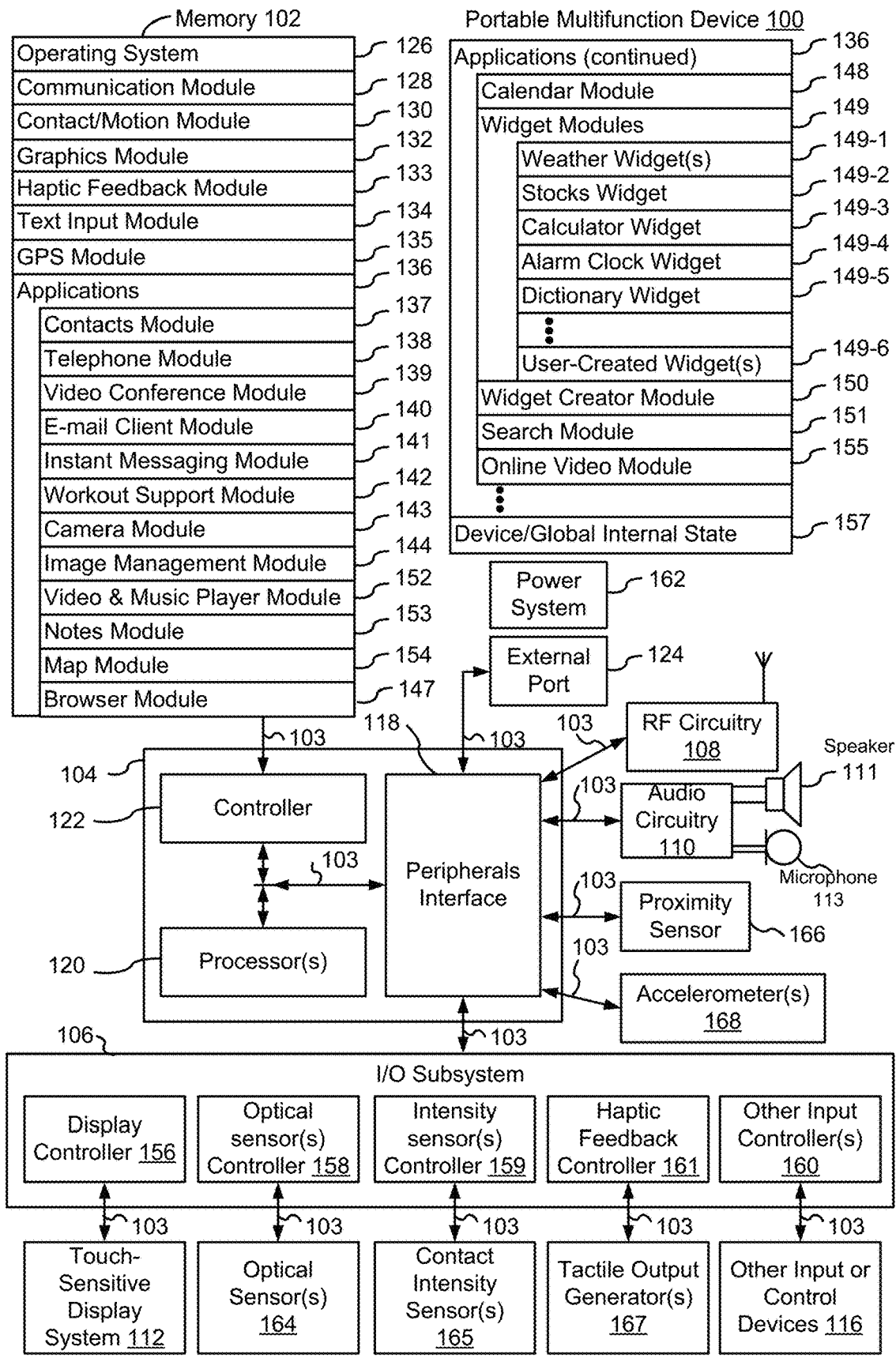
FIG. 1A is a block diagram illustrating a portable multifunction device with a touch-sensitive display in accordance with some embodiments.

Many electronic devices provide feedback as input is detected at a graphical user interface to provide an indication of the effects the input has on device operations. Electronic devices also provide feedback to notify a user regarding incoming communications and received communications. Methods described herein provide haptic feedback to help a user understand the effects of detected input on device operations and to provide information to a user about the state of a device.

Below, FIGS. 1A-1B, 2, and 3 provide a description of example devices. FIGS. 4A-4B and 5A-5BB illustrate example user interfaces for providing haptic feedback. FIGS. 5CC-5OO illustrate example operations of an electronic device for providing audio and/or tactile feedback. FIGS. 6A-6C illustrate a flow diagram of a method of outputting tactile outputs based on progress adjusting adjustable controls. FIGS. 7A-7D illustrate a flow diagram of a method of producing tactile outputs in response to detected increases in the characteristic intensity of a contact. FIGS. 8A-8C illustrate a flow diagram of a method of generating a sequence of tactile outputs that correspond to movement of a focus selector. FIG. 9 illustrates a flow diagram of a method of outputting tactile outputs in response to detecting movement of a contact. FIG. 10 illustrates a flow diagram of a method for providing output in accordance with detected input by a contact at a user interface that includes a plurality of icons. FIGS. 11A-11B illustrate a flow diagram of a method of producing tactile output that includes an output parameter that increases as a number of received communications increases. FIGS. 12A-12D illustrate a flow diagram of a method of providing different feedback indicative of an incoming communication depending on a device context. FIGS. 13A-13D illustrate a flow diagram of a method of providing different feedback indicative of an alert event depending on a device context. The user interfaces in FIGS. 5A-5BB and the example operations shown in FIGS. 5CC-5OO are used to illustrate the processes in FIGS. 6A-6C, 7A-7D, 8A-8C, 9, 10, 11A-11B, 12A-12D, and 13A-13D.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user interactive graphical user interface objects include, without limitation, a button, slider, icon, selectable menu item, switch, hyperlink or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, California.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electro-mechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
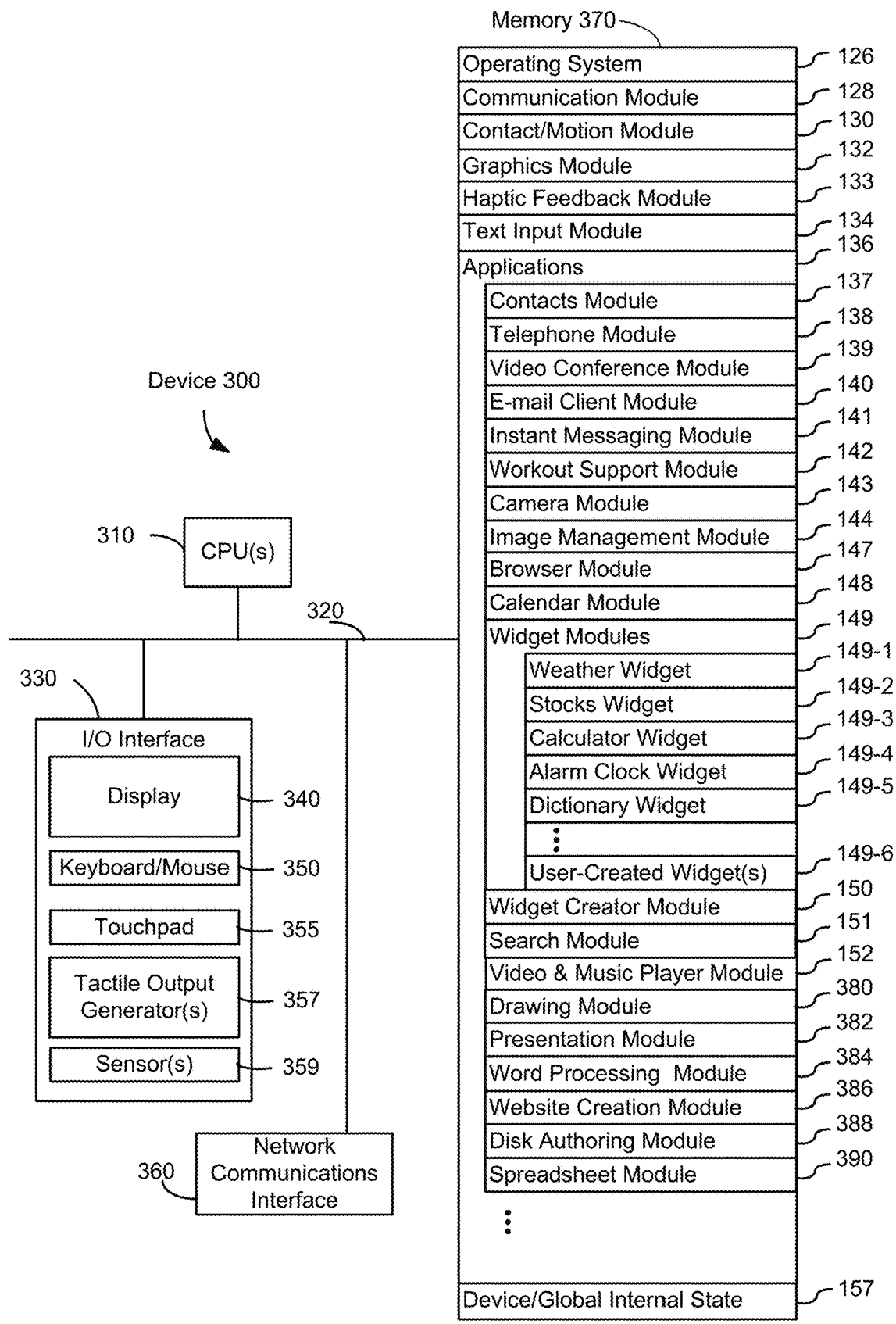
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California. In some embodiments, the external port is a Lightning connector that is the same as, or similar to and/or compatible with the Lightning connector used in some iPhone®, iPod Touch®, and iPad® devices from Apple Inc. of Cupertino, California.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture (e.g., on touch-sensitive display system 112) depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected (e.g., on touch-sensitive display system 112) based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts module 137, e-mail module 140, IM module 141, browser module 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone module 138, video conference module 139, e-mail module 140, or IM module 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
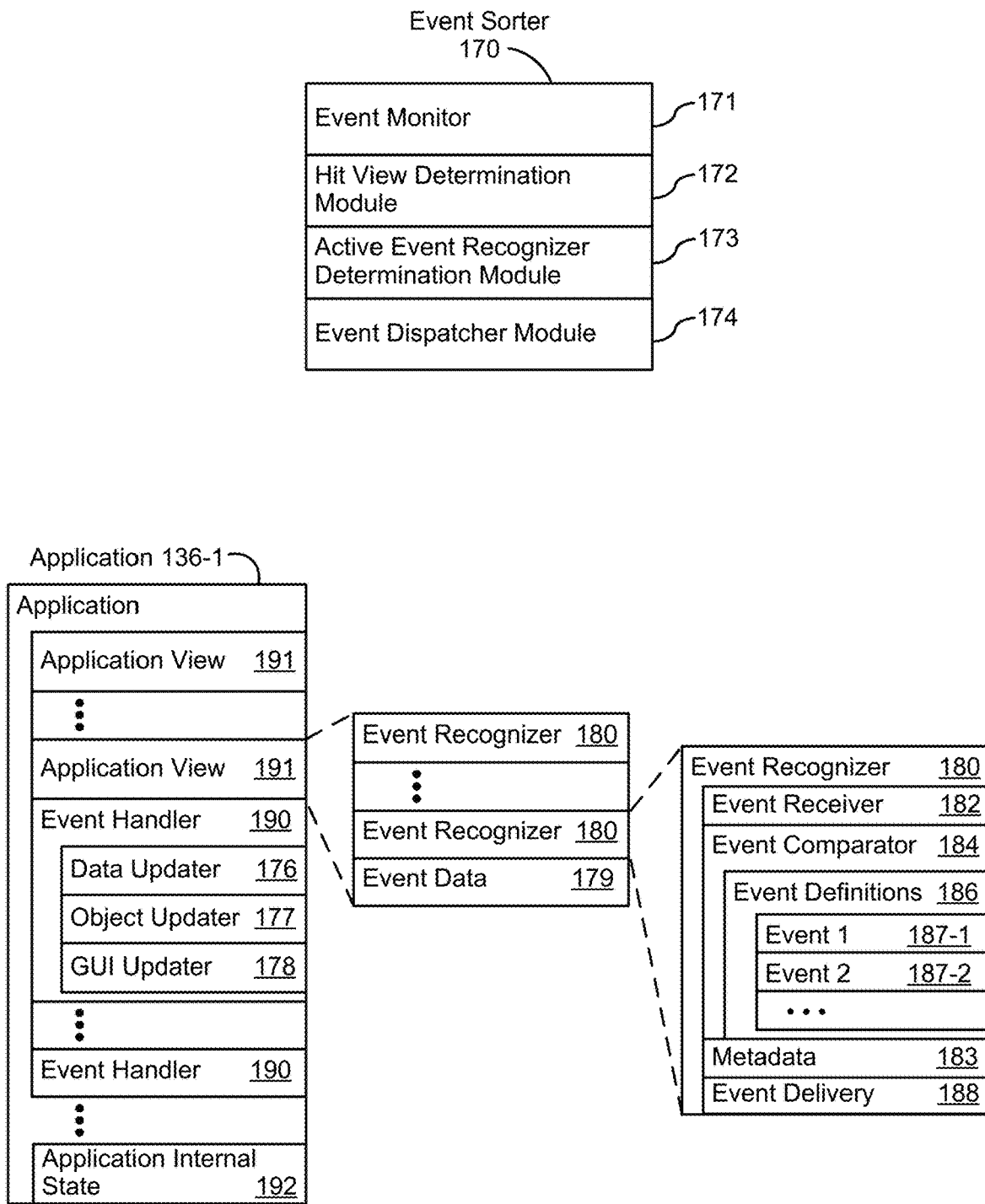
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 1C:
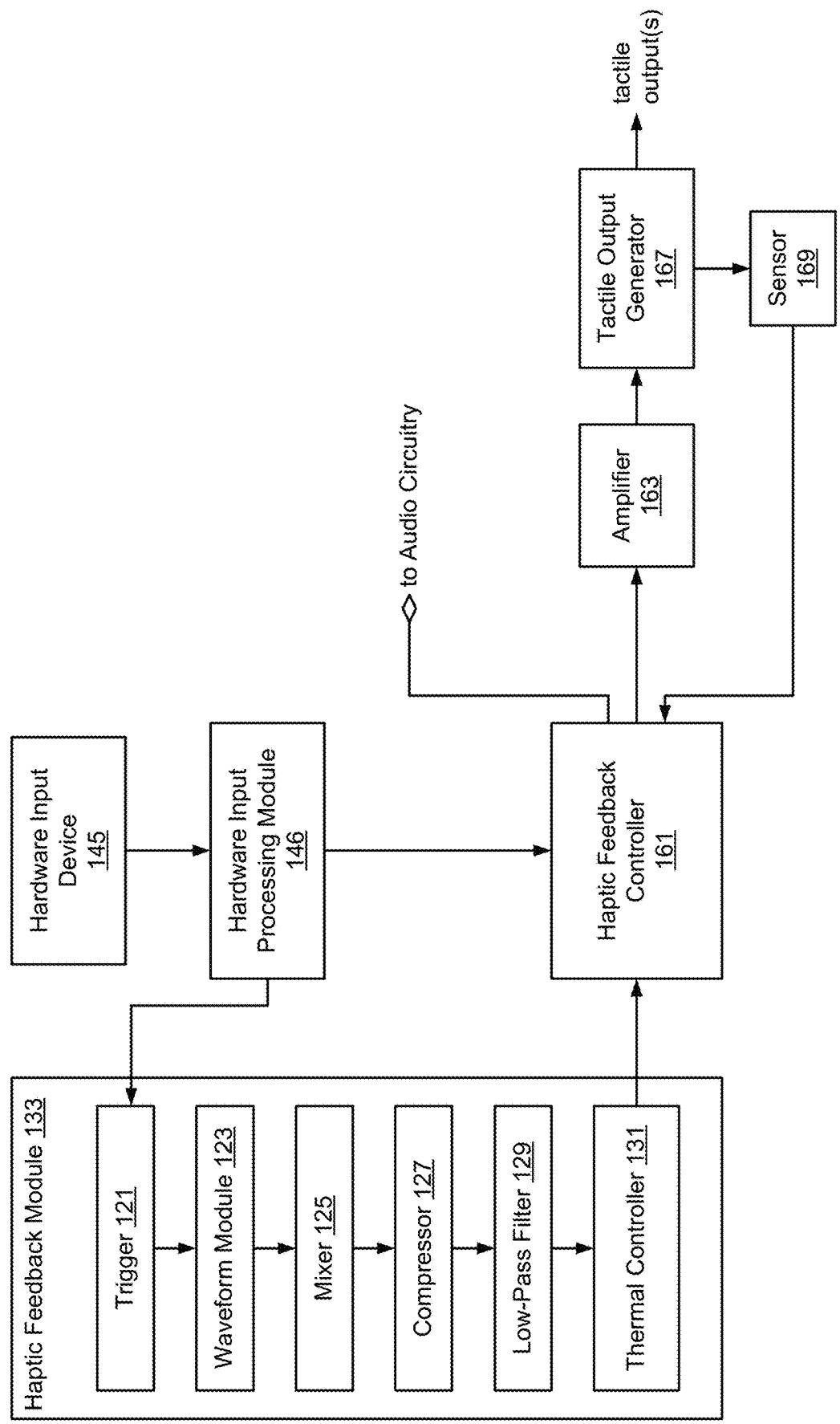
FIG. 1C is a block diagram illustrating a tactile output module in accordance with some embodiments.

FIG. 1C is a block diagram illustrating a tactile output module in accordance with some embodiments. In some embodiments, I/O subsystem 106 (e.g., haptic feedback controller 161 (FIG. 1A) and/or other input controller(s) 160 (FIG. 1A)) includes at least some of the example components shown in FIG. 1C. In some embodiments, peripherals interface 118 includes at least some of the example components shown in FIG. 1C.

In some embodiments, the tactile output module includes haptic feedback module 133. In some embodiments, haptic feedback module 133 aggregates and combines tactile outputs for user interface feedback from software applications on the electronic device (e.g., feedback that is responsive to user inputs that correspond to displayed user interfaces and alerts and other notifications that indicate the performance of operations or occurrence of events in user interfaces of the electronic device). Haptic feedback module 133 includes one or more of: waveform module 123 (for providing waveforms used for generating tactile outputs), mixer 125 (for mixing waveforms, such as waveforms in different channels), compressor 127 (for reducing or compressing a dynamic range of the waveforms), low-pass filter 129 (for filtering out high frequency signal components in the waveforms), and thermal controller 131 (for adjusting the waveforms in accordance with thermal conditions). In some embodiments, haptic feedback module 133 is included in haptic feedback controller 161 (FIG. 1A). In some embodiments, a separate unit of haptic feedback module 133 (or a separate implementation of haptic feedback module 133) is also included in an audio controller (e.g., audio circuitry 110, FIG. 1A) and used for generating audio signals. In some embodiments, a single haptic feedback module 133 is used for generating audio signals and generating waveforms for tactile outputs.

In some embodiments, haptic feedback module 133 also includes trigger module 121 (e.g., a software application, operating system, or other software module that determines a tactile output is to be generated and initiates the process for generating the corresponding tactile output). In some embodiments, trigger module 121 generates trigger signals for initiating generation of waveforms (e.g., by waveform module 123). For example, trigger module 121 generates trigger signals based on preset timing criteria. In some embodiments, trigger module 121 receives trigger signals from outside haptic feedback module 133 (e.g., in some embodiments, haptic feedback module 133 receives trigger signals from hardware input processing module 146 located outside haptic feedback module 133) and relays the trigger signals to other components within haptic feedback module 133 (e.g., waveform module 123) or software applications that trigger operations (e.g., with trigger module 121) based on activation of a user interface element (e.g., an application icon or an affordance within an application) or a hardware input device (e.g., a home button or an intensity-sensitive input surface, such as an intensity-sensitive touch screen). In some embodiments, trigger module 121 also receives tactile feedback generation instructions (e.g., from haptic feedback module 133, FIGS. 1A and 3). In some embodiments, trigger module 121 generates trigger signals in response to haptic feedback module 133 (or trigger module 121 in haptic feedback module 133) receiving tactile feedback instructions (e.g., from haptic feedback module 133, FIGS. 1A and 3).

Waveform module 123 receives trigger signals (e.g., from trigger module 121) as an input, and in response to receiving trigger signals, provides waveforms for generation of one or more tactile outputs (e.g., waveforms selected from a predefined set of waveforms designated for use by waveform module 123, such as the waveforms described in greater detail below with reference to FIGS. 4F-4G).

Mixer 125 receives waveforms (e.g., from waveform module 123) as an input, and mixes together the waveforms. For example, when mixer 125 receives two or more waveforms (e.g., a first waveform in a first channel and a second waveform that at least partially overlaps with the first waveform in a second channel) mixer 125 outputs a combined waveform that corresponds to a sum of the two or more waveforms. In some embodiments, mixer 125 also modifies one or more waveforms of the two or more waveforms to emphasize particular waveform(s) over the rest of the two or more waveforms (e.g., by increasing a scale of the particular waveform(s) and/or decreasing a scale of the rest of the waveforms). In some circumstances, mixer 125 selects one or more waveforms to remove from the combined waveform (e.g., the waveform from the oldest source is dropped when there are waveforms from more than three sources that have been requested to be output concurrently by tactile output generator 167).

Compressor 127 receives waveforms (e.g., a combined waveform from mixer 125) as an input, and modifies the waveforms. In some embodiments, compressor 127 reduces the waveforms (e.g., in accordance with physical specifications of tactile output generators 167 (FIG. 1A) or 357 (FIG. 3)) so that tactile outputs corresponding to the waveforms are reduced. In some embodiments, compressor 127 limits the waveforms, such as by enforcing a predefined maximum amplitude for the waveforms. For example, compressor 127 reduces amplitudes of portions of waveforms that exceed a predefined amplitude threshold while maintaining amplitudes of portions of waveforms that do not exceed the predefined amplitude threshold. In some embodiments, compressor 127 reduces a dynamic range of the waveforms. In some embodiments, compressor 127 dynamically reduces the dynamic range of the waveforms so that the combined waveforms remain within performance specifications of the tactile output generator 167 (e.g., force and/or moveable mass displacement limits).

Low-pass filter 129 receives waveforms (e.g., compressed waveforms from compressor 127) as an input, and filters (e.g., smooths) the waveforms (e.g., removes or reduces high frequency signal components in the waveforms). For example, in some instances, compressor 127 includes, in compressed waveforms, extraneous signals (e.g., high frequency signal components) that interfere with the generation of tactile outputs and/or exceed performance specifications of tactile output generator 167 when the tactile outputs are generated in accordance with the compressed waveforms. Low-pass filter 129 reduces or removes such extraneous signals in the waveforms.

Thermal controller 131 receives waveforms (e.g., filtered waveforms from low-pass filter 129) as an input, and adjusts the waveforms in accordance with thermal conditions of device 100 (e.g., based on internal temperatures detected within device 100, such as the temperature of haptic feedback controller 161, and/or external temperatures detected by device 100). For example, in some cases, the output of haptic feedback controller 161 varies depending on the temperature (e.g. haptic feedback controller 161, in response to receiving same waveforms, generates a first tactile output when haptic feedback controller 161 is at a first temperature and generates a second tactile output when haptic feedback controller 161 is at a second temperature that is distinct from the first temperature). For example, the magnitude (or the amplitude) of the tactile outputs may vary depending on the temperature. To reduce the effect of the temperature variations, the waveforms are modified (e.g., an amplitude of the waveforms is increased or decreased based on the temperature).

In some embodiments, haptic feedback module 133 (e.g., trigger module 121) is coupled to hardware input processing module 146. In some embodiments, other input controller(s) 160 in FIG. 1A includes hardware input processing module 146. In some embodiments, hardware input processing module 146 receives inputs from hardware input device 145 (e.g., other input or control devices 116 in FIG. 1A, such as a home button or an intensity-sensitive input surface, such as an intensity-sensitive touch screen). In some embodiments, hardware input device 145 is any input device described herein, such as touch-sensitive display system 112 (FIG.

1A), keyboard/mouse 350 (FIG. 3), touchpad 355 (FIG. 3), one of other input or control devices 116 (FIG. 1A), or an intensity-sensitive home button. In some embodiments, hardware input device 145 consists of an intensity-sensitive home button, and not touch-sensitive display system 112 (FIG. 1A), keyboard/mouse 350 (FIG. 3), or touchpad 355 (FIG. 3). In some embodiments, in response to inputs from hardware input device 145 (e.g., an intensity-sensitive home button or a touch screen), hardware input processing module 146 provides one or more trigger signals to haptic feedback module 133 to indicate that a user input satisfying predefined input criteria, such as an input corresponding to a "click" of a home button (e.g., a "down click" or an "up click"), has been detected. In some embodiments, haptic feedback module 133 provides waveforms that correspond to the "click" of a home button in response to the input corresponding to the "click" of a home button, simulating a haptic feedback of pressing a physical home button.

In some embodiments, the tactile output module includes haptic feedback controller 161 (e.g., haptic feedback controller 161 in FIG. 1A), which controls the generation of tactile outputs. In some embodiments, haptic feedback controller 161 is coupled to a plurality of tactile output generators, and selects one or more tactile output generators of the plurality of tactile output generators and sends waveforms to the selected one or more tactile output generators for generating tactile outputs. In some embodiments, haptic feedback controller 161 coordinates tactile output requests that correspond to activation of hardware input device 145 and tactile output requests that correspond to software events (e.g., tactile output requests from haptic feedback module 133) and modifies one or more waveforms of the two or more waveforms to emphasize particular waveform(s) over the rest of the two or more waveforms (e.g., by increasing a scale of the particular waveform(s) and/or decreasing a scale of the rest of the waveforms, such as to prioritize tactile outputs that correspond to activations of hardware input device 145 over tactile outputs that correspond to software events).

In some embodiments, as shown in FIG. 1C, an output of haptic feedback controller 161 is coupled to audio circuitry of device 100 (e.g., audio circuitry 110, FIG. 1A), and provides audio signals to audio circuitry of device 100. In some embodiments, haptic feedback controller 161 provides both waveforms used for generating tactile outputs and audio signals used for providing audio outputs in conjunction with generation of the tactile outputs. In some embodiments, haptic feedback controller 161 modifies audio signals and/or waveforms (used for generating tactile outputs) so that the audio outputs and the tactile outputs are synchronized (e.g., by delaying the audio signals and/or waveforms). In some embodiments, haptic feedback controller 161 includes a digital-to-analog converter used for converting digital waveforms into analog signals, which are received by amplifier 163 and/or tactile output generator 167.

In some embodiments, the tactile output module includes amplifier 163. In some embodiments, amplifier 163 receives waveforms (e.g., from haptic feedback controller 161) and amplifies the waveforms prior to sending the amplified waveforms to tactile output generator 167 (e.g., any of tactile output generators 167 (FIG. 1A) or 357 (FIG. 3)). For example, amplifier 163 amplifies the received waveforms to signal levels that are in accordance with physical specifications of tactile output generator 167 (e.g., to a voltage and/or a current required by tactile output generator 167 for generating tactile outputs so that the signals sent to tactile output generator 167 produce tactile outputs that correspond to the waveforms received from haptic feedback controller 161) and sends the amplified waveforms to tactile output generator 167. In response, tactile output generator 167 generates tactile outputs (e.g., by shifting a moveable mass back and forth in one or more dimensions relative to a neutral position of the moveable mass).

In some embodiments, the tactile output module includes sensor 169, which is coupled to tactile output generator 167. Sensor 169 detects states or state changes (e.g., mechanical position, physical displacement, and/or movement) of tactile output generator 167 or one or more components of tactile output generator 167 (e.g., one or more moving parts, such as a membrane, used to generate tactile outputs). In some embodiments, sensor 169 is a magnetic field sensor (e.g., a Hall effect sensor) or other displacement and/or movement sensor. In some embodiments, sensor 169 provides information (e.g., a position, a displacement, and/or a movement of one or more parts in tactile output generator 167) to haptic feedback controller 161 and, in accordance with the information provided by sensor 169 about the state of tactile output generator 167, haptic feedback controller 161 adjusts the waveforms output from haptic feedback controller 161 (e.g., waveforms sent to tactile output generator 167, optionally via amplifier 163).

Figure 2:
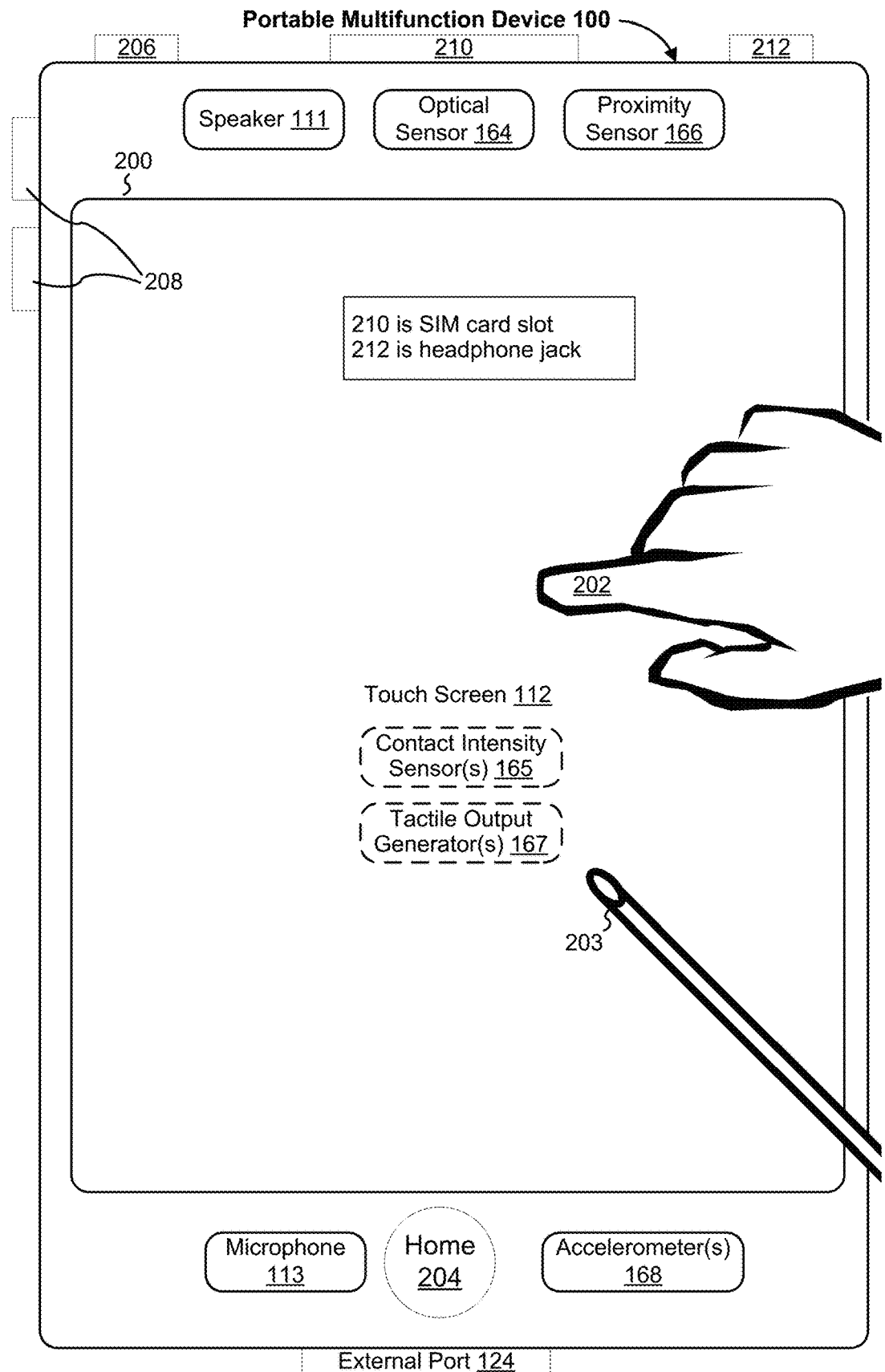
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
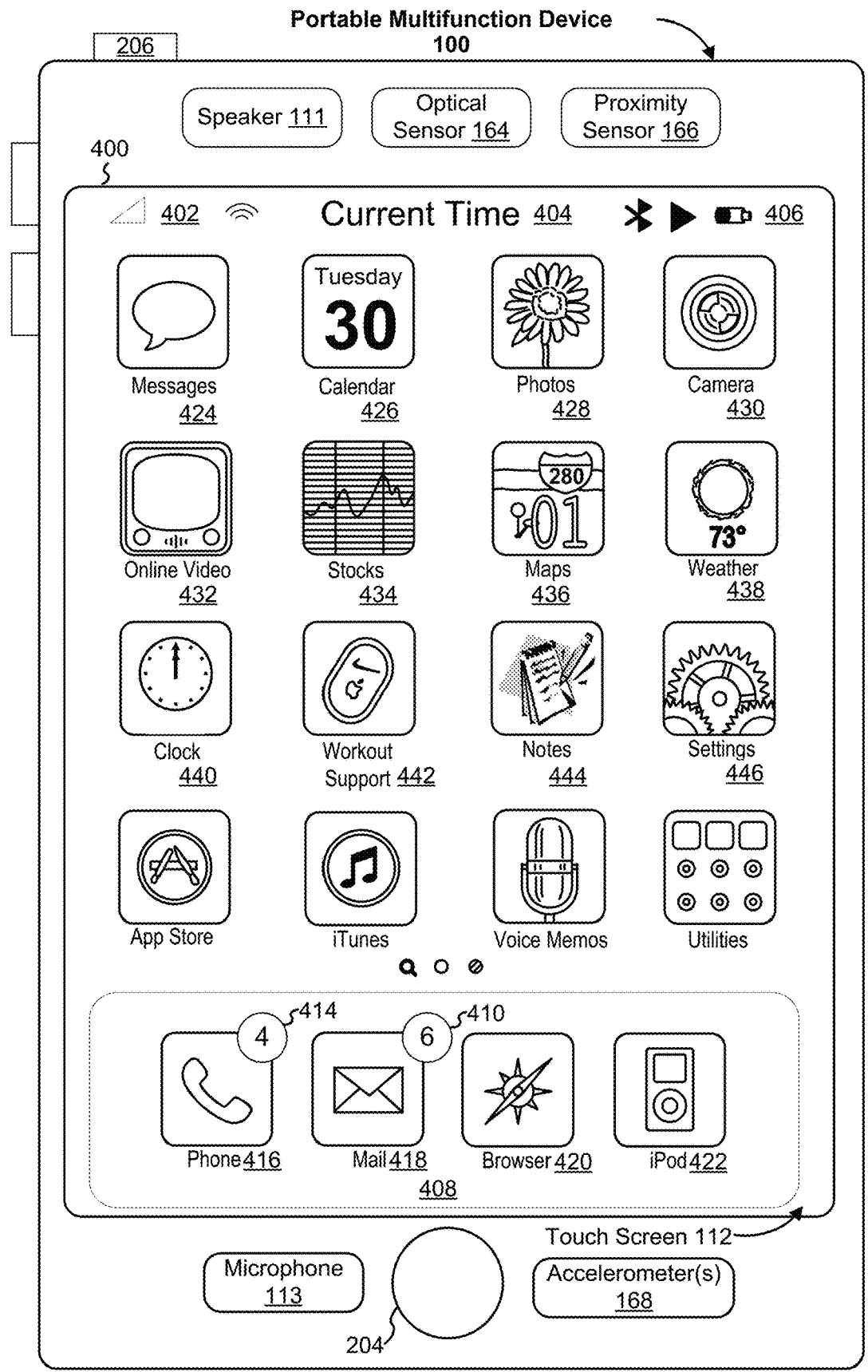
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- a Bluetooth indicator;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, a value produced by low-pass filtering the intensity of the contact over a predefined period or starting at a predefined time, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first intensity threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $IT_L$), and/or one or more other intensity thresholds (e.g., an intensity threshold $IT_H$ that is lower than $IT_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S.

patent application Ser. Nos. 14/399,606 and 14/624,296, which are incorporated by reference herein in their entireties.

Figure 4C:
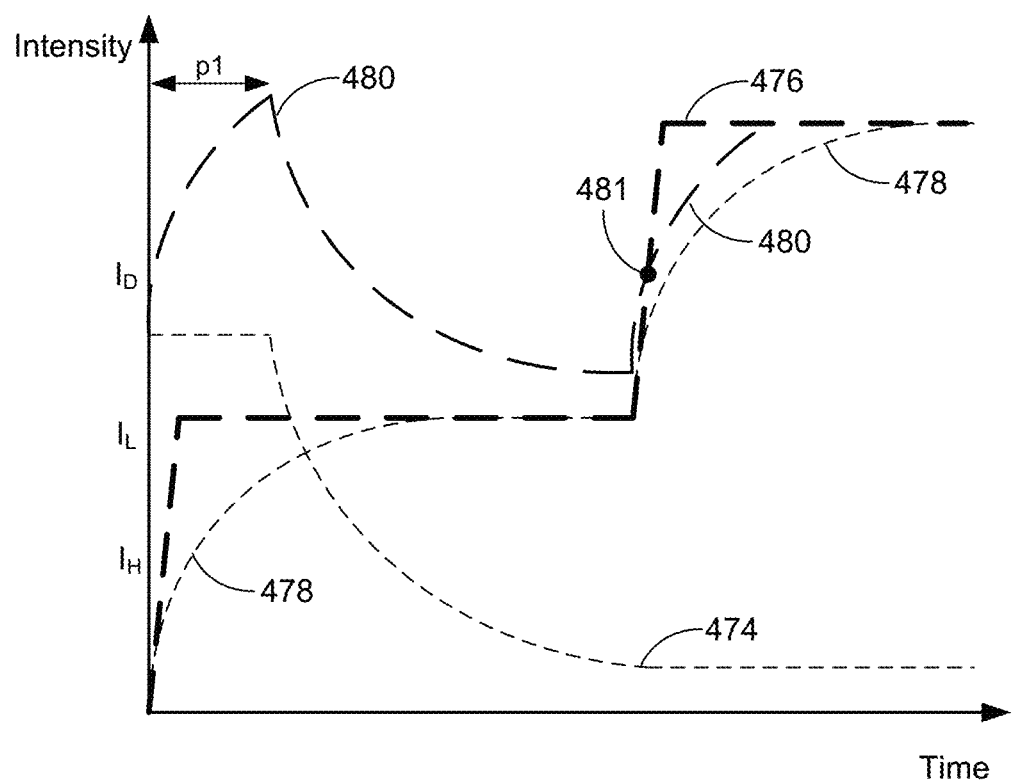
FIGS. 4C-4E illustrate examples of dynamic intensity thresholds in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

Figure 4D:
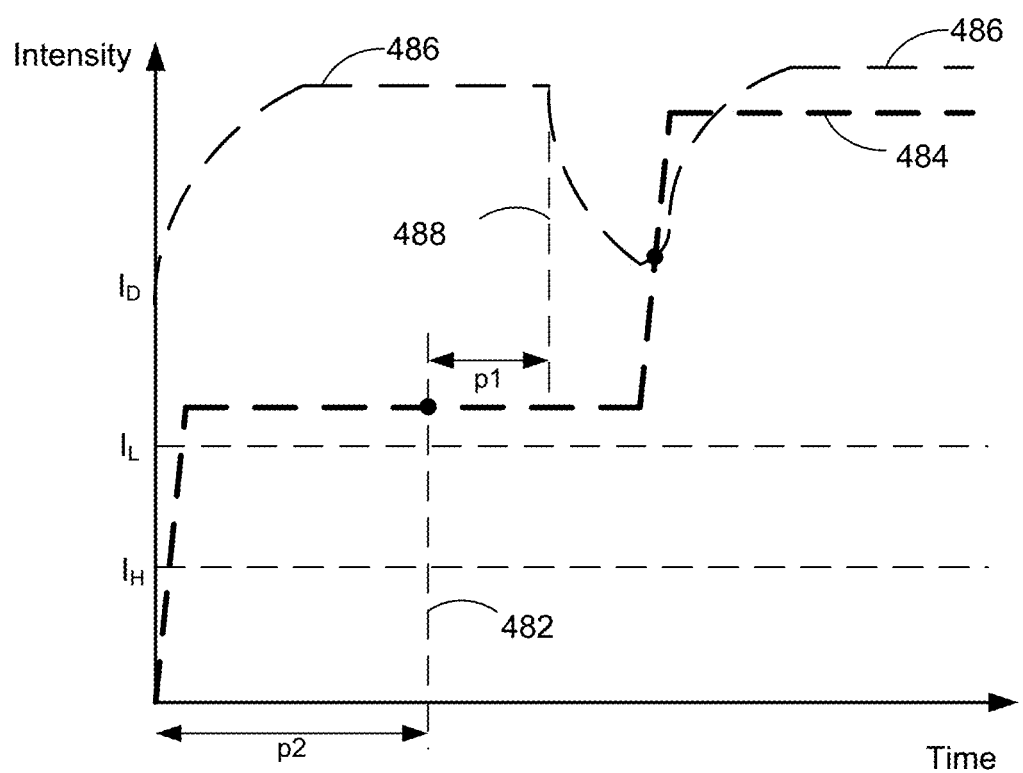

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

Figure 4E:
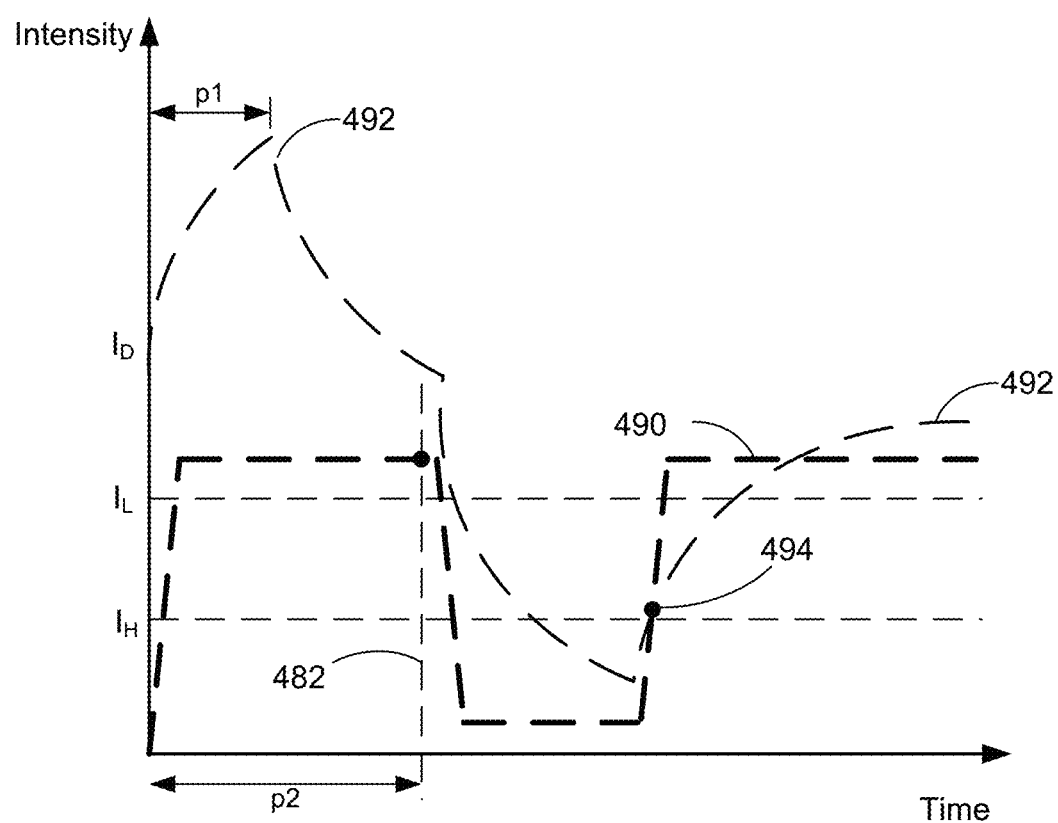

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

Figure 4F:
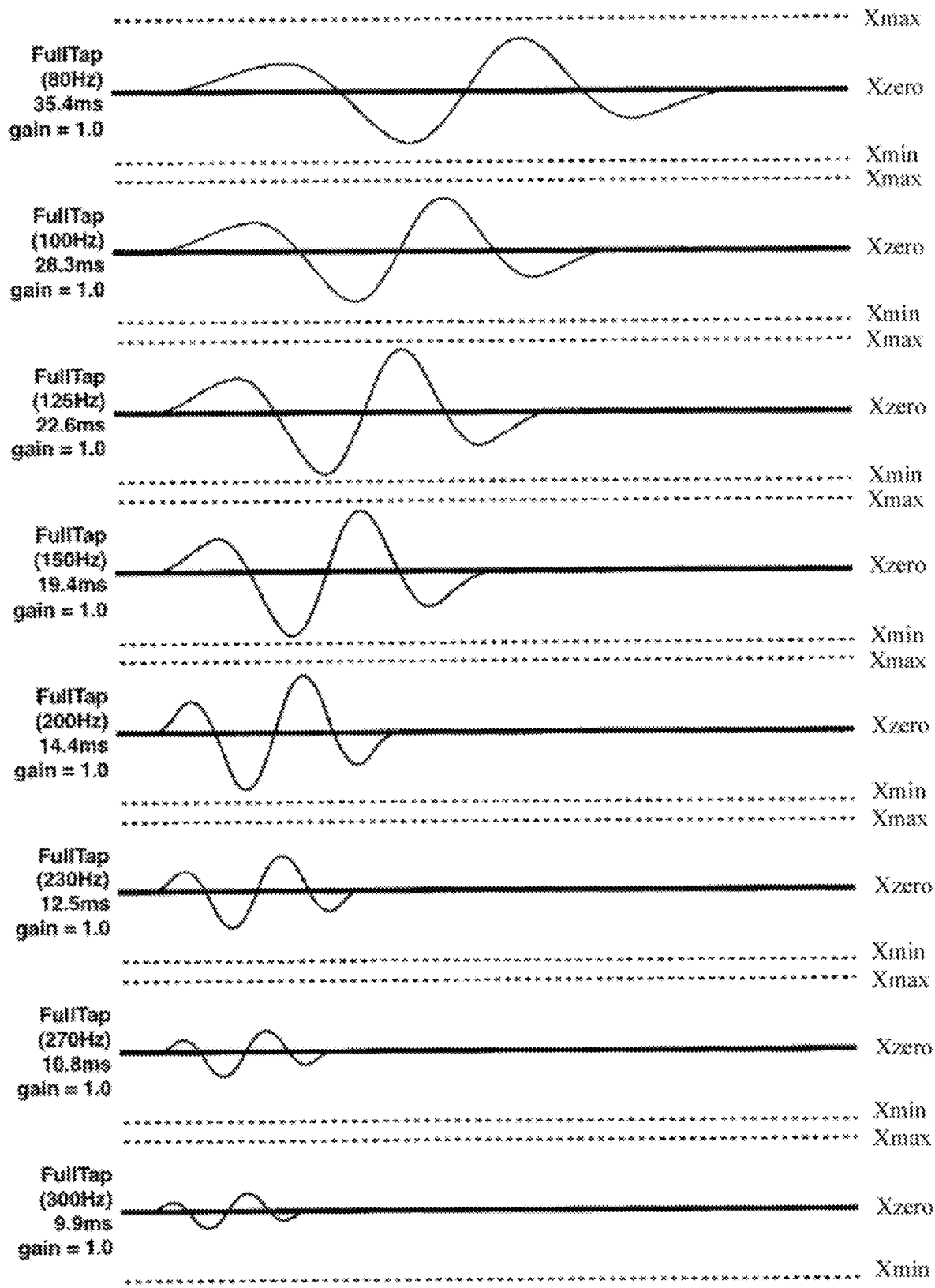
FIGS. 4F-4K illustrate a set of sample tactile output patterns in accordance with some embodiments.
Figure 4G:
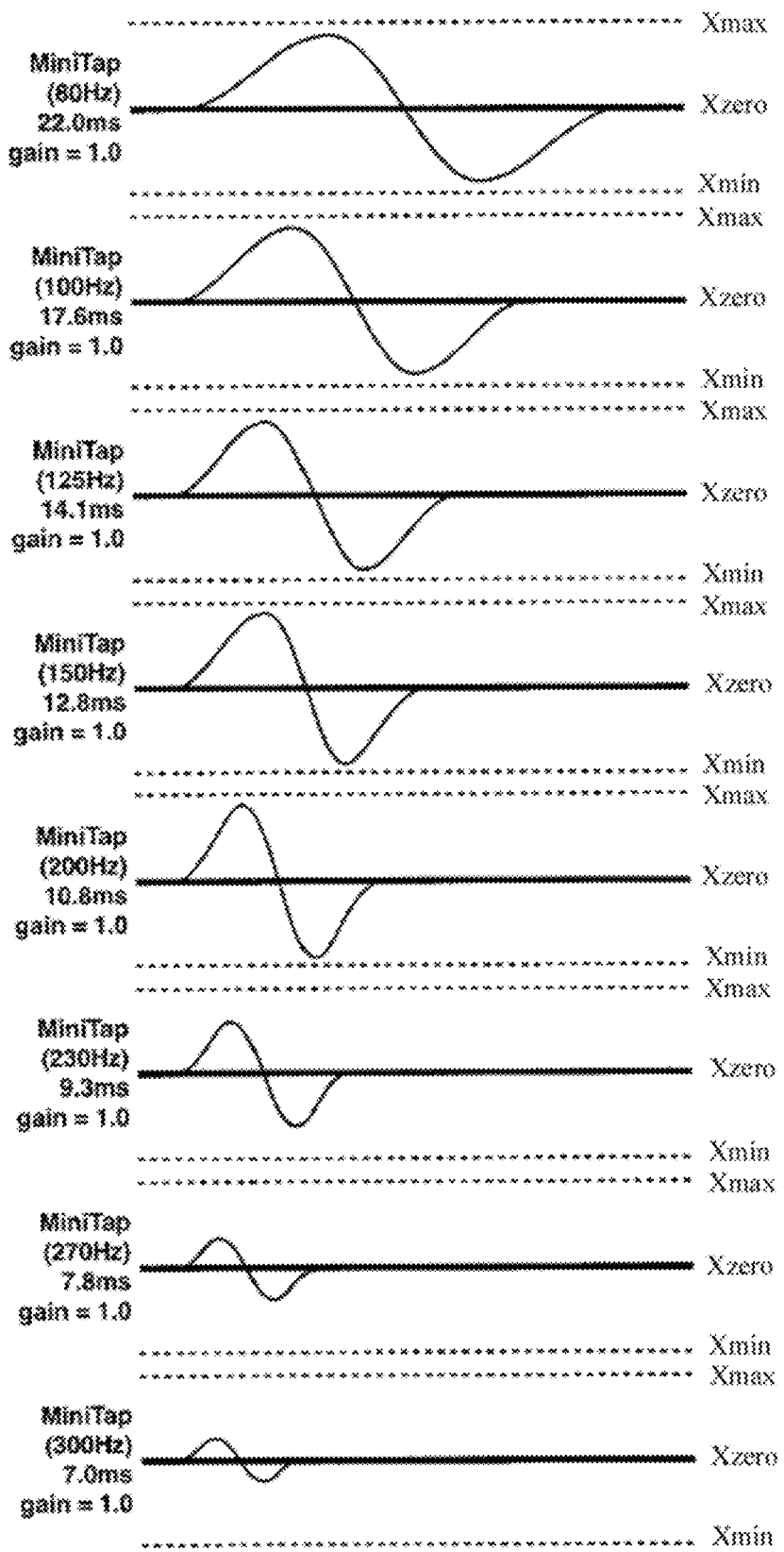
Figure 4H:
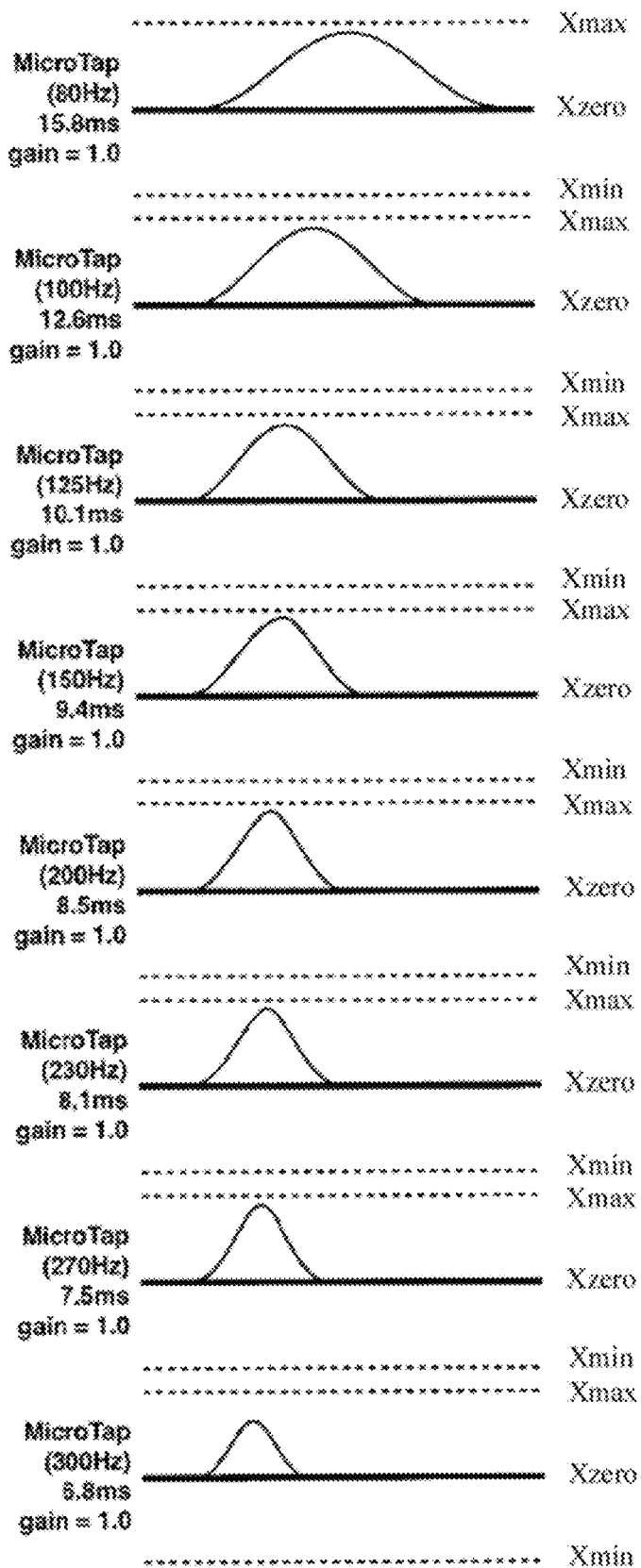
Figure 4I:
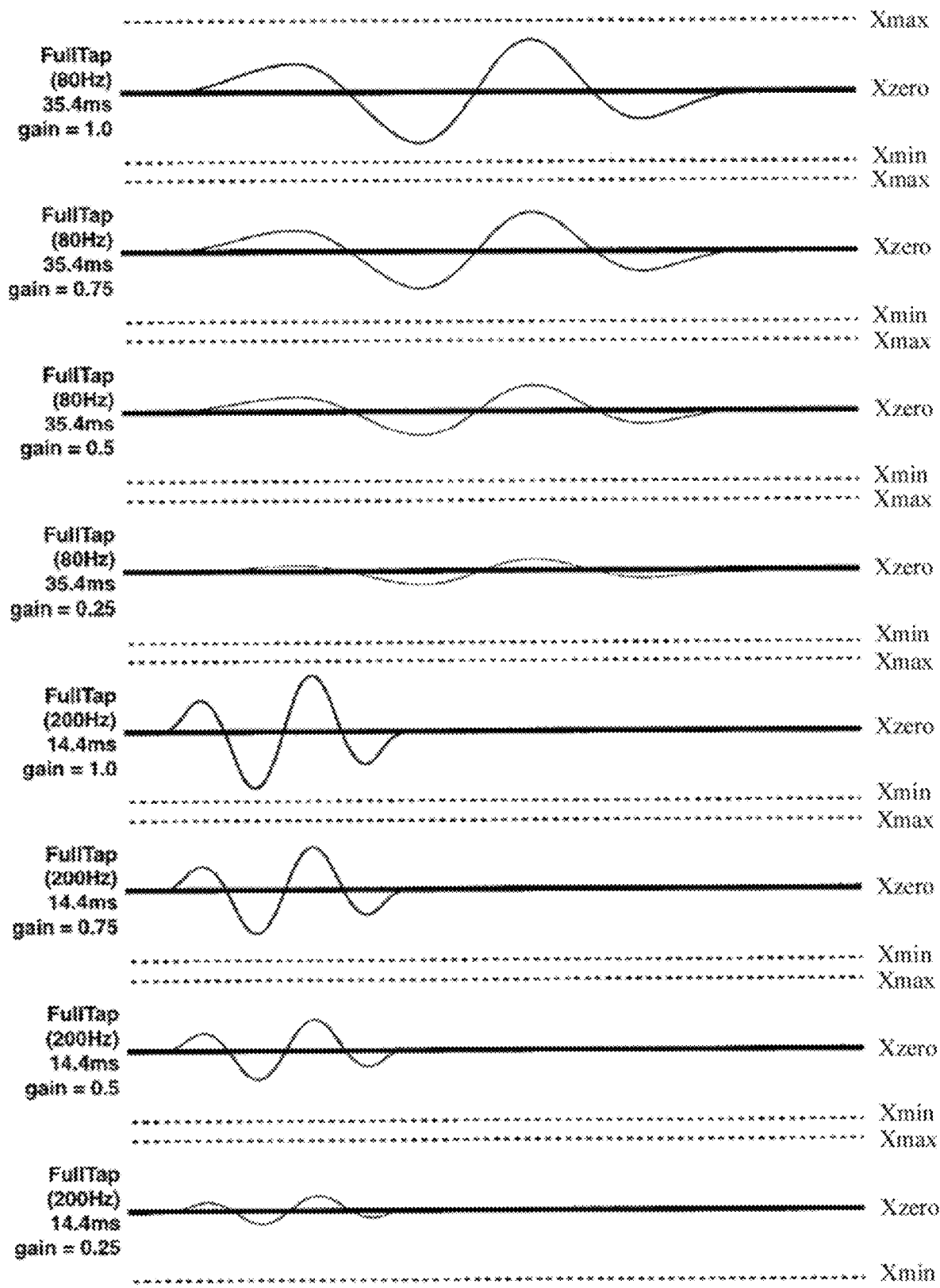
Figure 4J:
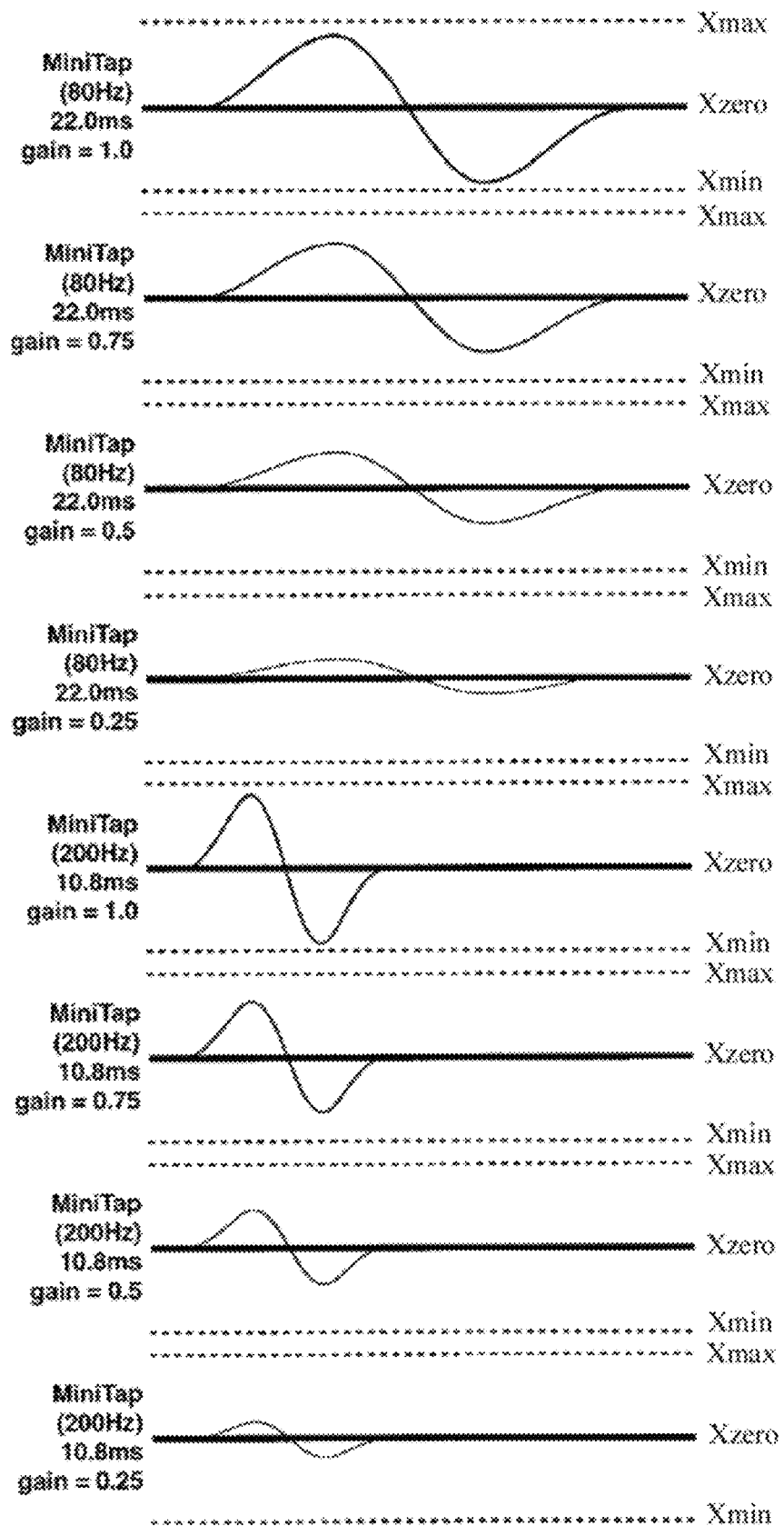
Figure 4K:
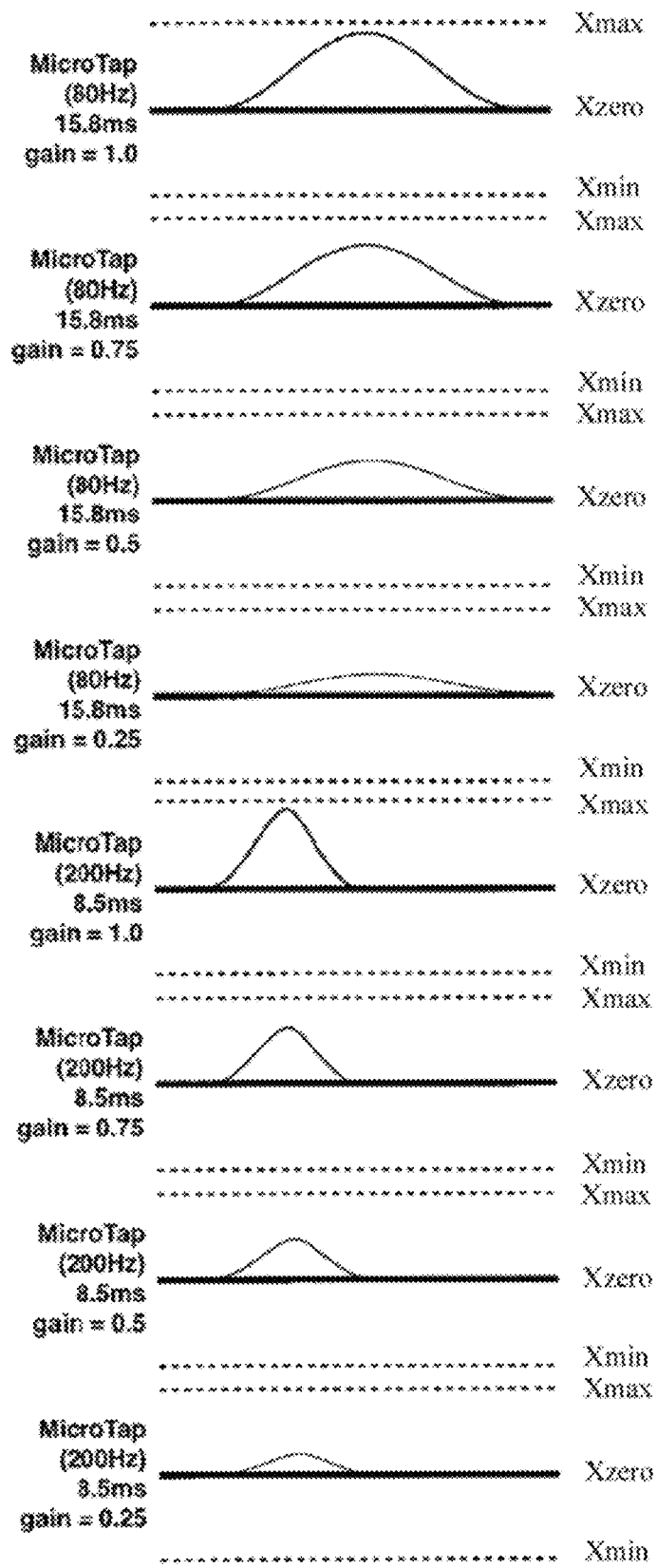

FIGS. 4F-4H provide a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein. This example of a palette of tactile outputs shows how a set of three waveforms and eight frequencies can be used to produce an array of tactile output patterns. In addition to the tactile output patterns shown in this figure, each of these tactile output patterns is optionally adjusted in amplitude by changing a gain value for the tactile output pattern, as shown, for example for FullTap 80 Hz, FullTap 200 Hz, MiniTap 80 Hz, MiniTap 200 Hz, MicroTap 80 Hz, and MicroTap 200 Hz in FIGS. 4I-4K, which are each shown with variants having a gain of 1.0, 0.75, 0.5, and 0.25. As shown in FIGS. 4I-4K, changing the gain of a tactile output pattern changes the amplitude of the pattern without changing the frequency of the pattern or changing the shape of the waveform. In some embodiments, changing the frequency of a tactile output pattern also results in a lower amplitude as some tactile output generators are limited by how much force can be applied to the moveable mass and thus higher frequency movements of the mass are constrained to lower amplitudes to ensure that the acceleration needed to create the waveform does not require force outside of an operational force range of the tactile output generator (e.g., the peak amplitudes of the FullTap at 230 Hz, 270 Hz, and 300 Hz are lower than the amplitudes of the FullTap at 80 Hz, 100 Hz, 125 Hz, and 200 Hz).

FIGS. 4F-4K show tactile output patterns that have a particular waveform. The waveform of a tactile output pattern represents the pattern of physical displacements relative to a neutral position (e.g., $x_{zero}$) versus time that a moveable mass goes through to generate a tactile output with that tactile output pattern. For example, a first set of tactile output patterns shown in FIG. 4F (e.g., tactile output patterns of a "FullTap") each have a waveform that includes an oscillation with two complete cycles (e.g., an oscillation that starts and ends in a neutral position and crosses the neutral position three times). A second set of tactile output patterns shown in FIG. 4G (e.g., tactile output patterns of a "MiniTap") each have a waveform that includes an oscillation that includes one complete cycle (e.g., an oscillation that starts and ends in a neutral position and crosses the neutral position one time). A third set of tactile output patterns shown in FIG. 4H (e.g., tactile output patterns of a "MicroTap") each have a waveform that includes an oscillation that include one half of a complete cycle (e.g., an oscillation that starts and ends in a neutral position and does not cross the neutral position). The waveform of a tactile output pattern also includes a start buffer and an end buffer that represent the gradual speeding up and slowing down of the moveable mass at the start and at the end of the tactile output. The example waveforms shown in FIGS. 4F-4K include $x_{min}$ and $x_{max}$ values which represent the maximum and minimum extent of movement of the moveable mass. For larger electronic devices with larger moveable masses, there may be larger or smaller minimum and maximum extents of movement of the mass. The examples shown in FIGS. 4F-4K describe movement of a mass in 1 dimension, however similar principles would also apply to movement of a moveable mass in two or three dimensions.

As shown in FIGS. 4F-4H, each tactile output pattern also has a corresponding characteristic frequency that affects the "pitch" of a haptic sensation that is felt by a user from a tactile output with that characteristic frequency. For a continuous tactile output, the characteristic frequency represents the number of cycles that are completed within a given period of time (e.g., cycles per second) by the moveable mass of the tactile output generator. For a discrete tactile output, a discrete output signal (e.g., with 0.5, 1, or 2 cycles) is generated, and the characteristic frequency value specifies how fast the moveable mass needs to move to generate a tactile output with that characteristic frequency. As shown in FIGS. 4F-4H, for each type of tactile output (e.g., as defined by a respective waveform, such as FullTap, MiniTap, or MicroTap), a higher frequency value corresponds to faster movement(s) by the moveable mass, and hence, in general, a shorter time to complete the tactile output (e.g., including the time to complete the required number of cycle(s) for the discrete tactile output, plus a start and an end buffer time). For example, a FullTap with a characteristic frequency of 80 Hz takes longer to complete than FullTap with a characteristic frequency of 100 Hz (e.g., 35.4 ms vs. 28.3 ms in FIG. 4F). In addition, for a given frequency, a tactile output with more cycles in its waveform at a respective frequency takes longer to complete than a tactile output with fewer cycles its waveform at the same respective frequency. For example, a FullTap at 150 Hz takes longer to complete than a MiniTap at 150 Hz (e.g., 19.4 ms vs. 12.8 ms), and a MiniTap at 150 Hz takes longer to complete than a MicroTap at 150 Hz (e.g., 12.8 ms vs. 9.4 ms). However, for tactile output patterns with different frequencies this rule may not apply (e.g., tactile outputs with more cycles but a higher frequency may take a shorter amount of time to complete than tactile outputs with fewer cycles but a lower frequency, and vice versa). For example, at 300 Hz, a FullTap takes as long as a MiniTap (e.g., 9.9 ms).

As shown in FIGS. 4F-4H, a tactile output pattern also has a characteristic amplitude that affects the amount of energy that is contained in a tactile signal, or a "strength" of a haptic sensation that may be felt by a user through a tactile output with that characteristic amplitude. In some embodiments, the characteristic amplitude of a tactile output pattern refers to an absolute or normalized value that represents the maximum displacement of the moveable mass from a neutral position when generating the tactile output. In some embodiments, the characteristic amplitude of a tactile output pattern is adjustable, e.g., by a fixed or dynamically determined gain factor (e.g., a value between 0 and 1), in accordance with various conditions (e.g., customized based on user interface contexts and behaviors) and/or preconfigured metrics (e.g., input-based metrics, and/or user-interface-based metrics). In some embodiments, an input-based metric (e.g., an intensity-change metric or an input-speed metric) measures a characteristic of an input (e.g., a rate of change of a characteristic intensity of a contact in a press input or a rate of movement of the contact across a touch-sensitive surface) during the input that triggers generation of a tactile output. In some embodiments, a user-interface-based metric (e.g., a speed-across-boundary metric) measures a characteristic of a user interface element (e.g., a speed of movement of the element across a hidden or visible boundary in a user interface) during the user interface change that triggers generation of the tactile output. In some embodiments, the characteristic amplitude of a tactile output pattern may be modulated by an "envelope" and the peaks of adjacent cycles may have different amplitudes, where one of the waveforms shown above is further modified by multiplication by an envelope parameter that changes over time (e.g., from 0 to 1) to gradually adjust amplitude of portions of the tactile output over time as the tactile output is being generated.

Although specific frequencies, amplitudes, and waveforms are represented in the sample tactile output patterns in FIGS. 4F-4H for illustrative purposes, tactile output patterns with other frequencies, amplitudes, and waveforms may be used for similar purposes. For example, waveforms that have between 0.5 to 4 cycles can be used. Other frequencies in the range of 60 Hz-400 Hz may be used as well.

In some embodiments, for ringtones and/or alerts, tactile outputs including one or more of Vibe 150 Hz, MicroTap 150 Hz, MiniTap 150 Hz, and FullTap 150 Hz are used (to indicate an incoming phone call or a received text message).

Although only specific frequencies, amplitudes, and waveforms are represented in the sample tactile output patterns in FIGS. 4F-4K for illustrative purposes, tactile output patterns with other frequencies, amplitudes, and waveforms may be used for similar purposes. For example, waveforms that have between 0.5 to 4 cycles can be used. Other frequencies in the range of 60 Hz-400 Hz may be used as well.

User Interfaces and Associated Processes

Attention is now directed towards embodiments of user interfaces ("UI") and associated processes that may be implemented on an electronic device, such as portable multifunction device 100 or device 300, with a display, a touch-sensitive surface, optionally one or more tactile output generators for generating tactile outputs, and optionally one or more sensors to detect intensities of contacts with the touch-sensitive surface.

Figure 5A:
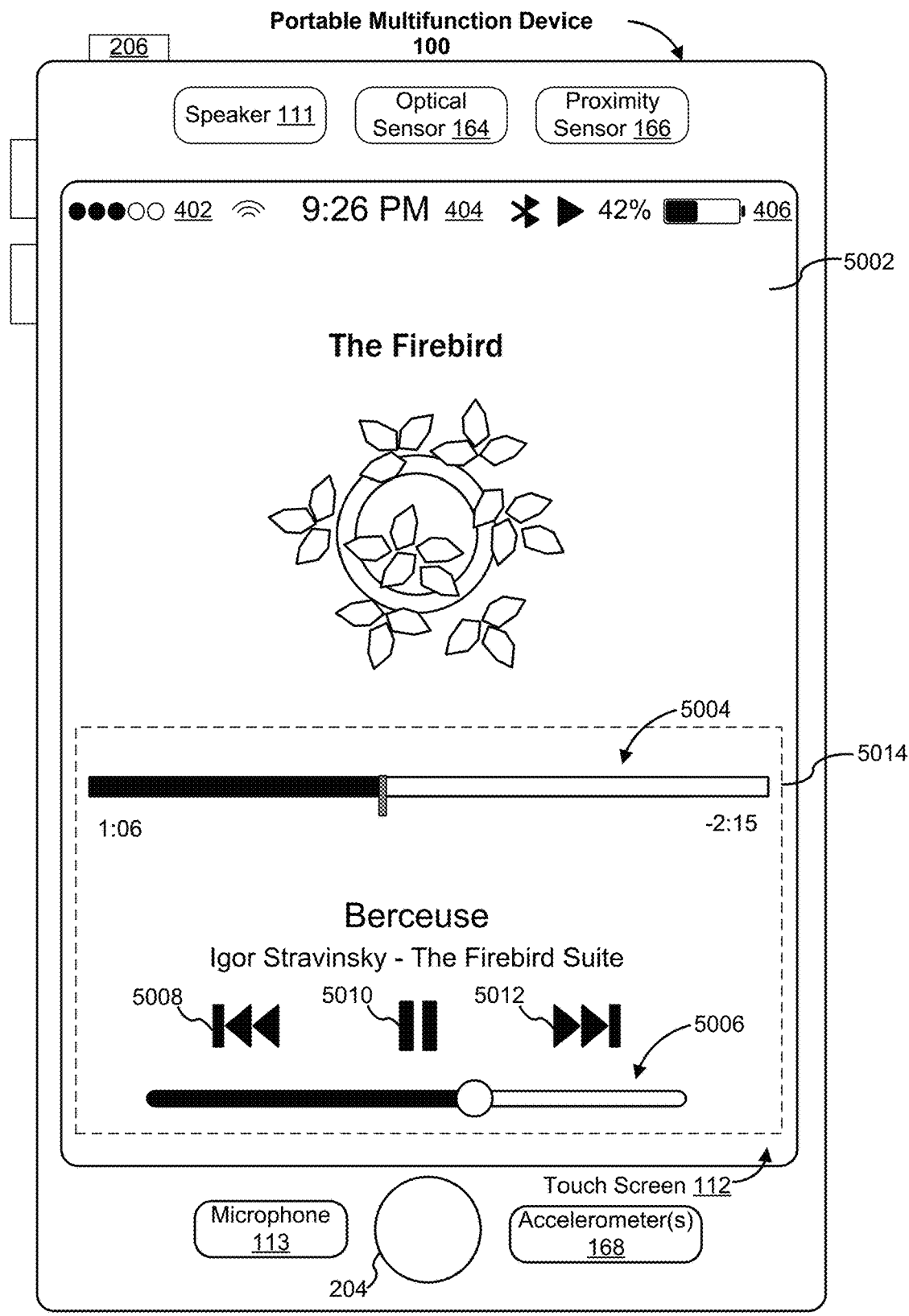
FIGS. 5A-5BB illustrate example user interfaces for providing haptic feedback in accordance with some embodiments.
Figures 1, 5B:
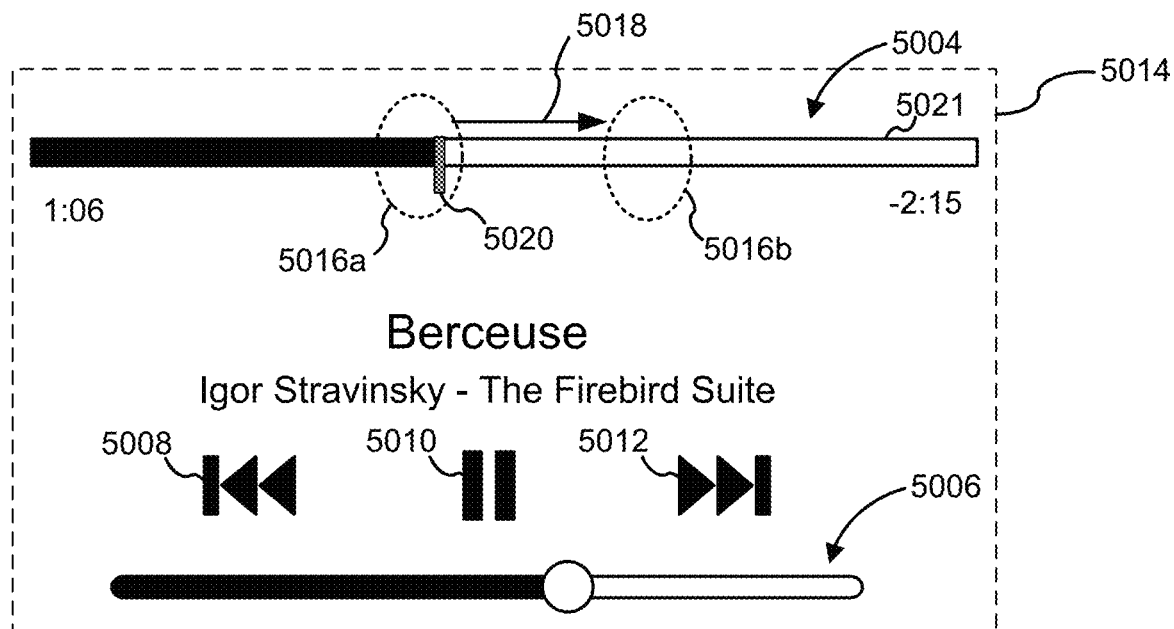
Figures 2, 5B:
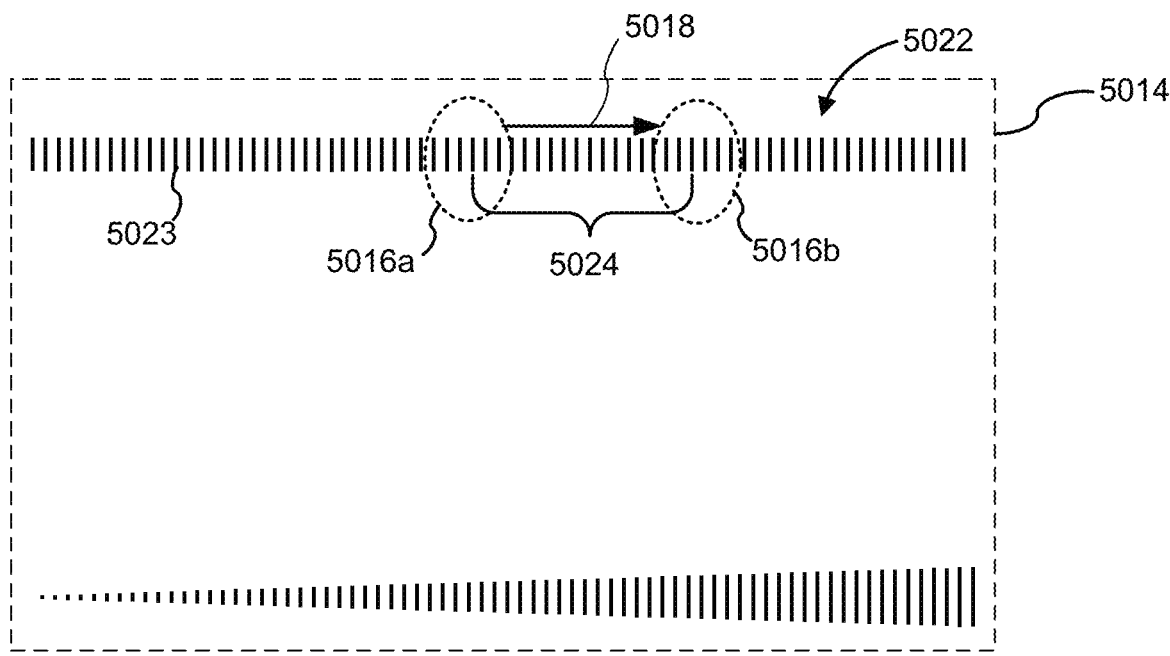
Figures 1, 5C:
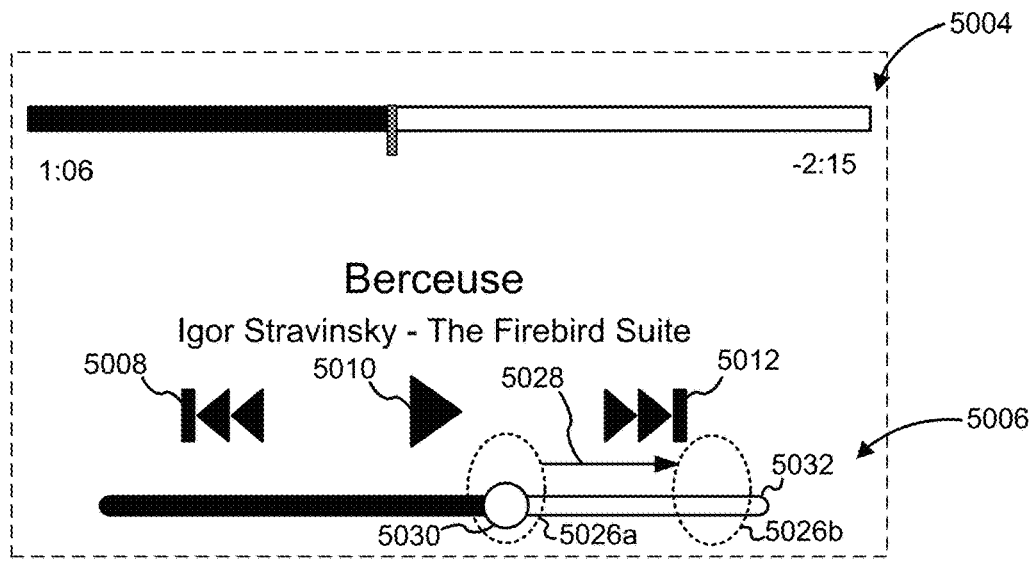
FIGS. 5CC-5OO illustrate example operations of an electronic device in accordance with some embodiments.
Figures 2, 5C:
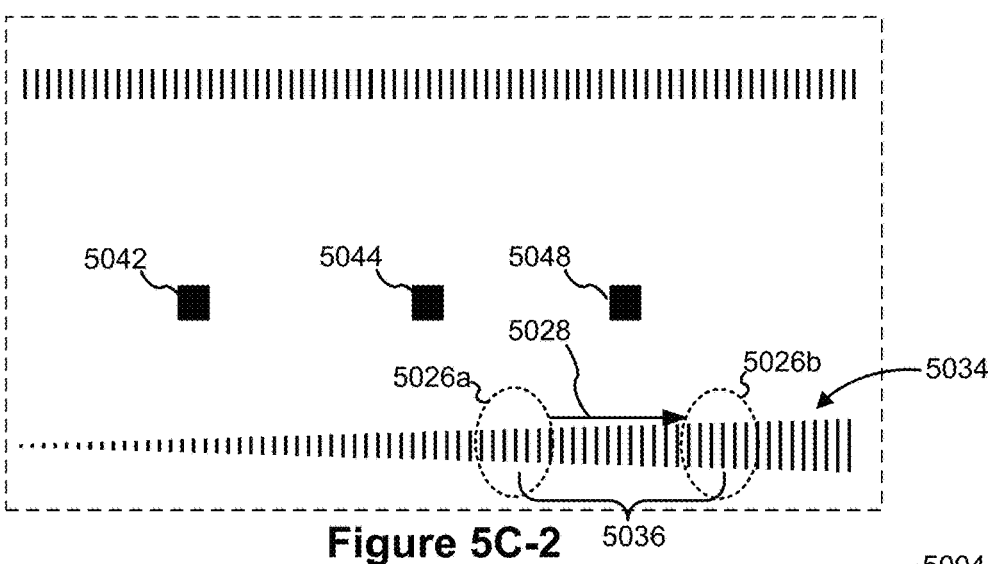
Figures 3, 5C:
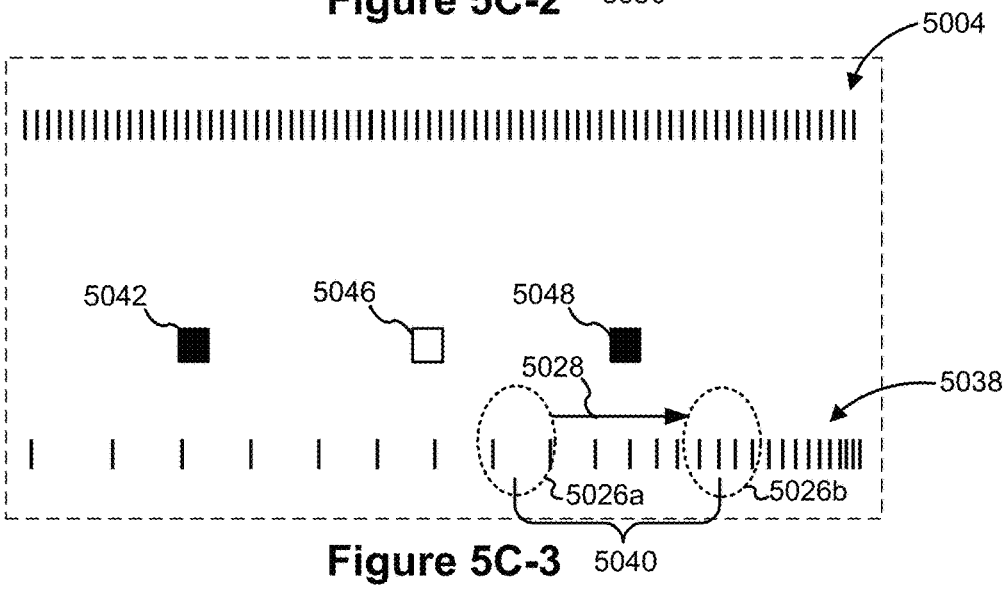

FIGS. 5A-5BB illustrate example user interfaces for providing haptic feedback in accordance with some embodiments. The user interfaces in these figures are used to illustrate the processes described below, including the processes in FIGS. 6A-6C, 7A-7D, 8A-8C, 9, 10, 11A-11B, and 12A-12D. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIG. 5A-5E illustrate example user interfaces with adjustable controls, in accordance with some embodiments.

In FIG. 5A, a user interface 5002 includes a first adjustable control 5004 and a second adjustable control 5006. For example, user interface 5002 is a user interface for a music player application, first adjustable control 5004 is a playback position adjustment control, and second adjustable control 5006 is a volume adjustment control. In some embodiments, user interface 5002 includes additional controls, such as previous track control 5008 (e.g., for initiating playback from the beginning of a current track and/or from a previous track), pause/play control 5010 (e.g., for pausing and/or playing a current track), and next track control 5012 (e.g., for playing a next track).

FIGS. 5B-1, 5B-2, 5C-1, 5C-2, and 5C-3 illustrate portion 5014 of user interface 5002, as indicated with a dotted line in FIG. 5A.

In FIG. 5B-1, a contact moves in a drag gesture across first adjustable control 5004 from a first position indicated by focus selector 5016a to a second position indicated by focus selector 5016b along a path indicated by arrow 5018. For example, the drag gesture moves playhead 5020 forward along playback position slider 5021 to adjust a playback position in a media file (e.g., an audio track).

FIG. 5B-2 illustrates tactile outputs that are generated as the drag gesture illustrated in FIG. 5B-2 occurs, in accordance with some embodiments. Each line shown along row 5020, which corresponds to first adjustable control 5004 of FIG. 5B-1, represents a discrete tactile output (e.g., a haptic event that causes a tap sensation that is experienced by a contact, such as a finger, at a location indicated by focus selector 5016). The length of a line in row 5022 (e.g., line 5023) represents an amplitude of a tactile output event, and the spacing between the lines of row 5022 indicates the distribution of tactile output along the adjustable control (e.g., corresponding to a frequency with which the tactile output events occur if the focus selector moves across the adjustable control at a constant speed). As a contact is dragged across row 5022 along the path indicated by arrow 5018, a series of tactile outputs that correspond to first adjustable control 5004 (e.g., tactile outputs represented by the lines shown within bracket 5024) are provided. The tactile outputs that correspond to first adjustable control 5004 occur at evenly spaced intervals and each tactile output of the series has the same amplitude.

In FIG. 5C-1, a contact moves in a drag gesture across second adjustable control 5006 from a first position indicated by focus selector 5026a to a second position indicated by focus selector 5026b along a path indicated by arrow 5028. For example, the drag gesture moves volume control 5030 forward in the volume slider 5032 to increase the sound level at which media is played back.

FIG. 5C-2 illustrates a series of tactile outputs that are generated as the drag gesture illustrated in FIG. 5C-1 occurs, in accordance with some embodiments. Each line shown along row 5034, which corresponds to second adjustable control 5006 of FIG. 5C-1, represents a discrete tactile output. The lengths of the lines in row 5034 increase from left to right, indicating that the amplitude of tactile output events is increasing as the focus selector moves from left to right. As a contact is dragged across row 5034 along the path indicated by arrow 5028, a series of tactile outputs that correspond to second adjustable control 5006 (e.g., tactile outputs represented by the lines shown within bracket 5036) are provided. The tactile outputs that correspond to second adjustable control 5006, as illustrated in 5C-2, occur at evenly spaced intervals and gradually increase in amplitude.

FIG. 5C-3 illustrates a series of tactile outputs that are generated as the drag gesture illustrated in FIG. 5C-1 occurs, in accordance with some embodiments. Each line shown along row 5040, which corresponds to second adjustable control 5006 of FIG. 5C-1, represents a discrete tactile output. The spacing between lines in row 5040 decreases from left to right, indicating that the distribution of tactile output events along the second adjustable control 5006 (e.g., corresponding to a frequency with which the tactile output events occur if the focus selector moves across the adjustable control at a constant speed) is increasing as the focus selector moves from left to right. As a contact is dragged across row 5040 along the path indicated by arrow 5028, a series of tactile outputs that correspond to second adjustable control 5006 (e.g., tactile outputs represented by the lines shown within bracket 5040) are provided. The tactile outputs that correspond to second adjustable control 5006, as illustrated in 5C-3, have the same amplitude and occur at gradually decreasing time intervals.

In some embodiments, tactile output is provided for previous track control 5008, pause/play control 5010, and/or next track control 5012, e.g., as indicated at 5042, 5044, 5046, and 5048 of 5C-2 and 5C-3. For example, in some embodiments, a single tap, as indicated at 5042, is provided when input is detected at previous track control 5008. In some embodiments, a single tap, as indicated at 5048, is provided when input is detected at next track control 5012. In some embodiments, a number of tactile outputs provided by a control is based on a number of states of the control. For example, in some embodiments, a two-state control such as pause/play control 5010 provides a tactile output having a first tactile output profile (e.g., a tactile output with a first intensity) when the state of the control changes from pause to play, as indicated at 5044, and a second tactile output profile (e.g., a tactile output with a second intensity that is greater than the first intensity and/or a spring oscillation effect) when the state of the control changes from play to pause, as indicated at 5046.

Figures 1, 5D:
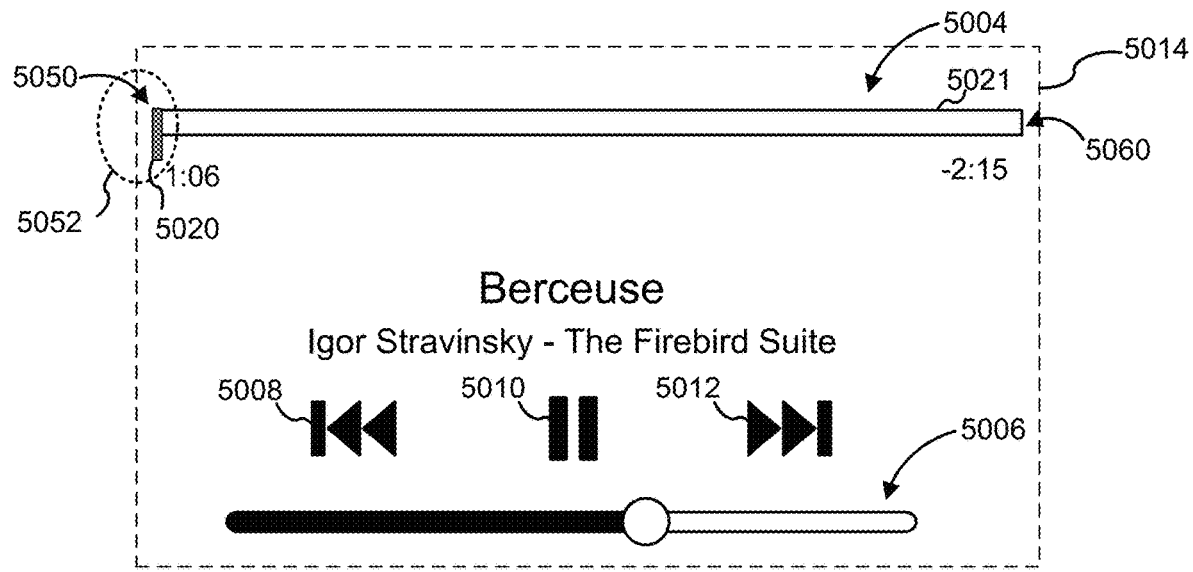
Figures 2, 5D:
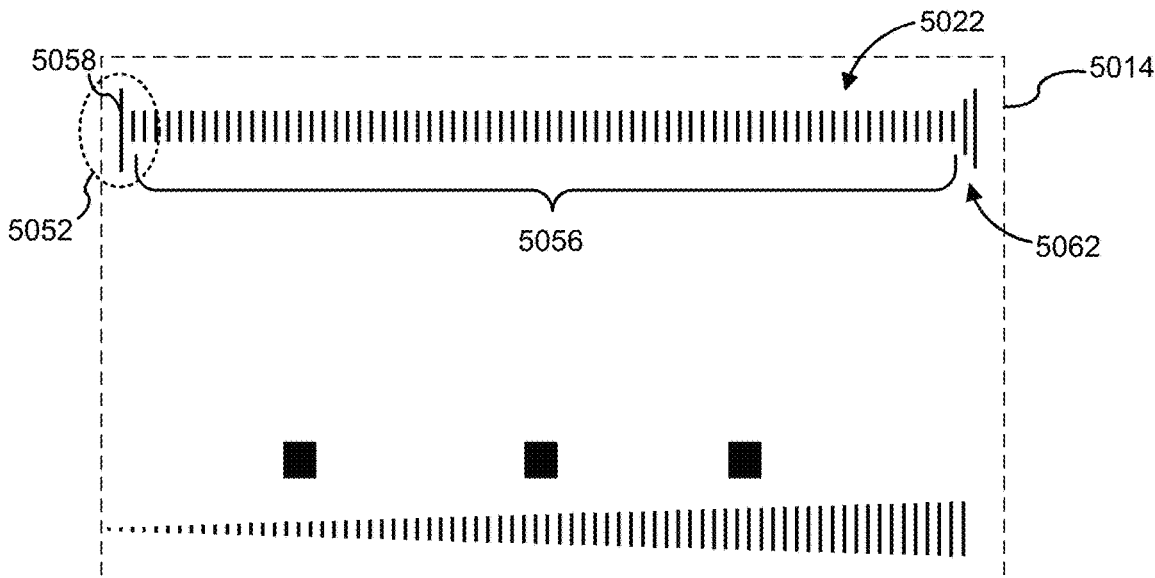

FIGS. 5D-1 and 5D-2 illustrate tactile output provided at endpoints of an adjustable control 5004. In some embodiments, one or more endpoint tactile outputs are provided when an endpoint of an adjustable control is reached. In this manner, a user is provided with feedback indicating that, e.g., a minimum point or maximum point of an adjustable control has been reached, such as a beginning point or endpoint of a media file. For example, when playhead 5020 is dragged to left endpoint 5050 of playback position slider 5021, as indicated by focus selector 5052 shown in FIG. 5D-1, a tactile output 5054 is provided, as indicated in FIG. 5D-2. Compared with other tactile outputs of adjustable control 5004 (such as the tactile outputs shown in bracket 5056), left endpoint tactile output 5058 has at least one different characteristic, such as a higher amplitude. When playhead 5020 is dragged to right endpoint 5060 of playback position slider 5021, right endpoint tactile outputs 5062 are provided. Compared with other tactile outputs of adjustable control 5004 (such as the tactile outputs shown in bracket 5056), right endpoint tactile outputs 5062 have higher amplitudes.

Figures 1, 5E:
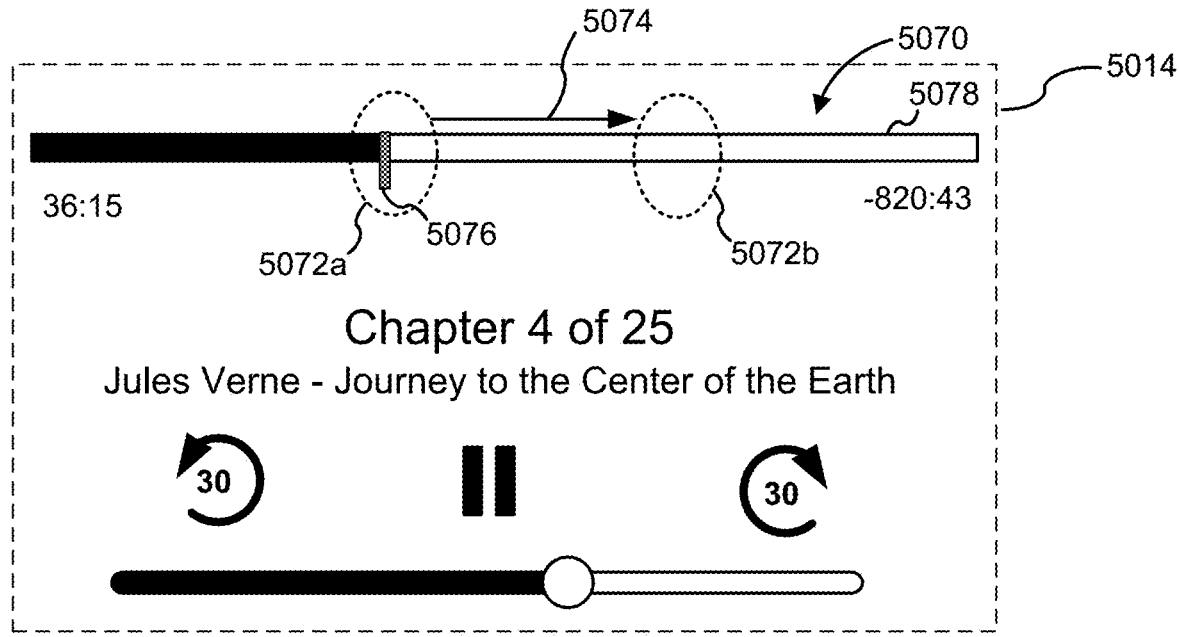
Figures 2, 5E:
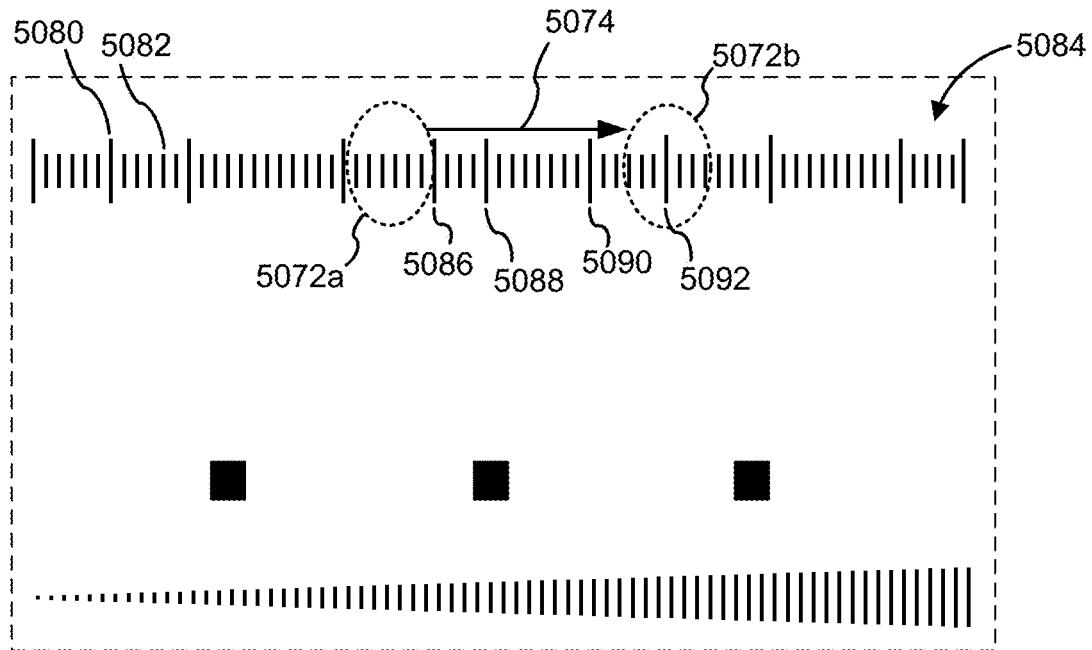

FIGS. 5E-1 and 5E-2 illustrate tactile output provided at chapter markers for media content. In FIG. 5E-1, a contact moves in a drag gesture across adjustable control 5070 from a first position indicated by focus selector 5072a to a second position indicated by focus selector 5072b along a path indicated by arrow 5074. For example, the drag gesture moves playhead 5076 forward along playback position slider 5078 to adjust a playback position in a media file (e.g., an audiobook).

FIG. 5E-2 illustrates a series of tactile outputs that are generated as the drag gesture illustrated in FIG. 5E-1 occurs, in accordance with some embodiments. Each line shown along row 5084, which corresponds to second adjustable control 5070 of FIG. 5E-1, represents a discrete tactile output. Lines at positions in row 5084 that correspond to chapter markers (e.g., line 5080) are longer than lines that do not correspond to chapter markers (e.g., line 5082), indicating that the amplitude of tactile output events is greater at chapter marker positions than at positions that do not correspond to chapter markers. As a contact is dragged across row 5084 along the path indicated by arrow 5074, a series of tactile outputs that correspond to adjustable control 5070 are provided, including high amplitude tactile outputs corresponding to chapter markers at 5086, 5088, 5090, and 5092.

Figure 5F:
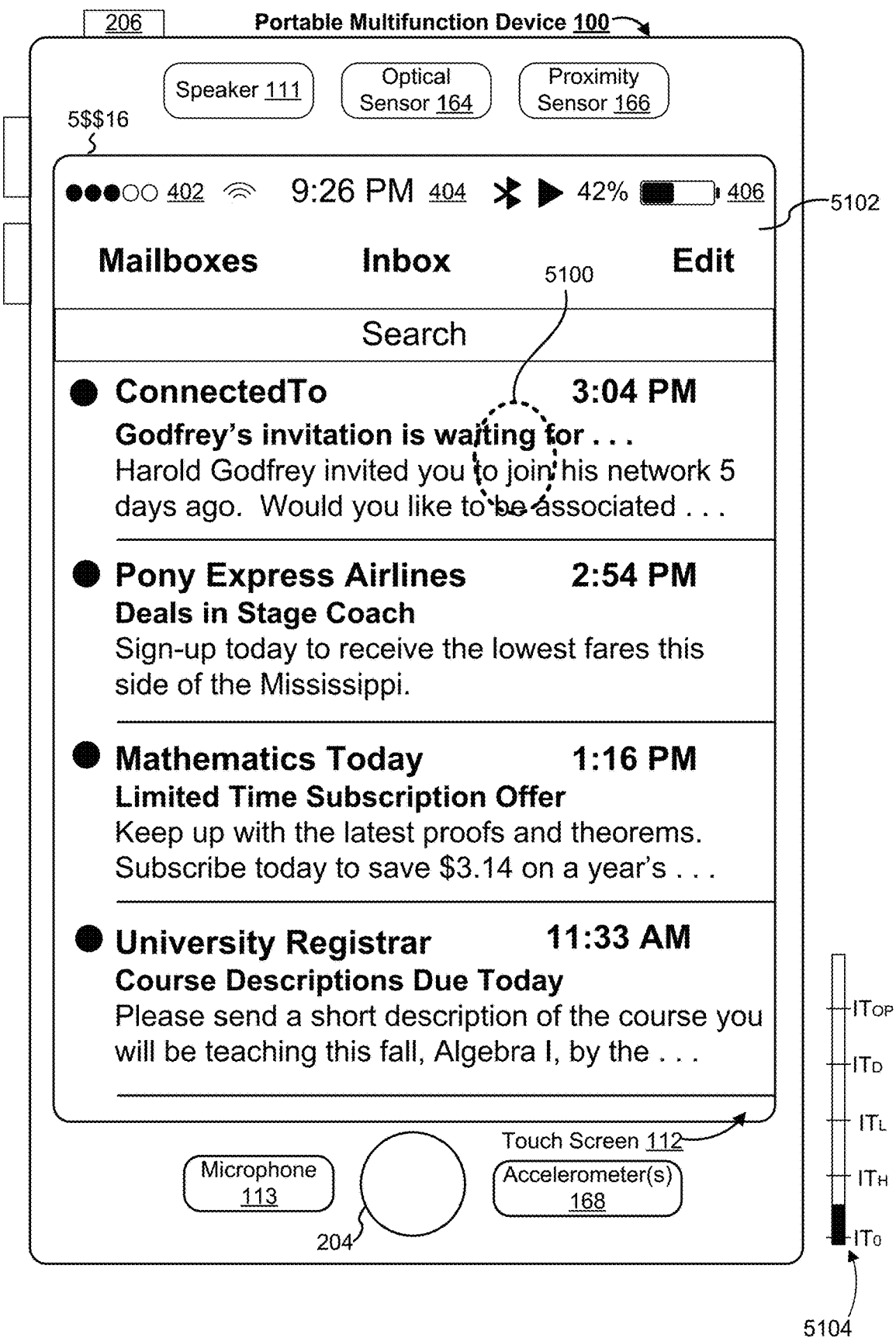

FIGS. 5F-5K illustrate a tactile output that varies based on a characteristic intensity of a contact. In FIG. 5F, a contact is detected on touch-sensitive display system 112 at a location indicated by focus selector 5100. The location of focus selector 5100 within user interface 5102 (e.g., a mail inbox interface) corresponds to a content item (e.g., a preview of mail content). A characteristic intensity of the contact is above a detection threshold intensity $IT_0$ and below a hint threshold intensity $IT_H$, as indicated at intensity meter 5104.

Figure 5G:
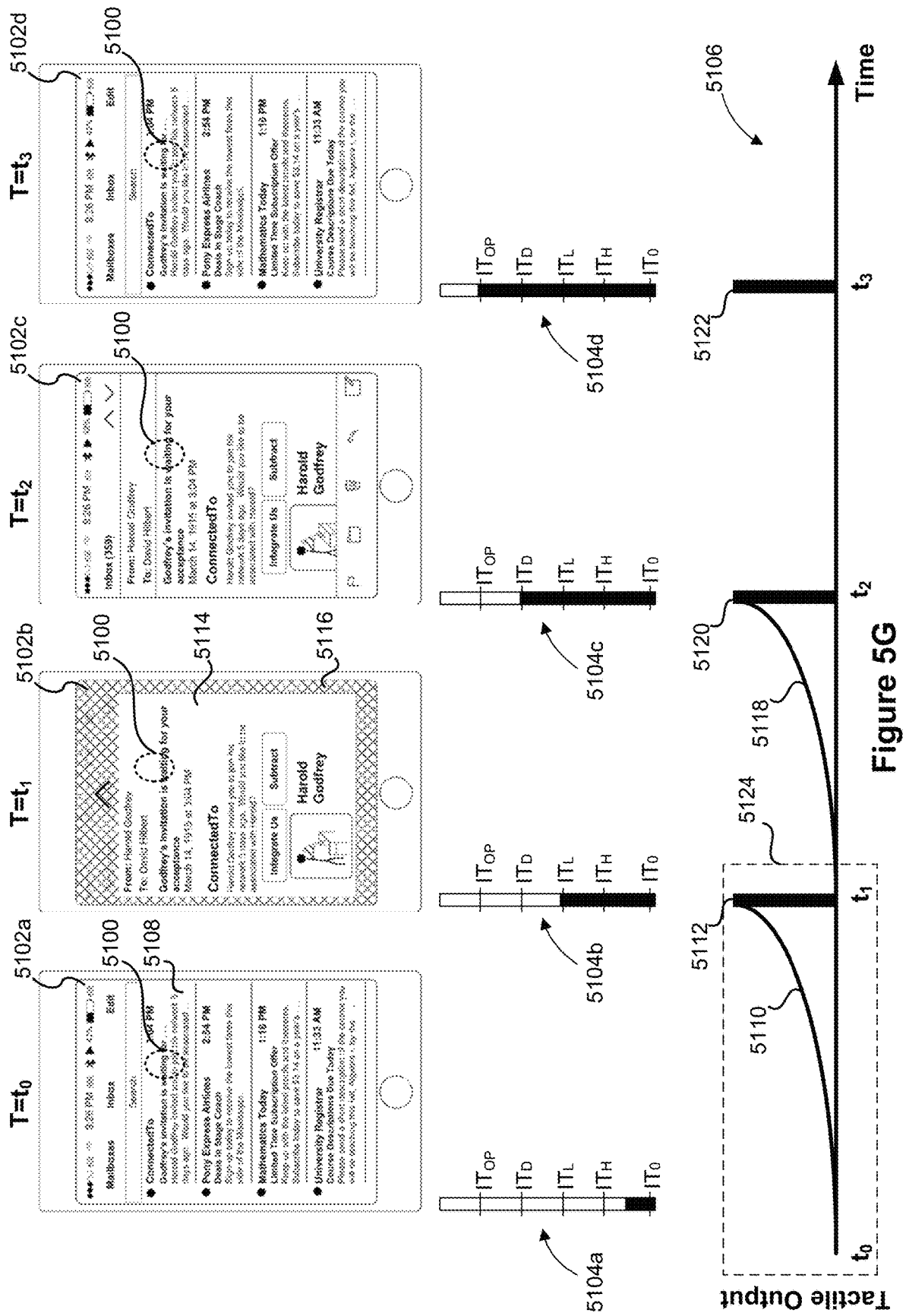

In FIG. 5G, the characteristic intensity of the contact indicated by focus selector 5100 increases from below hint threshold intensity level $IT_H$ to above an overpress threshold intensity level $IT_{OP}$, as indicated by intensity meters 5104a, 5104b, 5104c, and 5104d corresponding to user interfaces 5102a, 5102b, 5102c, and 5102d, respectively. The tactile output provided as the characteristic intensity of the contact increases is illustrated by tactile output graph 5106.

In user interface 5102a, a contact is at a position indicated by focus selector 5100 that corresponds to a panel 5108 including a representation of content. For example, the representation of content is a short preview of an e-mail in an e-mail inbox. As the characteristic intensity of the contact illustrated by focus selector 5100 increases from an initial intensity level that is below hint threshold intensity level $IT_H$, as indicated at 5104a, and approaches light press intensity threshold level $IT_L$, as indicated at 5104b, a tactile output with a first tactile output profile varies in accordance with the proximity of the characteristic intensity of the contact to $IT_L$. For example, as the characteristic intensity of the contact increases between time to and time $t_1$, a characteristic of the tactile output increases (e.g., an amplitude, and/or a distribution of tactile outputs of an oscillating tactile output increases from zero, or a peak amplitude of a sequence of discrete tactile outputs increases gradually as the intensity of the contact increases), as indicated at 5110. User interface transitions that occur as the characteristic intensity of the contract increases from $IT_H$ to $IT_L$ is shown in more detail in FIG. 5H.

When the characteristic intensity of the contact increases above light press intensity threshold level $IT_L$, a tactile output with a second tactile output profile, such as a discrete tap, is produced. For example, at time $t_1$, when the characteristic intensity of the contact meets first intensity criteria (e.g., increases above light press intensity threshold level $IT_L$), as indicated at 5104b, a first discrete tap is produced, as indicated at 5112. In some embodiments, when the characteristic intensity of the contact increases above light press intensity threshold level $IT_L$, a preview of information corresponding to panel 5108 is shown in a preview area 5114 of user interface 5102b. For example, preview area 5114 is a preview platter displayed in or over user interface 5102b. In this example, preview area 5114 of user interface 5102b displays a long (e.g., expanded) preview of an e-mail corresponding to the short preview of the e-mail shown in panel 5108 of user interface 5102a. In some embodiments, user interface 5102b is blurred except for preview area 5114, as indicated at 5116.

As the characteristic intensity of the contact illustrated by focus selector 5100 increases from an intensity that is above light press intensity threshold level $IT_L$, as indicated at 5104b, and approaches deep press intensity threshold level $IT_D$, as indicated at 5104c), a tactile output with a third tactile output profile varies in accordance with the proximity of the characteristic intensity of the contact to $IT_D$. For example, as the characteristic intensity of the contact increases between time $t_1$ and time $t_2$, a characteristic of the tactile output increases (e.g., an amplitude and/or the frequency of an oscillating tactile output increases from zero, or a peak amplitude of a sequence of discrete tactile outputs increases gradually as the intensity of the contact increases), as indicated at 5118. In some embodiments, as the characteristic intensity of the contact increases from intensity $I_L$ and approaches intensity $I_D$, preview area 5114 gradually expands from a first area (e.g., as shown in 5102b) to a second area (e.g., approaching the full screen display of the content as shown in 5102c).

When the characteristic intensity of the contact meets second intensity criteria (e.g., increases above deep press intensity threshold level $IT_D$), a tactile output with a fourth tactile output profile is produced. For example, at time $t_2$, when the characteristic intensity of the contact increases above deep press intensity threshold level $IT_D$, as indicated at 5104c, a second discrete tap is produced, as indicated at 5120. In some embodiments, when the characteristic intensity of the contact increases above deep press intensity threshold level $IT_D$, preview area 5114 is no longer displayed, and instead a user interface 5102c corresponding to the previously previewed content is displayed (e.g., the e-mail is shown in a user interface for viewing an e-mail).

When the characteristic intensity of the contact increases above overpress intensity threshold level $IT_{OP}$, a tactile output with a fifth tactile output profile is produced. For example, at time $t_3$, when the characteristic intensity of the contact increases above overpress intensity threshold level $IT_{OP}$, as indicated at 5104d, a third discrete tap is produced as indicated at 5122. In some embodiments, when the characteristic intensity of the contact increases above overpress intensity threshold level $IT_{OP}$, a previously displayed user interface is re-displayed. In some embodiments, the re-displayed user interface is a user interface that was displayed when the characteristic intensity of the contact was initially detected (e.g., when the characteristic intensity of the contact rose above contact detection threshold level $IT_0$). For example, an e-mail inbox with short previews of e-mails, as indicated at user interface 5102a, is re-displayed at user interface 5102d.

Figure 5H:
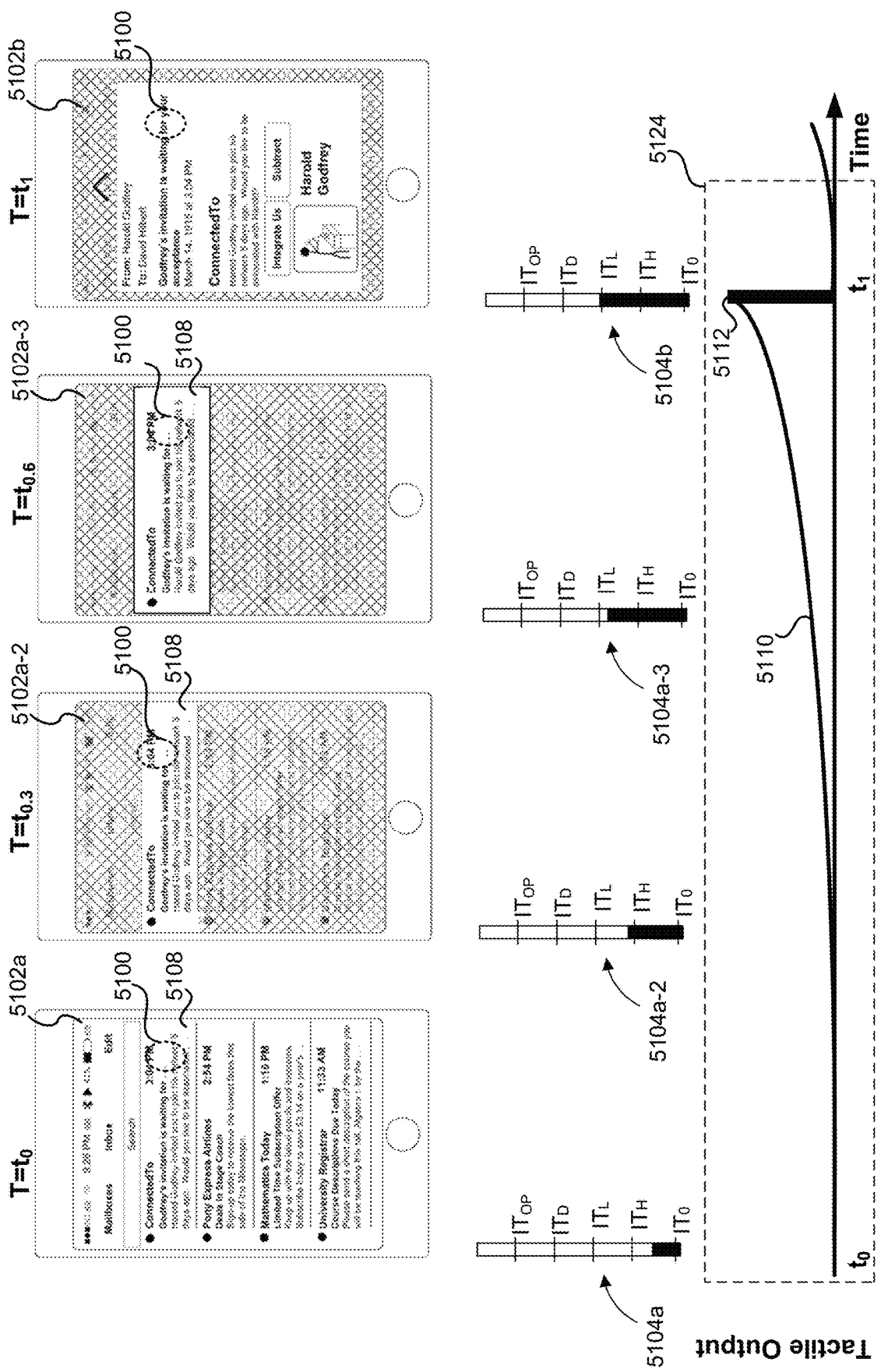

FIG. 5H illustrates user interface transitions that correspond to an increase in the intensity of a detected contact from intensity level $I_0$ to intensity level $I_1$ (as indicated in the area surrounded by dotted line 5124 of FIGS. 5G and 5H). In FIG. 5H, the characteristic intensity of the contact indicated by focus selector 5100 increases from below hint threshold intensity level $IT_H$ to above a light press threshold intensity level $IT_L$, as indicated by intensity meters 5104a, 5104a-2, 5104a-3, and 5104b corresponding to user interfaces 5102a, 5102a-2, 5102a-3, and 5102b, respectively.

User interfaces 5102a-2 and 5102 a-3 illustrate a hint state that occurs when a characteristic intensity of the contact indicated by focus selector 5100 is above a hint threshold intensity level $IT_H$ and below a light press threshold intensity level $IT_L$, in accordance with some embodiments. In user interface 5102a, focus selector 5100 is at a position corresponding to a panel 5108 including a representation of content (e.g., a short preview of an e-mail in an e-mail inbox). As the characteristic intensity of the contact increases from above $IT_H$ approaching $IT_L$, user interface is blurred except for panel 5108, the area of panel 5108 increases, the size of content in panel 5108 increases, and/or the size of content in the user interface outside of panel 5108 decreases. The blur and size change effects increase as the characteristic intensity of the contact increases between time $t_{0.3}$ and time $t_{0.6}$, as indicated in intensity meters 5104a-2 and 5104a-3 and user interfaces 5102a-2 and 5102a-3, respectively.

Figure 5K:
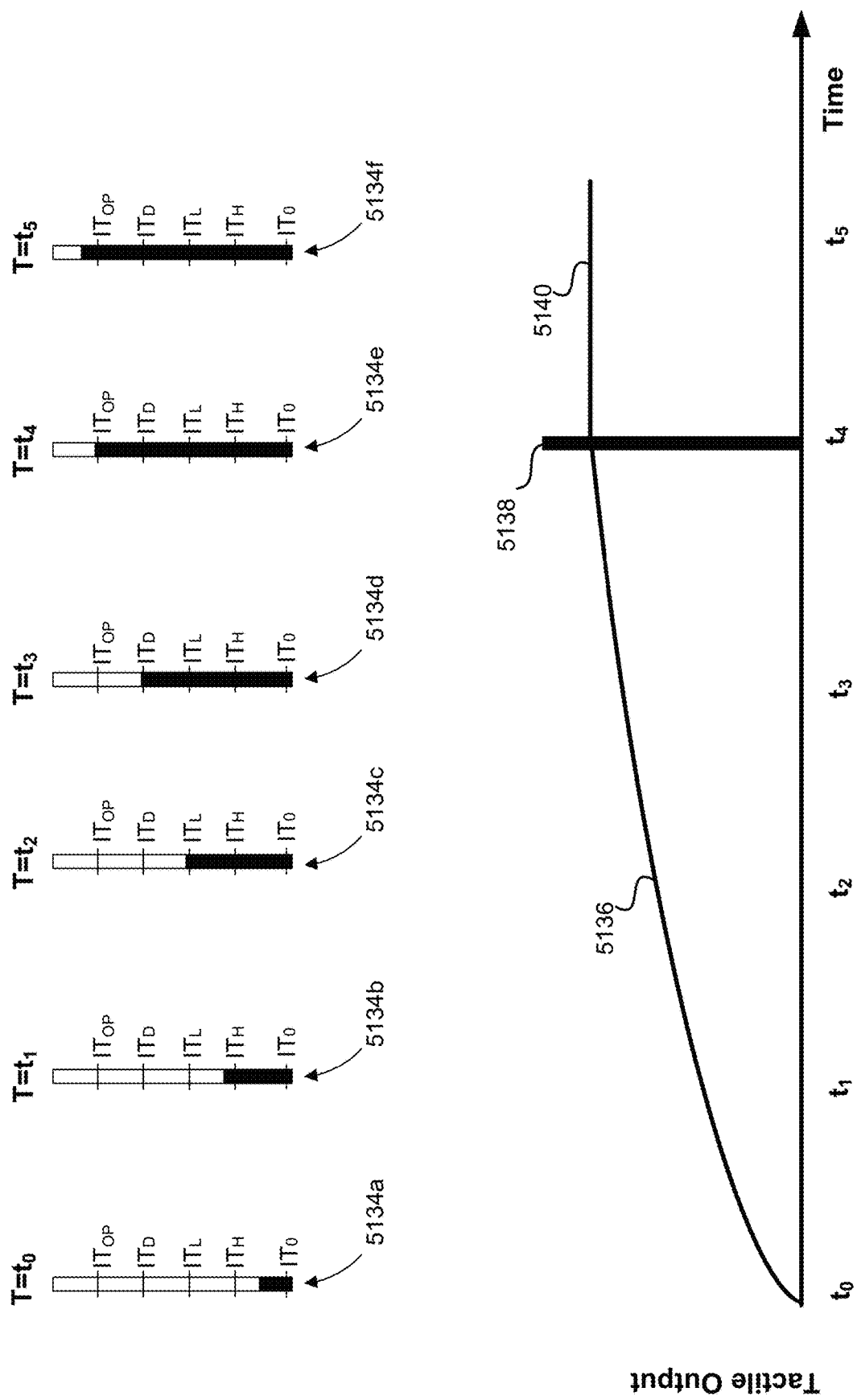
Figure 5L:
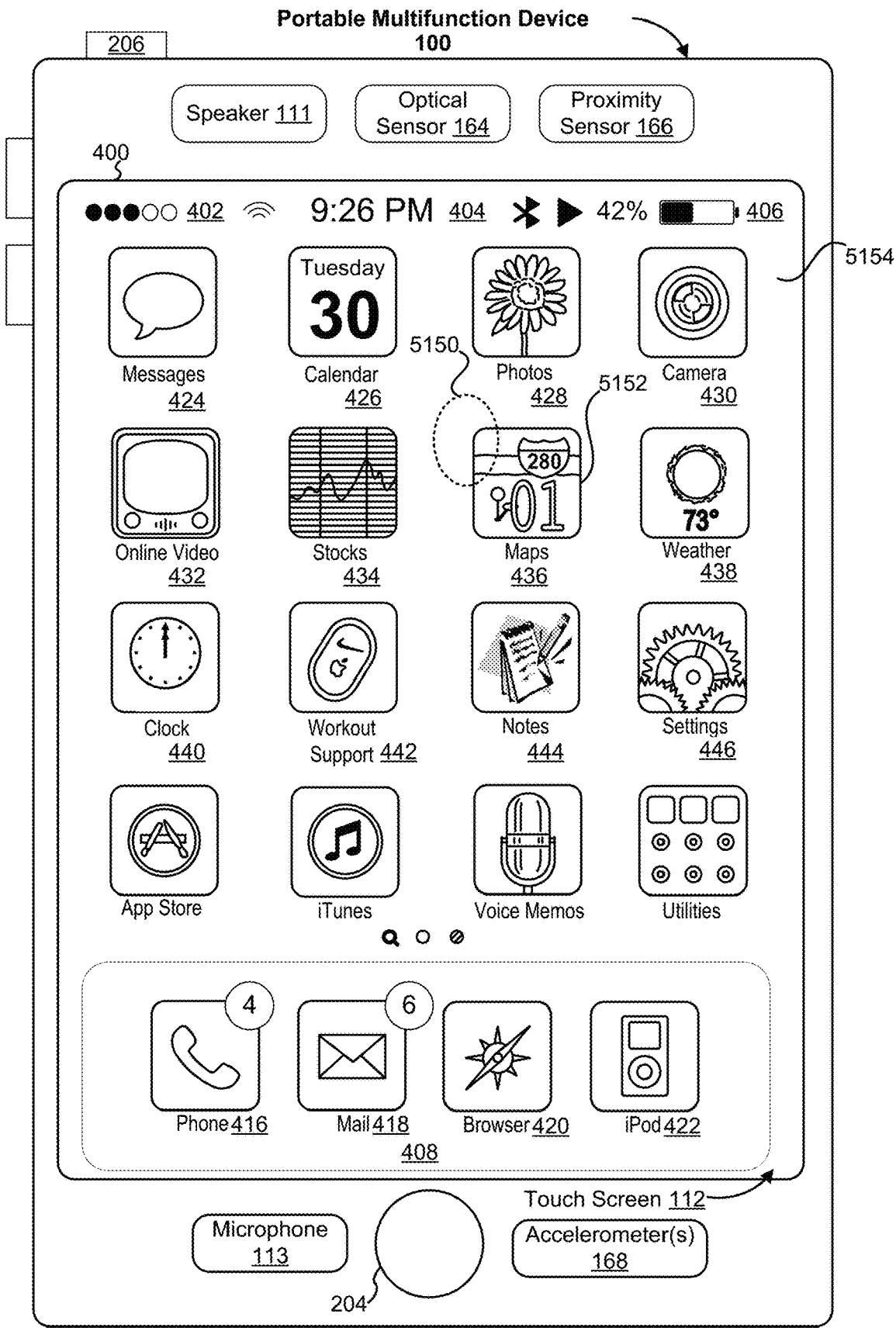
Figure 5M:
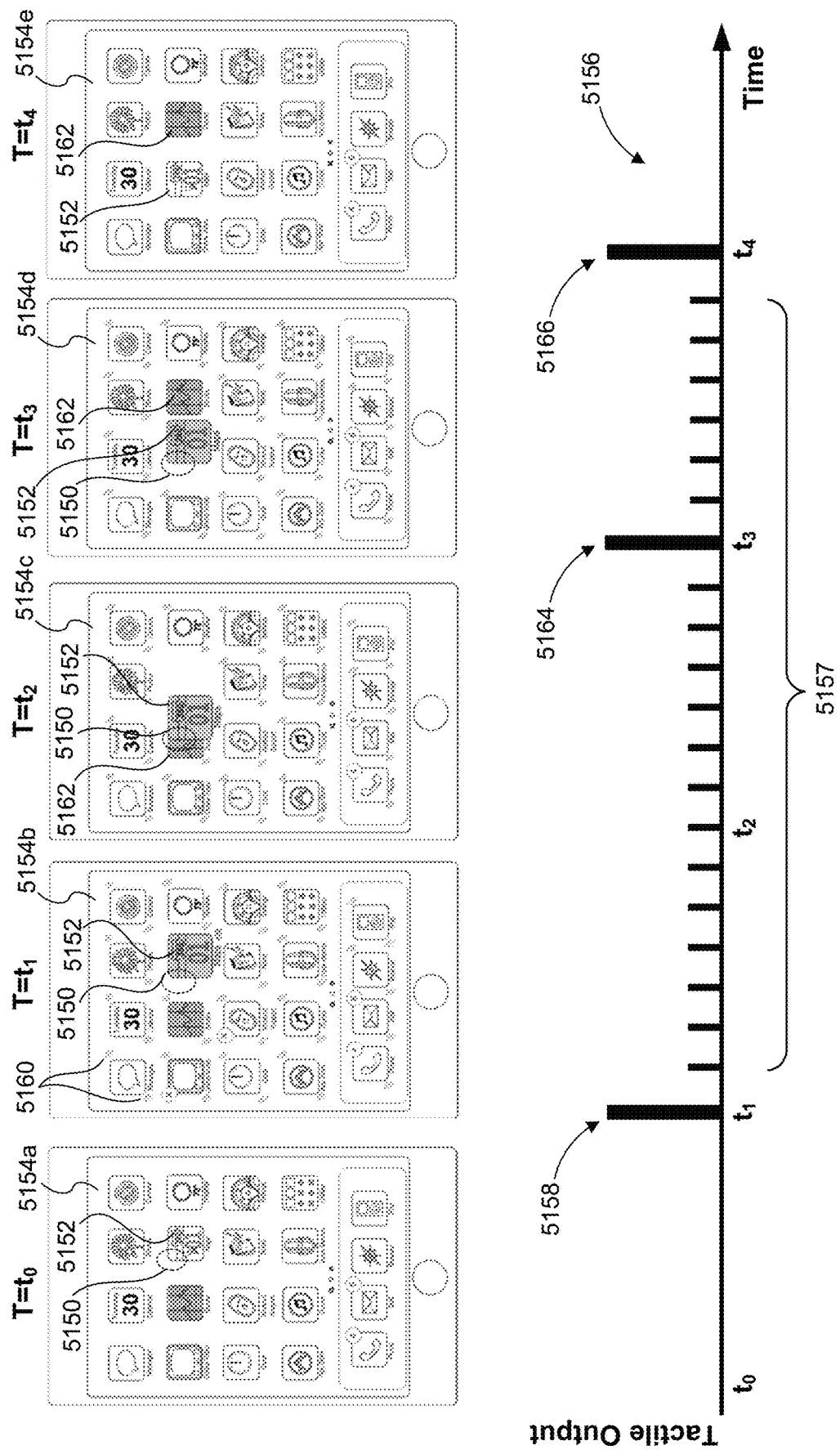
Figure 5N:
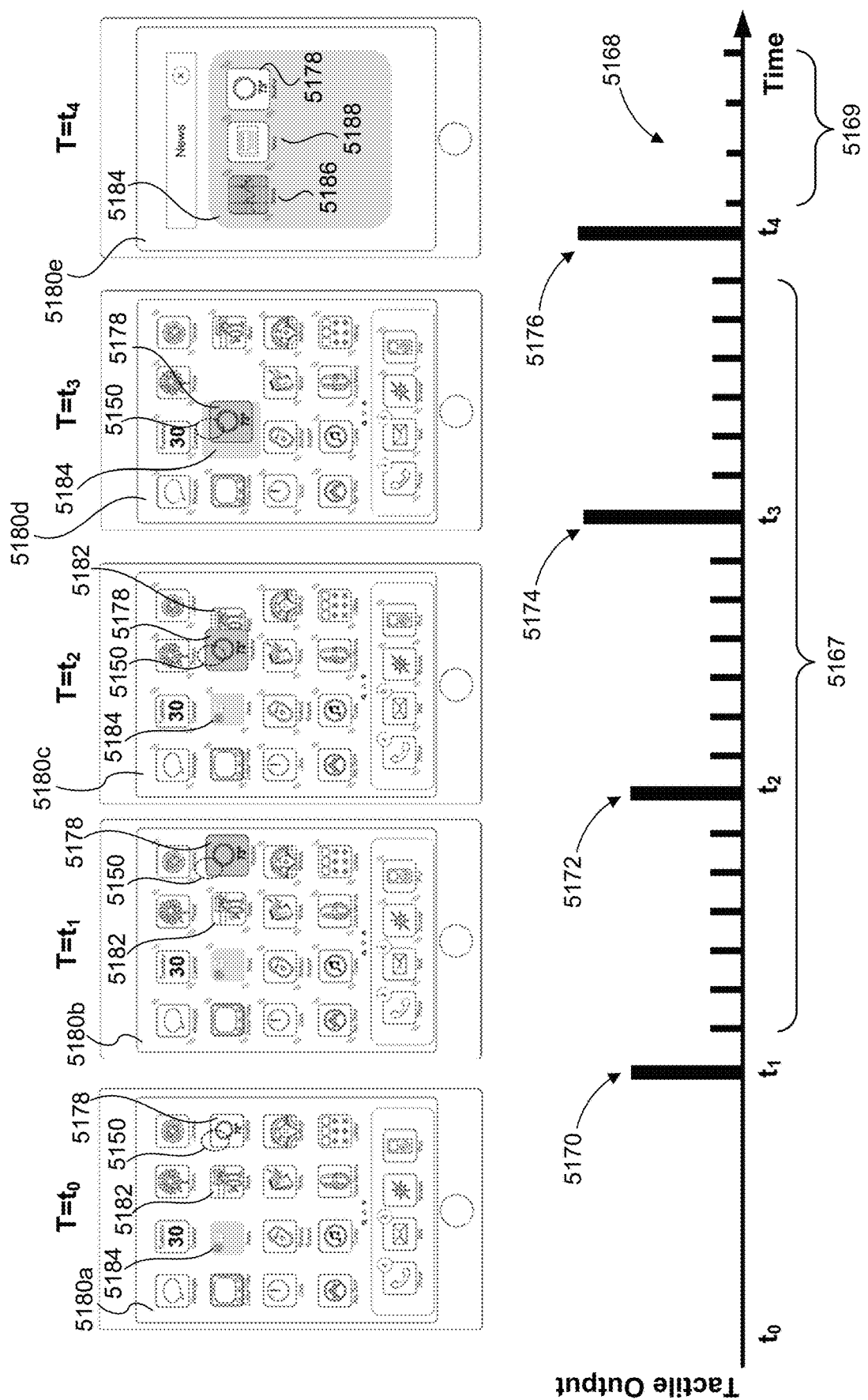
Figure 5O:
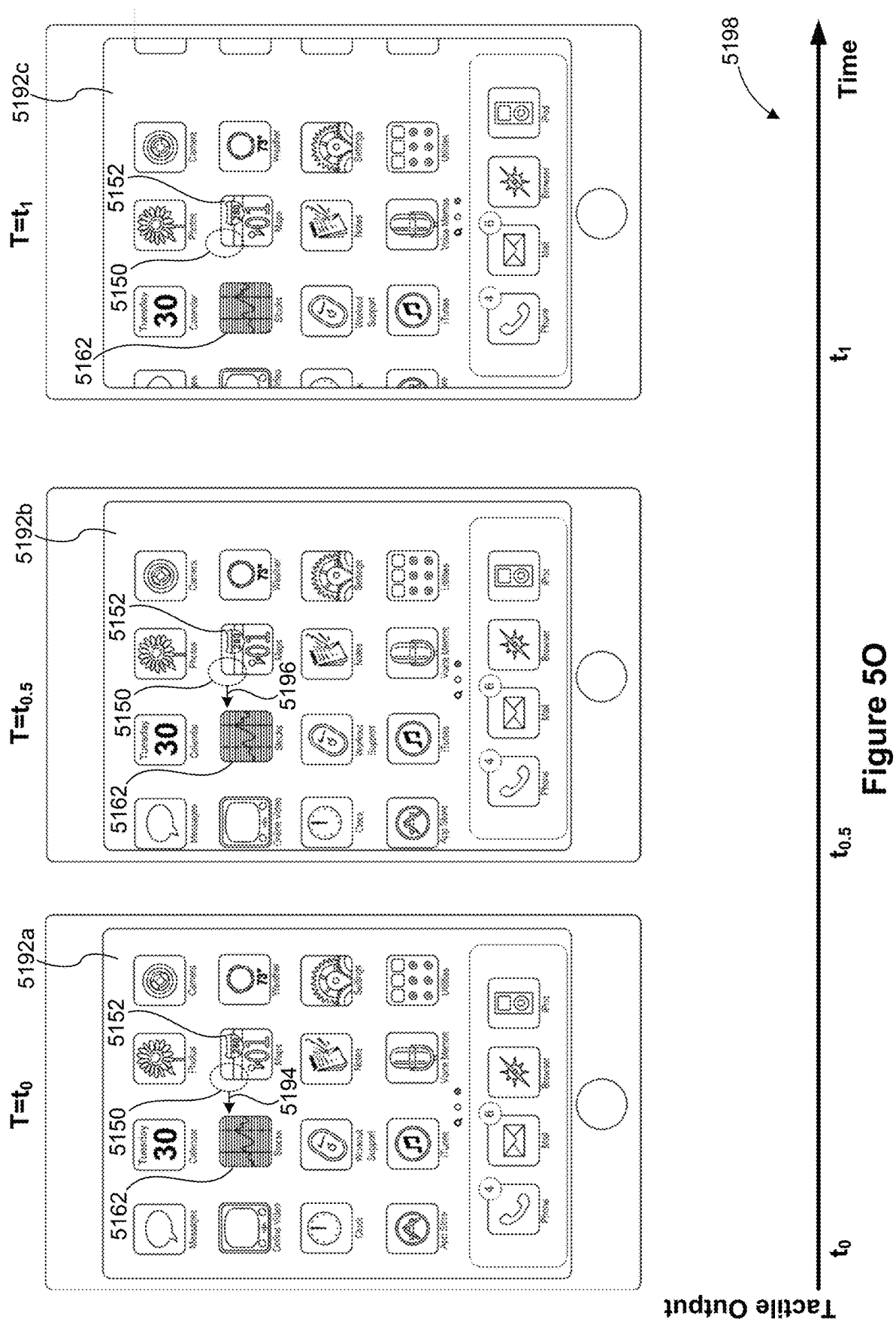
Figure 5P:
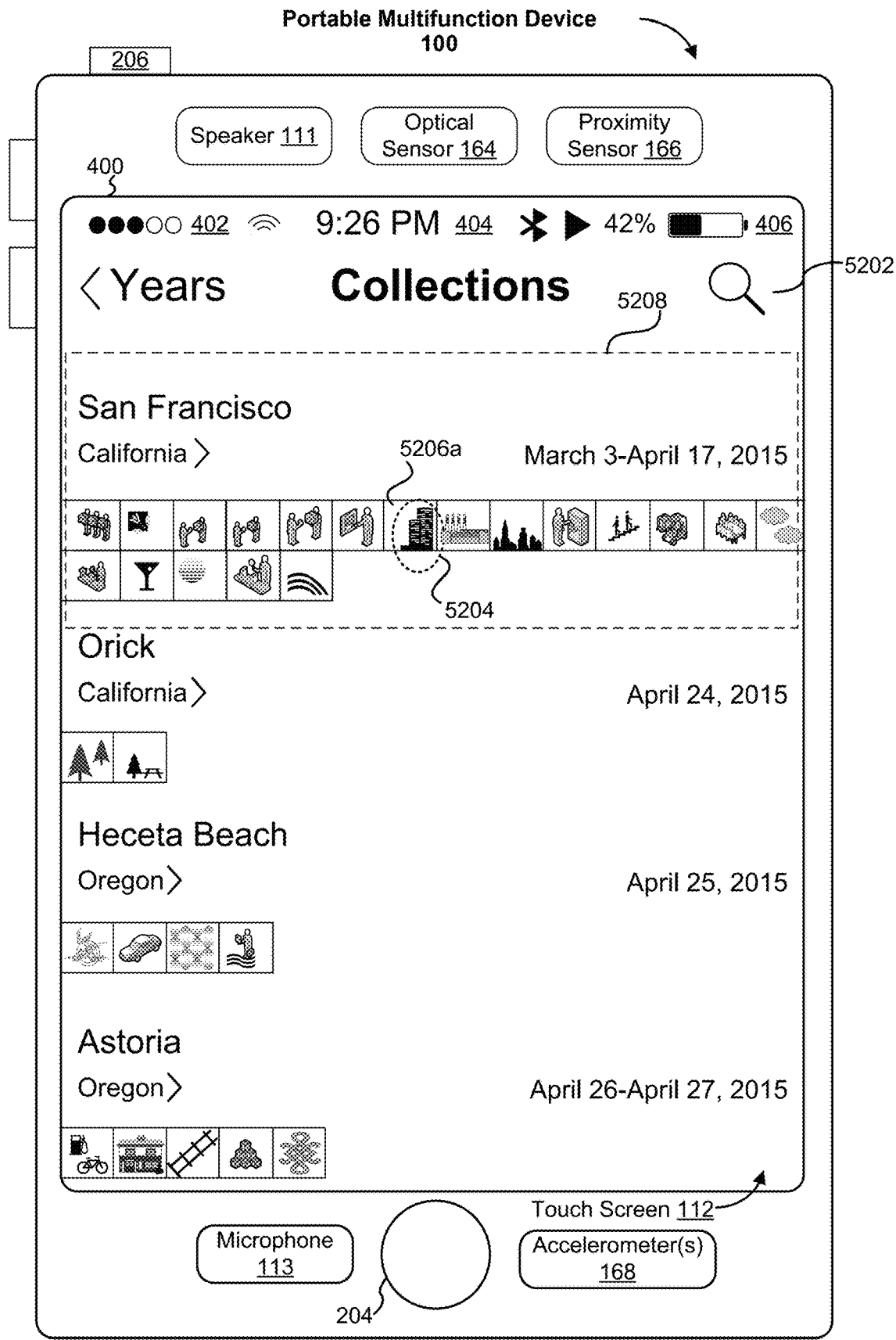
Figure 5Q:
Figures 1, 5R:
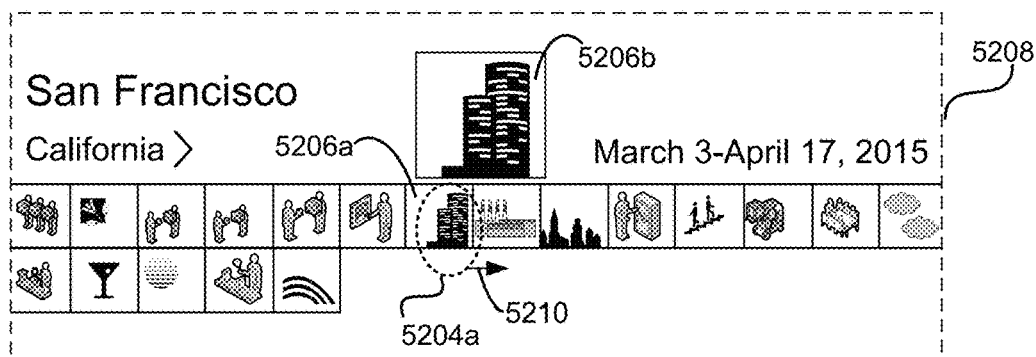
Figures 2, 5R:
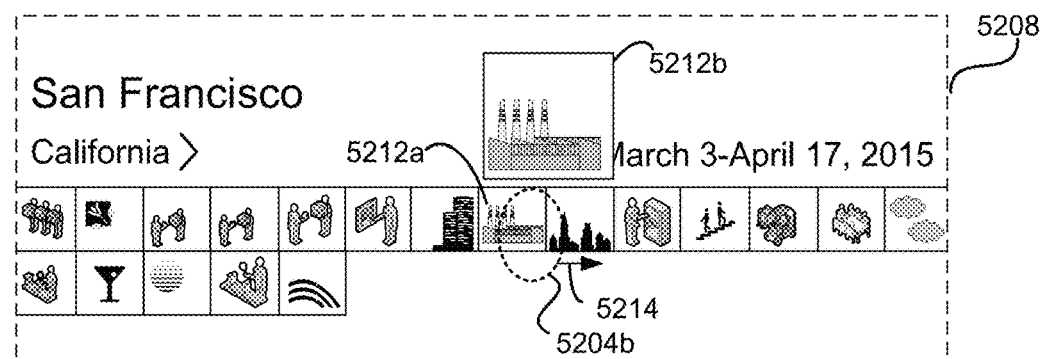
Figures 3, 5R:
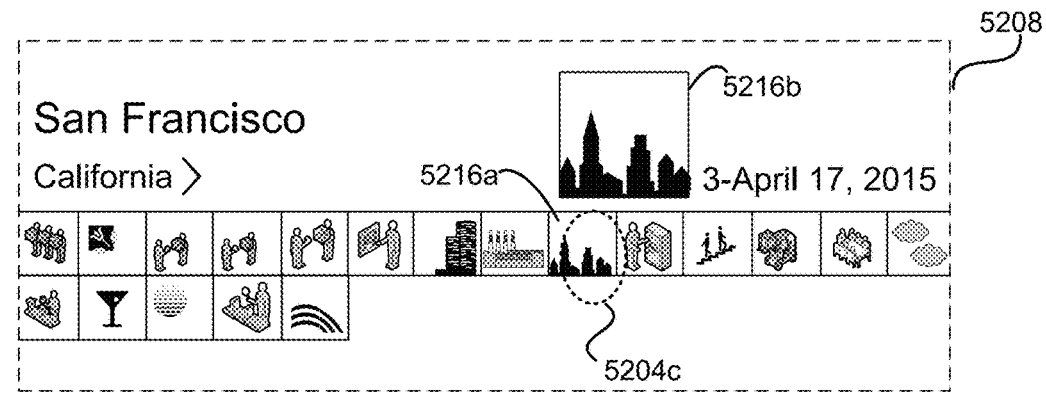
Figures 4, 5R:
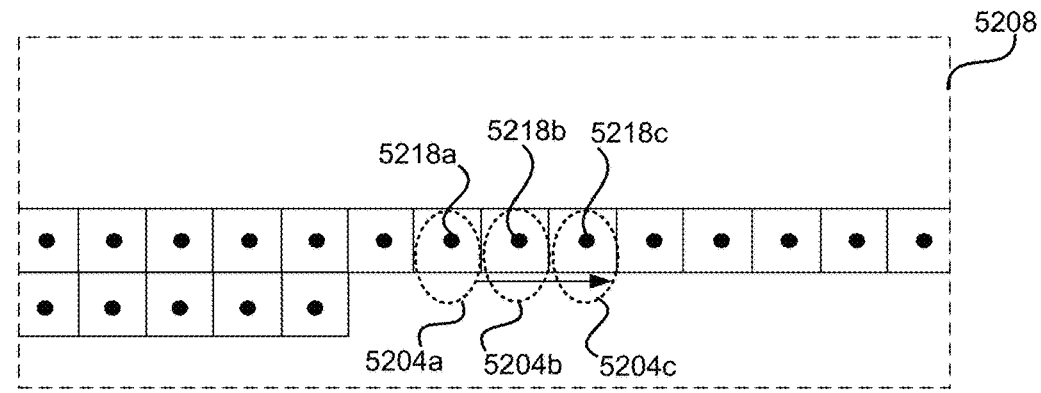
FIG. 4B illustrates an example user interface for a multifunction device with a touch-sensitive surface that is separate from the display in accordance with some embodiments.
Figures 1, 5S:
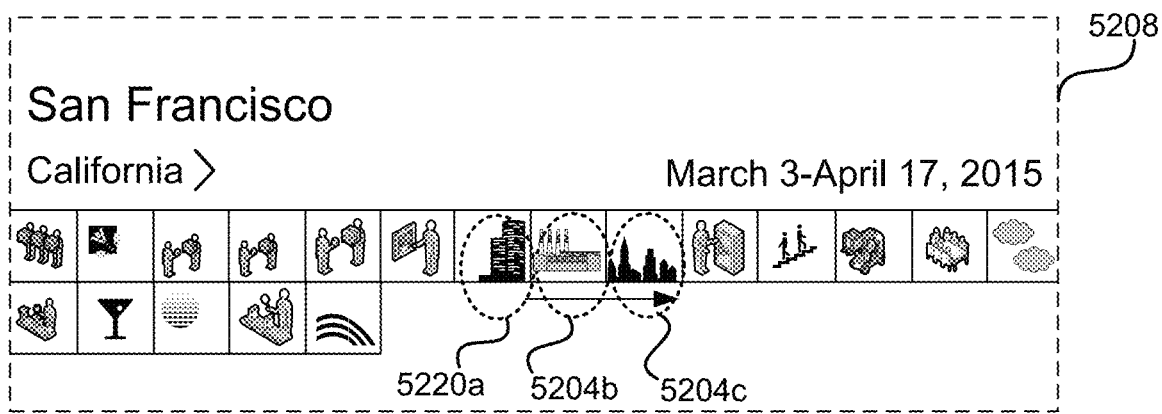
Figures 2, 5S:
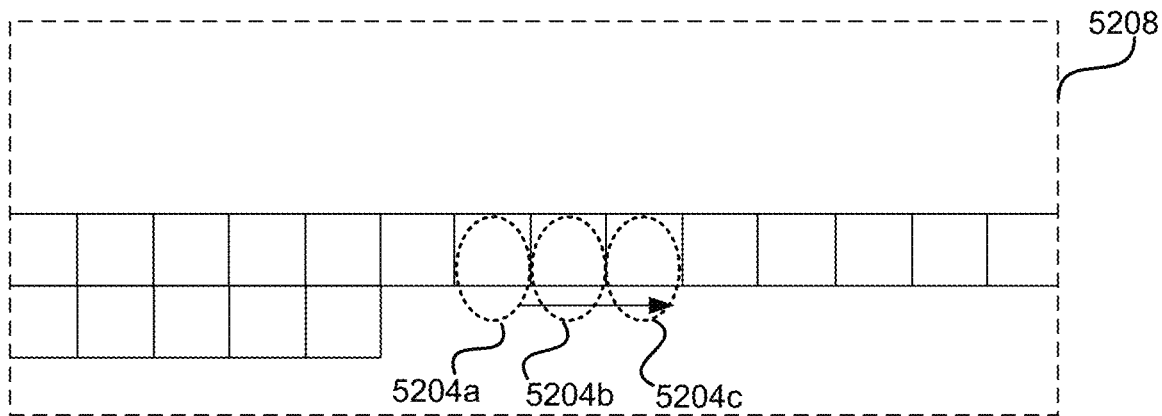
Figure 5T:
Figure 5U:
Figure 5V:
Figure 5W:
Figures 1, 5X:
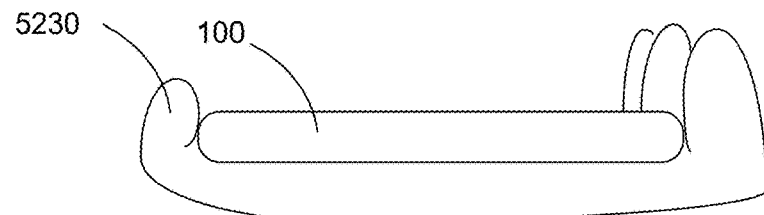
Figures 2, 5X:
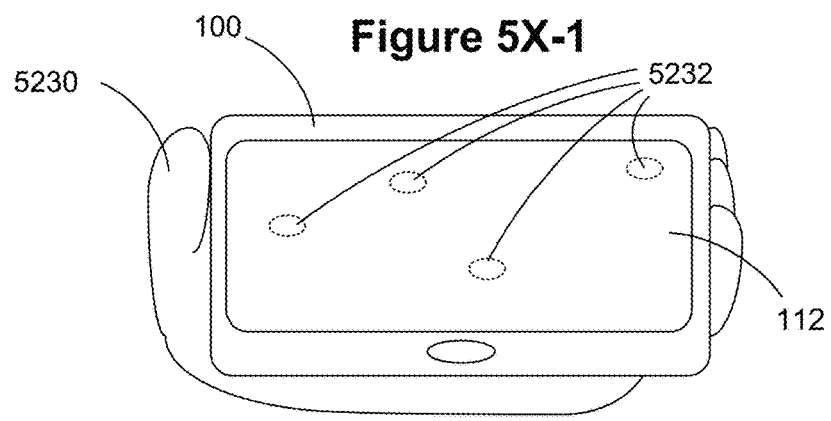
Figures 3, 5X:
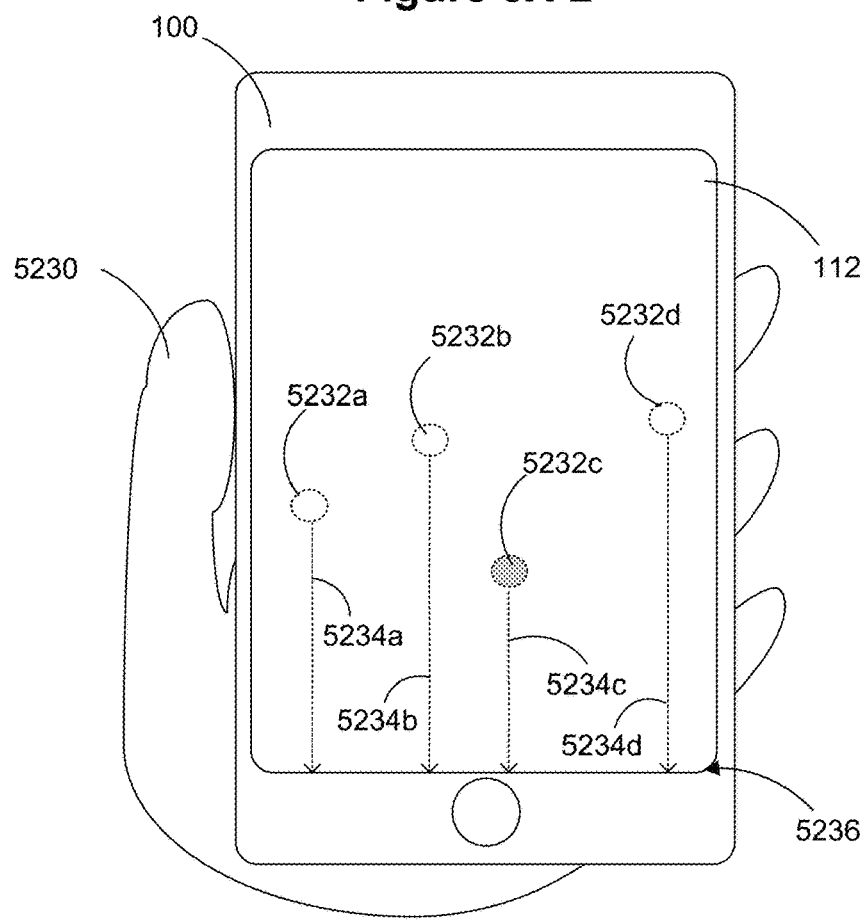
Figure 5Y:
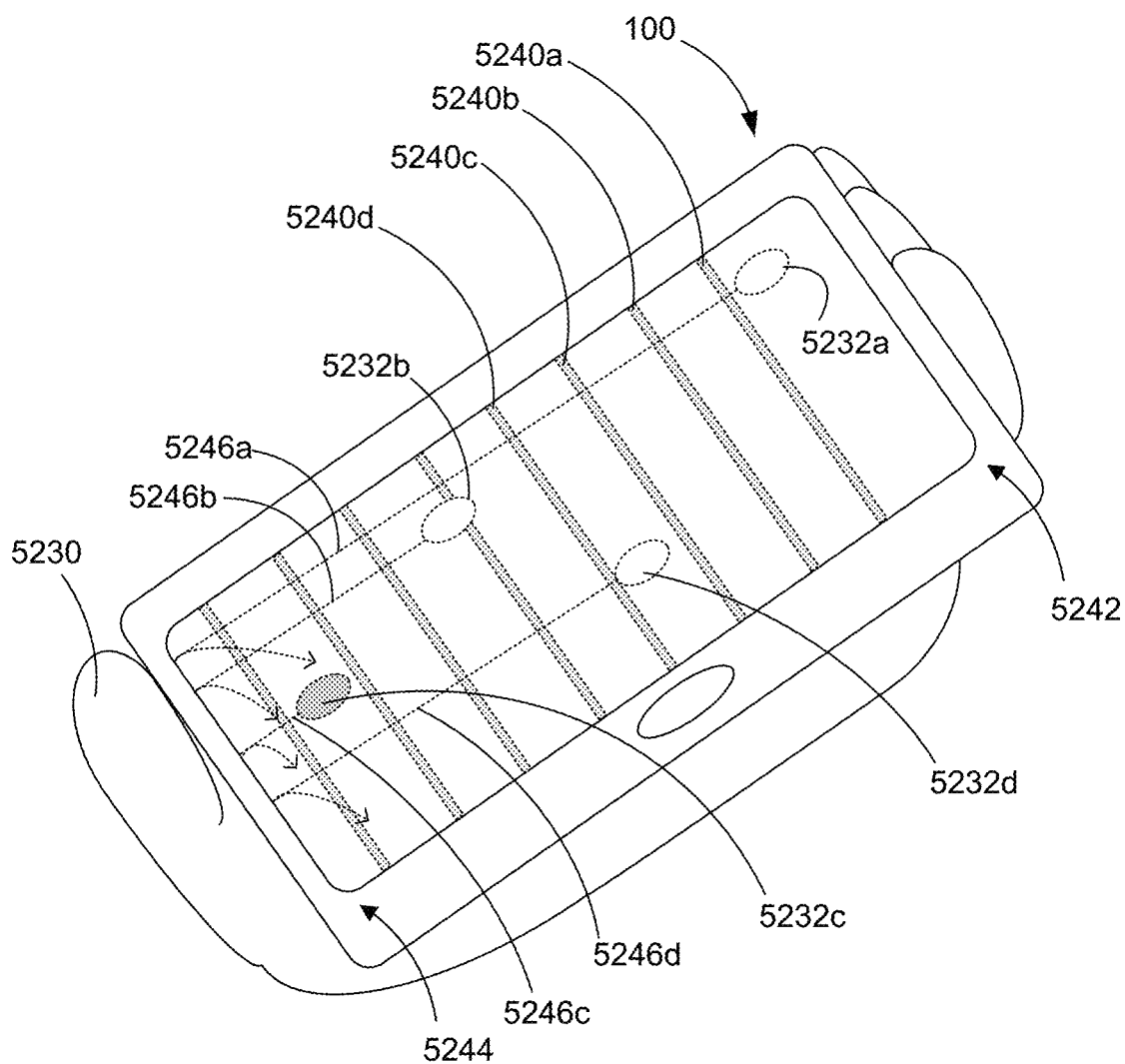
Figure 5C:
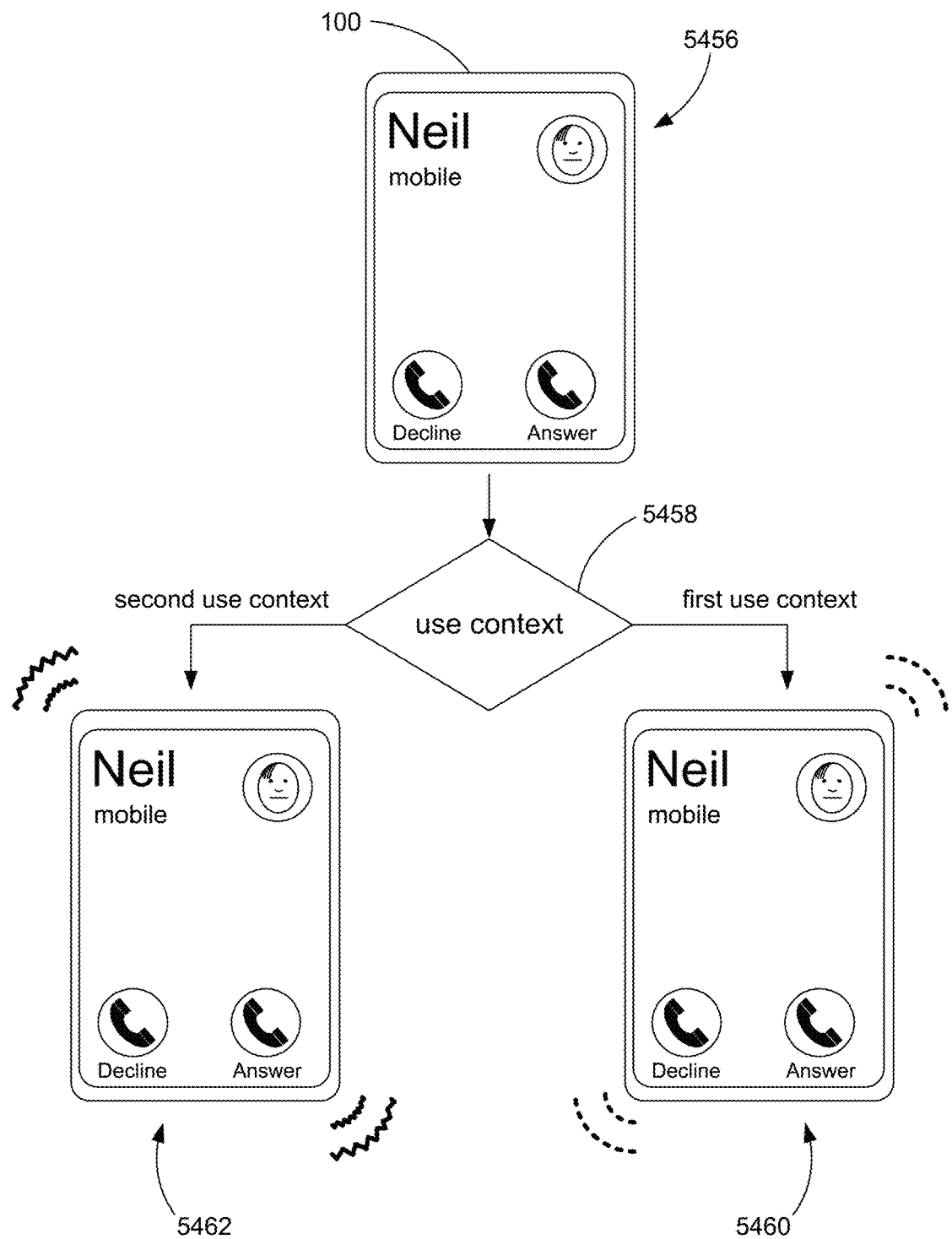
Figure 5D:
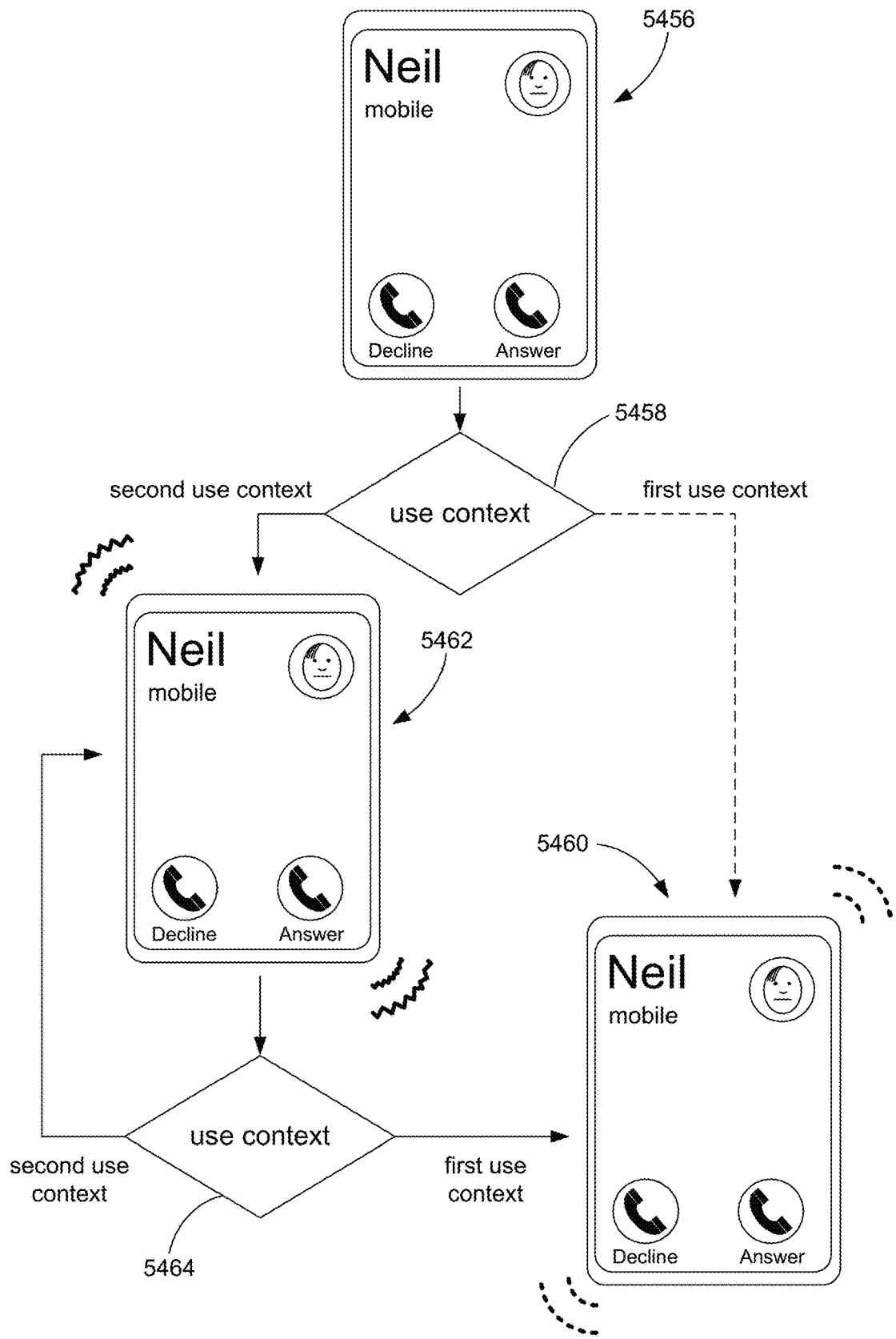
Figure 5E:
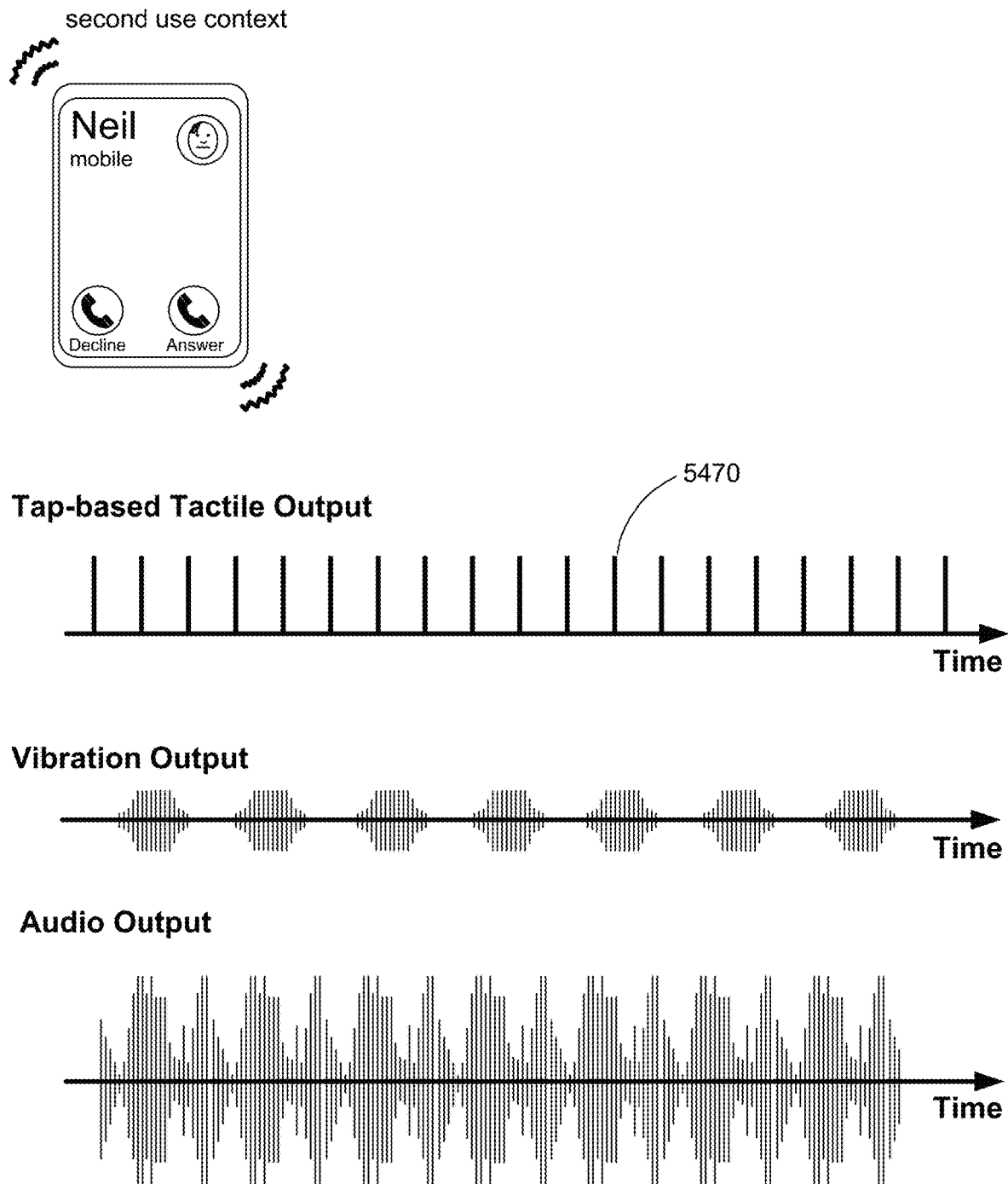
Figure 5F:
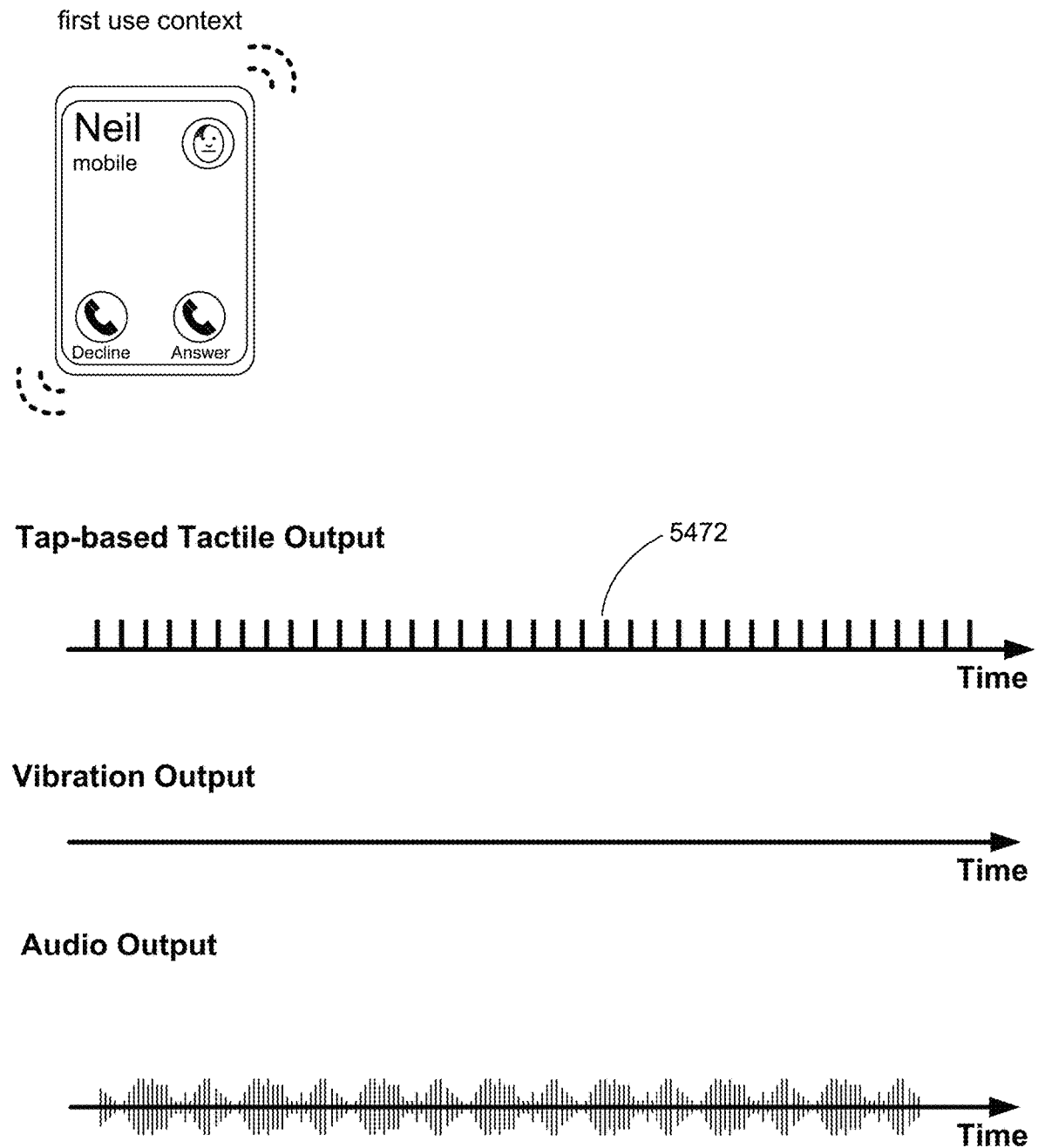
Figure 5H:
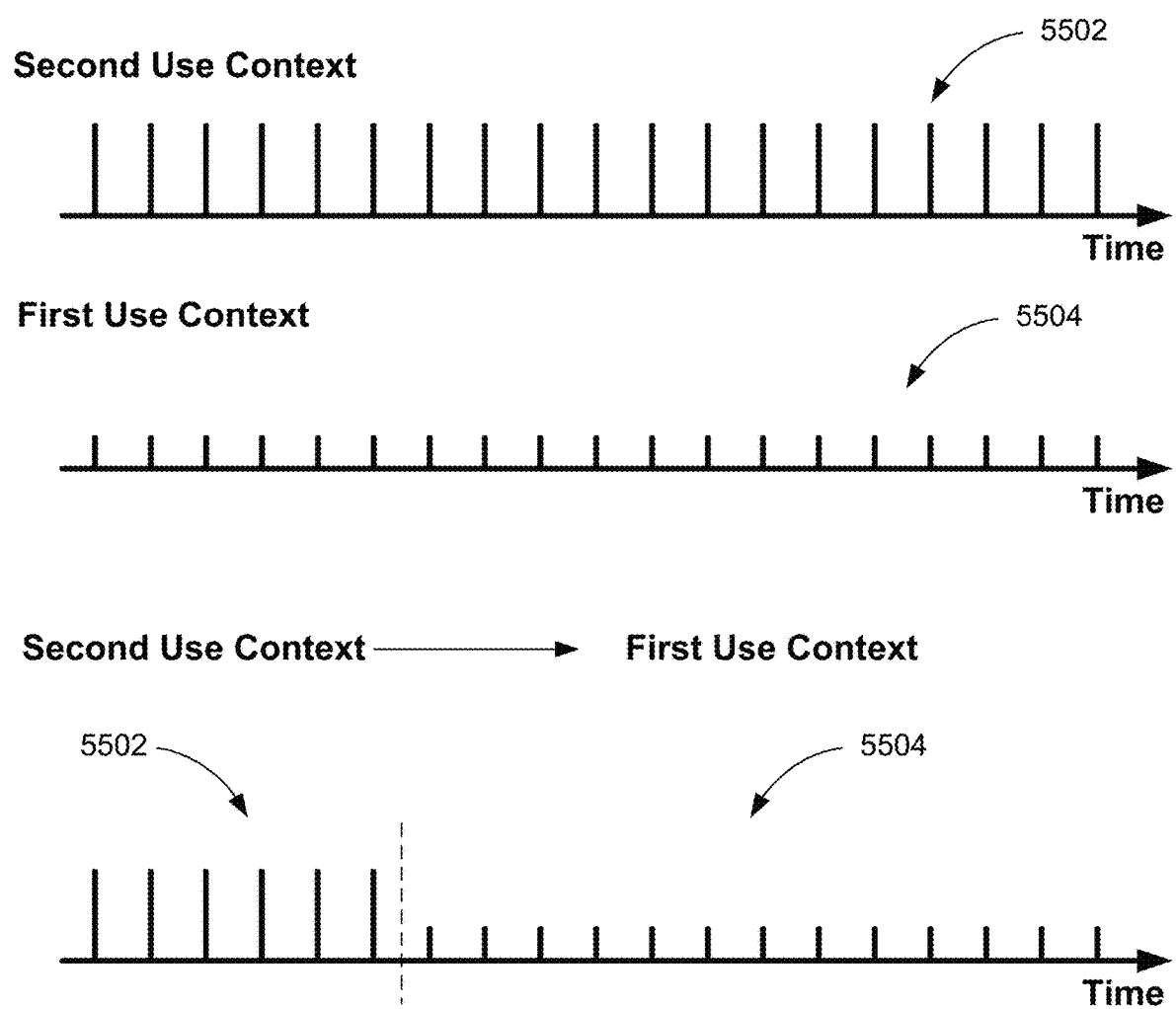
Figure 5I:
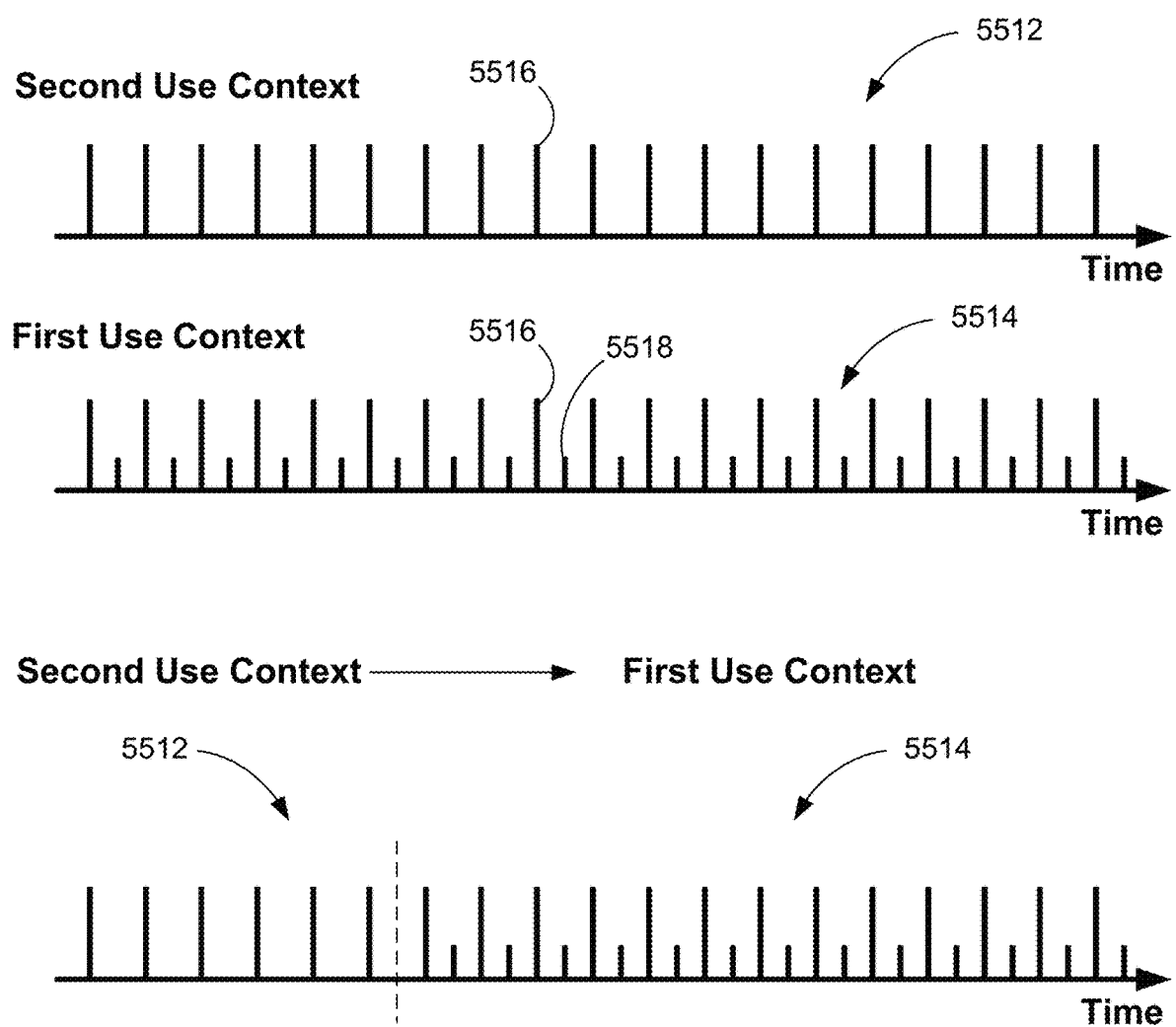

In FIG. 5I, the characteristic intensity of the contact indicated by focus selector 5100 decreases after reaching light press threshold intensity level $IT_L$. In user interface 5126a, a contact is at a position indicated by focus selector 5100 that corresponds to a panel 5108 including a representation of content. At time to, the characteristic intensity of the contact illustrated by focus selector 5100 is below hint threshold intensity level $IT_H$, as indicated at user interface 5126a and intensity meter 5128a. At time $t_1$, the characteristic intensity of the contact increases above hint threshold intensity level $IT_H$, as indicated at user interface 5126b and intensity meter 5128b. At time $t_2$, the characteristic intensity of the contact illustrated by focus selector 5100 increases above threshold intensity level $IT_L$, as indicated at user interface 5126c and intensity meter 5128c. As the characteristic intensity of the contact increases after time to, a tactile output with a first output profile is produced (e.g., a characteristic of the tactile output increases, as indicated at 5110). As the characteristic intensity of the contact increases from above $IT_H$ approaching $IT_L$, user interface 5126b is blurred except for panel 5108, the area of panel 5108 increases, the size of content in panel 5108 increases, and/or the size of content in the user interface outside of panel 5108 decreases. At time $t_2$, a discrete tap is produced, as indicated at 5112. When the characteristic intensity of the contact increases above light press intensity threshold level $IT_L$, as indicated at intensity level meter 5128c at time $t_2$, preview of information corresponding to panel 5108 is shown in a preview area 5114 of user interface 5126c. The characteristic intensity of the contact illustrated by focus selector 5100 subsequently (e.g., at time $t_3$) decreases below threshold intensity level $IT_L$, as indicated at user interface 5126d and intensity meter 5128d. In accordance with a determination that the decrease in the characteristic intensity of the contact is detected after the characteristic intensity of the contact illustrated by focus selector 5100 increased above threshold intensity level $IT_L$, the tactile output with the first output profile is forgone and preview area 5114 is maintained on the display as indicated in user interface 5126d.

Figure 5J:
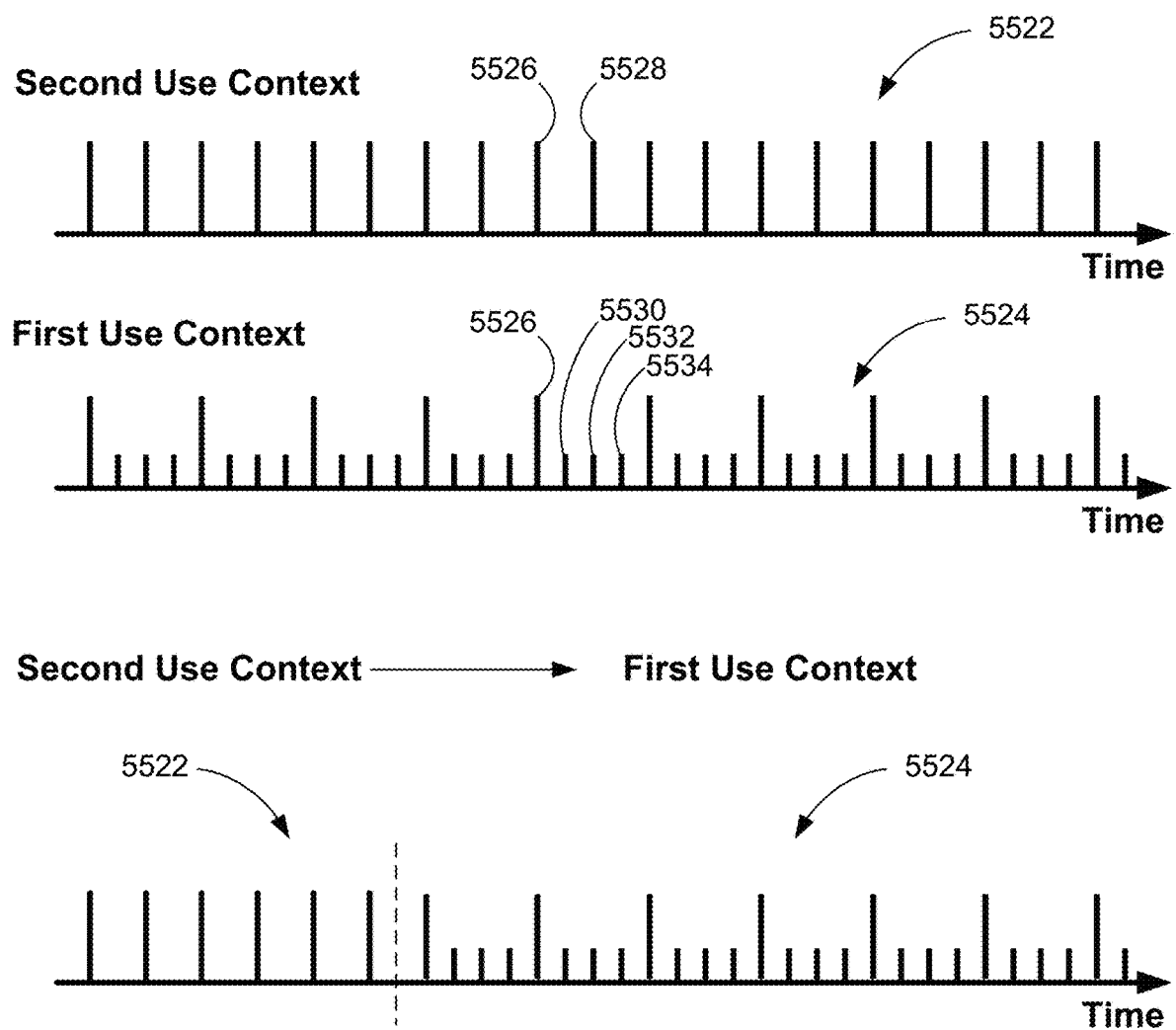
Figure 5K:
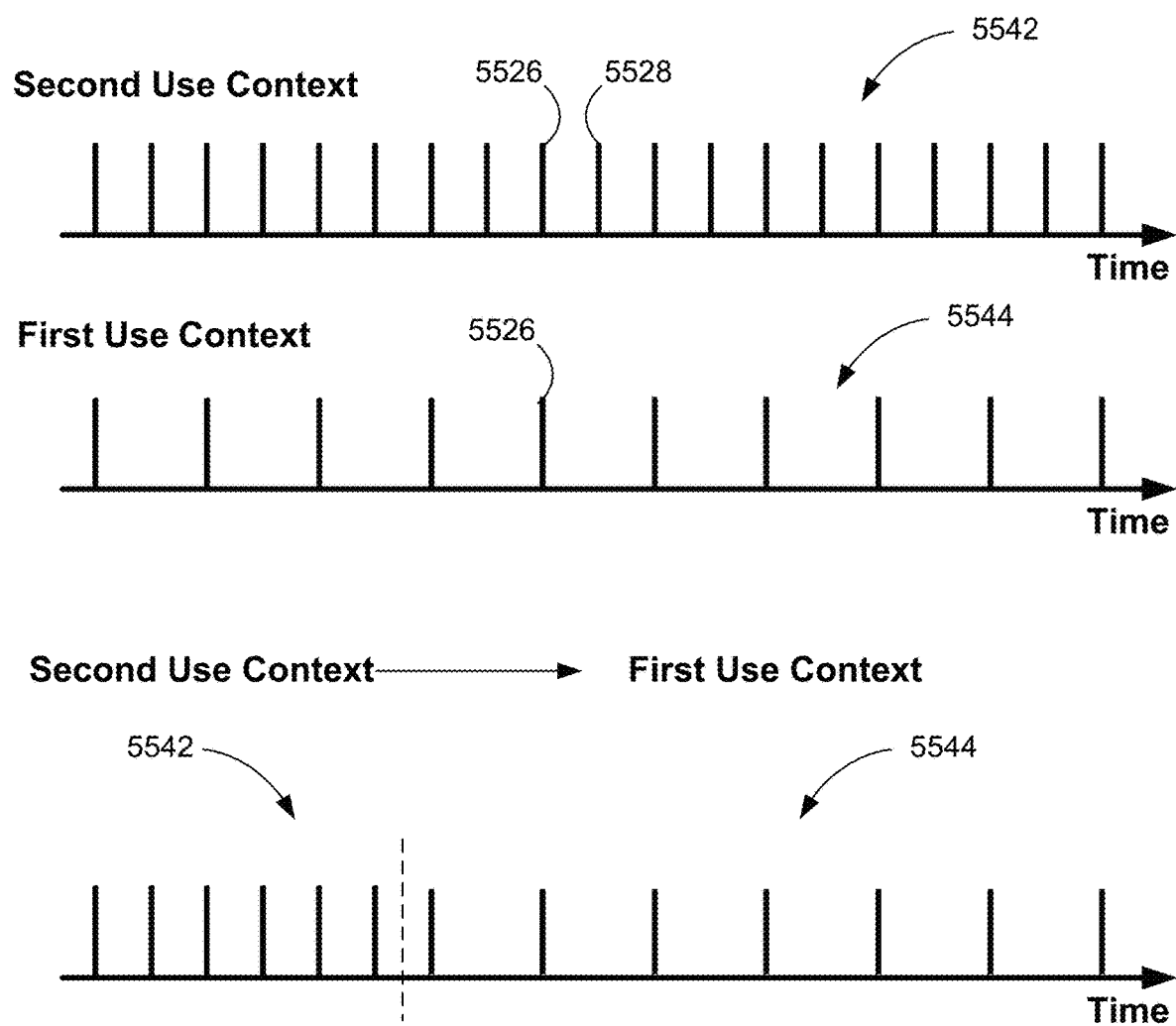
Figure 5L:
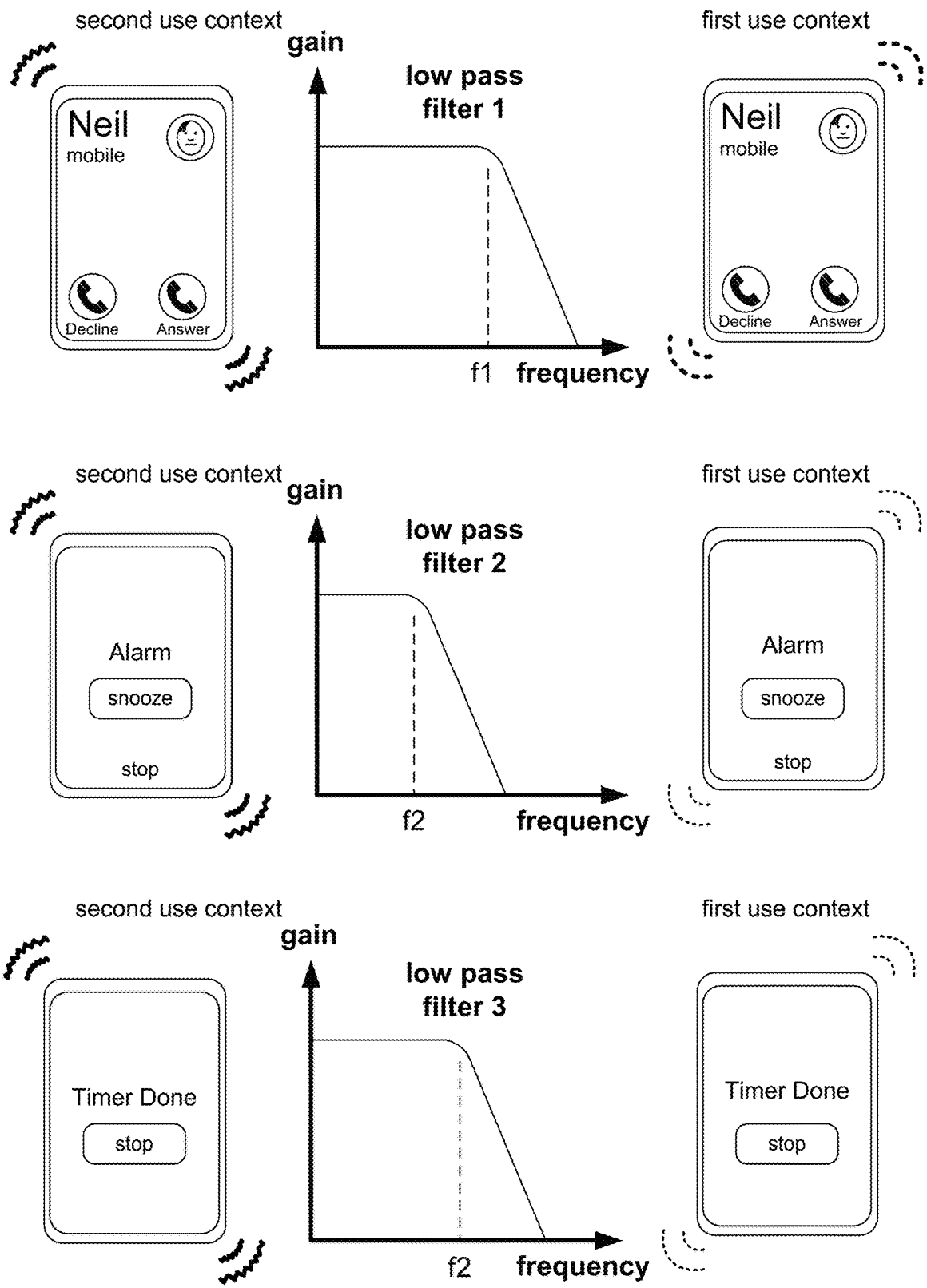
Figure 5N:
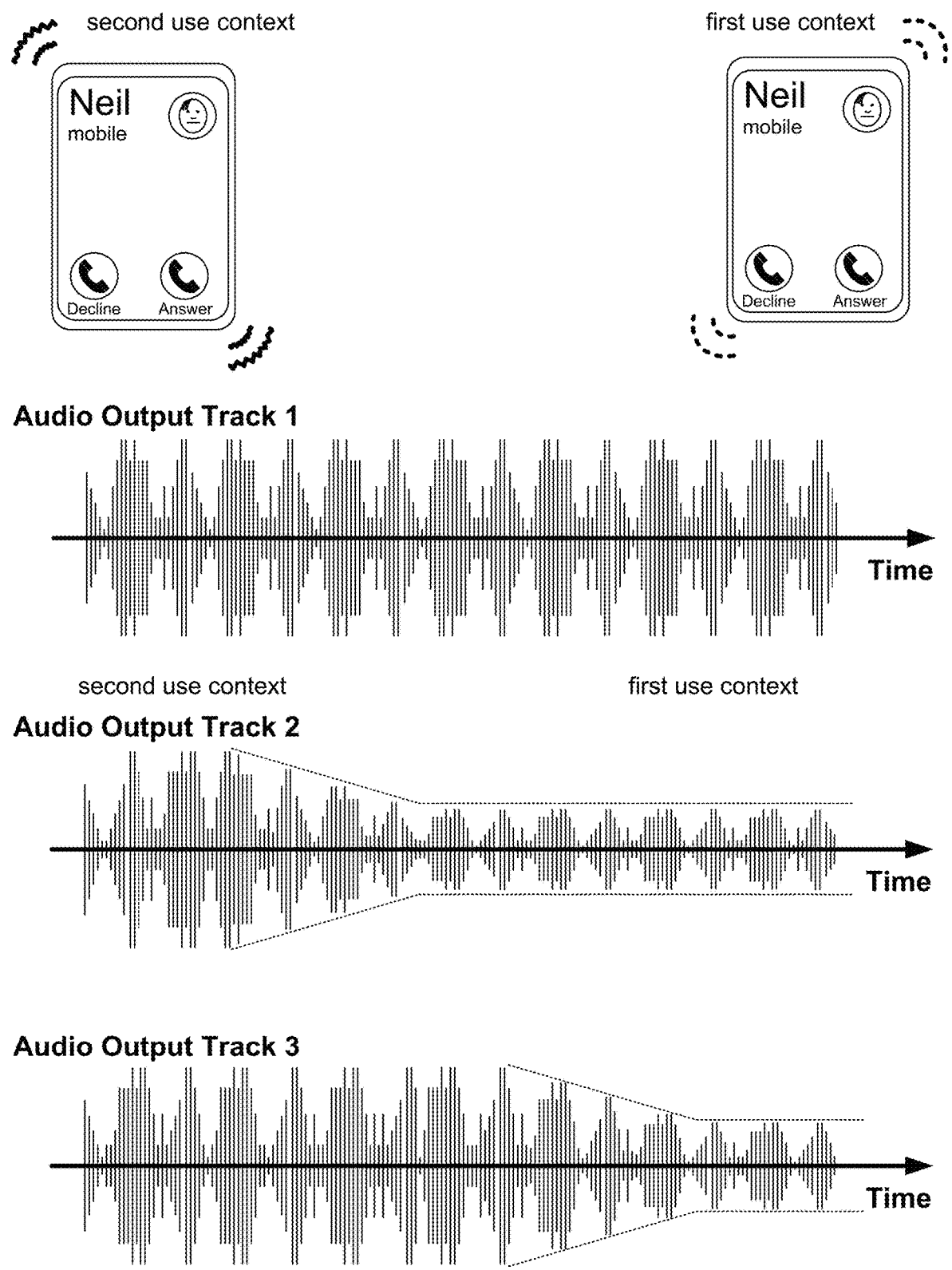
Figure 5O:
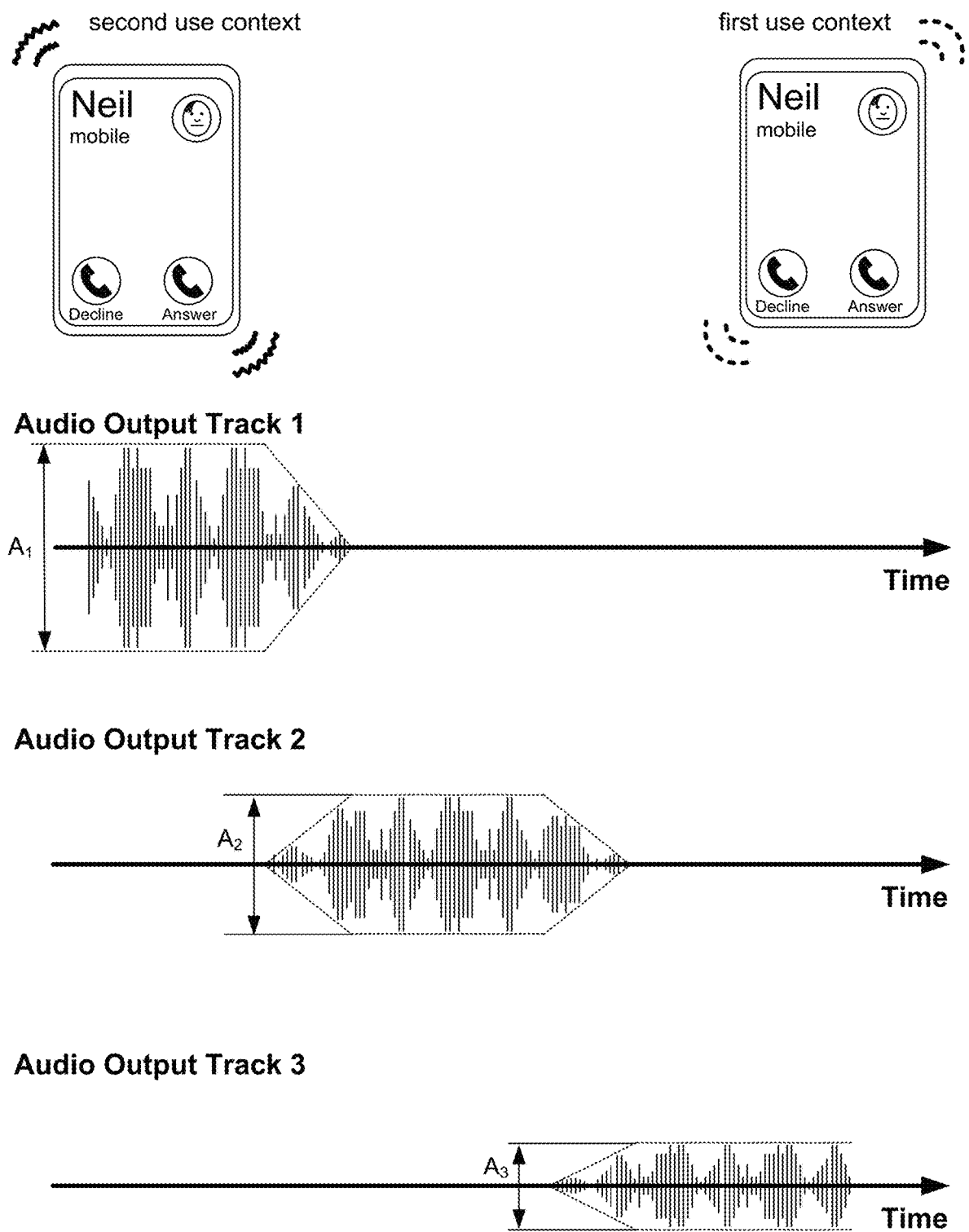
Figure 12A:
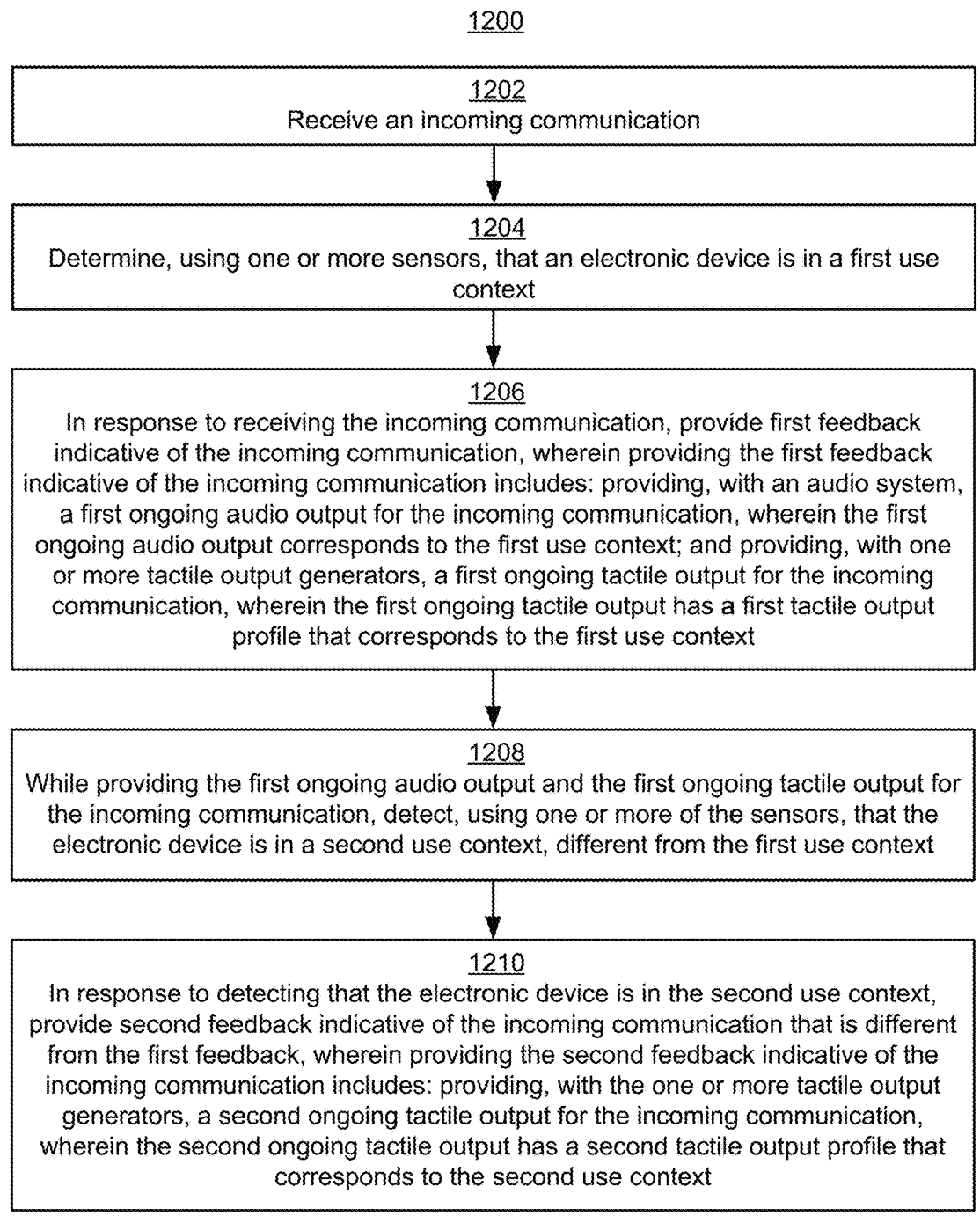
Figure 13A:
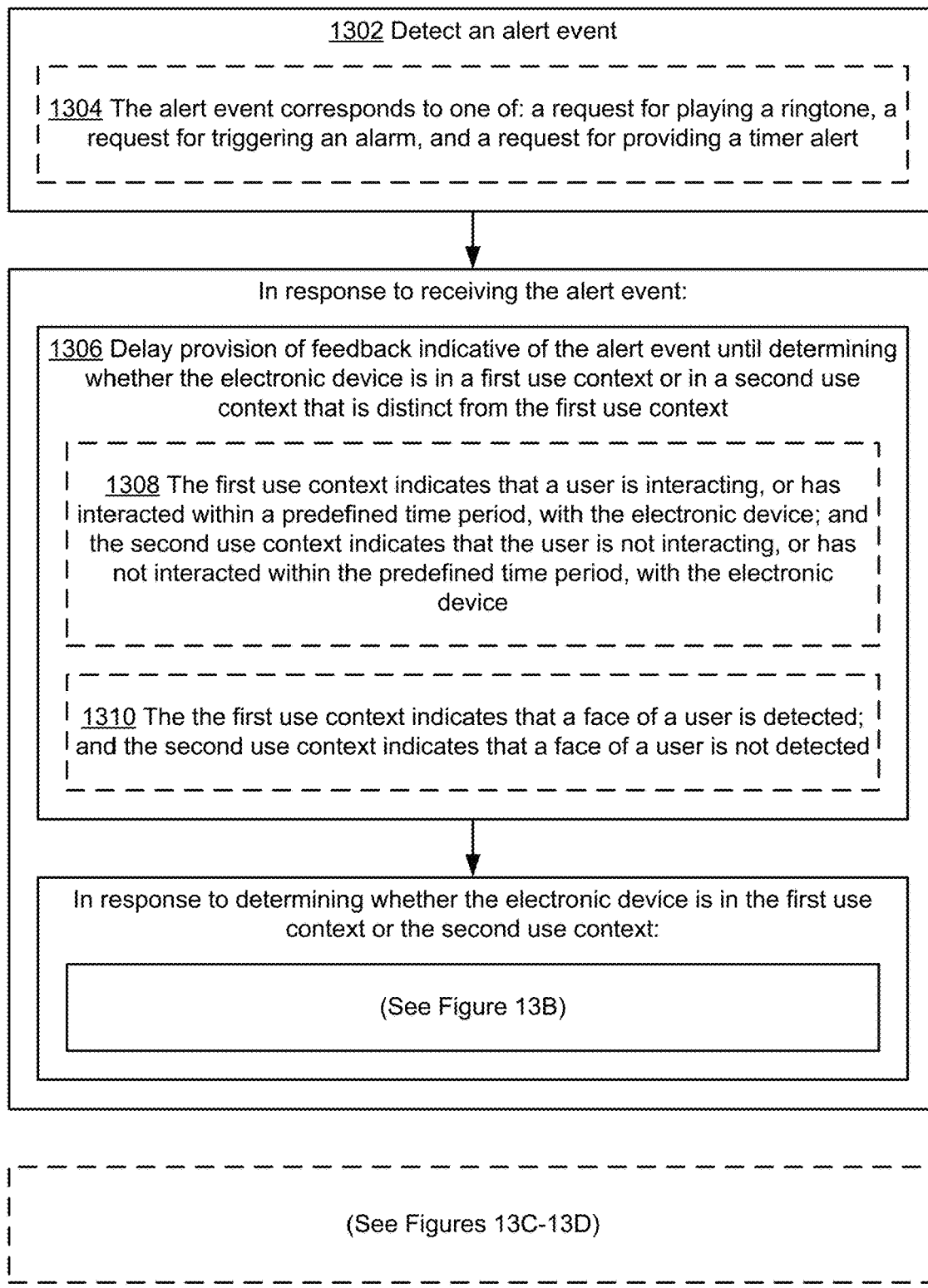

In FIG. 5J, the characteristic intensity of the contact indicated by focus selector 5100 decreases before reaching light press threshold intensity level $IT_L$. In user interface 5130a, a contact is at a position indicated by focus selector 5100 that corresponds to a panel 5108 including a representation of content. At time to, the characteristic intensity of the contact illustrated by focus selector 5100 is below hint threshold intensity level $IT_H$, as indicated at user interface 5130a and intensity meter 5132a. At time $t_1$, the characteristic intensity of the contact increases above hint threshold intensity level $IT_H$, as indicated at user interface 5130b and intensity meter 5132b. As the characteristic intensity of the contact increases from above $IT_H$ approaching $IT_L$, user interface is blurred except for panel 5108, the area of panel 5108 increases, the size of content in panel 5108 increases, and/or the size of content in the user interface outside of panel 5108 decreases. At time $t_2$, the characteristic intensity of the contact illustrated by focus selector 5100 continues increasing above threshold intensity level $IT_H$ without reaching threshold intensity level $IT_L$, as indicated at user interface 5130c and intensity meter 5132c. As the characteristic intensity of the contact increases after time to, a tactile output with a first output profile is produced (e.g., a characteristic of the tactile output increases, as indicated at 5110). The characteristic intensity of the contact illustrated by focus selector 5100 subsequently (e.g., at time $t_3$) decreases, as indicated at user interface 5130d and intensity meter 5132d. In accordance with a determination that the decrease in the characteristic intensity of the contact is detected before the characteristic intensity of the contact met intensity criteria (e.g., increased above threshold intensity level $IT_L$), the tactile output with the first output profile continues to vary in accordance with the proximity of the characteristic intensity of the contact to threshold intensity level $IT_L$. As the characteristic intensity of the contact decreases, the area of panel 5108 decreases, the size of content in panel 5108 decreases, and/or the size of content in the user interface outside of panel 5108 increases, e.g., as indicated at user interface 5130d.

In some embodiments, a set of tactile output profiles as illustrated in FIG. 5K occur as a characteristic intensity of a contact with touch-sensitive display system 112 increases above overpress intensity threshold level $IT_{OP}$. At times $t_0$-$t_3$, the characteristic intensity of the contact increases from below hint threshold intensity level $IT_H$ to above overpress intensity threshold level $IT_{OP}$, as indicated at 5134a, 5134b, 5134c, and 5134d, respectively. Between times $t_0$ and $t_3$, tactile output having an increasing parameter (e.g., amplitude and/or distribution of tactile outputs) is provided, as indicated at 5136. At time $t_4$, when the characteristic intensity of the contact increases above overpress intensity threshold level $IT_{OP}$, as indicated at 5134e, a discrete tap occurs, as indicated at 5138. As the characteristic intensity of the contact continues to increase beyond intensity threshold level $IT_{OP}$, as indicated at 5134f, tactile output having a steady parameter (e.g., a steady amplitude and/or distribution of tactile outputs) is provided, as indicated at 5140.

FIGS. 5L-5N illustrate selection and movement of an application icon, and a series of tactile outputs that correspond to movement of the selected application icon. In FIG. 5L, a contact is detected at touch-sensitive display system 112 at a location indicated by focus selector 5150. In some embodiments, an application icon 5152 is selected in accordance with a determination that selection criteria are met (e.g., focus selector 5150 is at a location corresponding to application icon 5152 for an amount of time exceeding a threshold duration, e.g., 1 second). In some embodiments, when application icon 5152 is selected, movement of focus selector 5150 across touch-sensitive display system 112 causes application icon 5152 to move, as illustrate in FIGS. 5M and 5N. In some embodiments, when application icon 5152 is not selected, movement of focus selector 5150 across touch-sensitive display system 112 causes multiple application icons in user interface 5154 to move, as illustrated in FIG. 5O.

In FIG. 5M, a selected application icon is moved over another application icon. At an initial time $T=t_0$, a contact is detected on touch-sensitive display system 112 when focus selector 5150 is at a location that corresponds to application icon 5152. At a later time $T=t_1$, focus selector 5150 has remained at a location of application icon 5152 for an amount of time that results in selection of application icon 5152. In some embodiments, to provide an indication to the user that an application icon has been selected, tactile output is generated at the time that the application icon becomes selected. For example, as indicated in tactile output graph 5156, a discrete tap 5158 is generated at time $t_1$ at which application icon 5152 has become selected. In some embodiments, as indicated at time $t_1$—$t_4$ of tactile output graph 5156, a series of tactile outputs (e.g., a series of taps 5157, such as a series of taps with a lower amplitude than the amplitude of discrete tap 5158) are generated while application icon 5152 is selected. In some embodiments, one or more visual indications, such as highlighting application icon 5152 (e.g., shading application icon 5152, as indicated in user interface 5154b, 5154c, and 5154d) and animating one or more application icons within user interface 1514 (e.g., a shaking animation, as indicated at 5160), are displayed while application icon 5152 is selected.

When application icon 5152 is selected, application icon 5152 is "picked up" by focus selector 5150 such that application icon 5152 moves in accordance with the movement of focus selector 5150. At a time $T=t_2$, focus selector 5150 and application icon 5152 have moved to the left toward Stocks application icon 5160. At a time $T=t_3$, application icon 5152 passes over Stocks application icon 5160. In some embodiments, when application icon 5152 overlaps (e.g., to a predefined extent) Stocks application icon 5160, a discrete tap 5164 is generated to indicate to a user that application icon 5152 is passing over Stocks application icon 5160 (e.g., as indicated at $t_3$ of tactile output graph 5156).

At a time $T=t_4$, liftoff of the contact from the touch-sensitive surface is detected. In response to liftoff of the contact, application icon 5152 is unselected. In some embodiments, when application icon becomes unselected, a discrete tap 5166 is generated to indicate to a user that unselection of application icon 5152 has occurred (e.g., as indicated at $t_4$ of tactile output graph 5156).

In FIG. 5N, a selected application icon is moved into a folder. At an initial time $T=t_0$, a contact is detected on touch-sensitive display system 112 when focus selector 5150 is at a location that corresponds to application icon 5153, as indicated in user interface 5180a. At a later time $T=t_1$, focus selector 5150 has remained at a location of application icon 5178 for an amount of time that results in selection of application icon 5178, as indicated in user interface 5180b. In some embodiments, to provide an indication to the user that an application icon has been selected, tactile output is generated at the time that the application icon becomes selected. For example, as indicated in tactile output graph 5168, a discrete tap 5170 is generated at time $t_1$ at which application icon 5178 has become selected. In some embodiments, as indicated starting from time $t_1$ of tactile output graph 5168, a series of tactile outputs (e.g., a series of taps 5167, such as a series of taps with a lower amplitude than the amplitude of discrete tap 5170) are generated while application icon 5178 is selected.

At a time $T=t_2$, focus selector 5150 and application icon 5178 have moved to the left, passing over Maps application icon 5182, as indicated in user interface 5180c. In some embodiments, a discrete tap 5172 is generated at time $t_2$ to indicate that application icon 5178 has passed over Maps application icon 5182, as indicated in graph 5168.

At a time $T=t_3$, application icon 5178 enters a region corresponding to folder icon 5184 that includes Stocks application icon 5186 and News application icon 5188, as indicated at user interface 5180*d*. In some embodiments, a discrete tap 5174 is generated at time t₃ to indicate that application icon 5178 has entered a region corresponding to folder 5184, as indicated in graph 5168. In some embodiments, to provide an indication that application icon 5178 has encountered a user interface object that is different from an application icon (e.g., application icon 5178 has encountered a folder 5184 rather than another application icon), the discrete tap 5174 is different (e.g., has a larger amplitude) from discrete tap 5172 that occurred when application icon 5178 passed over Maps application icon 5182.

After application icon 5178 has hovered over folder 5184 for a predetermined period of time, at a time T=t₄, an enlarged view of folder 5184 is displayed, as indicated in user interface 5180*e*. In some embodiments, when folder 5184 is displayed, the user interface displayed in 5180*d* ceases to be displayed. In some embodiments, a discrete tap 5176 is generated to indicate to a user that application icon 5178 has been moved into folder 5184, as indicated at time t₄ of graph 5168. In some embodiments, the discrete tap 5176 associated with displaying application icon 5178 in folder 5184 is different (e.g., has a larger amplitude) from discrete tap 5172 that occurred when application icon 5178 passed over Maps application icon 5182.

In FIG. 5O, because no user interface object is selected, no tactile outputs are generated as the contact moves across the touch-sensitive surface. At an initial time T=t₀, a contact is detected on touch-sensitive display system 112 when focus selector 5150 is at a location that corresponds to application icon 5152, as indicated in user interface 5192*a*. At a later time T=t₀.₅, focus selector 5150 has moved along a path indicated by arrow 5194 to a new position, as indicated in user interface 5192*b*. Because focus selector 5150 has not remained at a location of application icon 5152 for an amount of time that results in selection of application icon 5152, application icon 5152 is not selected. Accordingly, in response to the movement of focus selector 5150 along the path indicated by arrow 5194, multiple application icons, including application icon 5152, move along the path indicated by arrow 5194. At a time T=t₁, in response to movement of focus selector 5150 along a path indicated by arrow 5196, multiple application icons, including application icon 5152, have moved to the left, as indicated in user interface 5192*c*. Tactile output graph 5198 indicates that no tactile outputs occur in response to movement of a contact across touch-sensitive display system 112 when no application icon is selected.

FIGS. 5P-5R illustrate image previews that are displayed as a contact moves along a set of image thumbnails, and a series of tactile outputs that correspond to movement of the contact along the set of image thumbnails. FIGS. 5R-1, 5R-2, 5R-3, 5R-4, 5S-1, and 5S-2, illustrate portion 5208 of user interface 5002, as indicated with a dotted line in FIGS. 5P and 5Q.

In FIG. 5P, a contact is detected at touch-sensitive display system 112 at a location indicated by focus selector 5204. In some embodiments, in accordance with a determination that preview display criteria are met (e.g., focus selector 5204 is at a location corresponding to image thumbnail 5206*a* for an amount of time exceeding a threshold duration, e.g., 1 second), a preview 5206*b* of an image corresponding to image thumbnail 5206*a* is displayed, as shown in FIG. 5Q. In some embodiments, a preview 5206*b* of an image corresponding to an image thumbnail 5206*a* is a view of the image that is larger than the image thumbnail 5206*a*. In some embodiments, preview 5206*b* of the image corresponding to image thumbnail 5206*a* is displayed under and/or above a location of focus selector 5204. In some embodiments, when the preview display criteria are met, a tactile output is generated.

In some embodiments, when the preview display criteria are met, movement of the contact to a location corresponding to another image thumbnail causes a preview of an image corresponding the other image thumbnail to be displayed, as indicated in FIGS. 5R-1, 5R-2, and 5R-3.

In FIG. 5R-1, preview display criteria are met and preview 5206*b* of the image corresponding to image thumbnail 5206*a* is displayed. The contact moves from a first location indicated by focus selector 5204*a* along a path indicated by arrow 5210 to a second location indicated by focus selector 5204*b* in FIG. 5R-2. The second location indicated by focus selector 5204*b* corresponds to the location of image thumbnail 5212*a*. In accordance with a determination that the contact has moved to the second location, a preview 5212*b* of the image corresponding to image thumbnail 5212*a* is displayed. The contact moves from the second location indicated by focus selector 5204*b* along a path indicated by arrow 5214 to a third location indicated by focus selector 5204*c* in FIG. 5R-3. The third location indicated by focus selector 5204*c* corresponds to the location of image thumbnail 5214*a*. In accordance with a determination that the contact has moved to the third location, a preview 5216*b* of the image corresponding to image thumbnail 5216*a* is displayed.

FIG. 5R-4 illustrates tactile output provided as the contact moves across touch-sensitive display system 112 to the locations indicated by focus selectors 5204*a*, 5204*b*, and 5204*c*. Dots 5218*a*, 5218*b*, and 5218*c* represent discrete tactile outputs that occur when the contact is at locations indicated by focus selectors 5204*a*, 5204*b*, and 5204*c*, respectively. In this manner, a series of discrete tactile outputs is output as a contact moves across a series of image thumbnails. In some embodiments, each time the contact moves over a different image thumbnail, a discrete tactile output occurs.

In some embodiments, when preview display criteria are not met, no tactile output is generated. In FIG. 5S-1, preview display criteria are not met (a contact is not at a position indicated by focus selector 5204*a* for an amount of time exceeding a threshold duration). Accordingly, no preview is displayed. As the contact moves across touch-sensitive display system 112 to positions indicated by 5204*b* and 5204*c*, respectively, no previews are displayed, as indicated in FIG. 5S-1, and no tactile output occurs, as indicated FIG. 5S-2.

FIGS. 5T-5U illustrate previews 5220 and 5224 displayed when preview criteria are met and a contact moves across touch-sensitive display system 112 from a first location indicated by focus selector 2226*a* to a second location indicated by focus selector 2226*b* (e.g., in a vertical direction), in accordance with some embodiments. In accordance with a determination that the preview display criteria are met, tactile output is generated (e.g., a discrete tactile output is generated when the contact is at the location indicated by focus selector 2226*a* and a discrete tactile output is generated when the contact is at the location indicated by focus selector 2226*b*). In some embodiments, when scrolling criteria, which are different from the preview display criteria, are met, movement of the contact moves across touch-sensitive display system 112 from the first location indicated by focus selector 2226*a* to the second location indicated by focus selector 2226*b* (e.g., movement of the contact in a vertical direction) causes the plurality of image thumbnails displayed in user interface 5202 to scroll (e.g., scroll vertically), as illustrated at FIGS. 5V-5W.

FIGS. 5X-1 to 5X-3 illustrate simulated objects 5232 that are used to represent communications received by device 100, in accordance with some embodiments. In some embodiments, simulated objects 5232 are, e.g., virtual spheres that "roll" across the surface of device 100. Tactile outputs indicate the movement of the simulated objects 5232 across the device 100 and/or collisions between the simulated objects 5232 and a virtual boundary, such as a boundary that corresponds to one or more edges of the touch-sensitive display system 112. Movements of the simulated objects 5232 and/or collisions between the simulated objects 5232 and a virtual boundary give a user an impression of a number of notifications for communications that were received by device 100 (e.g., communications received by device 100 since the user last activated and/or woke the device).

In FIG. 5X-1, device 100 is held flat in a user's hand 5230. As the user's hand causes device 100 to tilt from the flat position illustrated in FIG. 5X-1 to the tilted position illustrated in FIG. 5X-2 and finally to the upright position illustrated in FIG. 5X-3, the simulated objects 5232 move in response to the movement of the device. For example, movement of device 100 to the upright position illustrated in FIG. 5X-3 causes simulated objects 5232a, 5232b, 5232c, and 5232d to move along paths 5234a, 5234b, 5234c, and 5234d, respectively. In some embodiments, as the simulated objects 5232 move along paths 5234, device 100 outputs a series of tactile outputs to simulate the movement of objects 5232 (e.g., so that the user has the sensation of virtual spheres rolling across device 100 in response to the tilting that occurs between FIG. 5X-1 and FIG. 5X-3). In some embodiments, each time a respective simulated object 5232 reaches an edge of touch-sensitive display system 112 of device 100 (e.g., a respective simulated object 5232 reaches the ends of its respective path 5234, as illustrated in FIG. 5X-3), device 100 outputs a tactile output to simulate the collision of the respective simulated object 5232 with the edge of touch-sensitive display system 112 (e.g., so that the user has the sensation of a virtual sphere bouncing off of lower edge 5236 of touch-sensitive display system 112).

In some embodiments, a respective simulated object 5232 has a quality that depends on at least one property of a corresponding notification. For example, simulated objects 5232a, 5232b, and 5232d correspond to received e-mail messages that are not marked "urgent" and simulated object 5232c (shown shaded) corresponds to a received e-mail message that is marked "urgent." The simulated objects that correspond to the non-urgent notifications have a first property (e.g., a first simulated weight) and the simulated object that corresponds to an urgent notification has a second property that is different from the first property (e.g., a second simulated weight that is greater than the first simulated weight, such that a larger tactile output is produced when simulated object 5232c collides with edge 5236). Examples of simulated qualities of simulated objects that vary in accordance with communication type include, e.g., velocity, acceleration, size, weight, and/or stickiness. Examples of properties of notifications include, e.g., urgency level assigned by the communication sender, priority assigned to the communication by the user, type of notification (e.g., text message, telephone call, e-mail, calendar invitation, reminder, and/or third party application notification), and/or number of notifications of a type.

FIG. 5Y illustrates a simulated surface texture with which simulated objects 5232 interact, in accordance with some embodiments. In FIG. 5Y, simulated surface features 5240 are, e.g., virtual bumps, virtual divots, or other textural features. In some embodiments, the number, arrangement, and/or positions of surface features is different from the example illustration of FIG. 5Y.

Device 100 outputs tactile outputs to simulate collision of simulated objects 5232 with surface features 5240. For example, as device 100 is tilted as shown in FIG. 5Y, simulated objects 5232a, 5232b, 5232c, and 5232d move from right edge 5242 to left edge 5244 along paths 5246a, 5246b, 5246c, and 5246d, respectively. As simulated object 5232a moves along path 5246a, simulated object 5232a encounters surface features 5240a, 5240b, 5240c, 5240d, and so on. Each time simulated object 5232 encounters a respective surface feature 5240, device 100 generates tactile output to provides the user with an impression of the interaction between the simulated object 5232a and the respective surface feature 5240. For example, tactile output is provided to give the user an impression of one or more simulated objects (e.g., virtual spheres) rolling over one or more surface features (e.g., virtual bumps).

FIGS. 5Z, 5AA, and 5BB illustrate tap-based tactile output, vibration output and audio output corresponding to various use contexts of the device, in accordance with some embodiments.

In some embodiments, tap-based tactile output is a sequence of discrete tactile output patterns that reach full amplitude and/or maximum velocity within a first number of cycles of a mass moving relative to an actuator (e.g., 1, 2, or 3) and is optionally actively damped so that it stops moving relative to the actuator instead of gradually oscillating around a resting position (e.g., such as the FullTaps, MiniTaps, and/or MicroTaps described above with reference to FIGS. 4F-4K). Tap-based tactile output, optionally, enables finer, more precise, control of the parameters of the tactile output than vibration output but delivers a lower amplitude or shorter tactile output (per unit energy) than vibration output. In some embodiments, for tap-based tactile output, the location of the moving mass is actively monitored to ensure that the tap-based tactile output is within precise operational parameters, whereas with vibration output the location of the moving mass is not actively monitored, because the operating parameters are less precise. In some embodiments, vibration output is oscillatory tactile output that gradually increases in amplitude over a second number of cycles of a mass moving relative to an actuator (e.g., 5, 10, 15) and then gradually decreases in amplitude over a plurality of cycles of the mass moving relative to the actuator. Vibration output, optionally, enables longer and higher amplitude tactile output (e.g., per unit of energy input) in place of the finer control offered by the tap-based tactile output.

In FIG. 5Z, the device 100 is operating in a first use context, e.g., in a user's hand 5230. Device 100 is receiving an incoming communication (a telephone call from Neil). In some embodiments, device 100 outputs tap-based tactile output, vibration output, and or audio output (e.g., a ringtone) to signal to the user that a communication is incoming. While device 100 is in the user's hand 5230, device 100 outputs a first ongoing tactile output (e.g., as shown in the graph labeled "Tap-based Tactile Output," a series of discrete taps), a first ongoing vibration output (e.g., as shown in the graph labeled "Vibration Output," an oscillation that occurs at periodic intervals), and a first ongoing audio output (e.g., as shown in the graph labeled "Audio Output," an audio waveform).

In FIG. 5AA, the device 100 is operating in a second use context, e.g., in a user's pocket 5250. As device 100 receives an incoming communication while in the user's pocket 5250, device 100 outputs a second ongoing tap-based tactile output. The series of discrete taps shown in the Tap-based Tactile Output graph of FIG. 5AA occur at a frequency that is greater than the frequency of the series of discrete taps shown in FIG. 5Z. As device 100 receives an incoming communication while in the user's pocket 5250, device 100 outputs a second ongoing vibration output. The oscillations in the Vibration Output graph of FIG. 5AA occur at shorter intervals than the intervals of the oscillations of FIG. 5Z. As device 100 receives an incoming communication while in the user's pocket 5250, device 100 outputs a second ongoing audio output. The audio waveform in the Audio Output graph of FIG. 5AA has a higher amplitude than the amplitude of the audio waveform of FIG. 5Z. In this way, the audibility of the audio output is increased such that a user is able to hear the audio output despite sound absorption and/or sound transmission reduction caused by the second use context (e.g., sound absorption and/or sound transmission reduction caused by a pocket in which device 100 is operating).

In FIG. 5BB, the device 100 is operating in a third use context, e.g., lying flat on table 5252. As device 100 receives an incoming communication while on table 5252, device 100 outputs a third ongoing tap-based tactile output. The series of discrete taps shown in the Tap-based Tactile Output graph of FIG. 5BB occur at a frequency that is lower than both the frequency of the series of discrete taps shown in FIG. 5Z and the frequency of the series of discrete taps shown in FIG. 5AA. As device 100 receives an incoming communication while on table 5252, device 100 does not generate vibration output. As device 100 receives an incoming communication while on table 5252, device 100 outputs a third ongoing audio output. The audio waveform in the Audio Output graph of FIG. 5BB is periodically damped, as indicated at 5254.

In some embodiments, device 100 uses one or more sensors to determine that a use context has changed (e.g., from the user's pocket 5250, as illustrated in FIG. 5AA, to in the user's hand 5230, as illustrated in FIG. 5Z). When device 100 is in the user's pocket 5250, the user may desire a louder audio output, more frequent vibration bursts, and/or higher frequency taps to compensate for the muffling effect of containment in pocket 5250. When the device 100 is in the user's hand 5230 (e.g., when the user removes device 100 from pocket 5250 and is holding the device in open air), the user may desire quieter output, less frequent vibration bursts, and/or a lower frequency of taps to avoid excessive noise. When the device 100 is flat on the table 5252, a user may desire damped audio output, no vibration, and/or a very low frequency of taps to avoid excessive rattling of device 100 on the table.

FIGS. 5CC-5OO illustrate example operations of electronic device 100 for providing audio and/or tactile feedback in accordance with some embodiments.

FIG. 5CC illustrates that electronic device 100 detects an alert event (e.g., electronic device 100 generates and/or receives instructions to generate an alert in response to an incoming call, lapse of a preselected time interval, or reaching a particular time), and in response, updates (5456) its display (e.g., displays a user interface corresponding to telephone module 138).

FIG. 5CC also illustrates that audio and/or tactile feedback is not provided until after electronic device 100 determines (5458) a use context of electronic device 100. For example, in some embodiments, electronic device 100 forgoes providing audio and/or tactile feedback when electronic device 100 updates (5456) its display (and subsequently provides audio and/or tactile feedback once the determination is made).

Subsequent to detecting an alert event, electronic device 100 determines (5458) a use context of electronic device 100. In some embodiments, electronic device 100 determines whether electronic device 100 is in either a first use context (e.g., a context in which a user of electronic device 100 is determined to be paying attention to electronic device 100, such as electronic device 100 is held by a user and actively receiving user inputs) or a second use context (e.g., a context in which a user of electronic device 100 is determined not to be paying attention to electronic device 100, such as electronic device 100 is stored in a pocket or left on a surface away from the user). For example, electronic device 100 determines which use context electronic device 100 is in between the first use context and the second use context (e.g., electronic device 100 is in one of only two use contexts that include the first use context and the second use context). In some embodiments, electronic device 100 determines which use context electronic device 100 is in among three or more use contexts that include the first use context and the second use context. In some embodiments, a user is determined to be paying attention to the device based on one or more sensor inputs (e.g., in accordance with a determination that a face of the user is in a field of view of a camera of the device, in accordance with a determination that a gaze of a user of the device is directed to a display of the device based image data from a camera of the device, in accordance with a determination that the device has been or is being lifted up based on an accelerometer or gyroscope of the device, or in accordance with a determination that the device has been or is being removed from a pocket, bag, or other enclosure based on a proximity sensor or camera). In some embodiments, the user is determined not to be paying attention to the device based on one or more sensor inputs (e.g., in accordance with a determination that a face of the user is not in a field of view of a camera of the device, in accordance with a determination that a gaze of a user of the device is not directed to a display of the device based image data from a camera of the device, in accordance with a determination that the device has been detected to be stationary for more than a threshold amount of time indicating that the device is not being held by a user based on an accelerometer or gyroscope of the device, and/or in accordance with a determination that the device has been or is being in a pocket, bag, or other enclosure based on a proximity sensor or camera of the device).

Electronic device 100, in accordance with a determination that electronic device 100 is in the first use context (e.g., a context in which a user of electronic device 100 is determined to be paying attention to electronic device 100), electronic device 100 provides (5460) first feedback (e.g., a first audio output and/or a first tactile output) to indicate the alert event.

Electronic device 100, in accordance with a determination that electronic device 100 is in the second use context (e.g., a context in which a user of electronic device 100 is determined not to be paying attention to electronic device 100), electronic device 100 provides (5462) second feedback (e.g., a second audio output and/or a second tactile output) to indicate the alert event.

The second feedback is distinct from the first feedback (e.g., the second audio output is distinct from the first audio output, and/or the second tactile output is distinct from the first tactile output). For example, while electronic device 100 is in the second use context (e.g., a user of electronic device 100 is not paying attention to electronic device 100), electronic device 100 provides the second audio output and/or the second tactile output to draw the attention of the user, and while device 100 is in the first use context (e.g., a user of electronic device 100 is paying attention to electronic device 100), electronic device 100 provides reduced audio and/or tactile feedback (e.g., the first audio output and/or the first tactile output), as the volume of the second audio output and/or the amplitude of the second tactile output is not required to draw the user's attention. While electronic device 100 is in the first use context, the first audio output that has a lower volume than the second audio output and/or the first tactile output that has a lower amplitude than the second tactile output is provided, because the user is already paying attention to electronic device 100.

FIG. 5DD illustrates that, in some embodiments, subsequent to initiating provision (5462) of the second feedback, electronic device 100 determines again (5464) a use context of electronic device 100. For example, while electronic device 100 is providing the second feedback, electronic device 100 continues to monitor whether electronic device 100 has transitioned from the second use context to the first use context (e.g., while electronic device 100 is providing the second feedback, electronic device 100 repeats determination of whether a user who was not paying attention to the device is now paying attention to the device).

FIG. 5DD also illustrates that, in accordance with a determination that electronic device 100 remains in the second use context, electronic device 100 continues to provide the second feedback (e.g., while electronic device 100 remains in the second use context, electronic device 100 continues to provide the second feedback until feedback termination criteria are satisfied, such as outputting a ringtone for a predefined number of times or for a predefined time interval).

FIG. 5DD further illustrates that, in accordance with a determination that electronic device 100 has transitioned from the second use context to the first use context, electronic device 100 transitions from providing (5462) the second feedback to providing (5460) the first feedback (e.g., electronic device 100 ceases to provide the second feedback and initiates to provide the first feedback).

FIG. 5EE illustrates the second feedback provided by electronic device 100. The second feedback includes second audio output and/or second tactile output (e.g., second tap-based tactile output and/or second vibration output). The second audio output has second audio amplitude (that is greater than first audio amplitude of the first audio output shown in FIG. 5FF). In FIG. 5EE, the second tactile output includes a plurality of discrete tactile output components 5470 (e.g., tap-based tactile output components) having second tactile output amplitude (e.g., FullTaps shown in FIGS. 4F and 4I) and a second time interval. In FIG. 5EE, the second tactile output also includes vibration outputs.

FIG. 5FF illustrates the first feedback provided by electronic device 100. The first feedback includes first audio output and/or first tactile output (e.g., first tap-based tactile output and/or second vibration output). The first audio output has first audio amplitude that is less than the second audio amplitude of the second audio output (shown in FIG. 5EE). In FIG. 5FF, the first tactile output includes a plurality of discrete tactile output components 5472 (e.g., tap-based tactile outputs) having first tactile output amplitude less than the second tactile output amplitude (e.g., MiniTaps or MicroTaps shown in FIGS. 4G-4H and 4J-4K) and having a first time interval that is shorter than the second time interval (e.g., the first tactile output has a higher frequency of discrete tap-based tactile outputs than the second tactile output). In FIG. 5FF, the first tactile output does not include vibration outputs. However, in some other embodiments, the first tactile output includes vibration outputs.

FIG. 5GG illustrates transition of electronic device 100 from providing the second feedback to the first feedback in accordance with some embodiments. In FIG. 5GG, the tap-based tactile output changes from the second tap-based tactile output (having the second tap-based tactile output amplitude) to the first tap-based tactile output (having the first tap-based tactile output amplitude less than the second tap-based tactile output amplitude). FIG. 5GG also shows that electronic device 100 transitions from providing vibration outputs as part of the second tactile output to ceasing to provide vibration outputs as the first tactile output does not include vibration outputs. FIG. 5GG further shows that electronic device 100 transitions from providing the second audio output that has the second audio amplitude to providing the first audio output that has the first audio amplitude that is less than the second audio amplitude. As shown in FIG. 5GG, the audio output changes gradually (e.g., linearly or nonlinearly) from the second amplitude to the first amplitude over a first period of time, $t_1$. The tactile output (including the tap-based tactile output) changes from the second tactile output to the first tactile output over a second period of time, $t_2$, that is less than the first period of time, $t_1$. In some embodiments, as shown in FIG. 5GG, electronic device 100 transitions from determining that electronic device 100 has transitioned from the second use context to the first use context to providing the first audio output over a period of time $t_1'$, and transitions from determining that electronic device 100 has transitioned from the second use context to the first use context to providing the first tactile output over a period of time $t_2'$ that is less than the period of time $t_1$ Instead of immediately transitioning from providing the second audio output to providing the first audio output, electronic device 100 transitions gradually from providing the second audio output to providing the first audio output over a period of time, thereby providing smooth audio transition from the second audio output to the first audio output and providing improved user experience.

FIGS. 5HH-5KK illustrate example tap-based tactile outputs for the first use context and the second use context in accordance with some embodiments.

FIG. 5HH illustrates that tap-based tactile output 5502 is provided while electronic device 100 is in the second use context (e.g., a context in which a user of the device is determined not to be paying attention to the device) and tap-based tactile output 5504 is provided while electronic device 100 is in the first use context (e.g., a context in which a user of the device is determined to be paying attention to the device). Tap-based tactile output 5502 includes a plurality of tap-based tactile output components having a second tactile output amplitude (e.g., FullTaps shown in FIGS. 4F and 4I) and a second time interval. Tap-based tactile output 5504 includes a plurality of tap-based tactile output components having a first tactile output amplitude less than the second tactile output amplitude (e.g., MiniTaps or MicroTaps shown in FIGS. 4G-4H and 4J-4K) and the same second time interval.

FIG. 5HH also illustrates transition from providing tap-based tactile output 5502 to providing tap-based tactile output 5504 in conjunction with the transition of electronic device 100 from the second use context to the first use context.

FIG. 5II illustrates that tap-based tactile output 5512 is provided while electronic device 100 is in the second use context (e.g., a context in which a user of the device is determined not to be paying attention to the device) and tap-based tactile output 5514 is provided while electronic device 100 is in the first use context (e.g., a context in which a user of the device is determined to be paying attention to the device). Tap-based tactile output 5512 includes a plurality of tap-based tactile output components 5516 having a second tactile output amplitude (e.g., FullTaps shown in FIGS. 4F and 4I) and a second time interval. Tap-based tactile output 5514 includes the plurality of tap-based tactile outputs having a first time interval that is shorter than the second time interval (e.g., tap-based tactile output 5514 has a higher frequency of tap-based tactile output components than tap-based tactile output 5512). In particular, tap-based tactile output 5514 includes the plurality of tap-based tactile output components 5516 and also includes a plurality of tap-based tactile output components 5518 having a first tactile output amplitude that is less than the second tactile output amplitude (e.g., MiniTaps or MicroTaps shown in FIGS. 4G-4H and 4J-4K) between tap-based tactile output components 5516.

FIG. 5II also illustrates transition from providing tap-based tactile output 5512 to providing tap-based tactile output 5514 in conjunction with the transition of electronic device 100 from the second use context to the first use context.

FIG. 5JJ illustrates that tap-based tactile output 5522 is provided while electronic device 100 is in the second use context (e.g., a context in which a user of the device is determined not to be paying attention to the device) and tap-based tactile output 5524 is provided while electronic device 100 is in the first use context (e.g., a context in which a user of the device is determined to be paying attention to the device). Tap-based tactile output 5522 includes a plurality of tap-based tactile output components 5526 and 5528 having a second tactile output amplitude (e.g., FullTaps shown in FIGS. 4F and 4I). Tap-based tactile output 5524 includes the plurality of tap-based tactile output components 5526 and also includes a plurality of tap-based tactile output components 5530, 5532, and 5534 having a first tactile output amplitude that is less than the second tactile output amplitude (e.g., MiniTaps or MicroTaps shown in FIGS. 4G-4H and 4J-4K). In particular, tap-based tactile output component 5528 having the second tactile output amplitude is replaced with tap-based tactile output component 5532 having the first tactile output amplitude (e.g., tap-based tactile output 5524 does not include tap-based tactile output components 5528).

FIG. 5JJ also illustrates transition from providing tap-based tactile output 5522 to providing tap-based tactile output 5524 in conjunction with the transition of electronic device 100 from the second use context to the first use context.

FIG. 5KK illustrates that tap-based tactile output 5542 is provided while electronic device 100 is in the second use context (e.g., a context in which a user of the device is determined not to be paying attention to the device) and tap-based tactile output 5544 is provided while electronic device 100 is in the first use context (e.g., a context in which a user of the device is determined to be paying attention to the device). Tap-based tactile output 5542 includes a plurality of tap-based tactile output components 5526 and 5528 having a second tactile output amplitude (e.g., FullTaps shown in FIGS. 4F and 4I). Tap-based tactile output 5544 includes the plurality of tap-based tactile output components 5526 (e.g., FullTaps). In tap-based tactile output 5544, tap-based tactile output components 5528 are omitted.

FIG. 5KK also illustrates transition from providing tap-based tactile output 5542 to providing tap-based tactile output 5544 in conjunction with the transition of electronic device 100 from the second use context to the first use context.

FIG. 5LL illustrates that a filter is used to obtain the first audio output from the second audio output (e.g., the first audio output corresponds to an output obtained by applying the filter to the second audio output). In some embodiments, the filter is a low pass filter. In some embodiments, the filter is a high pass filter, a band pass filter, or any other filter (e.g., a digital filter).

FIG. 5LL also illustrates that different filters (e.g., low pass filter 1 having a cutoff frequency f1, low pass filter 2 having a cutoff frequency f2 that is different from the cutoff frequency f1, or low pass filter 3 having a cutoff frequency f3 that is different from the cutoff frequencies f1 and f2) are selected depending on the content of the second audio output.

In some embodiments, the content of the second audio output is determined based on frequency components of the second audio output. For example, low pass filter 1 (having a high cutoff frequency) is selected for an audio output having dominantly treble components, and low pass filter 2 (having a low cutoff frequency) is selected for an audio component having dominantly bass components.

In some embodiments, the content of the second audio output is determined based on a type of the alert event (e.g., whether the alert event is associated with an incoming call, an alarm, or a timer). For example, as shown in FIG. 5LL, low pass filter 1 is used to obtain the first audio output from the second audio output when the second audio output is associated with an incoming call, low pass filter 2 is used to obtain the first audio output from the second audio output when the second audio output is associated with an alarm, and low pass filter 3 is used to obtain the first audio output from the second audio output when the second audio output is associated with a timer.

Although FIG. 5LL describes an application of a filter to an audio output, a filter can be applied to a tactile output in an analogous manner. For brevity, such details are omitted herein.

FIG. 5MM illustrates that an audio output (e.g., the second audio output and the first audio output) includes a plurality of audio output tracks (e.g., audio output track 1, audio output track 2, and audio output track 3). FIG. 5MM also illustrates that during the transition of electronic device 100 from providing the second audio output to providing the first audio output, a particular audio output track (e.g., audio output track 2) is removed. For example, an amplitude of audio output track 2 is gradually (e.g., linearly or nonlinearly) reduced until audio output track 2 is completely tuned out (e.g., silenced). Optionally, another audio output track (e.g., audio output rack 3) is concurrently, or subsequently, tuned out (e.g., silenced). In some embodiments, the audio output includes more than three audio output tracks.

FIG. 5NN illustrates that during the transition of electronic device 100 from providing the second audio output to providing the first audio output, an amplitude of a particular audio output track (e.g., audio output track 2) is reduced without completely silencing the particular audio output track (e.g., the reduced amplitude of the particular audio output track is greater than zero). FIG. 5NN also illustrates that, subsequent to reducing the amplitude of the particular audio output track (e.g., audio output track 2), an amplitude of another audio output track (e.g., audio output track 3) is reduced. In some embodiments, the audio output includes more than three audio output tracks. In some embodiments, an amplitude of yet another audio output track is concurrently, or subsequently, reduced (e.g., when the audio output includes four audio output tracks, an amplitude of the fourth audio output track is reduced concurrently with, or subsequently to, reducing the amplitude of the third audio output track).

FIG. 5OO illustrates that during the transition of electronic device 100 from providing the second audio output to providing the first audio output, audio output track 1 is provided. Subsequently, audio output track 1 is tuned out and audio output track 2 is provided. Thereafter, audio output track 2 is tuned out and audio output track 3 is provided. This progressive switching between audio tracks provides smooth transition between the second audio output (e.g., an audio output that includes audio output track 1) and the first audio output (e.g., an audio output that includes audio output track 3).

In some embodiments, as shown in FIG. 5OO, audio output track 1 has first amplitude $A_1$, audio output track 2 has second amplitude $A_2$ that is less than first amplitude $A_1$, and audio output track 3 has third amplitude $A_3$ that is less than second amplitude $A_2$. Thus, as electronic device 100 transitions from audio output track 1 to audio output track 2, and subsequently to audio output track 3, the volume of an audio output generated by electronic device 100 is progressively reduced.

In some embodiments, audio output track 1 corresponds to a first musical instrument, audio output track 2 corresponds to a second musical instrument, and audio output track 3 corresponds to a third musical instrument.

In some embodiments, the second audio output includes audio output track 1, audio output track 2, and audio output track 3. During the transition of electronic device 100 from providing the second audio output to providing the first audio output, electronic device 100 sequentially tunes out audio output track 1 and audio output track 2 (e.g., electronic device 100 first tunes out audio output track 1 while maintaining audio output track 2 and audio output track 3, and subsequently tunes out audio output track 2 while maintaining audio output track 3).

FIGS. 6A-6C are flow diagrams illustrating a method 600 of outputting tactile outputs based on progress adjusting adjustable controls, in accordance with some embodiments. The method 600 is performed at an electronic device (e.g., device 300, FIG. 3, or portable multifunction device 100, FIG. 1A) with a display, a touch-sensitive surface, optionally one or more sensors to detect intensity of contacts with the touch-sensitive surface, and one or more tactile output generators. In some embodiments, the display is a touch-screen display and the touch-sensitive surface is on or integrated with the display. In some embodiments, the display is separate from the touch-sensitive surface. Some operations in method 600 are, optionally, combined and/or the order of some operations is, optionally, changed.

As described below, the method 600 provides an intuitive way to adjust a value using an adjustable control. The method provides the user with tactile output such that the user better understands the effect of operating the control while performing an adjustment, thereby creating a more efficient human-machine interface.

The device displays (602), on the display (e.g., touch-sensitive display system 112), a user interface (e.g., a media playback interface, such as user interface 5002, as shown in FIG. 5A) that includes: a first adjustable control (e.g., playback position adjustment control 5004) and a second adjustable control (e.g., volume adjustment control 5006).

The device detects movement (604) of a first contact across the touch-sensitive surface in a drag gesture (e.g., along a path indicated by arrow 5018, as shown in FIGS. 5B-1 and 5B-2; along a path indicated by arrow 5028, as shown in FIGS. 5C-1, 5C-3, and 5C-3; or along a path indicated by arrow 5074, as shown in FIGS. 5E-1 and 5E-2).

In accordance with a determination that the drag gesture is performed while a focus selector (e.g., a focus selector 5016 as indicated at 5016*a* and 5016*b* of FIGS. 5B-1 and 5B-2) is at a location that corresponds to the first adjustable control 5004 (e.g., the drag gesture is performed by a contact indicated by focus selector 5016 on a touch-sensitive display 112 while the contact is at a location corresponding to a first draggable icon 5020 for a first slider 5021, or the drag gesture is performed by a contact on a touch-sensitive surface while a cursor or other pointer is at a location corresponding to a first draggable icon 5020 for a first slider 5021) the device: adjusts (606) the first adjustable control 5004 in accordance with the movement of the first contact in the drag gesture (e.g., moving a first draggable icon 5020 across the touch-sensitive display 112 to adjust a value of a parameter that corresponds to the first adjustable control 5004, such as a playback position parameter); and outputs (606), with the one or more tactile output generators 167, a first plurality of tactile outputs (e.g., as represented by the row of lines shown at 5022). A respective tactile output (e.g., as represented by the line shown at 5023), in the first plurality of tactile outputs, is triggered based on progress adjusting the first adjustable control 5004 (e.g., based on progress of the first draggable icon 5020 across the display, such as when the focus selector 5016 is at a respective predefined location in the first slider on the display). The first plurality of tactile outputs has a first distribution of tactile outputs as the first adjustable control 5021 is adjusted (e.g., a first spatial distribution of tactile output triggers along a path of the first draggable icon).

In accordance with a determination that the drag gesture is performed while the focus selector (e.g., a focus selector 5026 as indicated at 5026*a* and 5026*b* of FIGS. 5C-1, 5C-2, and 5C-3) is at a location that corresponds to the second adjustable control 5006 (e.g., the drag gesture is performed by a contact indicated by focus selector 5026 on a touch-sensitive display 112 while the contact is at a location that corresponds to a second draggable icon 5030 for a second slider 5032, or a drag gesture is performed by a contact on a touch-sensitive surface while a cursor or other pointer is at location that corresponds to a second draggable icon 5030 for a second slider 5032) the device: adjusts (608) the second adjustable control 5006 in accordance with the movement of the first contact in the drag gesture (e.g., moving a second draggable icon 5030 across the display 112 to adjust a value of a parameter that corresponds to the second adjustable control 5006, such as a volume level); and outputs (608), with the one or more tactile output generators, a second plurality of tactile outputs (e.g., as represented by the row of lines shown at 5034). A respective tactile output, in the second plurality of tactile outputs, is triggered based on progress adjusting the second adjustable control (e.g., based on progress of the second draggable icon 5030 along the volume slider 5032, such as when the focus selector 5026 is at a respective predefined location in the second slider on the display). The second plurality of tactile outputs has a second distribution of tactile outputs that is different from (e.g., less than or greater than) the first distribution of tactile outputs as the second adjustable control is adjusted. For example, a density of tactile output triggers along a path of the second draggable icon 5030 (e.g., a density of tactile output triggers along volume slider 5032) is less that a density of tactile output triggers along a path of the first draggable icon 5020 (e.g., a density of tactile output triggers along playback position slider 5021), or vice versa. In some embodiments, as shown in FIGS. 5B-2 and 5C-3, the locations 5038 along the volume slider 5032 that trigger tactile outputs are more widely spaced than the locations 5022 along the progress bar 5021 that trigger tactile outputs.

Outputting a second plurality of tactile outputs that has a second distribution of tactile outputs that is different from the first distribution of tactile outputs as the second adjustable control is adjusted provides the user with feedback about the type of control being used, which control among multiple controls is being used, and/or the extent of the adjustment that is being made. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first adjustable control 5004 is (610) a progress control 5021 for selecting a position within content (e.g., a content scrubber control with a draggable progress icon 5020 that is configured to adjust a playback position in media content being played back) and the second control 5006 is a volume control 5032 for controlling volume of the content while it is playing (e.g., a control with a draggable volume slider icon 5030 that is configured to adjust the volume at which the media content is played back). In some embodiments, content includes, e.g., audio and/or video content.

In some embodiments, the first plurality of tactile outputs 5022 includes (612) an endpoint tactile output 5058, as shown in FIG. 5D-2, that is provided in accordance with a determination that the first adjustable control 5020 has reached an endpoint (e.g., endpoint 5050 as shown in FIG. 5D-1). In some embodiments, different feedback (e.g., tactile output with a larger amplitude and/or other differences in its tactile output profile than the prior outputs in the first plurality of tactile outputs) is provided when a draggable icon 5020 reaches an end of a scrubber, such as an end of a progress control 5021. In some embodiments, a second adjustable control 5006, such as a volume control 5006, does not have different feedback at the end of the volume scrubber.

Providing feedback with tactile output at endpoints of controls that differs from tactile output provided at other parts of the control provides the user with feedback about the extent of adjustment available from a control. Providing improved feedback to the user enhances the operability of the device and makes the user-device interface more efficient (e.g., by helping the user to provide proper inputs, informing the user when further input will no longer produce an adjustment to a control, and reducing user mistakes when operating/interacting with the device) which, additionally, reduces power usage and improves battery life of the device by enabling the user to use the device more quickly and efficiently.

In some embodiments, for a respective tactile output (e.g., as represented by the line shown at 5023) in the first plurality of tactile outputs (e.g., as represented by the row of lines 5022), the respective tactile output is triggered (614) when the focus selector 5016 is at a corresponding predefined location on the display. For example, a first tactile output, in the first plurality of tactile outputs, is triggered when the focus selector is at a first predefined location on the display (e.g., as indicated by 5016*a*); a second tactile output, in the first plurality of tactile outputs, is triggered when the focus selector is at a second predefined location on the display (e.g., as indicated by 5016*b*), adjacent to the first predefined location on the display; a third tactile output, in the first plurality of tactile outputs, is triggered when the focus selector is at a third predefined location on the display, adjacent to the second predefined location on the display; and so on. Similarly, in some embodiments, for a respective tactile output in the second plurality of tactile outputs (e.g., as represented by the row of lines 5034), the respective tactile output is triggered when the focus selector is at a corresponding predefined location on the display.

In some embodiments, the first adjustable control is a progress control, and at least some of the predefined locations on the display correspond to (616) chapter markers for media content whose playback is being adjusted with the progress control. For example, FIG. 5E-1 illustrates a progress control 5078. FIG. 5E-2 illustrates a series 5084 of lines (e.g., 5080, 5084) that represent locations on the display at which a tactile output is triggered. The series 5084 includes tactile output trigger locations that correspond to chapter markers (e.g., line 5080). In some embodiments, tactile output trigger locations that correspond to chapter markers have one or more distinct characteristics from tactile output trigger locations that do not correspond to trigger markers. For example, line 5080 that corresponds to a chapter marker is a longer line than line 5082 that does not correspond to a chapter marker, indicating that, e.g., a tactile output with a greater amplitude is output at a location on the display indicated by line 5080. In some embodiments, chapter markers are, e.g., chapter markers for, audio tracks, audio book chapters, and/or video chapters.

Outputting tactile outputs with distinct characteristics at tactile output trigger locations that correspond to chapter markers as a user scrolls through content provides a user with feedback about the progress of the scrolling and information usable for more precisely navigating to a desired part of the content. Providing improved feedback to the user enhances the operability of the device and makes the user-device interface more efficient (e.g., by helping the user to quickly and precisely hone in on a desired destination in the content) which, additionally, reduces power usage and improves battery life of the device by enabling the user to use the device more quickly and efficiently.

In some embodiments, each tactile output in the first plurality of tactile outputs and in the second plurality of tactile outputs has (618) a corresponding tactile output profile. In some embodiments, the tactile output profile includes one or more characteristics of a given tactile output, such as the amplitude of the output, the shape of a movement waveform in the output, the duration of the output (e.g., a discrete tap output or a continuous ongoing output), the characteristics of objects being simulated by the output (e.g., the size, material, and/or mass of simulated objects, such as a simulated ball rolling on a simulated surface), the number of objects being simulated by the output, and/or characteristics of the movements of the simulated objects.

In some embodiments, a respective tactile output, in the first plurality of tactile outputs, has a first respective tactile output profile; and a respective tactile output, in the second plurality of tactile outputs, has a second respective tactile output profile that is different from the first respective tactile output profile (620). For example, in the plurality of tactile outputs represented by the row of lines shown at 5034 of FIG. 5C-2, the increasing length of the lines represents, e.g., an increasing amplitude. A first tactile output of the plurality of tactile outputs represented by 5034 (e.g., a tactile output that occurs when a focus selector is at a location indicated by 5026a) has a first tactile output profile (e.g., a first amplitude) and a second tactile output of the plurality of tactile outputs represented by 5034 (e.g., a tactile output that occurs when a focus selector is at a location indicated by 5026b) has a second tactile output profile (e.g., a second amplitude that is greater than the first amplitude).

In some embodiments, amplitudes of tactile outputs in the first plurality of tactile outputs are constant and amplitudes of tactile outputs in the second plurality of tactile outputs are variable (622). For example, the amplitudes in the second plurality of tactile outputs are increasing, decreasing, oscillating, and/or variable according to a step function. In some embodiments, the second control adjusts the magnitude of a parameter of the content (e.g., volume) and the magnitude of the tactile outputs increases as the magnitude of the parameter increases. The row of lines 5022 representing tactile outputs in FIG. 5B-2 is an example of amplitudes of tactile outputs that are constant and the row of lines 5034 in FIG. 5C-2 is an example of amplitudes of tactile outputs that are variable, in accordance with some embodiments.

Outputting tactile outputs with amplitudes that are constant for a first plurality of tactile outputs (e.g., corresponding to a first adjustable control) and amplitudes that are variable for a second plurality of tactile outputs (e.g., corresponding to a second adjustable control) provides the user with feedback about the type of control being used, which control among multiple controls is being used, and/or the extent of the adjustment that is being made. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, amplitudes of tactile outputs in the first plurality of tactile outputs vary in a first manner (e.g., increasing, decreasing, oscillating, and/or variable according to a step function) and amplitudes of tactile outputs in the second plurality of tactile outputs vary in a second manner that is different from the first manner (624).

In some embodiments, tactile outputs in the first plurality of tactile outputs are accompanied by corresponding audio outputs (626).

In some embodiments, the audio outputs have (628) an audio parameter that is variable. In some embodiments, the audio parameter (e.g., amplitude and/or frequency) varies as a tactile output parameter (e.g., amplitude, frequency (e.g., of an oscillating tactile output) and/or distribution of tactile outputs)) varies. For example, the audio parameter increases as the tactile parameter increases, and the audio parameter decreases as the tactile parameter decreases).

In some embodiments, the user interface includes (630) a play/pause toggle control 5010 (e.g., a virtual play/pause button). The device detects an input by a second contact on the touch-sensitive surface while a focus selector is at a location that corresponds to the play/pause toggle control 5010 (shown in a pause state in FIG. 5B-1 and in a play state in FIG. 5C-1). For example, the device detects a tap gesture by a contact on a touch-sensitive display at a play/pause button, or detects a tap gesture by a contact on a touch-sensitive surface while a cursor or other pointer is at a play/pause button on the display. In response to detecting the input by the second contact: in accordance with a determination that the input corresponds to a request to play media content (e.g., the play/pause button is being switched from pause to play): the device plays the media content; displays the play/pause toggle control in a play state; and outputs, with the one or more tactile output generators, at least one tactile output that has a first tactile output profile (e.g., a tactile output represented by the box at 5044 of FIG. 5C-2). In accordance with a determination that the input corresponds to a request to pause the media content (e.g., the play/pause button is being switched from play to pause): the device pauses the media content; displays the play/pause toggle control in a pause state; and outputs, with the one or more tactile output generators, at least one tactile output that has a second tactile output profile that is different from the first tactile output profile (e.g., a tactile output represented by the box at 5046 of FIG. 5C-3). For example, toggling from pause to play causes a "boingy" tactile output (e.g., a tactile output that has a periodic step function or sinusoidally varying amplitude, which in some embodiments is damped over time), whereas toggling from play to pause causes a different, "non-boingy" tactile output (e.g., a plurality of tactile outputs with a non-varying amplitude), or vice versa.

Outputting a tactile output with a first tactile output profile when a request to make a first state change (e.g., to play media content) is received at a multi-state control (such as a play/pause toggle control) and a second tactile output profile when a request to make a second state change (e.g., to pause content) is received at the multi-state control provides the user with feedback as to which control among multiple controls is being operated and the nature of the control (e.g., by providing an indication that the control is a multi-state control). Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the improved feedback allows the user to operate a control such as the play/pause toggle control without powering on a display of the device.

It should be understood that the particular order in which the operations in FIGS. 6A-6C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, 900, 1000, 1100, 1200, and 1300) are also applicable in an analogous manner to method 600 described above with respect to FIGS. 6A-6C. For example, the contacts, gestures, user interface objects, tactile outputs, focus selectors, and animations described above with reference to method 600 optionally have one or more of the characteristics of the contacts, gestures, user interface objects, tactile outputs, focus selectors, and animations described herein with reference to other methods described herein (e.g., methods 700, 800, 900, 1000, 1100, 1200, and 1300). For brevity, these details are not repeated here.

FIGS. 7A-7D are flow diagrams illustrating a method 700 of providing tactile outputs in response to detected increases in the characteristic intensity of a contact, in accordance with some embodiments. The method 700 is performed at an electronic device (e.g., device 300, FIG. 3, or portable multifunction device 100, FIG. 1A) with a display, a touch-sensitive surface, one or more sensors configured to detect intensities of contacts on the touch-sensitive surface, and one or more tactile output generators. In some embodiments, the display is a touch-screen display and the touch-sensitive surface is on or integrated with the display. In some embodiments, the display is separate from the touch-sensitive surface. Some operations in method 700 are, optionally, combined and/or the order of some operations is, optionally, changed.

As described below, the method 700 provides feedback as user input is received. The feedback gives the user an intuitive sense of intensity of a contact with a touch sensitive surface. The method helps a user to understand the connection between provided input and device responses to input, thereby creating a more efficient human-machine interface.

While displaying a first user interface on the display, the device detects (702) a contact on the touch-sensitive surface. For example, the device detects a contact a location indicated by focus selector 5100, as shown in FIG. 5F.

The device detects (704) a first increase in a characteristic intensity of the contact on the touch-sensitive surface. For example, the characteristic intensity of the contact illustrated by focus selector 5100 increases from below a hint intensity threshold level $IT_H$, as illustrated by intensity level meter 5104a shown in FIG. 5H, to above the hint intensity threshold level $IT_H$, as illustrated by intensity level meter 5104a-2, and continues to increase above the hint intensity threshold level $IT_H$, as illustrated by intensity level meter 5104a-3.

In response to detecting the first increase in the characteristic intensity of the contact on the touch-sensitive surface, the device produces (706) a first tactile output, with the one or more tactile output generators, that has a first tactile output profile. The first tactile output profile is, e.g., a profile with periodic output and/or an output with an amplitude (and/or distribution of tactile outputs) that, optionally, increases and/or decreases monotonically (e.g., linearly, exponentially, logarithmically, and/or according to a step function) as the characteristic intensity increases. The first tactile output profile includes an output parameter that (dynamically) varies in accordance with a proximity of the characteristic intensity of the contact to meeting a first intensity criteria (e.g., an amplitude of the first tactile output profile increases as the characteristic intensity approaches a first intensity threshold). For example, the first tactile output is an output with an increasing amplitude as illustrated at 5110 in tactile output graph 5106 of FIG. 5H as the characteristic intensity of the contact increases from below a hint intensity threshold level $IT_H$, as illustrated by intensity level meter 5104a, to above the hint intensity threshold level $IT_H$, as illustrated by intensity level meter 5104a-2, and continues to increase above the hint intensity threshold level $IT_H$, as illustrated by intensity level meter 5104a-3.

Producing a tactile output with a tactile output profile that varies as a characteristic intensity of a contact increases provides the user with feedback about the level of intensity that is being detected by the device based on the user's input and provides tactile feedback to the user indicating that pressing harder will cause the device to perform an operation associated with a user interface element. Providing improved tactile feedback to the user enhances the operability of the device and makes the user-device interface more efficient (e.g., by helping the user to provide proper inputs and reducing user mistakes when operating/interacting with the device).

While producing the tactile output that has the first tactile output profile, the device detects (708) a second increase in the characteristic intensity of the contact on the touch-sensitive surface. For example, the characteristic intensity of the contact illustrated by focus selector 5100 increases from below a light press intensity threshold level $IT_L$, as illustrated by intensity level meter 5104a shown in FIG. 5G, to above the light press intensity threshold level $IT_L$, as illustrated by intensity level meter 5104b shown in FIG. 5G. In response to detecting the second increase in the characteristic intensity of the contact on the touch-sensitive surface (710), in accordance with a determination that the characteristic intensity of the contact on the touch-sensitive surface meets the first intensity criteria (e.g., the characteristic intensity of the contact increases above an intensity threshold, such as a light press intensity threshold $IT_L$), the device produces a second tactile output (e.g., a tap, such as a short duration "minitap") that has a second tactile output profile that is different from the first tactile output profile. For example, the second tactile output is a tap as represented by bar 5112 in tactile output graph 5106 of FIG. 5G. In some embodiments, the intensity criteria include a time varying component (e.g., as described above with reference to FIGS. 4C-4E). In accordance with a determination that the characteristic intensity of the contact on the touch-sensitive surface does not meet the first intensity criteria, the device continues to produce the first tactile output that has the first tactile output profile and (dynamically) varies the output parameter in accordance with the second increase in the characteristic intensity of the contact based on the proximity of the characteristic intensity of the contact to meeting the first intensity criteria. For example, in accordance with a determination that the characteristic intensity of the contact is below light press intensity threshold $IT_L$, as shown at intensity level meter 5104a-3 of FIG. 5H, the device continues to produce first tactile output 5110.

In some embodiments, the device determines (712) whether the characteristic intensity of the contact on the touch-sensitive surface meets the first intensity criteria in response to detecting the second increase in the characteristic intensity of the contact on the touch-sensitive surface.

In some embodiments, while detecting the second increase in the characteristic intensity of the contact, the first tactile output continues (714) at least until the first intensity criteria are satisfied. In some embodiments, the first tactile output is an ongoing output, such as a sinusoidal output, a repeating stream of step function pulses (e.g., <0.1 seconds apart), or another function with a periodic or repetitive property that continues at least until the first intensity criteria are satisfied.

In some embodiments, the second tactile output is (716) a discrete tactile output (e.g., a single tap, such as a tap represented by bar 5112 shown in tactile output graph 5106 of FIG. 5G). In some embodiments, the second tactile output profile has a higher amplitude than at least part of the first tactile output profile, e.g., such that the amplitude of the second tactile output is larger than the first tactile output when the first intensity criteria (e.g., a light press intensity threshold) are met. For example, as shown in FIG. 5G, the amplitude of the tap represented by bar 5512 in tactile output graph 5106 is higher than the highest amplitude of the tactile output shown at 5110.

In some embodiments, in accordance with a determination that the characteristic intensity of the contact on the touch-sensitive surface meets the first intensity criteria, the device ceases (718) to output the first tactile output (e.g., ceasing a continuous tactile output).

In some embodiments, after detecting the second increase in the characteristic intensity of the contact, the device detects (720) a decrease in the characteristic intensity of the contact. In accordance with a determination that the decrease in the characteristic intensity of the contact is detected after the characteristic intensity of the contact on the touch-sensitive surface meets the first intensity criteria (e.g., light press intensity threshold $IT_L$), the device forgoes producing the first tactile output (e.g., to provide feedback to the user to indicate that the characteristic intensity of the contact has already met the first intensity criteria). In accordance with a determination that the decrease in the characteristic intensity of the contact is detected before the characteristic intensity of the contact on the touch-sensitive surface meets the first intensity criteria, the device continues to produce the first tactile output that has the first tactile output profile and continuing to vary the output parameter in accordance with the proximity of the characteristic intensity of the contact to meeting the first intensity criteria (e.g., to provide feedback to the user to indicate that the characteristic intensity of the contact has not yet met the first intensity criteria). For example, as illustrated in FIG. 5J, the characteristic intensity of the contact decreases from below light press intensity threshold $IT_L$ as shown by intensity level meter 5132c, to a lower intensity level, as shown by intensity level meter 5132d. Because the characteristic intensity of the contact did not meet the first intensity criteria (e.g., did not increase above light press intensity threshold $IT_L$), the device continues to produce first tactile output 5110 and continues to vary the amplitude of tactile output 5110 as the characteristic intensity of the contact drops.

In some embodiments, while the first tactile output is produced, the device displays (722) an animation that varies in accordance with the proximity of the characteristic intensity of the contact to meeting the first intensity criteria. In some embodiments, the change in the animation parallels the change in the tactile output (e.g., a parameter of the animation varies as the output parameter of the first tactile output profile varies). In some embodiments, the animation is a continuous animation that is dynamically adjusted in accordance with the characteristic intensity of the contact. In some embodiments, the animation is a "hint" animation, which dynamically obscures user interface objects (e.g., by increasing a blur radius for the objects), other than a selected first interface object, as the intensity approaches a "peek" intensity threshold for displaying a preview area that corresponds to the selected first user interface object. For example, as the characteristic intensity of the contact 5100 increases from a time $t_0$ to a time $t_{0.6}$, as illustrated by intensity level meters 5104a, 5104a-2, and 5104a-3, the background of user interface is animated such that it is increasingly blurred (as indicated by the transition from 5102a to 5102a-2 and to 5102a-3), as illustrated in FIG. 5H.

In some embodiments, the animation includes animating a sequence of images in the background in accordance with the characteristic intensity of the first contact. In some embodiments, the change includes changing a Z-depth, focus, radial position relative to the contact, color, contrast, or brightness of one or more objects of the background, wherein the dynamic change in the appearance of the background of the first user interface is based at least in part on the characteristic intensity of the first contact (e.g., directly, linearly, non-linearly proportional to, or at a rate determined based on the characteristic intensity of the contact).

In some embodiments, the dynamic change of the appearance of the background of the first user interface is based at least in part on a position of the first focus selector 5100 on the display (e.g., distortion of a background pattern is more pronounced for portions of the background pattern that are closer to the focus selector). For example, a virtual mesh is pushed back more at location near a contact than at locations near the edge of touch screen 112.

In some embodiments, the output parameter of the first tactile output varies (724) nonlinearly in accordance with the proximity of the characteristic intensity of the contact to meeting the first intensity criteria. For example, the output parameter of the first tactile output varies exponentially, logarithmically, and/or as an increasing step function (e.g., series of taps).

In some embodiments, after producing the first tactile output, the device detects (726) a third increase in a characteristic intensity of the contact on the touch-sensitive surface to an intensity that is greater than a threshold intensity that is included in the first intensity criteria (e.g., the characteristic intensity of the contact increases above an intensity threshold such as a light press threshold $IT_L$). For example, the characteristic intensity of the contact 5100 increases from an intensity level below a deep press intensity threshold $IT_D$, as illustrated at intensity level meter 5104b of FIG. 5G, to an intensity level above the deep press intensity threshold $IT_D$, as indicated at intensity level meter 5104c. In response to detecting the third increase in the characteristic intensity of the contact on the touch-sensitive surface, the device produces a third tactile output, with the one or more tactile output generators, that has a third tactile output profile that varies (e.g., an amplitude of the third tactile output profile increases linearly or nonlinearly) in accordance with a proximity of the characteristic intensity of the contact to meeting a second intensity criteria (e.g., including a criterion that the characteristic intensity of the contact increases above an intensity threshold such as a deep press threshold $IT_D$). In some embodiments, the third tactile output is produced after the second tactile output ("minitap") (e.g., as illustrated at 5112) is produced or is concluded. For example, the device produces a tactile output 5118 with a tactile output that increases as the characteristic intensity of the contact 5100 increases from 5104b to 5014c, as illustrated in FIG. 5G.

In some embodiments, as the third tactile output is produced, the device displays (728) an animation that varies in accordance with the proximity of the characteristic intensity of the contact to meeting the second intensity criteria. In some embodiments, as the characteristic intensity of the contact increases between a light press threshold $IT_L$ and a deep press threshold $IT_D$, an animation that expands a preview area 5100 (e.g., a preview area that corresponds to a selected user interface object) is displayed (e.g., instead of an animation that obscures other user interface objects, as occurs below the light press threshold $IT_L$, in accordance with some embodiments).

In some embodiments, in accordance with a determination that the characteristic intensity of the contact on the touch-sensitive surface meets the second intensity criteria, the device produces (730) a fourth tactile output that has a fourth tactile output profile (such as a single tap, e.g., with a longer duration than the second tactile output). In some embodiments, the second intensity criteria are met when the characteristic intensity of the contact increases above a deep press intensity threshold $IT_D$. In some embodiments, the third tactile output is a continuous tactile output that changes dynamically as the intensity of the contact changes and the fourth tactile output is a discrete tactile output that is produced when the contact meets the second intensity criteria. For example, in accordance with a determination that the characteristic intensity of contact 5100 increases above a deep press intensity threshold $IT_D$, as indicated at intensity meter 5104c, a fourth tactile output (e.g., as single tap, as represented by bar 5120 of tactile output graph 5106) is produced.

In some embodiments, the third tactile output profile (e.g., function) is different (732) from the first tactile output profile.

In some embodiments, in accordance with a determination that the characteristic intensity of the contact on the touch-sensitive surface meets a third intensity criteria, the device produces (734) a fifth tactile output that has a fifth tactile output profile, wherein the duration of the fifth tactile output is shorter than the duration of the first tactile output (e.g., the fifth tactile output is a tap output). In some embodiments, the third intensity criteria are met when the characteristic intensity of the contact increases above an overpress intensity threshold $IT_{OP}$ that is greater than the deep press threshold $IT_D$, as illustrated in FIG. 5G at intensity level meter 5104d). For example, a tap input as represented by bar 5122 of tactile output graph 5106 is produced when the characteristic intensity of the contact increases above overpress intensity threshold $IT_{OP}$ as illustrated in at 5104d.

In some embodiments, the first intensity criteria include (736) a criterion that is met when the characteristic intensity of the contact exceeds a first intensity threshold (e.g., a light press intensity threshold $IT_L$); the second intensity criteria include a criterion that is met when the characteristic intensity of the contact exceeds a second intensity threshold (e.g., a deep press threshold $IT_D$), greater than the first intensity threshold; and the third intensity criteria include a criterion that is met when the characteristic intensity of the contact exceeds a third intensity threshold (e.g., an overpress intensity threshold $IT_O$), greater than the second intensity threshold. In some embodiments, the device foregoes producing (736) a continuous tactile output while the characteristic intensity of the contact is between the second intensity threshold and the third intensity threshold. For example, as illustrated in FIG. 5G, no tactile output is produced between time $t_2$ and time $t_3$, while the characteristic intensity of contact 5100 is between $IT_D$ and $IT_O$. In some embodiments, no tactile output (and no corresponding animation) is produced while the characteristic intensity of the contact is between the second intensity threshold and the third intensity threshold. In some embodiments, in contrast to the varying/dynamic tactile output that occurs as a first intensity threshold is approached (e.g., the first tactile output 5110) and the varying/dynamic tactile output that occurs as a second intensity threshold is approached (e.g., the third tactile output 5118), there is no varying/dynamic tactile output as the third intensity threshold is approached. In some embodiments, in contrast to the varying animation that occurs as a first intensity threshold is approached and the varying animation that occurs as a second intensity threshold is approached, there is no varying animation as the third intensity threshold is approached.

In some embodiments, while displaying an animation that varies in accordance with the proximity of the characteristic intensity of the contact to meeting the second intensity criteria, the device detects (738) a fourth increase in a characteristic intensity of the contact on the touch-sensitive surface. In response to detecting the fourth increase in the characteristic intensity of the contact: in accordance with a determination that the characteristic intensity of the contact on the touch-sensitive surface meets the second intensity criteria (e.g., the characteristic intensity of the contact exceeds a deep press threshold $IT_D$, as illustrated at intensity level meter 5104c, as illustrated in FIG. 5G), the device displays a second user interface that is distinct from the first user interface (e.g., the device displays user interface 5102c that is distinct from user interface 5102a); and, in accordance with a determination that the characteristic intensity of the contact on the touch-sensitive surface meets the third intensity criteria (e.g., the characteristic intensity of the contact exceeds an overpress threshold $IT_{OP}$, as illustrated at intensity level meter 5104d), the device redisplays the first user interface (e.g., the device redisplays the user interface shown at 5102a, as indicated at user interface 5102d).

It should be understood that the particular order in which the operations in FIGS. 7A-7D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 900, 1000, 1100, 1200, and 1300) are also applicable in an analogous manner to method 700 described above with respect to FIGS. 7A-7D. For example, the contacts, gestures, user interface objects, tactile outputs, intensity thresholds, focus selectors, and animations described above with reference to method 700 optionally have one or more of the characteristics of the contacts, gestures, user interface objects, tactile outputs, intensity thresholds, focus selectors, and animations described herein with reference to other methods described herein e.g., methods 600, 800, 900, 1000, 1100, 1200, and 1300). For brevity, these details are not repeated here.

FIGS. 8A-8C are flow diagrams illustrating a method 800 of generating a sequence of tactile outputs that correspond to movement of a focus selector, in accordance with some embodiments. The method 800 is performed at an electronic device (e.g., device 300, FIG. 3, or portable multifunction device 100, FIG. 1A) with a display, a touch-sensitive surface, optionally one or more sensors to detect intensity of contacts with the touch-sensitive surface, and one or more tactile output generators. In some embodiments, the display is a touch-screen display and the touch-sensitive surface is on or integrated with the display. In some embodiments, the display is separate from the touch-sensitive surface. Some operations in method 800 are, optionally, combined and/or the order of some operations is, optionally, changed.

As described below, the method 800 provides feedback as user interaction with user interface objects is detected to give a user an intuitive sense of whether a user interface object is selected for movement. The method helps a user to understand the connection between provided input and device responses to input, thereby creating a more efficient human-machine interface.

The device displays (802) a user interface that includes a plurality of user interface objects (e.g., such as user interface objects 5152 and 5162 shown in user interfaces 5154a-5154e of FIG. 5M).

The device detects (804), on the touch-sensitive surface, a touch input by a contact that moves a focus selector 5150 from a first user interface object of the plurality of user interface objects in a first direction on the display. For example, the device detects a drag gesture by a contact on a touch-sensitive display that starts while the contact is at a first user interface object (e.g., focus selector 5150 is at first user interface object 5152), or the device detects a drag gesture by a contact on a touch-sensitive surface that starts while a cursor or other pointer is at a first user interface object on the display.

In response to detecting the touch input (806): in accordance with a determination that the first user interface object is selected when the focus selector moves in the first direction (e.g., as indicated in FIG. 5M), the device generates, by the one or more tactile output generators, a sequence of tactile outputs that correspond to the movement of the focus selector in the first direction (e.g., a sequence of tactile outputs 5157 as shown in tactile output graph 5156 of FIG. 5M); and in accordance with a determination that the first user interface object is not selected when the focus selector moves in the first direction (e.g., as indicated in FIG. 5O), the device forgoes generation of the sequence of tactile outputs that correspond to the movement of the focus selector in the first direction (e.g., as indicated in tactile output graph 5198 of FIG. 5O).

In some embodiments, in response to detecting the touch input, the device moves (808) the first user interface object in accordance with the movement of the focus selector without regard to whether or not the first user interface object is selected. For example, when the first user interface object is a first application launch icon in a multipage springboard and the springboard is in a normal navigation mode, the first application launch icon moves with the rest of a page as a touch input by a contact that starts on the first application launch icon scrolls the page in a first direction (e.g., leftward), without selecting the first application launch icon and without providing a sequence of tactile outputs. As illustrated in FIG. 5O, as focus selector 5150 moves along a path indicated by arrow 5194, the springboard (e.g., including multiple user interface objects) moves as the first application launch icon (user interface object 5152) moves (from a first position shown in user interface 5192*a*, to a second position shown in user interface 5192*b*, to a third position shown in user interface 5192*c*). In contrast, when the springboard is in an icon reconfiguration mode, a touch input by a contact that starts on the first application launch icon selects the first application launch icon and moves the icon in the first direction while providing a sequence of tactile outputs. For example, in FIG. 5M, a contact at a position indicated by focus selector 5150 selects first application launch icon 5152 and moves the first application launch icon (as illustrated at user interface 5154*a*-5154*e*).

In some embodiments, in response to detecting the touch input, in accordance with a determination that the first user interface object is selected (e.g., in response to a stationary input (e.g., press and hold) while the focus selector is at a location that corresponds to the first user interface object), the device moves (810) the first user interface object relative to (e.g., over and/or between) at least one other user interface object in the plurality of user interface objects. For example, as illustrated at user interfaces 5154*a*-5154*e* of FIG. 5M, first user interface object 5152 moves over user interface object 5162. In some embodiments, when selected, the first user interface object moves relative to all of the other objects in the plurality of user interface objects.

In some embodiments, in response to detecting the touch input, in accordance with a determination that the first user interface object is selected, the device displays (812) a preview (e.g., a thumbnail image, such as a thumbnail of an image from a set (e.g., row and/or grid) of images) of another object that corresponds to the first user interface object. For example, as shown in FIG. 5Q, when user interface object 5204 is selected, thumbnail image 5206*b* is shown as a preview of user interface object 5204.

In some embodiments, as the first user interface object is moved, the device generates (814) discrete tactile outputs that correspond to movement of the first object relative to the at least one other user interface object in the plurality of user interface objects. (e.g., discrete tactile outputs are generated as an app icon passes over other app icons). For example, as shown in tactile output graph 5156, discrete tactile output 5164 is produced at a time $t_3$ to indicate that user interface object 5152 has moved over user interface object 5162 (as shown at user interface 5154*d*). In some embodiments, discrete tactile outputs (e.g., tactile output 5164) are generated when the icon passes over other icons, while an ongoing sequence of tactile outputs (e.g., the series of tactile outputs 5157) that correspond to movement of the icon are also being generated.

In some embodiments, as the first user interface object is moved, the device generates (816) discrete tactile outputs that correspond to movement of other user interface objects in response to the movement of the first user interface object (e.g., other app icons rearranging and/or snapping into place as the first object moves around the UI). For example, in user interface 5154*e* of FIG. 5M, user interface object 5162 has snapped into the position where user interface object 5152 was previously located (as shown in user interface 5154*a*). At the time $t_4$ when user interface object 5162 has snapped into the new position, a discrete tactile output 5166 is produced. In some embodiments, the discrete tactile outputs (e.g., 5166) are generated while an ongoing sequence of tactile outputs (e.g., 5157) that correspond to movement are being generated.

In some embodiments, in response to selecting the first user interface object, the device generates (818) a tactile output that corresponds to the selection of the first user interface object that is different (e.g., a tap or series of taps with a larger amplitude, higher frequency, higher density, and/or other different tactile output profile) from the sequence of tactile outputs that correspond to movement of the first user interface object.

In some embodiments, in response to detecting the touch input, in accordance with a determination that the first user interface object is not selected, the device moves (820) a second user interface object in the plurality of user interface objects along with the first user interface object (e.g., scroll without providing tactile outputs if first object is not selected). For example, in FIG. 5O, first user interface object 5152 is not selected by a contact indicated by focus selector 5150, and movement of the focus selector 5150 along the path indicated by arrow 5194 causes second user interface object 5162 to move along with first user interface object 5152. In some embodiments, the first user interface object moves along with all other objects.

In some embodiments, in response to detecting a first portion of the touch input (e.g., while the focus selector is at a location corresponding to the first user interface object): the device selects (822) the first user interface object and generates an ongoing tactile output that indicates that the user interface is in a first state in which the first user interface object is selected (e.g., an icon reconfiguration mode). For example, in FIG. 5M, focus selector 5150 is at a location corresponding to user interface object 5152 (e.g., for more than a threshold period of time) and user interface object 5152 becomes selected. The device generates ongoing tactile output 5157, which includes a series of taps as indicated in tactile output graph 5156, to indicate that user interface object 5152 is selected. In some embodiments, the ongoing tactile output continues as long as the device is in the first state. In some embodiments, the ongoing tactile output continues as long as the device is in the first state and a contact continues to be detected on the touch-sensitive surface. In some embodiments, the ongoing tactile output stops if the contact ceases to be detected on the touch-sensitive surface.

In some embodiments, while the touch input is being detected and while the first user interface object is selected, the device detects (824) a change in a state of the user interface from a first state (e.g., when an application launch icon is moving among other application launch icons in an application springboard, as illustrated at FIG. 5M) to a second state (e.g., when an application launch icon is moved to a folder or a folder icon, or when an application launch icon is moved to a location that corresponds to another application launch icon, resulting in automatic generation of a folder). For example, in FIG. 5N, a user interface changes from a first state in which application launch icon (e.g., user interface object 5178) is moving among other application launch icons (e.g., moving over application launch icon 5182) to a second state in which application launch icon 5178 is moved to a location that corresponds to folder icon 5184. In response to detecting the change in the state of the user interface from the first state to the second state, the device changes from an ongoing first-state tactile output (e.g., an ongoing tactile output that indicates that the first user interface object is selected and the user interface is in the first state, such as the series of taps 5167 shown in tactile output graph 5168) to one or more second-state tactile outputs, different from the ongoing first-state tactile output (e.g., the series of taps 5169 shown in tactile output graph 5168), to indicate that the change in the state of the user interface from the first state to the second state has occurred. In some embodiments, the one or more second-state tactile outputs have a different output profile than the ongoing first-state tactile output (e.g., the second-state tactile outputs have a lower amplitude of tactile outputs, density of tactile outputs and/or frequency of tactile outputs).

In some embodiments, outputting the one or more second-state tactile outputs includes (828) outputting an ongoing sequence of tactile outputs (e.g., the series of taps 5169 shown in tactile output graph 5168) while the second state is the active state of the first user interface.

In some embodiments, changing a state of the user interface from the first state to the second state includes (830) displaying a second user interface overlaid on a first user interface (e.g., a folder user interface 5184 is shown, e.g., over or in lieu of the springboard user interface 5180*d*).

In some embodiments, changing a state of the user interface from the first state to the second state includes (832) replacing display of a first user interface with a second user interface (e.g., a folder UI replaces an array of application launch icons in a springboard UI).

It should be understood that the particular order in which the operations in FIGS. 8A-8C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 900, 1000, 1100, 1200, and 1300) are also applicable in an analogous manner to method 800 described above with respect to FIGS. 8A-8C. For example, the contacts, gestures, user interface objects, tactile outputs, focus selectors, and animations described above with reference to method 800 optionally have one or more of the characteristics of the contacts, gestures, user interface objects, tactile outputs, focus selectors, and animations described herein with reference to other methods described herein (e.g., methods 600, 700, 900, 1000, 1100, 1200, and 1300). For brevity, these details are not repeated here.

FIG. 9 is a flow diagram illustrating a method 900 of outputting tactile outputs in response to detecting movement of a contact, in accordance with some embodiments. The method 900 is performed at an electronic device (e.g., device 300, FIG. 3, or portable multifunction device 100, FIG. 1A) with a display, a touch-sensitive surface, optionally one or more sensors to detect intensity of contacts with the touch-sensitive surface, and one or more tactile output generators. In some embodiments, the display is a touch-screen display and the touch-sensitive surface is on or integrated with the display. In some embodiments, the display is separate from the touch-sensitive surface. Some operations in method 900 are, optionally, combined and/or the order of some operations is, optionally, changed.

As described below, the method 900 provides feedback as user movement of icons is detected to give a user an intuitive sense of movement of an icon. The method helps a user to understand the connection between provided input and device responses to input, thereby creating a more efficient human-machine interface.

The device (902) displays a first user interface (e.g., an application springboard) that includes: a plurality of icons of a first type (e.g., application launch icons), and at least one icon of a second type, different from the first type (e.g., a folder icon). For example, user interface 5180*a* is an application springboard that includes a plurality of application launch icons, including application launch icons 5178 and 5182, and a folder icon 5184.

While a focus selector is on a first icon of the first type (e.g., icon 5178), the device detects (904) movement of a contact (as represented by focus selector 5150 in FIG. 5N) across the touch-sensitive surface in a drag gesture (e.g., focus selector 5150 moves across the first user interface from a first position at time $t_1$, as shown in user interface 5180*b* to a second position at time $t_2$, as shown in user interface 5180*c*, to a third position at time $t_3$, as shown in user interface 5180*d*). For example, the device detects a drag gesture by a contact on a touch-sensitive display while the contact is on a first draggable icon, or detects a drag gesture by a contact on a touch-sensitive surface while a cursor or other pointer is on a first draggable icon on the display.

In response to detecting movement of the contact across the touch-sensitive surface in the drag gesture while the focus selector is on the first icon (906), the device moves (908) the first icon across the display in accordance with the movement of the first contact in the drag gesture (e.g., icon 5178 moves from a first position at time $t_1$, as shown in user interface 5180*b*, to a second position at time $t_2$, as shown in user interface 5180*c*, to a third position at time $t_3$, as shown in user interface 5180*d*). In accordance with a determination that the first icon moves over one or more other icons of the first type during the drag gesture, the device outputs (910), with the one or more tactile output generators, one or more tactile outputs of a first type, wherein a respective tactile output of the first type has a first tactile output profile. For example, as first icon 5178 moves over icon 5182, as shown in user interface 5180*c*, tactile output 5172 is produced. In accordance with a determination that the drag gesture moves the first icon over an icon of the second type at the end of the drag gesture, the device displays (912) a second user interface that corresponds to the icon of the second type (e.g., displaying a user interface for a folder that corresponds to a folder icon) and the device outputs, with the one or more tactile output generators, a tactile output of a second type, wherein the tactile output of the second type has a second tactile output profile that is different from the first tactile output profile. For example, first icon 5178 moves over folder icon 5184, as shown in user interface 5180*d*, and, in response, a user interface 5180*e* that includes an enlarged folder that corresponds to folder icon 5184 is displayed and tactile output 5169 (and/or 5176) is generated. In some embodiments, the user interface 5180*e* for the folder is overlaid on the first user interface (e.g., the springboard user interface as shown at 5180*d*). In some embodiments, the user interface 5180*e* for the folder 5184 replaces display of the first user interface 5180*d*. In some embodiments, the second type of tactile output (e.g., the series of taps 5169) is a continuous output while the second user interface is displayed, whereas the first type of tactile output is a discrete tap output (e.g., a tap output as represented by bar 5172) as the first icon 5178 moves over another icon 5182 of the first type.

In some embodiments, the drag gesture occurs while the first user interface is in a user interface reconfiguration mode. In some embodiments, continuous tactile output 5167 is provided while the first user interface is in the user interface reconfiguration mode, which is distinct from the first type of tactile output (e.g., a discrete tap output, e.g., 5172) and which is distinct from the second type of tactile output (e.g., a continuous output 5168 with a different output profile, such as a different amplitude of tactile outputs, density of tactile outputs and/or frequency of tactile outputs). In some embodiments, the user interface reconfiguration mode is entered in response to detecting a stationary input while the focus selector is over the first icon (e.g., a press and hold input).

In some embodiments, tactile output is also provided as other icons in the first user interface rearrange to fill in gaps caused by movement of the first icon.

It should be understood that the particular order in which the operations in FIG. 9 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 1000, 1100, 1200, and 1300) are also applicable in an analogous manner to method 900 described above with respect to FIG. 9. For example, the contacts, gestures, user interface objects, tactile outputs, focus selectors, and animations described above with reference to method 900 optionally have one or more of the characteristics of the contacts, gestures, user interface objects, tactile outputs, focus selectors, and animations described herein with reference to the other methods described herein (e.g., methods 600, 700, 800, 1000, 1100, 1200, and 1300). For brevity, these details are not repeated here.

FIG. 10 is a flow diagram illustrating a method 1000 of providing output in accordance with detected input by a contact at a user interface that includes a plurality of icons, in accordance with some embodiments. The method 1000 is performed at an electronic device (e.g., device 300, FIG. 3, or portable multifunction device 100, FIG. 1A) with a display, a touch-sensitive surface, optionally one or more sensors to detect intensity of contacts with the touch-sensitive surface, and one or more tactile output generators. In some embodiments, the display is a touch-screen display and the touch-sensitive surface is on or integrated with the display. In some embodiments, the display is separate from the touch-sensitive surface. Some operations in method 1000 are, optionally, combined and/or the order of some operations is, optionally, changed.

As described below, the method 1000 provides feedback as a user interacts with icons to give a user an intuitive sense of the icon interactions. The method helps a user to understand the connection between provided input and device responses to input, thereby creating a more efficient human-machine interface.

The device displays (1002) a first user interface (e.g., a photo management application) that includes a plurality of icons (e.g., thumbnail image icons of larger digital images, documents, or other content). For example, the device displays a photo management application, as illustrated in user interface 5202 of FIG. 5P, that includes a plurality of thumbnail image icons including thumbnail image icon 5206*a*.

The device detects (1004) a first input by a contact on the touch sensitive surface while a focus selector is on a first icon in the plurality of icons, the first icon having a first size. For example, the device detects an input by a contact 5204 on a touch-sensitive display while the contact is on a first icon 5206*a*, or the device detects an input by a contact on a touch-sensitive surface while a cursor or other pointer is on a first icon on the display.

In response to detecting the first input by the contact on the touch sensitive surface (1006): in accordance with a determination that the first input satisfies preview display criteria (1008), the device displays a preview of an object that corresponds to the first icon (e.g., a preview of a larger digital image, as illustrated at 5206*b* of FIG. 5Q), the preview having a second size that is greater than the first size; and the device outputs, with the one or more tactile output generators, a tactile output of a first type (e.g., a springy effect), wherein a tactile output of the first type has a first tactile output profile. In some embodiments, the preview display criteria include a criterion that is met when at least a first portion of the first input by the contact is a stationary input, such as a tap-and-hold gesture. In accordance with a determination that the first input satisfies scrolling criteria (1010), which are different from the preview display criteria: the device foregoes displaying the preview of the object that corresponds to the first icon; forgoes outputting, with the one or more tactile output generators, the tactile output of the first type; and, scrolls the plurality of icons. For example, scrolling occurs as illustrated by FIGS. 5V-5W. In some embodiments, the scrolling criteria include a criterion that is met when at least a first portion of the first input by the contact is a moving input, such as a drag gesture, a swipe gesture, and/or a finger roll gesture.

In some embodiments, while displaying the preview of the object that corresponds to the first icon (e.g., 5206*b*, as illustrated in FIG. 5Q and in FIG. 5R-1), the device detects a second input by a contact (e.g., movement of the contact from a position indicated by focus selector 5204*a* along a path indicated by arrow 5210 to a position indicated by focus selector 5204*b*). In response to detecting the second input, the device: moves the focus selector from the first icon to a second icon in the plurality of icons; displays a preview of an object that corresponds to the second icon (e.g., a preview of a larger digital image, as illustrated at 5212*b* of FIG. 5R-2), the preview having a second size that is greater than the first size; and outputs a second type of tactile output (e.g., a "tic," as represented by dot 5218*b* of FIG. 5R-4. In some embodiments, the second input follows the first input and uses the same continuous contact with the touch sensitive surface.

It should be understood that the particular order in which the operations in FIG. 10 have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 900, 1100, 1200, and 1300) are also applicable in an analogous manner to method 1000 described above with respect to FIG. 10. For example, the contacts, gestures, user interface objects, tactile outputs, focus selectors, and animations described above with reference to method 1000 optionally have one or more of the characteristics of the contacts, gestures, user interface objects, tactile outputs, focus selectors, and animations described herein with reference to other methods described herein (e.g., methods 600, 700, 800, 900, 1100, 1200, and 1300). For brevity, these details are not repeated here.

FIGS. 11A-11B are flow diagrams illustrating a method 1100 of providing haptic feedback in accordance with some embodiments. The method 1100 is performed at an electronic device (e.g., device 300, FIG. 3, or portable multifunction device 100, FIG. 1A) with a display, a touch-sensitive surface, optionally one or more sensors to detect intensity of contacts with the touch-sensitive surface, and one or more tactile output generators. In some embodiments, the display is a touch-screen display and the touch-sensitive surface is on or integrated with the display. In some embodiments, the display is separate from the touch-sensitive surface. Some operations in method 700 are, optionally, combined and/or the order of some operations is, optionally, changed.

As described below, the method 1100 provides an intuitive way to provide an indication of a number of communications received by a device. A user may need to check on a number of notifications received without activating a device, for example, when it would be inappropriate or undesirable to activate the device. Additionally, a user may wish to gauge a number of communications received by a device without individually reviewing a notification corresponding to each communication. By providing haptic feedback indicating a number of communications received by a device, the method helps a user when checking a device for its received communications, thereby creating a more efficient human-machine interface. For battery-operated electronic devices, enabling a user to check received communications faster and more efficiently (e.g., without requiring unlocking of the device and/or activation of the device display) conserves power and increases the time between battery charges.

The device receives (1102) a number of communications (e.g., instant messages, e-mails, and/or calls for a user of the electronic device).

After the number of communications is received: the device detects (1104), using one or more device orientation sensors (e.g., accelerometer, gyro, and/or light sensor), a change in a position and/or orientation of the electronic device (e.g., the device detects the electronic device being picked up, moved, and/or tilted by a user), and in response to detecting the change in the position and/or orientation of the device, the device produces, with the one or more tactile output generators, tactile output that has a tactile output profile that includes an output parameter that increases as the number of received communications increases. For example, FIGS. 5X-1 to 5X-3 illustrate a change in the orientation of device 100 that occurs as the device is tilted in a user's hand 5230. In response to the change in the orientation of the device, tactile outputs are produced (e.g., as simulated objects 5232a, 5323b, 5232c, and 5232d roll in the direction of movement of the device and/or as the virtual objects collide with lower edge 5236 of display 112).

In some embodiments, the communications are received (1106) while the device is in a locked state. In some embodiments, a locked state occurs e.g., in response activation of a button (e.g., push button 206) while the device is awake and/or when device 100 has been idle for a predetermined amount of time. In some embodiments, a lock screen is displayed when device 100 enters a locked state and/or when device 100 is awakened from in a locked state.

In some embodiments, the tactile output is produced (1108) while the device is in a locked state. For example, without unlocking the device, the user is provided with an impression of the number of communications received by the device (e.g., while the device was locked and/or since the user last viewed the device) by changing the position and/or orientation of the device for tactile output that corresponds to the number of received communications.

In some embodiments, the tactile output is produced (1110) while the display is in a non-displaying state. The non-displaying state is, e.g., a sleep state and/or other state in which the device ceases to generate output data for the display.

In some embodiments, the output parameter is (1112) an amplitude of the tactile output. For example, as a number of communications increases, tactile output with a larger amplitude is produced in response to a change in position of the device.

In some embodiments, the output parameter is (1114) a number of simulated objects that are simulated by the tactile output. (e.g., a number of virtual balls rolling around in the device and bouncing off of virtual boundaries). For example, as illustrated in FIGS. 5X-1 to 5X-3, as device 100 is tilted in a user's hand 5230, tactile outputs that correspond to four communications (illustrated by simulated objects 5232a, 5323b, 5232c, and 5232d) are produced (e.g., as the virtual objects roll in the direction of movement of the device and/or as the virtual objects collide with lower edge 5236 of display 112).

In some embodiments, the tactile output includes simulated impact events (1116) by the simulated objects (e.g., virtual balls bouncing off of virtual boundaries as the device is picked up, tilted, and/or shaken) and the number of simulated impact events increases as the number of communications received increases. For example, simulated impact events occur when simulated objects 5232a, 5323b, 5232c, and 5232d collide with lower edge 5236 of display 112. In some embodiments, (e.g., as illustrated in FIGS. 5X-2 and 5X-3), the simulated objects are spawned at different locations, e.g., so that collisions between the simulated objects and a collision object (such as the edge 5236 of the display 112) occur at different times. For example, simulated object 5232d travels a longer path 5234d from its spawn point to edge 5236 than the path 5234c traveled by simulated object 5232c. In some embodiments, the simulated objects have different simulated accelerations or other properties that cause collisions of the objects with edge 5236 (and/or another collision object) at different times. In this way, a user is enabled to gauge a number of received communications based on a number of simulated impact events.

In some embodiments, the tactile output profile includes (1118) tactile outputs to simulate movements of the simulated objects (e.g., along a simulated surface), wherein movement parameters of the simulated movements of the simulated objects are dependent on the detected change in the position and/or orientation of the device. For example, tactile outputs occur as simulated objects 5232*a*, 5232*b*, 5232*c*, and 5232*d* move along paths 5234*a*, 5234*b*, 5234*c*, and 5234*d*, respectively. In some embodiments, faster movement of device 100 causes the simulated objects (e.g., 5232*a*, 5232*b*, 5232*c*, and 5232*d*) to move faster. In some embodiments, tilting device 100 at a steeper angle causes the simulated objects (e.g., 5232*a*, 5232*b*, 5232*c*, and 5232*d*) to move faster, but once the simulated have settled on the simulated edge 5236 of display 112, the simulated objects cease moving until the device moves.

In some embodiments, the device detects (1120) a user input (e.g., the device detects a contact on the touch sensitive surface, a home button input, or a power button input), and in response to detecting the user input, the device modifies the tactile output profile to simulate movement of the simulated objects across a surface that has a surface texture (e.g., in addition to simulating impacts of the balls with simulated walls inside of the device, simulate the balls rolling around on a simulated grid with its own texture). For example, a simulated surface texture is illustrated in FIG. 5Y. Tactile outputs produced by device 100 simulate collisions between simulated objects (e.g., 5232*a*, 5232*b*, 5232*c*, and 5232*d*) and simulated surface features 5240*a*, 5240*b*, 5240*c*, 5240*d*, etc. as the simulated objects move across device 100.

In some embodiments, a respective simulated object has (1122) a simulated quality (e.g., a simulated size, material, or mass) that depends on at least one property of a corresponding notification.

In some embodiments, the at least one property of the corresponding notification includes (1124) a type of a communication (e.g., urgent vs. regular; text message vs. email vs. call; and/or favorite vs. known sender vs. unknown sender). In some embodiments, a type of communication has a corresponding tactile output that conveys the simulated quality (e.g., simulated size, simulated material, and/or simulated mass) of the simulated object.

In some embodiments, the tactile output profile for a particular received communication is (1126) user configurable (e.g., a user can configure different tactile output profiles for different contacts (e.g., contacts in the user's address book/contact list) to act as "haptic ringtones" for the contacts).

In some embodiments, the tactile output is generated (1128) immediately in response to the detected change in the position and/or orientation of the electronic device (e.g., immediately upon detecting liftoff of the device from a stationary surface).

In some embodiments, the change in the position and/or orientation of the electronic device is detected at a first time and the tactile output is generated at a second time when the orientation of the device meets tilt criteria. For example, the tilt criteria include a criterion that is met when the device orientation deviates from a "flat orientation" (e.g., face down or face up on a level surface such as a table) by a predetermined rotational amount about one or more axes (pitch, yaw, and/or roll).

In some embodiments, the change in the position and/or orientation of the electronic device is detected (1130) at a first time and the tactile output is generated at a second time that corresponds to occurrence of a simulated impact event, wherein the occurrence of the simulated impact event is determined based on the change in the position and/or orientation of the electronic device. In some embodiments, a simulated quality of the simulated object is also used to determine when the simulated impact event occurs. For example, the simulated quality of the simulated object is, e.g., a simulated mass, simulated surface texture, simulated acceleration, simulated shape, and/or simulated size. In some embodiments, the occurrence and/or magnitude of the simulated impact event is determined based on the rate of change in the position and/or orientation of the electronic device.

It should be understood that the particular order in which the operations in FIGS. 11A-11B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 900, 1000, 1200, and 1300) are also applicable in an analogous manner to method 1100 described above with respect to FIGS. 11A-11B. For example, the contacts and tactile outputs described above with reference to method 1100 optionally have one or more of the characteristics of the contact and tactile outputs described herein with reference to other methods described herein (e.g., methods 600, 700, 800, 900, 1000, 1200, and 1300). For brevity, these details are not repeated here.

FIGS. 12A-12D are flow diagrams illustrating a method 1200 of providing different feedback indicative of an incoming communication depending on a device context, in accordance with some embodiments. The method 1200 is performed at an electronic device (e.g., device 300, FIG. 3, or portable multifunction device 100, FIG. 1A) with a display, a touch-sensitive surface, optionally one or more sensors to detect intensity of contacts with the touch-sensitive surface, and one or more tactile output generators. In some embodiments, the display is a touch-screen display and the touch-sensitive surface is on or integrated with the display. In some embodiments, the display is separate from the touch-sensitive surface. Some operations in method 1200 are, optionally, combined and/or the order of some operations is, optionally, changed.

When a device provides the same feedback to notify a user of an incoming communication regardless of context, the notification may go unnoticed (if the device is contained in a pocket or purse). If the device is configured to provide a sufficiently strong notification to be noticed when the device is contained, the notification may be undesirably strong when the device is in the user's hand or otherwise in a not contained state (e.g., lying on a table). A level of vibration or sound that is acceptable when a device is in a user's hand or pocket may cause an undesirable level of noise and/or vibration when the device is in contact with a surface such as a table and causes the surface to resonate in response to the notification signal.

As described below, the method 1200 transitions from providing first feedback to providing second feedback indicative of an incoming communication in response to detecting a change in context of an electronic device. The method reduces the number, extent, and/or nature of the outputs of the device when a change in the device context occurs, thereby creating a more efficient machine. For battery-operated electronic devices, automatically adjusting feedback based on device context conserves power and increases the time between battery charges.

The device includes one or more sensors (e.g., an accelerometer (for determining device orientation), a light meter (to determine if device is in the pocket), a camera, and/or a microphone (to determine background sound level), an audio system, and one or more tactile output generators.

The device receives (1202) an incoming communication (e.g., an incoming call and/or a videoconference call).

The device determines (1204), using one or more of the sensors, that the electronic device is in a first use context. For example, the device determines whether the device is in a hand (as illustrated in FIG. 5Z), in a pocket (as illustrated in FIG. 5AA), or face down on a surface such as a table (as illustrated in FIG. 5BB).

In response to receiving the incoming communication, the device provides (1206) first feedback indicative of the incoming communication. Providing the first feedback indicative of the incoming communication includes: providing, with the audio system, a first ongoing audio output for the incoming communication, wherein the first ongoing audio output corresponds to the first use context (e.g., a default ringtone, a reduced amplitude ringtone, an increased amplitude ringtone, a damped ringtone, or a reverberant ringtone assigned to the first use context of the device); and providing, with the one or more tactile output generators, a first ongoing tactile output for the incoming communication, wherein the first ongoing tactile output has a first tactile output profile that corresponds to the first use context (e.g., discrete taps, vibration, vibration and taps, taps with varying density, increased amplitude taps, reduced amplitude taps, increased amplitude/frequency vibration, or reduced amplitude/frequency vibration assigned to the first use context of the device).

While providing the first ongoing audio output and the first ongoing tactile output for the incoming communication, the device detects (1208), using one or more of the sensors, that the electronic device is in a second use context, different from the first use context. For example, the device determines that the device has moved from a first use context to a second one of a hand (as illustrated in FIG. 5Z), in a pocket (as illustrated in FIG. 5AA), or face down on a surface such as a table (as illustrated in FIG. 5BB).

In response to detecting that the electronic device is in the second use context, the device provides (1210) second feedback indicative of the incoming communication that is different from the first feedback. Providing the second feedback indicative of the incoming communication includes: providing, with the one or more tactile output generators, a second ongoing tactile output for the incoming communication. The second ongoing tactile output has a second tactile output profile that corresponds to the second use context (e.g., discrete taps, vibration, vibration and taps, taps with varying density, increased amplitude taps, reduced amplitude taps, increased amplitude/frequency vibration, or reduced amplitude/frequency vibration assigned to the second use context of the device). In some embodiments, changing from the first feedback that notifies a user of an incoming communication to the second feedback that notifies the user of the incoming communication includes changing the ongoing tactile output without changing the ongoing audio output. In some embodiments, changing from the first feedback that notifies a user of an incoming communication to the second feedback that notifies the user of the incoming communication includes changing the ongoing audio output without changing the ongoing tactile output. In some embodiments, changing from the first feedback that notifies a user of an incoming communication to the second feedback that notifies the user of the incoming communication includes changing the ongoing tactile output and changing the ongoing audio output.

In some embodiments, the second ongoing tactile output for the incoming communication is distinct (1214) from the first ongoing tactile output for the incoming communication. For example, in FIG. 5AA, tactile outputs occur at a first frequency, as indicated in the Tap-based Tactile Output graph of FIG. 5AA, whereas in FIG. 5BB, tactile outputs occur as a second frequency that is lower than the first frequency, as indicated in the Tap-based Tactile Output graph of FIG. 5BB. In some embodiments, when the device is in a pocket, as illustrated in FIG. 5AA, the device outputs primarily vibrations (e.g., oscillating output, such as oscillating output having a minimum frequency, or a periodic step function having a maximum time (e.g., <0.5 s) between taps), e.g., to provide noticeable feedback to user. When the device is on a table, as illustrated in FIG. 5BB, the device uses primarily taps (e.g., step function output, such as periodic step function having a minimum time (e.g., >0.5 s between taps) when the device is on a table, e.g., to avoid vibration of the device on the table. For example, in FIG. 5AA, vibration output occurs as indicated in the Vibration Output graph of FIG. 5AA, whereas in FIG. 5BB, no vibration output occurs, as indicated in the Vibration Output graph of FIG. 5BB.

In some embodiments, providing the second feedback indicative of the incoming communication includes (1216) providing, with the audio system, a second ongoing audio output for the incoming communication, wherein the second ongoing audio output corresponds to the second use context. For example, the second ongoing audio output is, e.g., a default ringtone, a reduced amplitude ringtone, increased amplitude ringtone, damped ringtone, or reverberant ringtone assigned to the second use context of the device.

In some embodiments, the second ongoing audio output for the incoming communication is distinct from the first ongoing audio output for the incoming communication (e.g., different amplitude, different frequency, different tones, and/or different decay/reverberation properties). For example, the audio indicated in the Audio Output graph of FIG. 5Z has a lower amplitude than the audio indicated in the Audio Output graph of FIG. 5AA.

In some embodiments, at least one audio characteristic is shared (1218) between the first ongoing audio output and the second ongoing audio output. In some embodiments, there is a smooth transition between different audio outputs (e.g., the frequency, amplitude, or volume of audio or tactile output gradually increases or decreases over time from a first value corresponding to a first state to a second value corresponding to a second state). In some embodiments, the first ongoing audio output and the second ongoing audio output have the same notes (e.g., same component frequencies) but with different properties, such as different decay, different amplitude, and/or different reverb.

In some embodiments, at least one audio parameter changes (1220) during a transition from the first ongoing audio output to the second ongoing audio output as at least one tactile parameter changes (e.g., proportionally and/or in parallel) during a transition from the first ongoing tactile output to the second ongoing tactile output. For example, the tactile output illustrated in FIG. 5Z is different (e.g., has a lower frequency than) the tactile output is illustrated in FIG. 5AA and the audio output illustrated in FIG. 5Z is different (e.g., has a lower amplitude than) the audio output illustrated in FIG. 5AA.

In some embodiments (1222), the first use context is in a partially enclosed space (e.g., the first use context is in a pocket, as determined, for example, by a light sensor) and the first ongoing audio output has a first amplitude; and the second use context is in a space that is less enclosed than the partially enclosed space (e.g., the second use context is in a hand or on a table) and the second ongoing audio output has a second amplitude that is smaller than the first amplitude. For example, in FIG. 5AA, device 100 is in a pocket 5250, and in FIG. 5Z, device 100 is in hand 5230. In FIG. 5Z (which illustrates a less enclosed space), the audio output has a smaller amplitude than the audio output illustrated in FIG. 5AA (which illustrates a partially enclosed space). In some embodiments, increasing the audio output when the device is partially enclosed allows the device to be heard by a user, e.g., through a pocket or purse wall.

In some embodiments (1224), the first use context has a first background noise level (e.g., a sound pressure level (dB or dBA) as determined, for example, by an audio sensor) and the first ongoing audio output has a first amplitude; and the second use context has a second background noise level that is louder than the first background noise level and the second ongoing audio output has a second amplitude that is greater than the first amplitude.

In some embodiments (1226), the first use context has a first noise frequency distribution (as determined, for example, by an audio sensor) and the first ongoing audio output has a first audio frequency distribution; and the second use context has a second noise frequency distribution that is different from the first noise frequency distribution (e.g., higher in one or more frequency ranges, such as one or more frequency ranges that correspond to human voice range) and the second ongoing audio output has a greater amplitude than the first ongoing audio output in at least one frequency range. In some embodiments, noise frequency distribution is determined in octave bands, one-third octave bands, or higher resolution frequency ranges (e.g., using a FFT).

In some embodiments (1228), the first use context is on a stationary surface (e.g., the first use context is on a table, as illustrated in FIG. 5BB) and the first ongoing audio output has a first amplitude; and the second use context is in hand (e.g., as illustrated in FIG. 5Z) and the second ongoing audio output has a second amplitude that is smaller than the first amplitude. In some embodiments, the device displays first display content in the first use context and the device displays second display content that is different from the first display content in the second use context. For example, second display content includes identifying information for a caller.

In some embodiments (1230), the first ongoing audio output, the first ongoing tactile output, the second ongoing audio output, and the second ongoing tactile output are feedback indicative of the same incoming communication.

In some embodiments, while providing the second ongoing tactile output for the incoming communication, the device detects (1232), using one or more of the sensors, that the electronic device is in a third use context, different from the first use context and different from the second use context; and, in response to detecting that the electronic device is in the third use context, the device provides third feedback indicative of the incoming communication that is different from the first feedback and different from the second feedback, wherein providing the third feedback indicative of the incoming communication includes providing, with the one or more tactile output generators, a third ongoing tactile output for the incoming communication, wherein the third ongoing tactile output has a third tactile output profile that corresponds to the third use context.

In some embodiments, providing the third feedback indicative of the incoming communication includes providing (1234), with the audio system, a third ongoing audio output for the incoming communication, wherein the third ongoing audio output corresponds to the third use context (e.g., a default ringtone, reduced amplitude ringtone, increased amplitude ringtone, damped ringtone, or reverberant ringtone assigned to the second use context of the device).

In some embodiments (1236), the first use context is one of in a pocket (e.g., pocket 5250 as illustrated in FIG. 5AA), on a stationary surface (e.g., table 5252 as illustrated in FIG. 5BB), or in a hand (e.g., hand 5230 as illustrated in FIG. 5Z) and the second use context is another one of in a pocket, on a stationary surface, or in a hand. For example, the first use context occurs when the electronic device is in a pocket and the second use context occurs when the electronic device is on a stationary surface, such as a table.

In some embodiments (1238), when the device is determined to be in a context that indicates the device is in a user's pocket (e.g., as illustrated in FIG. 5AA), the ongoing audio output corresponding to the incoming communication is undamped and the ongoing tactile output corresponding to the incoming communication includes high-salience tactile components (e.g., vibrations that correspond to periodic oscillations of a mass in the tactile output generators, such as the vibrations illustrated in the Vibration Output graph of FIG. 5AA) and low-salience tactile components (e.g., "taps" that correspond to discrete activations of the tactile output generators, such as the discrete tactile outputs illustrated in the Tap-based Tactile Output graph of FIG. 5AA); when the device is determined to be in a context that indicates the device is in a user's hand (e.g., as illustrated in FIG. 5Z), the ongoing audio output corresponding to the incoming communication is undamped and the ongoing tactile output corresponding to the incoming communication includes the high-salience tactile components (e.g., the vibrations illustrated in the Vibration Output graph of FIG. 5Z) and low-salience tactile components (e.g., "taps" that correspond to discrete activations of the tactile output generators, such as the discrete tactile outputs illustrated in the Tap-based Tactile output graph of FIG. 5Z) but includes a reduced number of the low-salience and high-salience tactile components relative to the ongoing tactile output corresponding to the incoming communication when the device is determined to be in a context that indicates the device is in a user's hand; and, when the device is determined to be in a context that indicates the device is in display-side down on a surface (e.g., face-down on a table 5252 in front of the user), the ongoing audio output corresponding to the incoming communication is damped (e.g., as illustrated at 5254 of FIG. 5BB) and the ongoing tactile output corresponding to the incoming communication includes a reduced number of the low-salience and high-salience tactile components relative to the ongoing tactile output corresponding to the incoming communication when the device is determined to be in a context that indicates the device is in a user's hand. In some embodiments, the ongoing audio output corresponding to the incoming communication when the device is determined to be in a context that indicates the device is in a user's hand does not include any high-salience tactile components.

It should be understood that the particular order in which the operations in FIGS. 12A-12D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 900, 1000, 1100, and 1300) are also applicable in an analogous manner to method 1200 described above with respect to FIGS. 12A-12D. For example, the tactile outputs described above with reference to method 1200 optionally have one or more of the characteristics of the tactile outputs described herein with reference to other methods described herein (e.g., methods 600, 700, 800, 900, 1000, 1100, and 1300). For brevity, these details are not repeated here.

FIGS. 13A-13D are flow diagrams illustrating a method 1300 of providing different feedback indicative of an incoming communication depending on a device context, in accordance with some embodiments. The method 1300 is performed at an electronic device (e.g., device 300, FIG. 3, or portable multifunction device 100, FIG. 1A) with a display, a touch-sensitive surface, and an audio system (e.g., speakers and associated audio circuitry 110) and/or one or more tactile output generators 167. The electronic device optionally includes one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 1300 are, optionally, combined and/or the order of some operations is, optionally, changed.

This method relates to attenuating alerts on a device based on a user's attention level. Specifically, upon detecting an event to which an alert is associated, the device delays outputting the alert until it can determine whether the device is in a first use context (e.g., in which the user is paying attention to the device) or in a second use context (e.g., in which the user is not paying attention to the device). If the device is determined to be in the first use context, the device outputs one version of the alert (e.g., including a first audio and/or tactile output), and if the device is determined to be in the second use context, the device outputs a different version of the alert (e.g., including a second audio and/or tactile output distinct from the first). Delaying the alert until the user's level of attention can be determined and providing an appropriate output according to the determination provides improved feedback in that different audio and/or tactile outputs can more effectively grab the attention of an inattentive user, while at the same time not overwhelming a user who is already paying attention to the device. Providing improved feedback in this way enhances the operability of the device and makes the user-device interface more efficient (e.g., by providing an indication of the internal state of the device while avoiding unnecessary outputs), which additionally reduces power usage and improves battery life of the device by enabling the device to more selectively regulate alert levels and/or intensities, thereby avoiding unnecessary feedback.

The device detects (1302) an alert event (e.g., an instruction to generate an alert, such as audio, tactile, and/or vibration signals). For example, the device (e.g., operating system 126 or haptic feedback module 133 of the device) receives from telephone module 138 (e.g., in response to an incoming call) or from alarm clock widget 149-4 (e.g., in response to reaching a preselected time or lapse of a preselected time period) an instruction or a request to generate an alert (or an instruction or a request to generate audio and/or tactile feedback).

In some embodiments, the alert event corresponds (1304) to one of: a request for playing a ringtone (e.g., from telephone module 138, to indicate an incoming call), a request for triggering an alarm (e.g., from alarm clock widget 149-4, to indicate reaching a preselected time), and a request for providing a timer alert (e.g., from alarm clock widget 149-4 or a separate timer widget, to indicate lapse of a preselected time period).

Attenuating alerts for ringtones, alarms, and/or timers based on user attention levels provides improved feedback which enhances the operability of the device and makes the user-device interface more efficient (e.g., by providing an indication of the internal state of the device in response to incoming calls, the triggering of alarms, and/or the countdown of timers, while avoiding unnecessary outputs for situations in which the user is already paying attention to the device) which, additionally, reduces power usage and improves battery life of the device by enabling the device to more selectively regulate alert levels and/or intensities, thereby avoiding unnecessary feedback. In addition, attenuating alerts reduces startling the user while the user is already paying attention to the device, thereby improving user experience.

In response to receiving the alert event, the device delays (1306) provision of feedback indicative of the alert event until determining whether the electronic device is in a first use context or in a second use context that is distinct from the first use context. In some embodiments, the device delays provision of audio and/or tactile feedback without delaying provision of visual feedback (e.g., updating a user interface of the device) until the determination is made. In some embodiments, the device delays provision of any feedback (e.g., audio, tactile, or visual) until the determination is made so that no feedback is provided until the determination is made.

In some embodiments, the first use context indicates (1308) that a user is interacting, or has interacted within a predefined time period, with the electronic device; and the second use context indicates that the user is not interacting, or has not interacted within the predefined time period, with the electronic device. In some embodiments, the device is deemed to be in the first use context if the user is interacting with the device (e.g., providing inputs to the device). In some embodiments, the device is deemed to be in the first use context if the user has interacted with the device within the predefined time period (e.g., 30 seconds, 1 minute, 2 minutes, 3 minutes, etc.). In some embodiments, the device is deemed to be in the second use context if the user is not interacting with the device (e.g., no input is being provided to the device) and the user has not interacted with the device within the predefined time period (e.g., 30 seconds, 1 minute, 2 minutes, 3 minutes, etc.).

Expanding the use contexts to account for attention based on recent interactions with the device (in addition to current attention) enhances the operability of the device and makes the user-device interface more efficient by avoiding unnecessary feedback (e.g., by not outputting the more impactful feedback for situations in which the user recently stopped interacting with the device but is likely still close enough to notice the less impactful feedback) which, additionally, reduces power usage and improves battery life of the device by enabling the device to more selectively regulate alert levels and/or intensities, thereby avoiding unnecessary feedback.

In some embodiments, the first use context indicates (1310) that a face of a user is detected (e.g., based on a camera that is on a same side of the device as a display of the device); and the second use context indicates that a face of a user is not detected. For example, in some embodiments, the device is deemed to be in the first use context if a face of any user (e.g., any person) is detected without recognizing the face as a face of any particular user (e.g., a registered user), and the device is deemed to be in the second use context if no face is detected.

In some embodiments, the second use context indicates that a face of a user is not recognized (e.g., even if a face is detected, the detected face does not match a face of any registered user); and the first use context indicates that the face of the user is recognized (e.g., a face is detected and recognized as a face of a registered user). In some embodiments, the second use context indicates that a face of a user is not recognized and that the user has not interacted within the predefined time period with the electronic device; and the first use context indicates that the face of the user is recognized or that the user has interacted within the predefined time period with the electronic device.

Determining use contexts based on facial detection enhances the operability of the device and makes the user-device interface more efficient (e.g., by reducing the number of inputs needed to acknowledge an alert) and improves the longevity of the device (e.g., by eliminating unnecessary pressure and friction on the touch-sensitive surface during user inputs, and thereby reducing structural fatigue of the touch-sensitive surface). Further, using facial detection as an indicator of attentiveness enhances the operability of the device and makes the user-device interface more efficient by making use of the natural assumption that a user looks at whatever the user is giving attention to, which additionally reduces power usage and improves battery life of the device by enabling the device to more selectively regulate alert levels and/or intensities, thereby avoiding unnecessary feedback when the user is not paying attention to the device.

In some embodiments, the device determines whether the electronic device is in the first use context or the second use context. In some embodiments, the device determines that the electronic device is in the first use context (but not in the second use context). In some embodiments, the device determines that the electronic device is in the second use context (but not in the first use context).

In response to determining whether the electronic device is in the first use context or the second use context, the device, in accordance with a determination that the electronic device is in the first use context (e.g., a context in which a user of the device is determined to be paying attention to the device), provides (1312, FIG. 13B) first feedback indicative of the alert event (e.g., operation 5460, FIG. 5CC). The first feedback includes a first audio output and/or a first tactile output.

In some embodiments, the device forgoes (1314) monitoring whether the electronic device has transitioned from the first use context to the second use context; and/or forgoes transitioning from providing the first feedback to providing the second feedback (e.g., as shown in FIG. 5DD, once the device is determined to be in the first use context, the device does not monitor whether the device has transitioned to the second use context). In some embodiments, the device forgoes transitioning from providing at least a portion of the first feedback to providing at least a portion of the second feedback (e.g., once the device has provided at least a portion of the first feedback, the device does not transition to providing the second feedback or any portion thereof).

Forgoing further reevaluations of attentiveness when the device has been determined to be in the first use context (e.g., in which the user is paying attention) makes use of an assumption that once a user notices an alert, any subsequent lack of attention to the device is purposeful and informed (e.g., the user decides to ignore the alert after having given it attention), and therefore the device need not switch to the more impactful feedback (e.g., corresponding to the user not paying attention). Forgoing updates to the alert feedback after the user has seen the alert further reduces power usage and improves battery life of the device by reducing the computational loads on the device and enabling the device to more selectively regulate alert levels and/or intensities.

In accordance with a determination that the electronic device is in the second use context (e.g., a context in which a user of the device is determined not to be paying attention to the device) that is distinct from the first use context, the device provides (1316) second feedback indicative of the alert event (e.g., operation 5460 in FIG. 5CC). The second feedback includes a second audio output that is distinct from the first audio output and/or a second tactile output that is distinct from the first tactile output (e.g., the second audio output has a higher volume than the first audio output and/or the second tactile output has a larger amplitude than the first tactile output).

In some embodiments, while providing the second feedback indicative of the alert event, the device monitors (1318) whether the electronic device has transitioned from the second use context to the first use context (e.g., operation 5464 in FIG. 5DD). In response to determining that the electronic device has transitioned from the second use context to the first use context, the device transitions from providing the second feedback to providing the first feedback (e.g., operation 5462 to operation 5460 as shown in FIG. 5DD). In some embodiments, in response to determining that the electronic device has transitioned from the second use context to the first use context, the device transitions from providing at least a portion of the first feedback to providing at least a portion of the second feedback (e.g., FIG. 5GG).

Monitoring the user's attentiveness in the midst of outputting an alert and switching the alert's feedback based on a determination that the user's attentiveness has changed further enhances the operability of the device and makes the user-device interface more efficient (e.g., by providing an indication of the internal state of the device that is more responsive to the user's interactions with the device) and thereby reduces power usage and improves battery life of the device by enabling the device to switch from using more power hungry feedback when the situation no longer calls for it.

In some embodiments, transitioning from providing the second feedback to providing the first feedback includes (1320): transitioning from providing the second audio output to providing the first audio output over a first period of time (e.g., t1 in FIG. 5GG); and transitioning from providing the second tactile output to providing the first tactile output over a second period of time (e.g., t2 in FIG. 5GG) that is less than the first period of time. In some embodiments, transitioning from providing the second feedback to providing the first feedback includes: transitioning from determining that the electronic device has transitioned from the second use context to the first use context to providing the first audio output over a first period of time (e.g., t1' in FIG. 5GG); and transitioning from determining that the electronic device has transitioned from the second use context to the first use context to providing the first tactile output over a second period of time (e.g., t2' in FIG. 5GG) that is less than the first period of time.

Transitioning between audio outputs more gradually than between tactile outputs further reduces power usage and improves battery life of the device by taking advantage of varying levels of user sensitivity to changes in audio versus tactile feedback. Specifically, since sharp changes in tactile feedback are less perceptible than sharp changes in audio feedback, the more gradual audio transition enhances the user's audio experience while the sharp tactile transition reduces power usage and improves battery life of the device.

In some embodiments, the first audio output has (1322, FIG. 13C) a first volume (e.g., a first representative volume, such as an average volume) and the second audio output has a second volume (e.g., a second representative volume, such as an average volume) that is greater than the first volume (e.g., the first volume is less than the second volume). For example, the second audio output shown in FIG. 5EE has a greater volume than the first audio output shown in FIG. 5FF.

Reducing the volume for an alert when the device detects that a user is paying attention provides improved feedback which enhances the operability of the device and makes the user-device interface more efficient (e.g., by providing an indication of the internal state of the device while avoiding unnecessarily high volumes) which, additionally, reduces power usage and improves battery life of the device by enabling the device to more selectively regulate high volume levels when they are not needed, thereby avoiding unnecessary feedback.

In some embodiments, the first volume corresponds (1324) to a reduction of the second volume by a reduction factor; and the reduction factor is selected based on a volume property of the electronic device. For example, a high reduction factor is used when a (ringer) volume setting of the electronic device is high, and a low reduction factor is used when the (ringer) volume setting of the electronic device is low.

Reducing the volume for an alert by an amount determined by a volume setting of the device provides improved feedback which enhances the operability of the device and makes the user-device interface more efficient by preventing the volume from reducing to a level that is so low that the user cannot hear the alert (e.g., in situations where the device's volume is already reduced before the alert event due to an initial setting). In addition, reducing the volume for an alert by an amount determined by a volume setting of the device allows reducing the volume more when the device's volume is high so that the first audio output is not too loud, thereby improving the operability of the device.

In some embodiments, the first audio output corresponds (1326) to an output obtained by applying a low pass filter to the second audio output (e.g., FIG. 5LL). For example, when a low pass filter is applied to the second audio output to obtain the first audio output, the first audio output includes low frequency components of the second audio output without suppression but includes high frequency components of the second audio output with suppression (e.g., amplitudes of the high frequency components are reduced in the first audio output).

Applying a low pass filter to the audio output for an alert to provided when the device detects that a user is paying attention provides improved feedback which enhances the operability of the device and makes the user-device interface more efficient (e.g., by maintaining the character of the alert while providing a muffled version of the feedback to allow for less distraction while the user tends to the alert) which, additionally, reduces power usage and improves battery life of the device by enabling the device to more selectively regulate high frequencies when they are not needed, thereby avoiding unnecessary feedback.

In some embodiments, the second audio output includes (1328) two or more audio tracks; and the first audio output includes a subset, less than all, of the two or more audio tracks. For example, as shown in FIG. 5MM, the second audio output includes three audio output tracks, and the first audio output includes only two of the three audio output tracks (e.g., audio output track 2 is omitted in the first audio output). In some embodiments, each audio track corresponds to a particular musical instrument (e.g., the first audio track corresponds to a guitar, the second audio track corresponds to drums, and the third audio track corresponds to a keyboard). In such embodiments, removing one or more audio output tracks removes audio tracks corresponding to one or more musical instruments.

Reducing the number of audio tracks that are included in the output for an alert when the device detects that a user is paying attention provides improved feedback which enhances the operability of the device and makes the user-device interface more efficient (e.g., by maintaining the character of the alert while providing a simpler version of the feedback with fewer audio components to allow for less distraction while the user tends to the alert) which, additionally, reduces power usage and improves battery life of the device by enabling the device to more selectively regulate audio tracks when they are not needed, thereby avoiding unnecessary feedback.

In some embodiments, the second audio output includes (1330) a first audio track at a third volume and a second audio track at a fourth volume; and the first audio output includes the first audio tracking at the third volume and the second audio track at a fifth volume that is less than the fourth volume. For example, as shown in FIG. 5NN, the second audio output includes audio output track 1 at a particular volume (e.g., a third volume) and audio output track 2 at another volume (e.g., a fourth volume, which may or may not be the same as the third volume). The first audio output includes audio output track at the same particular volume (e.g., the third volume) and audio output track 2 at a reduced volume (e.g., a fifth volume that is less than the fourth volume).

Selectively reducing the volume for certain audio tracks while preserving the volume of others for an alert when the device detects that a user is paying attention provides improved feedback which enhances the operability of the device and makes the user-device interface more efficient (e.g., by maintaining the character of the alert while providing a simpler version of the feedback with less pronounced audio components to allow for less distraction while the user tends to the alert) which, additionally, reduces power usage and improves battery life of the device by enabling the device to more selectively regulate audio tracks, thereby avoiding unnecessary feedback.

In some embodiments, the first audio output corresponds (1332) to an output of applying a respective audio filter to the second audio output; and the respective audio filter is selected based on a type of audio content of the second audio output. In some embodiments, the audio content of the second audio output is determined based on frequency components of the second audio output, as described above with respect to FIG. 5LL, or musical instruments associated with the second audio output (e.g., a low pass filter with a low cutoff frequency is used for bass musical instruments and a low pass filter with a high cutoff frequency is used for alto musical instruments). In some embodiments, the audio content of the second audio output is determined based on a type of the alert event (e.g., whether the alert event is associated with an incoming call, an alarm, or a timer), as shown in FIG. 5LL.

Applying respective filters to audio tracks based on the content of the track for an alert when the device detects that a user is paying attention provides improved feedback which enhances the operability of the device and makes the user-device interface more efficient (e.g., by customizing the filtering for each track based on differences in content, thereby maintaining an acceptable level of sound quality while allowing for less distraction while the user tends to the alert) which, additionally, reduces power usage and improves battery life of the device by enabling the device to more selectively regulate audio tracks, thereby avoiding unnecessary feedback.

In some embodiments, a first audio filter is used for a first audio track and a second audio filter that is distinct from the first audio filter is used for a second audio track (because the first audio track includes a first type of audio content and the second audio track includes a second type of audio content that is distinct from the first type of audio content).

In some embodiments, providing the second feedback indicative of the alert event includes (1334) generating the second audio output by outputting an audio alert without applying a first filter or a second filter to the audio alert (e.g., the second audio output is an unfiltered audio output). Providing the first feedback indicative of the alert event includes: in accordance with a determination that an audio alert designated for the alert event is a first type of audio alert, generating the first audio output by applying the first filter to the audio alert of the first type; and in accordance with a determination that the audio alert designated for the alert event is a second type of audio alert, generating the first audio output by applying the second filter to the audio alert of the second type. For example, an audio filter is selected based on the type of the audio alert for generating the first audio output (e.g., a first audio filter is used for an incoming call, a second audio filter is used for a timer alert, and a third audio filter is used for an alarm clock).

Applying (or removing) respective filters to audio alerts based on the type of alert when the device detects that a user is paying attention provides improved feedback which enhances the operability of the device and makes the user-device interface more efficient (e.g., by customizing the filtering for different types of alerts, thereby maintaining an acceptable level of sound quality while allowing for less distraction while the user tends to the alert) which, additionally, reduces power usage and improves battery life of the device by enabling the device to more selectively regulate audio outputs, thereby avoiding unnecessary feedback.

In some embodiments, providing the first feedback indicative of the alert event includes: in accordance with a determination that an audio alert designated for the alert event is a first type of audio alert, generating the first audio output by applying a first filter to the audio alert of the first type; and in accordance with a determination that the audio alert designated for the alert event is a second type of audio alert, generating the first audio output by applying a second filter to the audio alert of the second type. Providing the second feedback indicative of the alert event includes generating the second audio output by outputting the first audio alert without applying the first filter or the second filter.

In some embodiments, the first tactile output has (1336, FIG. 13D) a first amplitude (e.g., a first representative amplitude, such as an average amplitude) and the second tactile output has a second amplitude (e.g., a second representative amplitude, such as an average amplitude) that is greater than the first amplitude (e.g., the first amplitude of tap-based tactile output 5504 is less than the second amplitude of tap-based tactile output 5502 as shown in FIG. 5HH).

Reducing the amplitude for an alert when the device detects that a user is paying attention provides improved feedback which enhances the operability of the device and makes the user-device interface more efficient (e.g., by providing an indication of the internal state of the device while avoiding tactile outputs with unnecessarily high amplitudes) which, additionally, reduces power usage and improves battery life of the device by enabling the device to more selectively regulate high amplitude levels when they are not needed, thereby avoiding unnecessary feedback.

In some embodiments, the first tactile output is a first sequence of tactile output components (e.g., tap-based tactile output components in tap-based tactile output 5504, FIG. 5HH) and the second tactile output is a second sequence of tactile outputs (e.g., tap-based tactile output components in tap-based tactile output 5502, FIG. 5HH) that corresponds to at least a portion of the first sequence of tactile outputs with a reduced amplitude (e.g., tactile outputs in the second sequence of tactile outputs have 75% or 50% of the amplitude of corresponding tactile outputs in the first sequence of tactile outputs), as shown in FIG. 5HH.

In some embodiments, the first tactile output includes (1338) a first number of tactile output components; the second tactile output includes a second number of tactile output components; and the second number is less than the first number. For example, as shown in FIG. 5JJ, the first tactile output has more tactile output components (e.g., discrete tactile outputs) than the second tactile output. In some cases, a single tactile output component in the second tactile output is replaced with multiple tactile output components (e.g., in FIG. 5JJ, single tactile output component 5528 is replaced with three tactile output components 5530, 5532, and 5534). In some embodiments, the multiple tactile output components have a lower amplitude than the single tactile output component, as shown in FIG. 5JJ (e.g., the multiple tactile output components are MiniTaps or MicroTaps shown in FIGS. 4G-4H and 4J-4K, and the single tactile output component is a FullTap shown in FIGS. 4F and 4I; alternatively, the multiple tactile output components are MicroTaps shown in FIGS. 4H and 4K, and the single tactile output component is a MiniTap shown in FIGS. 4G and 4J).

Outputting a different number of tactile outputs for an alert when the device detects that a user is paying attention provides improved feedback which enhances the operability of the device and makes the user-device interface more efficient (e.g., by providing an indication of the internal state of the device while avoiding tactile outputs with unnecessary characteristics) which, additionally, reduces power usage and improves battery life of the device by enabling the device to more selectively regulate certain types of tactile outputs when they are not needed, thereby avoiding unnecessary feedback.

In some embodiments, the second tactile output includes (1340) a plurality of tactile output components; and the first tactile output includes a subset, less than all, of the plurality of tactile output components. For example, as shown in FIG. 5KK, the second tactile output includes tactile output components 5526 and 5528, and the first tactile output includes tactile output component 5526 but does not include tactile output component 5528.

Reducing the number of tactile output components for an alert when the device detects that a user is paying attention provides improved feedback which enhances the operability of the device and makes the user-device interface more efficient (e.g., by providing an indication of the internal state of the device while minimizing the amount of tactile output components needed to signal the alert to the user) which, additionally, reduces power usage and improves battery life of the device by enabling the device to more selectively regulate high numbers of tactile output components when they are not needed, thereby avoiding unnecessary feedback.

In some embodiments, the second feedback includes (1342) a first vibration output that is generated by repeated oscillations of a tactile output generator at a respective frequency. The first feedback includes a sequence of tactile output components in place of the first vibration output. The tactile output components in the sequence of tactile output components correspond to separate activations of a tactile output generator instead of repeated oscillations of a tactile output generator at the respective frequency (e.g., there are pauses when the tactile output generator is not moving in between the separate activations of the tactile output generator). For example, as shown in FIG. 5GG, the vibration output included in the second feedback is replaced with tactile output components in the first feedback.

Separating activations of a tactile generator for an alert when the device detects that a user is paying attention (versus providing repeated oscillations with no separations) provides improved feedback which enhances the operability of the device and makes the user-device interface more efficient (e.g., by providing an indication of the internal state of the device while minimizing the amount of work required by the tactile output generator) which, additionally, reduces power usage and improves battery life of the device by enabling the device to more selectively regulate tactile output patterns, thereby avoiding unnecessary feedback.

In some embodiments, providing the first feedback indicative of the alert event includes (1344) transitioning from providing the second feedback to providing third feedback that includes a third audio output and/or a third tactile output, followed by a transition to providing the first feedback. A volume of the third audio output is less than a volume of the second audio output and greater than a volume of the first audio output, and/or an amplitude of the third tactile output is less than an amplitude of the second tactile output and greater than an amplitude of the first tactile output. For example, as shown in FIG. 5OO, transitioning from providing audio output track 1 to providing audio output track 3 includes first transitioning from providing audio output track 1 to providing audio output track 2 and subsequently transitioning from providing audio output track 2 to providing audio output track 3. An amplitude of audio output track 2, $A_2$, is less than an amplitude of audio output track 1, $A_1$, and an amplitude of audio output track 3, $A_3$, is less than the amplitude of audio output track 2, $A_2$. Thus, as the device progresses through the multiple audio output tracks, the overall volume of the audio output is reduced over time.

Progressively reducing the volume and/or amplitude for an alert when the device detects that a user is paying attention provides improved feedback which enhances the operability of the device and makes the user-device interface more efficient (e.g., by transitioning to lower power outputs while accounting for user sensitivities regarding sharp volume and/or amplitude transitions) which, additionally, reduces power usage and improves battery life of the device by enabling the device to regulate high volume and/or amplitude levels when they are not needed, thereby avoiding unnecessary feedback.

It should be understood that the particular order in which the operations in FIGS. 13A-13D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, 900, 1000, 1100, and 1200) are also applicable in an analogous manner to method 1300 described above with respect to FIGS. 13A-13D. For example, the tactile outputs described above with reference to method 1300 optionally have one or more of the characteristics of the tactile outputs described herein with reference to other methods described herein (e.g., methods 600, 700, 800, 900, 1000, 1100, and 1200). For brevity, these details are not repeated here.

The operations in the methods described above are, optionally implemented by running one or more functional modules in information processing apparatus such as general purpose processors (e.g., as described above with respect to FIGS. 1A and 3) or application specific chips.

The operations described above with reference to FIGS. 6A-6C are, optionally, implemented by components depicted in FIGS. 1A-1B. For example, display operation 602 and detection operation 604 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Similarly, the operations described above with reference to FIGS. 7A-7D are, optionally, implemented by components depicted in FIGS. 1A-1B. For example, display operation 702, detection operation 704, and producing operation 706 are, optionally, implemented by event sorter 170, event recognizer 180, and event handler 190. The operations described above with reference to FIGS. 8A-8C are, optionally, implemented by components depicted in FIGS. 1A-1B. For example, display operation 802 and detection operation 804 are, optionally, implemented by event sorter 170, event recognizer 180, and event handler 190. The operations described above with reference to FIG. 9 are, optionally, implemented by components depicted in FIGS. 1A-1B. For example, display operation 902, detection operation 904, move operation 908, and output operation 910 are, optionally, implemented by event sorter 170, event recognizer 180, and event handler 190. The operations described above with reference to FIG. 10 are, optionally, implemented by components depicted in FIGS. 1A-1B. For example, display operation 1002 and detection operation 1004 are, optionally, implemented by event sorter 170, event recognizer 180, and event handler 190. The operations described above with reference to FIGS. 11A-11B are, optionally, implemented by components depicted in FIGS. 1A-1B. For example, receiving operation 1102 is optionally, implemented by event sorter 170, event recognizer 180, and event handler 190. The operations described above with reference to FIGS. 12A-12D are, optionally, implemented by components depicted in FIGS. 1A-1B. For example, receiving operation 1202, determination operation 1204, and providing operation 1206 are, optionally, implemented by event sorter 170, event recognizer 180, and event handler 190. The operations described above with reference to FIGS. 13A-13D are, optionally, implemented by components depicted in FIGS. 1A-1B. For example, detecting operation 1302, feedback providing operation 1312, and feedback providing operation 1316 are, optionally, implemented by event sorter 170, event recognizer 180, and event handler 190.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
at an electronic device with a display, a touch-sensitive surface, and one or more tactile output generators:
displaying, on the display, a user interface that includes:
a first adjustable control, and
a second adjustable control;
detecting movement of a first contact across the touch-sensitive surface in a drag gesture;
in accordance with a determination that the drag gesture is performed while a focus selector is at a location that corresponds to the first adjustable control:
adjusting the first adjustable control in accordance with the movement of the first contact in the drag gesture; and
outputting, with the one or more tactile output generators, a first plurality of tactile outputs, wherein:
a respective tactile output, in the first plurality of tactile outputs, is triggered based on progress adjusting the first adjustable control; and
the first plurality of tactile outputs have a first distribution of tactile outputs as the first adjustable control is adjusted; and
in accordance with a determination that the drag gesture is performed while the focus selector is at a location that corresponds to the second adjustable control:
adjusting the second adjustable control in accordance with the movement of the first contact in the drag gesture; and
outputting, with the one or more tactile output generators, a second plurality of tactile outputs, wherein:
a respective tactile output, in the second plurality of tactile outputs, is triggered based on progress adjusting the second adjustable control; and
the second plurality of tactile outputs has a second distribution of tactile outputs that is different from the first distribution of tactile outputs as the second adjustable control is adjusted.

2. The method of claim 1, wherein the first adjustable control is a progress control for selecting a position within content, and the second adjustable control is a volume control for controlling volume of the content while the content is playing.

3. The method of claim 1, wherein the first plurality of tactile outputs includes an endpoint tactile output that is provided in accordance with a determination that the first adjustable control has reached an endpoint.

4. The method of claim 1, wherein, for a respective tactile output in the first plurality of tactile outputs, the respective tactile output is triggered when the focus selector is at a corresponding predefined location on the display.

5. The method of claim 4, wherein:
the first adjustable control is a progress control, and
one or more predefined locations on the display correspond to chapter markers for media content whose playback is being adjusted with the progress control.

6. The method of claim 1, wherein each tactile output, in the first plurality of tactile outputs and in the second plurality of tactile outputs, has a corresponding tactile output profile.

7. The method of claim 1, wherein a respective tactile output, in the first plurality of tactile outputs, has a first respective tactile output profile; and a respective tactile output, in the second plurality of tactile outputs, has a second respective tactile output profile that is different from the first respective tactile output profile.

8. The method of claim 1, wherein amplitudes of tactile outputs in the first plurality of tactile outputs are constant and amplitudes of tactile outputs in the second plurality of tactile outputs are variable.

9. The method of claim 1, wherein amplitudes of tactile outputs in the first plurality of tactile outputs vary in a first manner and amplitudes of tactile outputs in the second plurality of tactile outputs vary in a second manner that is different from the first manner.

10. The method of claim 1, wherein tactile outputs in the first plurality of tactile outputs are accompanied by corresponding audio outputs.

11. The method of claim 10, wherein the audio outputs have an audio parameter that is variable.

12. The method of claim 1, wherein the user interface includes a play/pause toggle control; and the method includes:
detecting an input by a second contact on the touch-sensitive surface while a focus selector is at a location that corresponds to the play/pause toggle control;
in response to detecting the input by the second contact:
in accordance with a determination that the input corresponds to a request to play media content:
playing the media content;
displaying the play/pause toggle control in a play state; and
outputting, with the one or more tactile output generators, at least one tactile output that has a first tactile output profile; and,
in accordance with a determination that the input corresponds to a request to pause the media content:

pausing the media content;
displaying the play/pause toggle control in a pause state; and
outputting, with the one or more tactile output generators, at least one tactile output that has a second tactile output profile that is different from the first tactile output profile.

13. An electronic device, comprising:
a display;
a touch-sensitive surface;
one or more tactile output generators;
one or more processors;
memory; and
one or more programs, wherein the one or more programs are stored in the memory and configured to be executed by the one or more processors, the one or more programs including instructions for:
displaying, on the display, a user interface that includes:
a first adjustable control, and
a second adjustable control;
detecting movement of a first contact across the touch-sensitive surface in a drag gesture;
in accordance with a determination that the drag gesture is performed while a focus selector is at a location that corresponds to the first adjustable control:
adjusting the first adjustable control in accordance with the movement of the first contact in the drag gesture; and
outputting, with the one or more tactile output generators, a first plurality of tactile outputs, wherein:
a respective tactile output, in the first plurality of tactile outputs, is triggered based on progress adjusting the first adjustable control; and
the first plurality of tactile outputs have a first distribution of tactile outputs as the first adjustable control is adjusted; and
in accordance with a determination that the drag gesture is performed while the focus selector is at a location that corresponds to the second adjustable control:
adjusting the second adjustable control in accordance with the movement of the first contact in the drag gesture; and
outputting, with the one or more tactile output generators, a second plurality of tactile outputs, wherein:
a respective tactile output, in the second plurality of tactile outputs, is triggered based on progress adjusting the second adjustable control; and
the second plurality of tactile outputs has a second distribution of tactile outputs that is different from the first distribution of tactile outputs as the second adjustable control is adjusted.

14. The electronic device of claim 13, wherein the first adjustable control is a progress control for selecting a position within content, and the second adjustable control is a volume control for controlling volume of the content while it is playing.

15. The electronic device of claim 13, wherein the first plurality of tactile outputs includes an endpoint tactile output that is provided in accordance with a determination that the first adjustable control has reached an endpoint.

16. The electronic device of claim 13, wherein, for a respective tactile output in the first plurality of tactile outputs, the respective tactile output is triggered when the focus selector is at a corresponding predefined location on the display.

17. The electronic device of claim 16, wherein:
the first adjustable control is a progress control, and
one or more predefined locations on the display correspond to chapter markers for media content whose playback is being adjusted with the progress control.

18. The electronic device of claim 13, wherein each tactile output, in the first plurality of tactile outputs and in the second plurality of tactile outputs, has a corresponding tactile output profile.

19. The electronic device of claim 13, wherein a respective tactile output, in the first plurality of tactile outputs, has a first respective tactile output profile; and a respective tactile output, in the second plurality of tactile outputs, has a second respective tactile output profile that is different from the first respective tactile output profile.

20. The electronic device of claim 13, wherein amplitudes of tactile outputs in the first plurality of tactile outputs are constant and amplitudes of tactile outputs in the second plurality of tactile outputs are variable.

21. The electronic device of claim 13, wherein amplitudes of tactile outputs in the first plurality of tactile outputs vary in a first manner and amplitudes of tactile outputs in the second plurality of tactile outputs vary in a second manner that is different from the first manner.

22. The electronic device of claim 13, wherein tactile outputs in the first plurality of tactile outputs are accompanied by corresponding audio outputs.

23. The electronic device of claim 22, wherein the audio outputs have an audio parameter that is variable.

24. The electronic device of claim 13, wherein the user interface includes a play/pause toggle control; and the one or more programs further include instructions for:
detecting an input by a second contact on the touch-sensitive surface while a focus selector is at a location that corresponds to the play/pause toggle control;
in response to detecting the input by the second contact:
in accordance with a determination that the input corresponds to a request to play media content:
playing the media content;
displaying the play/pause toggle control in a play state; and
outputting, with the one or more tactile output generators, at least one tactile output that has a first tactile output profile; and,
in accordance with a determination that the input corresponds to a request to pause the media content:
pausing the media content;
displaying the play/pause toggle control in a pause state; and
outputting, with the one or more tactile output generators, at least one tactile output that has a second tactile output profile that is different from the first tactile output profile.

25. A non-transitory computer readable storage medium storing one or more programs, the one or more programs comprising instructions that, when executed by an electronic device with a display, a touch-sensitive surface, and one or more tactile output generators, cause the electronic device to:
display, on the display, a user interface that includes:
a first adjustable control, and
a second adjustable control;
detect movement of a first contact across the touch-sensitive surface in a drag gesture;

in accordance with a determination that the drag gesture is performed while a focus selector is at a location that corresponds to the first adjustable control:
  adjust the first adjustable control in accordance with the movement of the first contact in the drag gesture; and
  output, with the one or more tactile output generators, a first plurality of tactile outputs, wherein:
    a respective tactile output, in the first plurality of tactile outputs, is triggered based on progress adjusting the first adjustable control; and
    the first plurality of tactile outputs have a first distribution of tactile outputs as the first adjustable control is adjusted; and
in accordance with a determination that the drag gesture is performed while the focus selector is at a location that corresponds to the second adjustable control:
  adjust the second adjustable control in accordance with the movement of the first contact in the drag gesture; and
  output, with the one or more tactile output generators, a second plurality of tactile outputs, wherein:
    a respective tactile output, in the second plurality of tactile outputs, is triggered based on progress adjusting the second adjustable control; and
    the second plurality of tactile outputs has a second distribution of tactile outputs that is different from the first distribution of tactile outputs as the second adjustable control is adjusted.

26. The computer readable storage medium of claim 25, wherein the first adjustable control is a progress control for selecting a position within content, and the second adjustable control is a volume control for controlling volume of the content while it is playing.

27. The computer readable storage medium of claim 25, wherein the first plurality of tactile outputs includes an endpoint tactile output that is provided in accordance with a determination that the first adjustable control has reached an endpoint.

28. The computer readable storage medium of claim 25, wherein, for a respective tactile output in the first plurality of tactile outputs, the respective tactile output is triggered when the focus selector is at a corresponding predefined location on the display.

29. The computer readable storage medium of claim 28, wherein:
  the first adjustable control is a progress control, and
  one or more predefined locations on the display correspond to chapter markers for media content whose playback is being adjusted with the progress control.

30. The computer readable storage medium of claim 25, wherein each tactile output, in the first plurality of tactile outputs and in the second plurality of tactile outputs, has a corresponding tactile output profile.

31. The computer readable storage medium of claim 25, wherein a respective tactile output, in the first plurality of tactile outputs, has a first respective tactile output profile; and a respective tactile output, in the second plurality of tactile outputs, has a second respective tactile output profile that is different from the first respective tactile output profile.

32. The computer readable storage medium of claim 25, wherein amplitudes of tactile outputs in the first plurality of tactile outputs are constant and amplitudes of tactile outputs in the second plurality of tactile outputs are variable.

33. The computer readable storage medium of claim 25, wherein amplitudes of tactile outputs in the first plurality of tactile outputs vary in a first manner and amplitudes of tactile outputs in the second plurality of tactile outputs vary in a second manner that is different from the first manner.

34. The computer readable storage medium of claim 25, wherein tactile outputs in the first plurality of tactile outputs are accompanied by corresponding audio outputs.

35. The computer readable storage medium of claim 34, wherein the audio outputs have an audio parameter that is variable.

36. The computer readable storage medium of claim 25, wherein the user interface includes a play/pause toggle control; and the one or more programs further include instructions that when executed by the electronic device cause the electronic device to:
  detect an input by a second contact on the touch-sensitive surface while a focus selector is at a location that corresponds to the play/pause toggle control;
  in response to detecting the input by the second contact:
    in accordance with a determination that the input corresponds to a request to play media content:
      play the media content;
      display the play/pause toggle control in a play state; and
      output, with the one or more tactile output generators, at least one tactile output that has a first tactile output profile; and,
    in accordance with a determination that the input corresponds to a request to pause the media content:
      pause the media content;
      display the play/pause toggle control in a pause state; and
      output, with the one or more tactile output generators, at least one tactile output that has a second tactile output profile that is different from the first tactile output profile.

* * * * *